US012223069B1

(12) United States Patent

Caffey

(10) Patent No.: US 12,223,069 B1

(45) Date of Patent: *Feb. 11, 2025

(54) SYSTEM AND METHOD FOR SECURELY VIEWING, EDITING, SHARING, AND LOGGING DOCUMENTS AND OTHER FILES AND INFORMATION, AND AUTHENTICATING USERS IN VIDEO AND IMAGES

(71) Applicant: SMART EYE TECHNOLOGY, INC., Atlanta, GA (US)

(72) Inventor: Dexter A. Caffey, Atlanta, GA (US)

(73) Assignee: SMART EYE TECHNOLOGY, INC., Atlanta, GA (US)

( * ) Notice: Subject to any disclaimer, the term of this patent is extended or adjusted under 35 U.S.C. 154(b) by 932 days.

This patent is subject to a terminal disclaimer.

(21) Appl. No.: 17/331,474

(22) Filed: May 26, 2021

Related U.S. Application Data

(63) Continuation-in-part of application No. 16/542,451, filed on Aug. 16, 2019, now Pat. No. 11,341,222.

(Continued)

(51) Int. Cl.

*G06F 21/32* (2013.01)

*G06F 16/93* (2019.01)

(Continued)

(52) U.S. Cl.

CPC .......... *G06F 21/6209* (2013.01); *G06F 16/93* (2019.01); *G06F 21/32* (2013.01);

(Continued)

(58) Field of Classification Search

None

See application file for complete search history.

(56) References Cited

U.S. PATENT DOCUMENTS

2002/0056046 A1 5/2002 Klein

2004/0064728 A1 4/2004 Scheurich (Continued)

OTHER PUBLICATIONS

Brown et al., A Novel Multimodal Biometric Authentication System using Machine Learning and Blockchain, Inc 2020: 12th International Network Conference 2020, Rhodes, Greece, Sep. 19-21, 2020, DOI: 10.1007/978-3-030-64758-2_3 (Year: 2020).*

*Primary Examiner* — Piotr Poltorak

(74) *Attorney, Agent, or Firm* — Smith, Gambrell & Russell, LLP; Gregory J. Kirsch

(57) ABSTRACT

The present invention allows for the creation of a biometrically secure environment that allows viewing, editing and sharing of confidential documents, or the like, in public places, without worrying that someone will see the contents. The invention provides privacy, for example for the purposes of reading documents, in a public environment while having the confidence that you are the only one able to read the document. Privacy may be achieved through methods of identification using biometric features, such as: face, iris or voice recognition. Verification that a real person is viewing the document may also be achieved by pulse recognition. In one embodiment, the screen will shut down when more than one person looks directly at the screen. In different embodiments, the present invention may use voice recognition, print behavior, iris scan, finger print, face verification, etc. A control panel and dashboard may be used, and liveness check or activity audit may be performed. In further embodiments, a document may be securely shared with groups of recipients; a user may be authenticated while video chatting; voice commands may be used to upload, share, send, and open documents; commands may be provided to allow for documents to be read out loud; documents that are shared during screen sharing during a video conference session may (Continued)

be logged; and documents may be scanned and uploaded into the system.

9 Claims, 207 Drawing Sheets

Related U.S. Application Data

(60) Provisional application No. 63/086,120, filed on Oct. 1, 2020, provisional application No. 63/030,446, filed on May 27, 2020, provisional application No. 62/720,543, filed on Aug. 21, 2018.

(51) Int. Cl.
*G06F 21/45* (2013.01)
*G06F 21/62* (2013.01)

(52) U.S. Cl.
CPC ...... *G06F 21/45* (2013.01); *G06F 2221/2113* (2013.01); *G06F 2221/2141* (2013.01)

(56) References Cited

U.S. PATENT DOCUMENTS

| | | | | |
|---|---|---|---|---|
| 2010/0205667 | A1* | 8/2010 | Anderson | G06F 3/013 726/19 |
| 2011/0225202 | A1 | 9/2011 | Man et al. | |
| 2011/0307960 | A1 | 12/2011 | Cepuran et al. | |
| 2016/0253559 | A1 | 9/2016 | Goncharov et al. | |
| 2017/0243020 | A1 | 8/2017 | Dhondse et al. | |
| 2019/0034395 | A1 | 1/2019 | Curry et al. | |
| 2019/0340373 | A1* | 11/2019 | Bulpin | G06F 21/6209 |

* cited by examiner

901

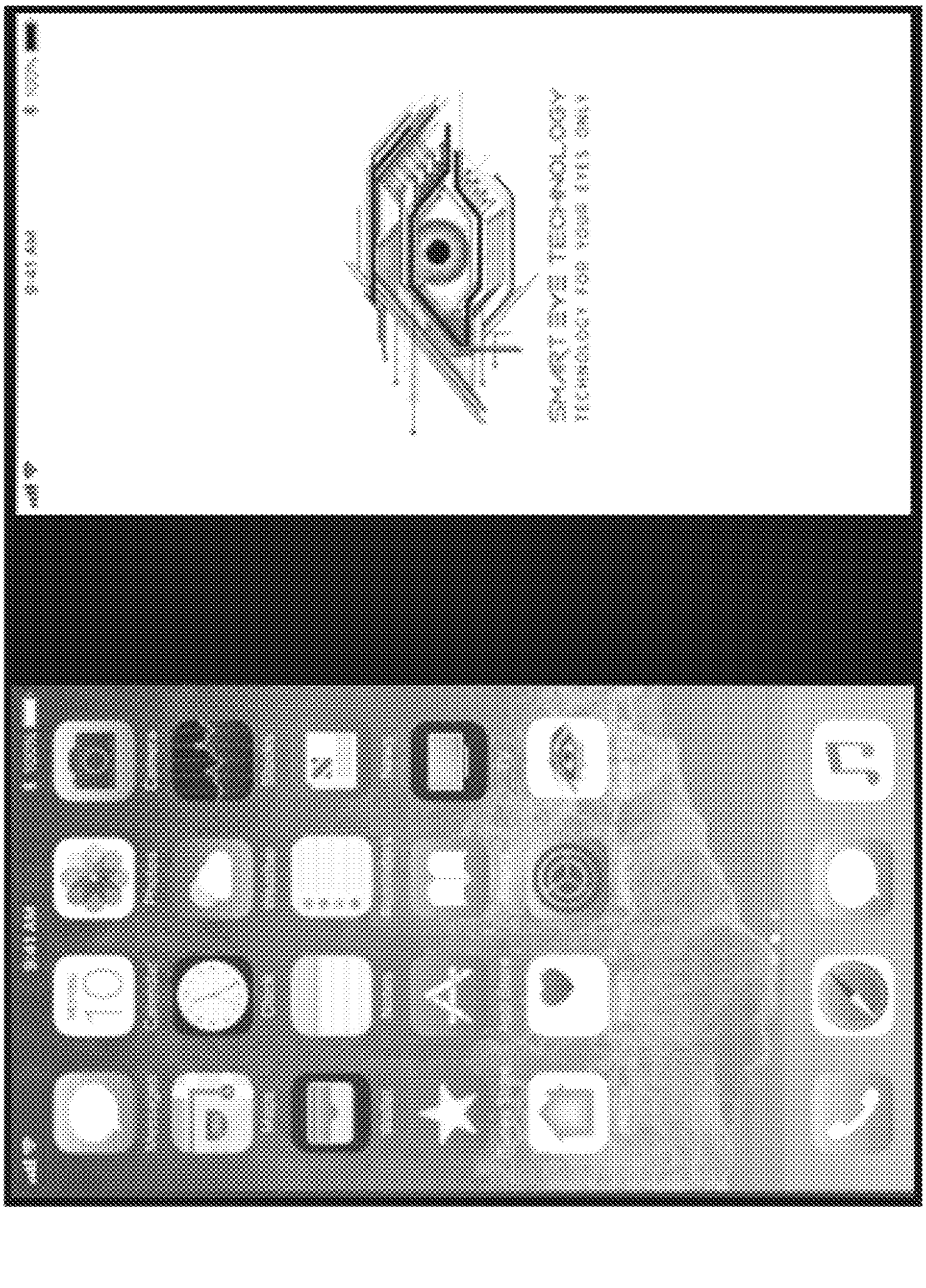
Figure 16.2
Figure 16.1

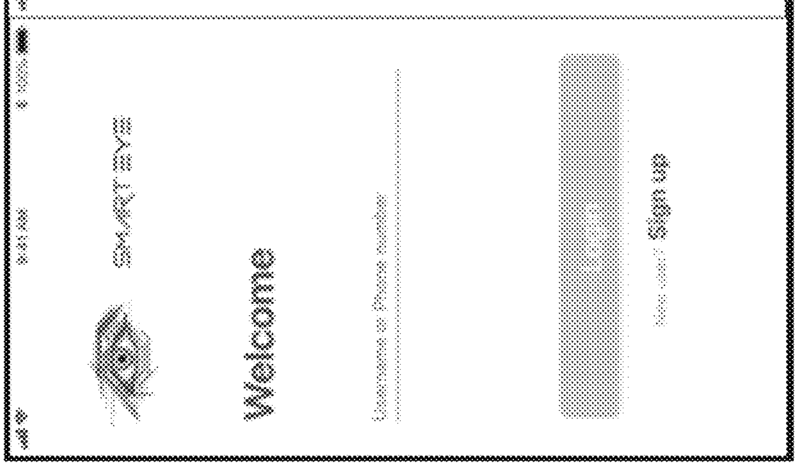
Figure 16.3
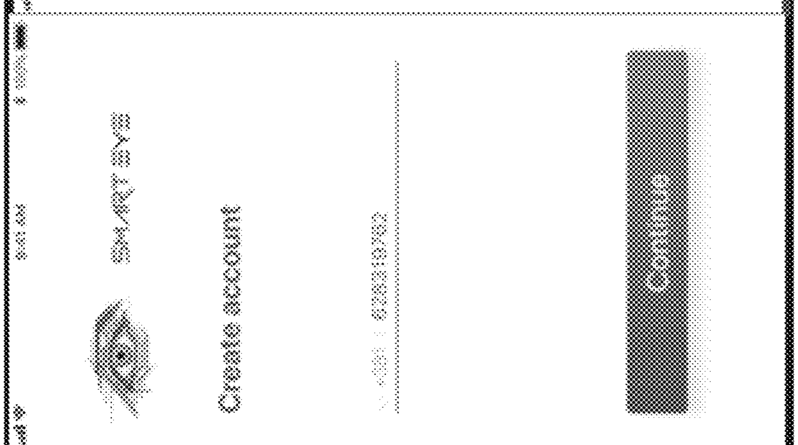
Figure 16.4
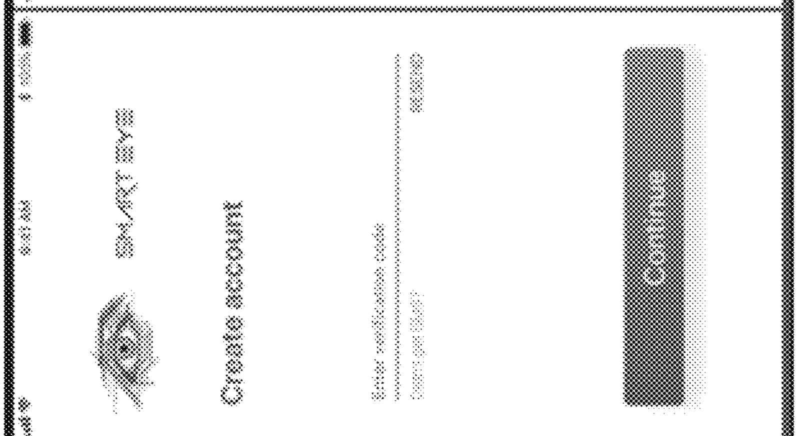
Figure 16.5
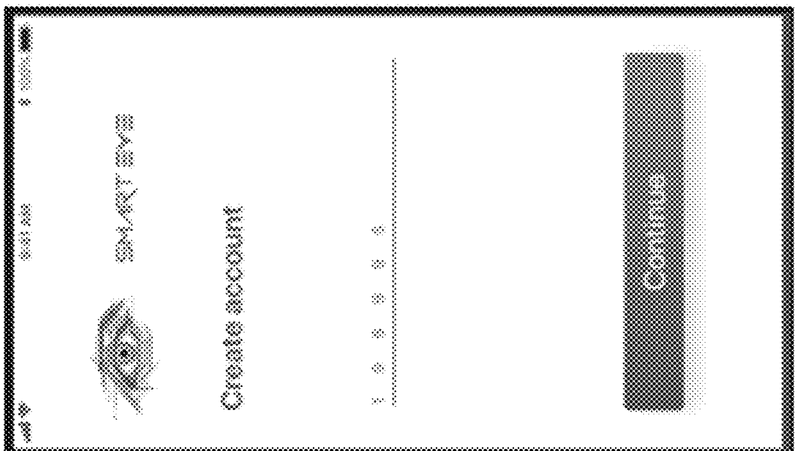
Figure 16.6

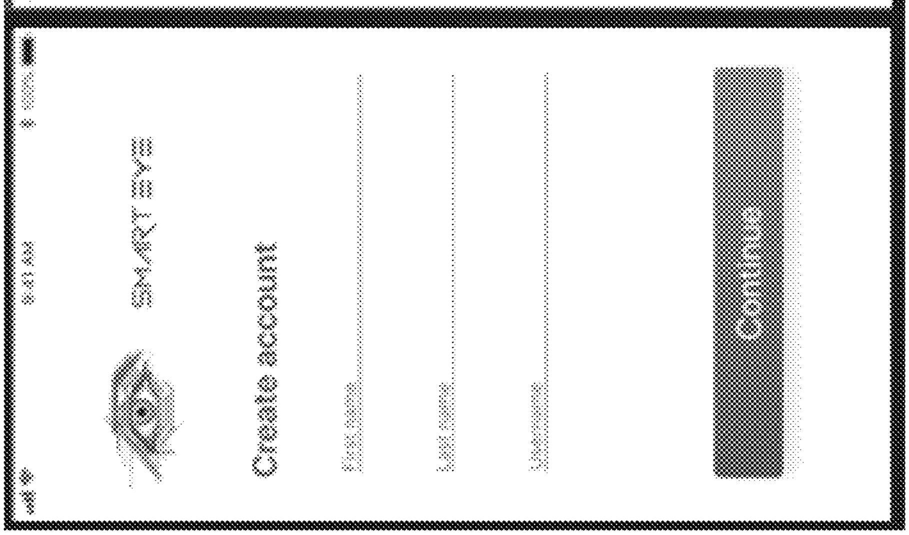
Figure 16.7
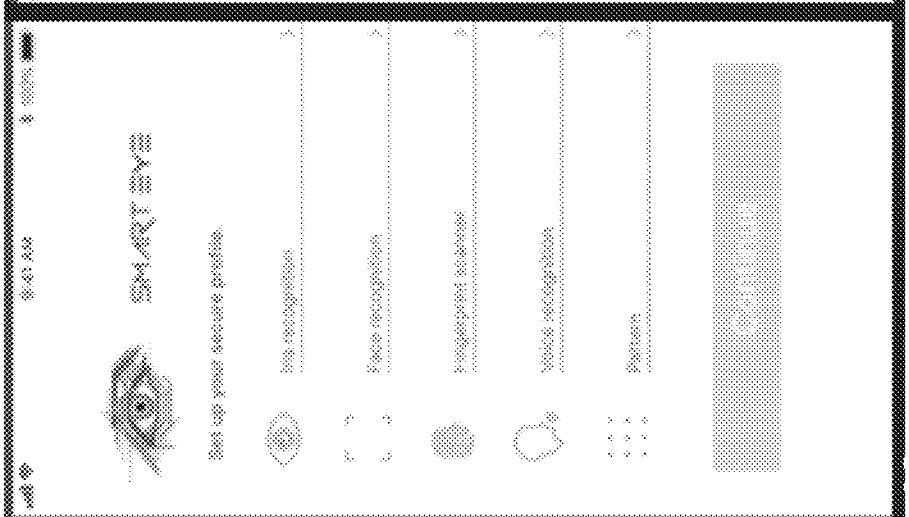
Figure 16.8
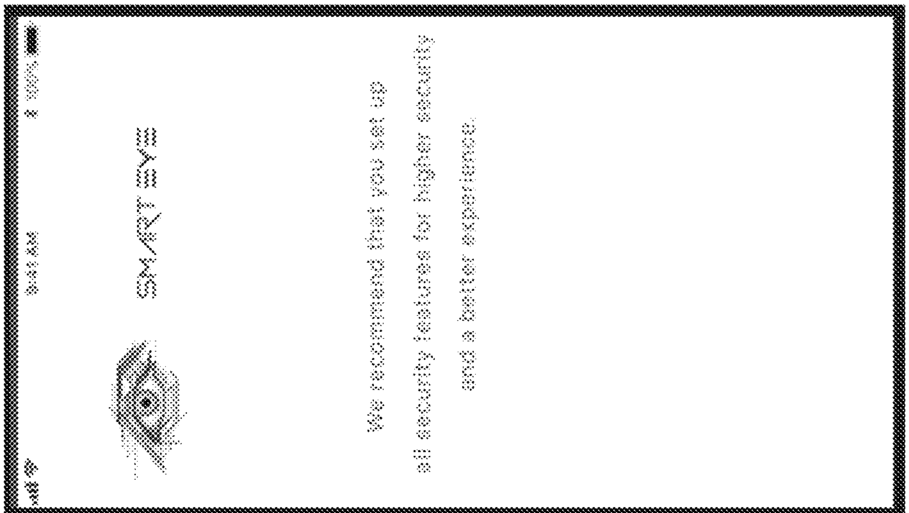
Figure 16.9

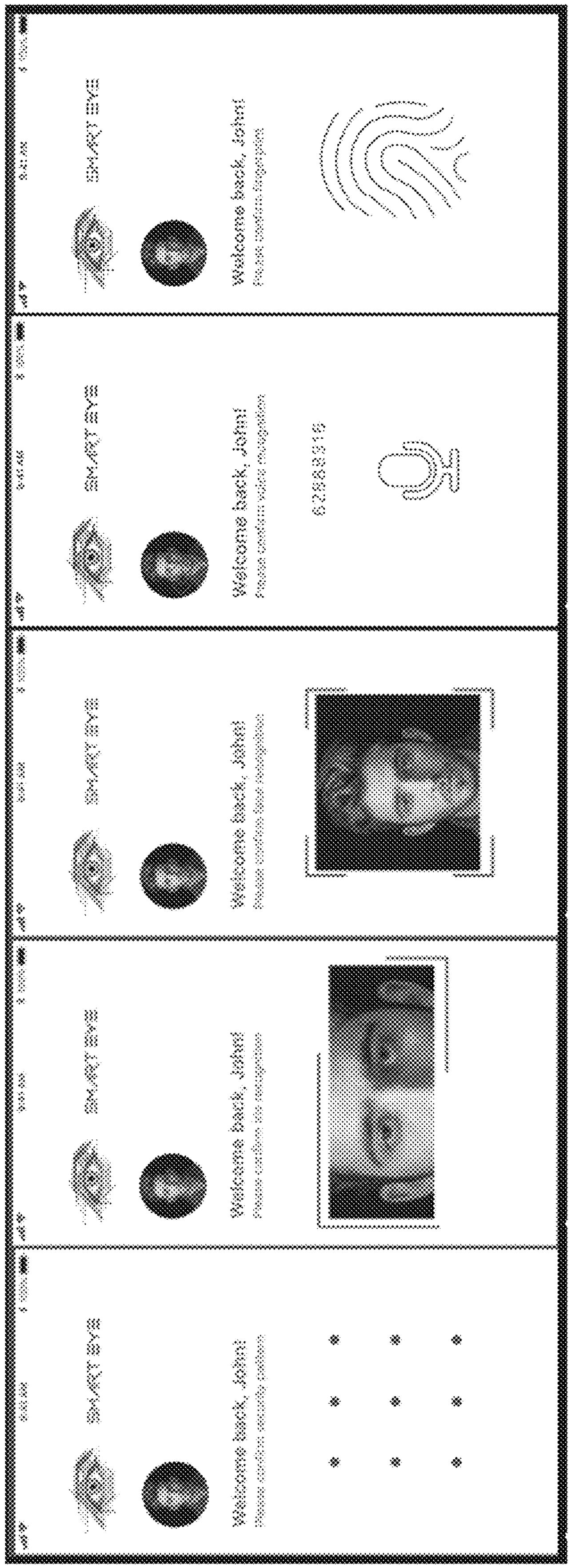
Figure 16.10
Figure 16.11
Figure 16.12
Figure 16.13
Figure 16.14

Figure 16.15
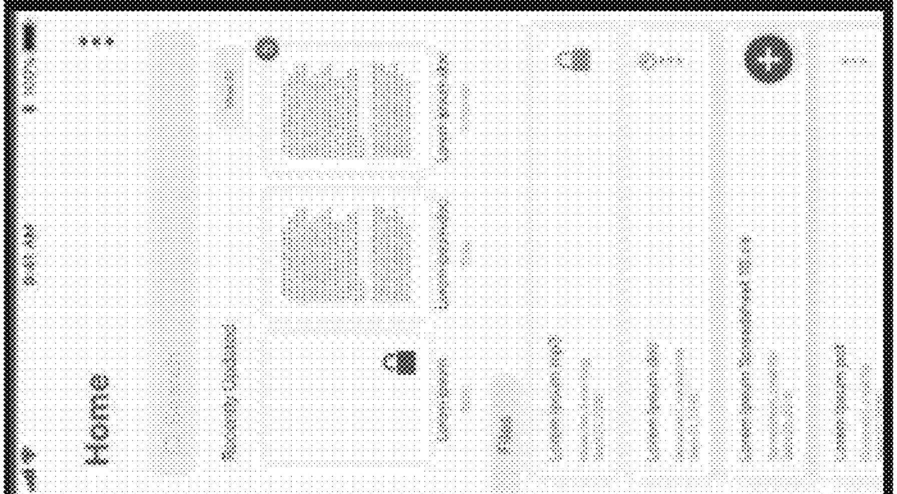
Figure 16.16
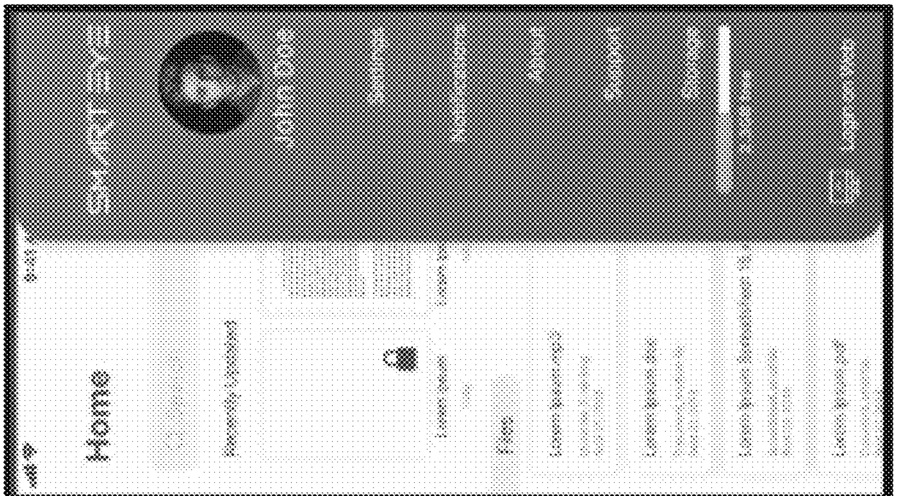
Figure 16.17

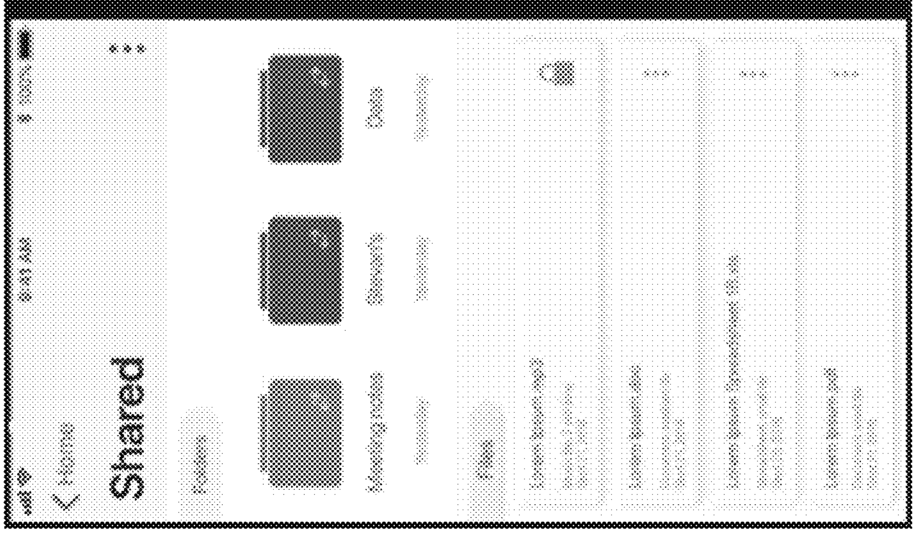
Figure 16.18
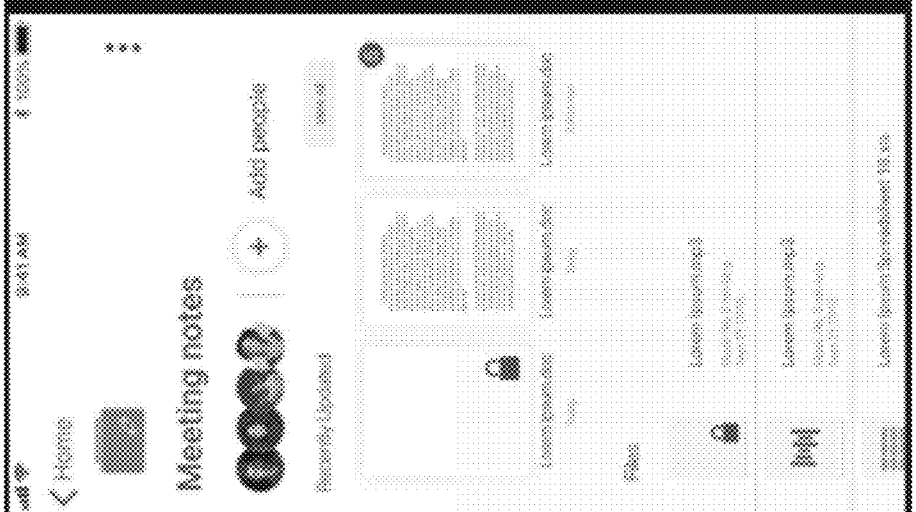
Figure 16.19
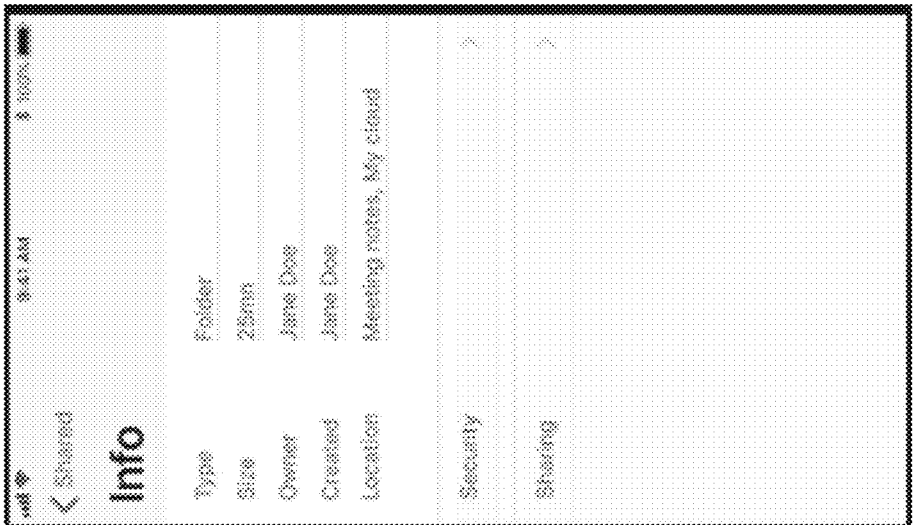
Figure 16.20

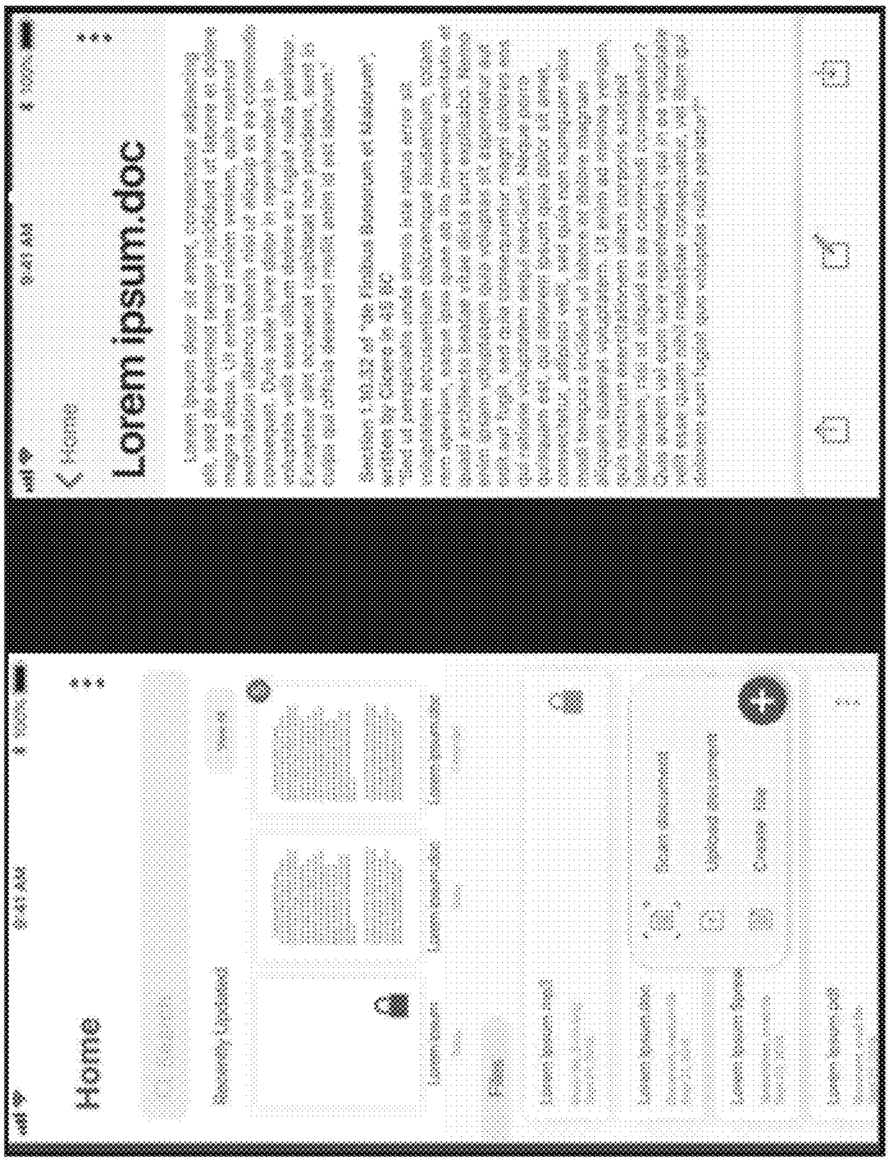
Figure 16.22
Figure 16.21

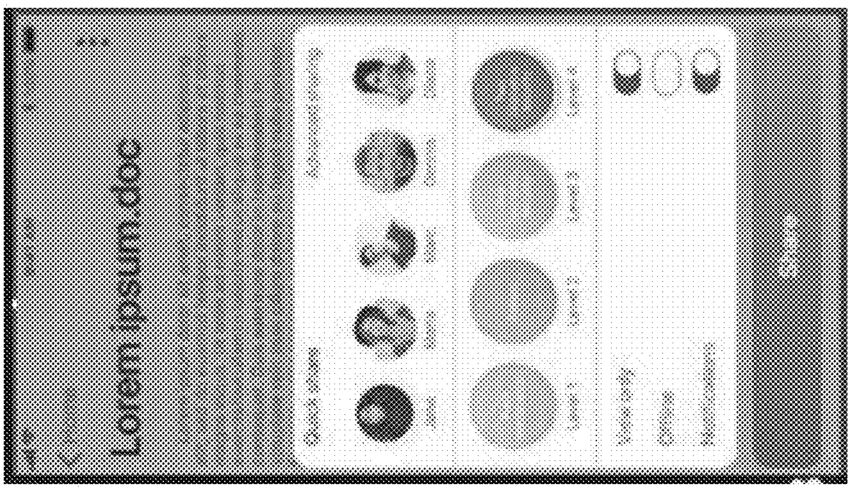
Fig. 16.23

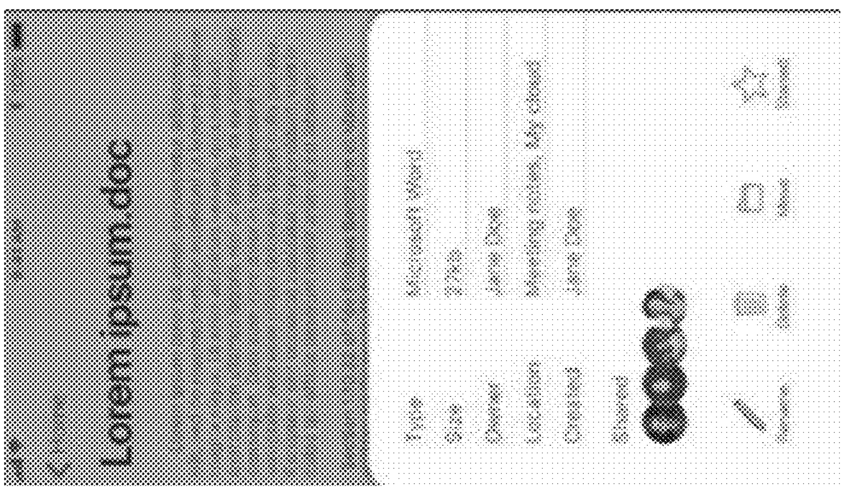
Fig. 16.24

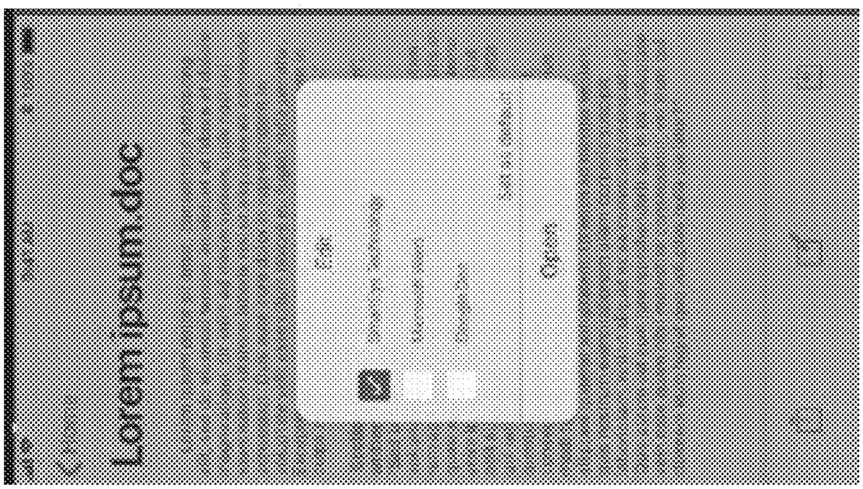
Fig. 16.25

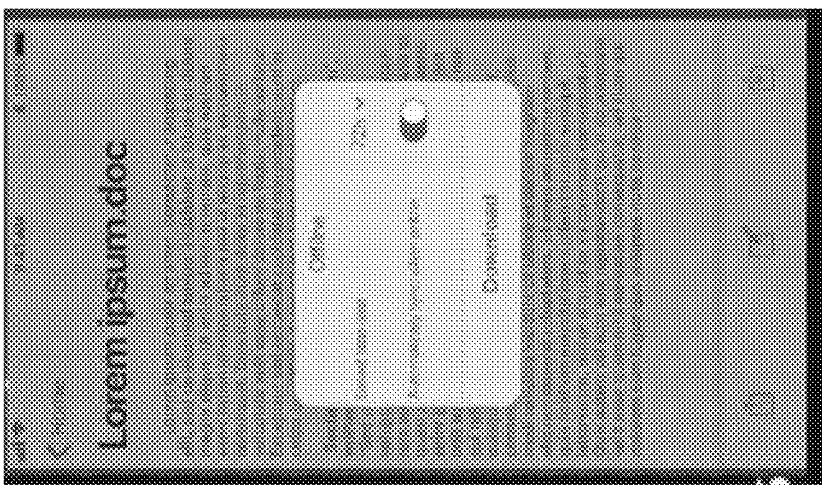
Fig. 16.26

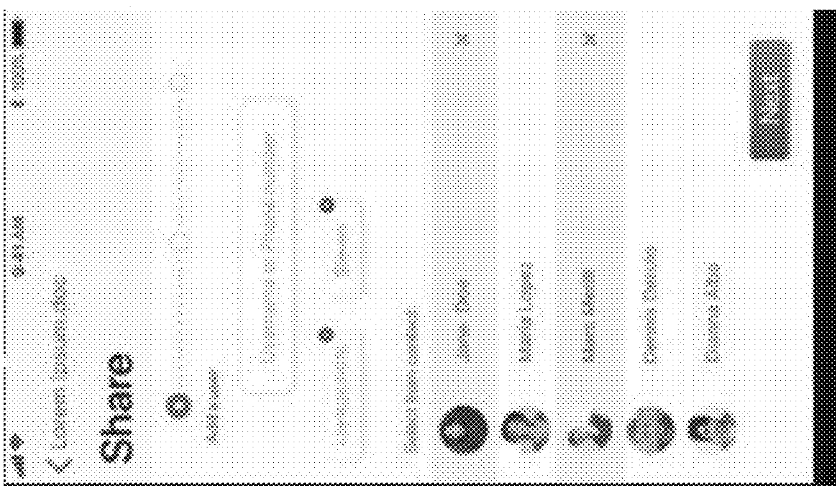
Fig. 16.27

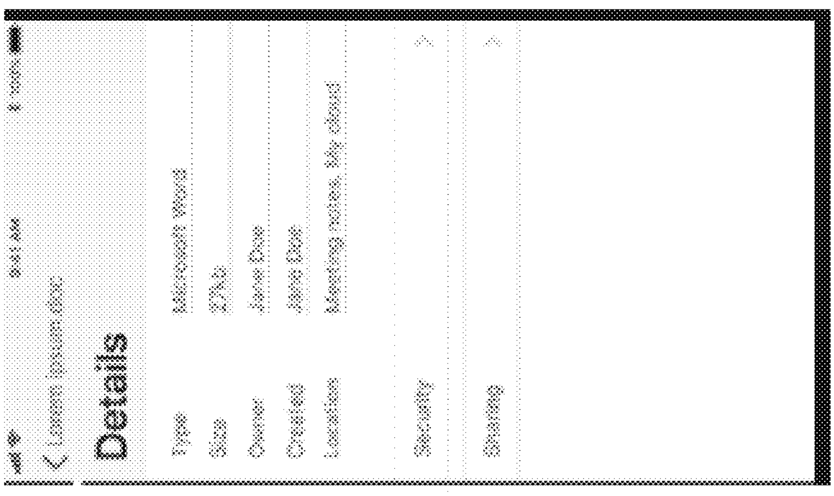
Fig. 16.28

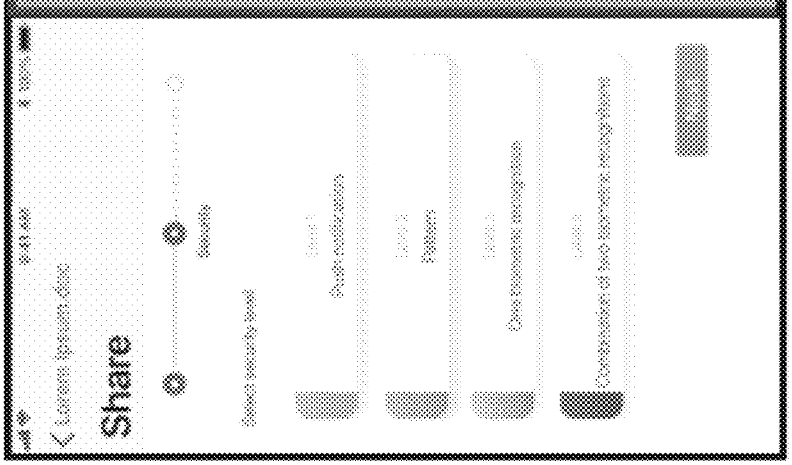
Figure 16.29
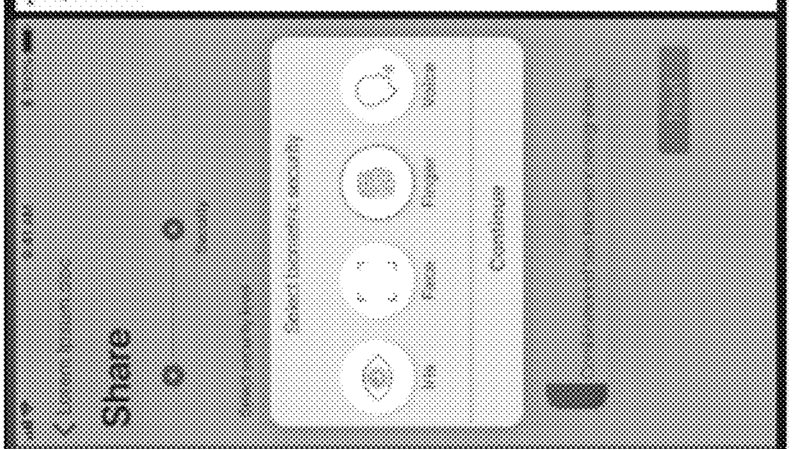
Figure 16.30
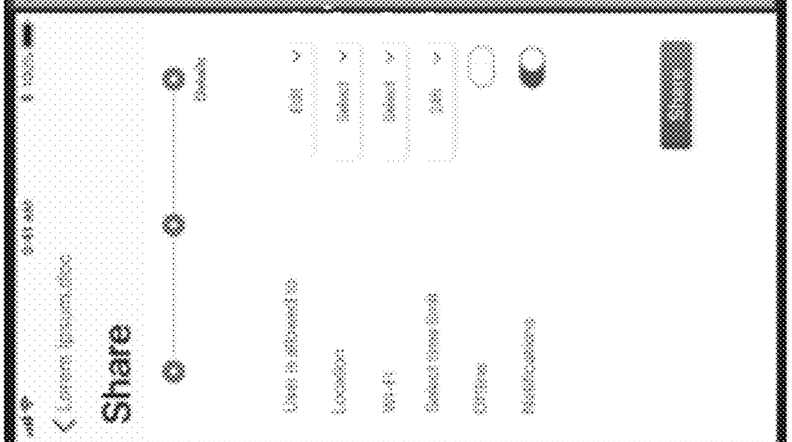
Figure 16.31
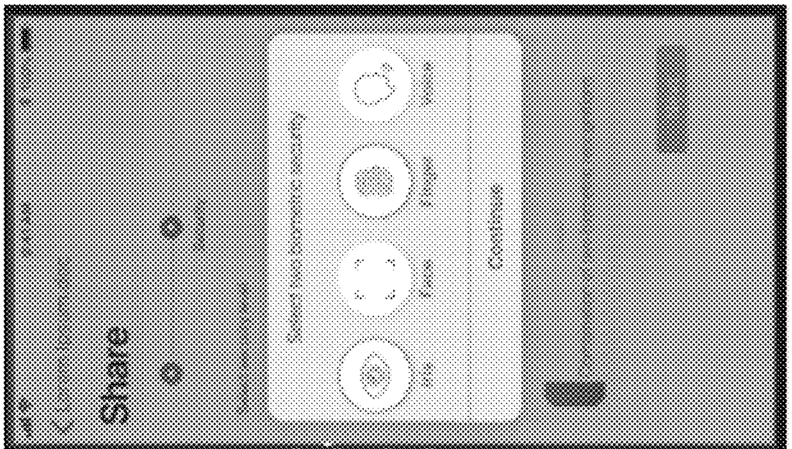
Figure 16.32

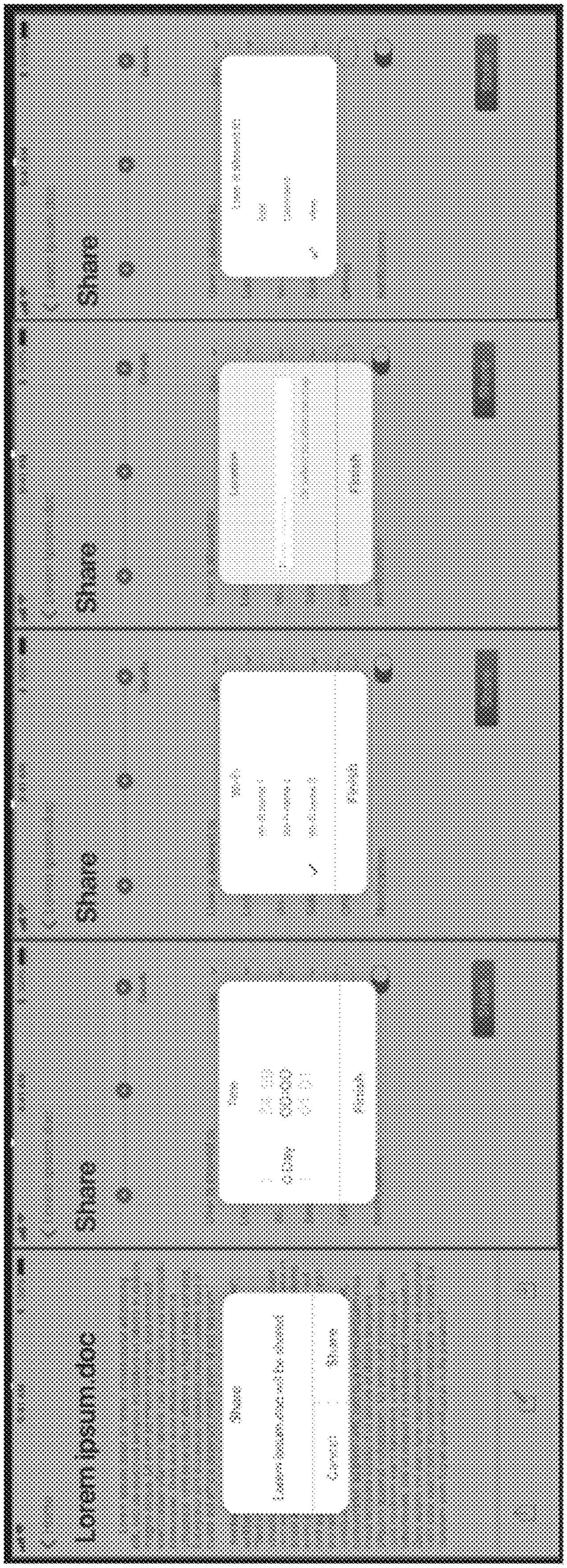
Figure 16.37
Figure 16.36
Figure 16.35
Figure 16.34
Figure 16.33

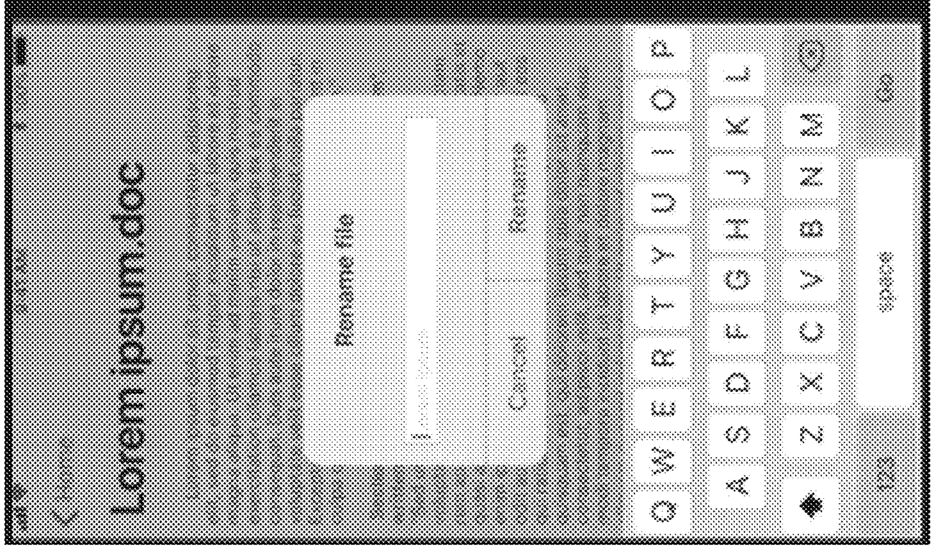
Figure 16.38
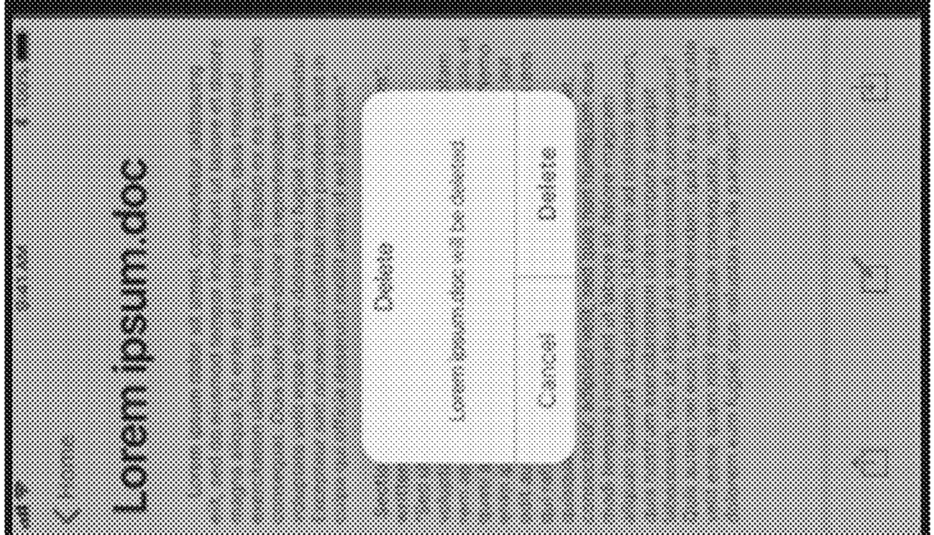
Figure 16.39
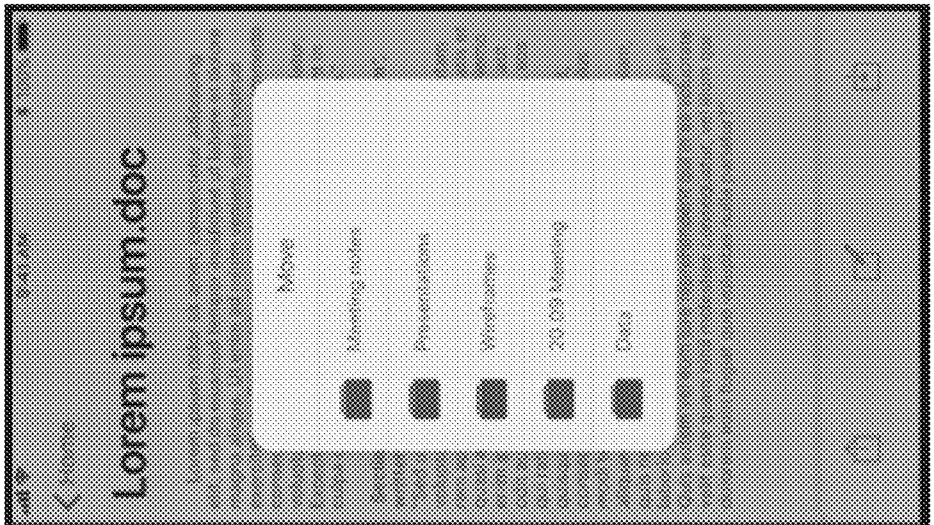
Figure 16.40

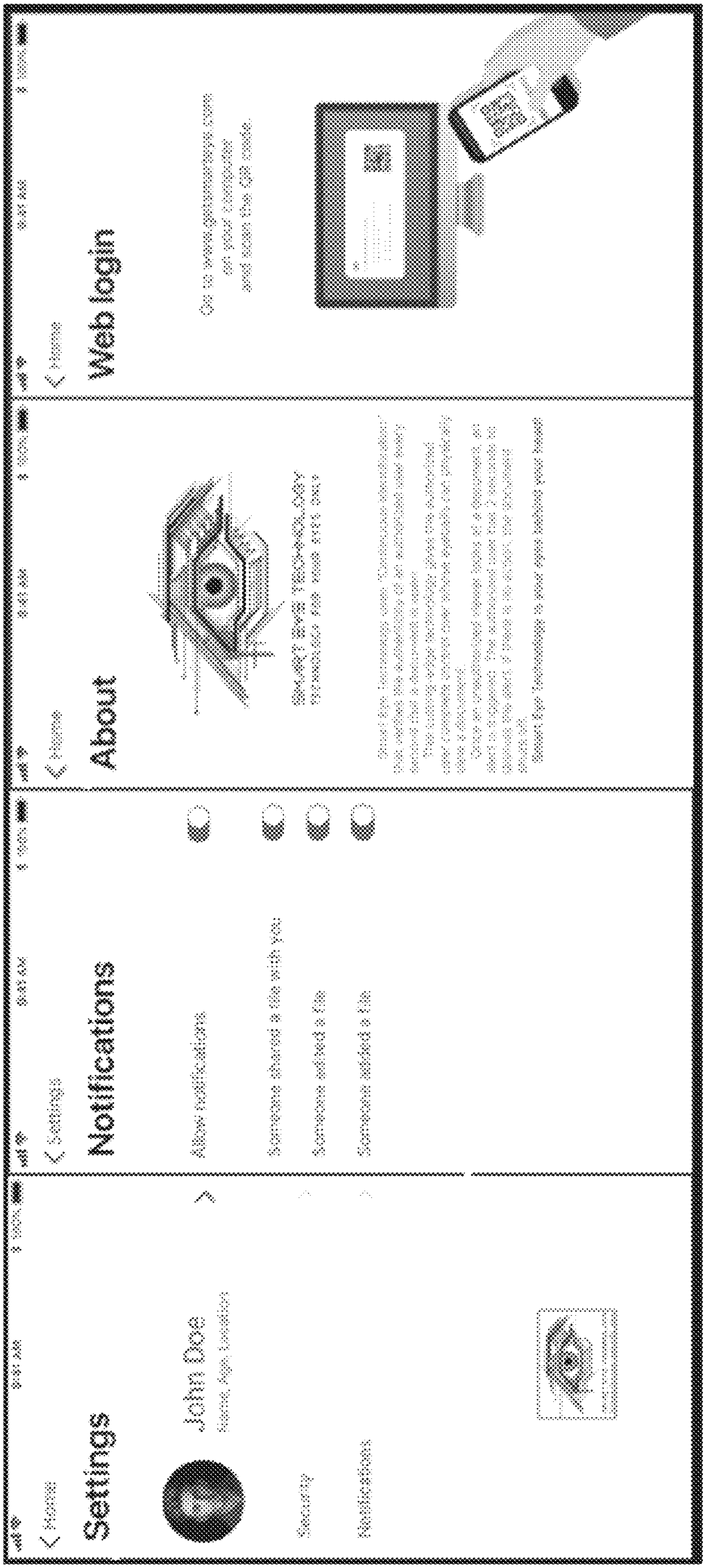
Figure 16.41
Figure 16.42
Figure 16.43
Figure 16.44

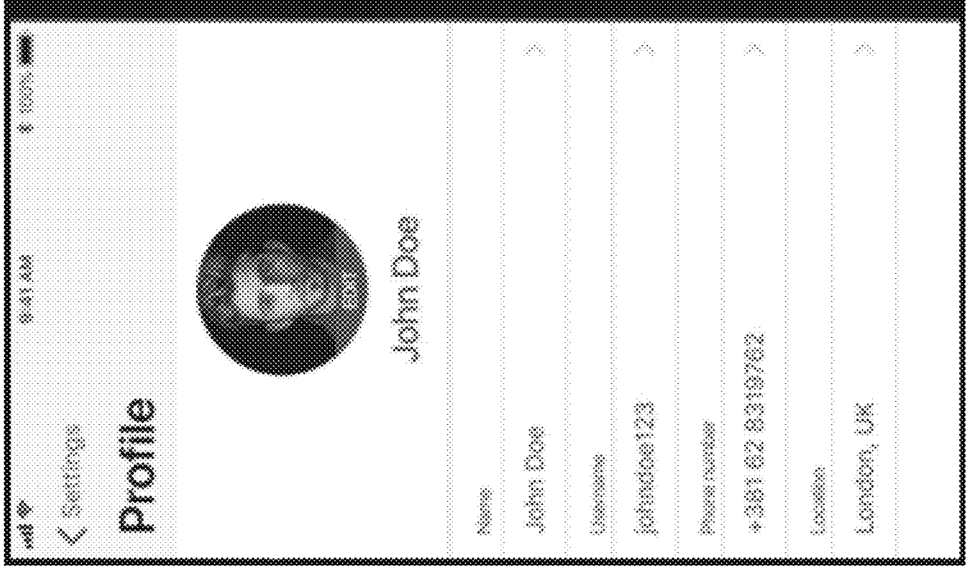
Figure 16.45
Figure 16.46
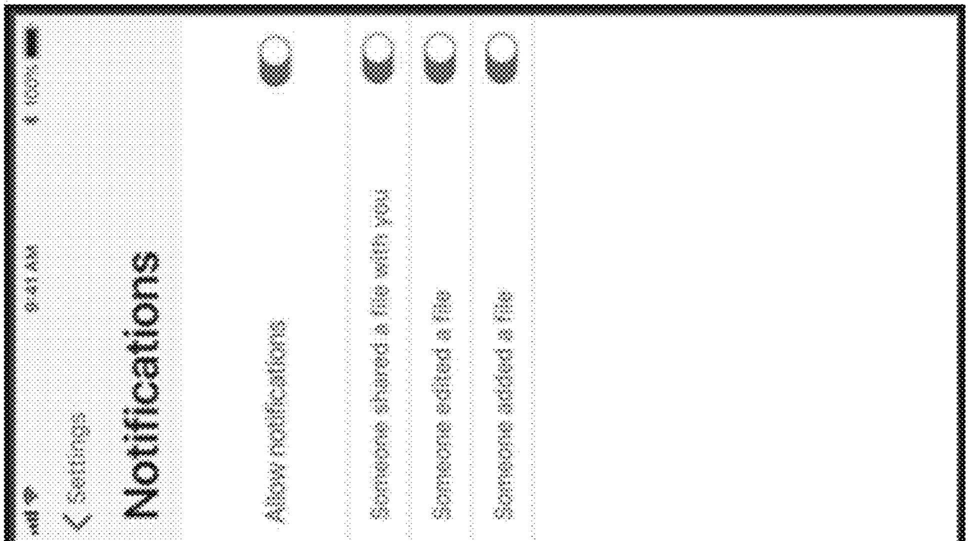
Figure 16.47

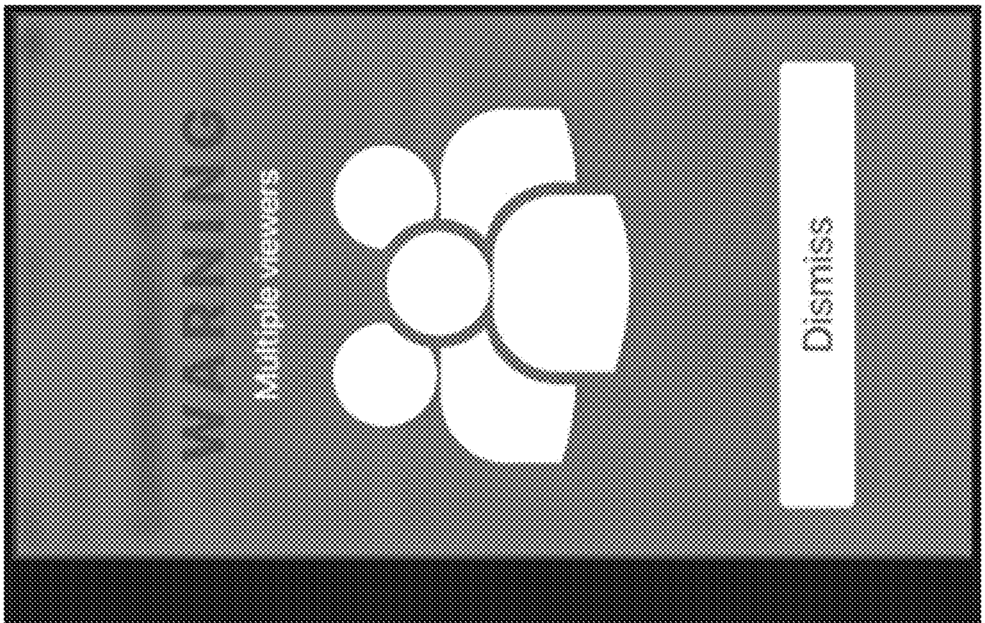
Figure 16.49
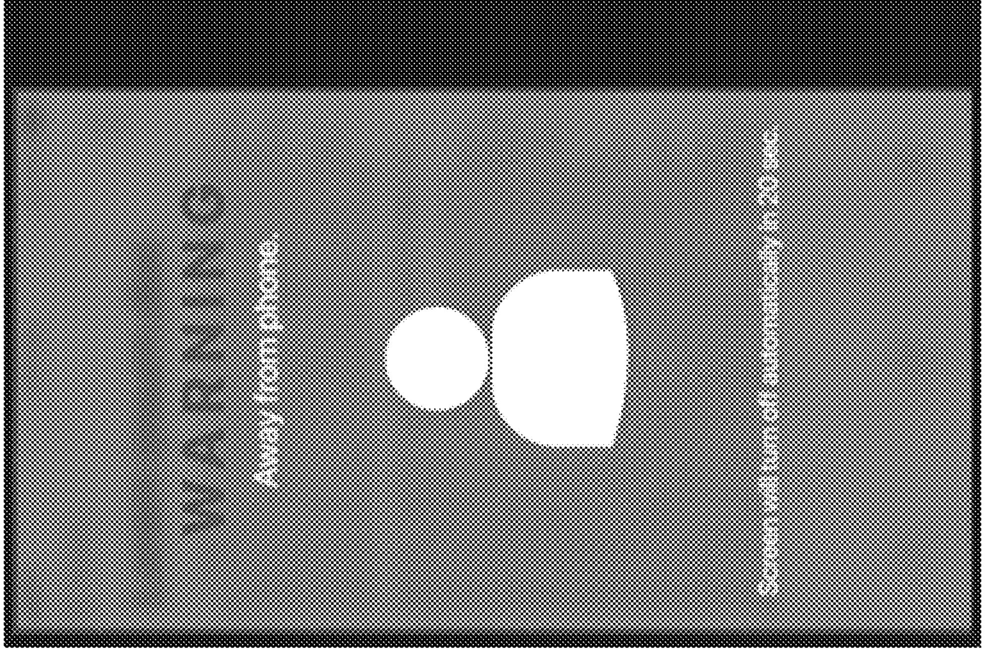
Figure 16.48

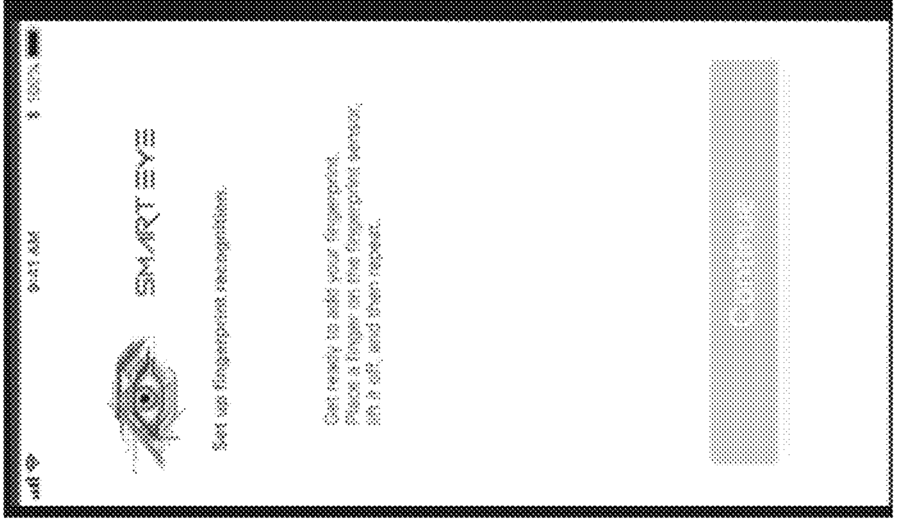
Figure 16.50
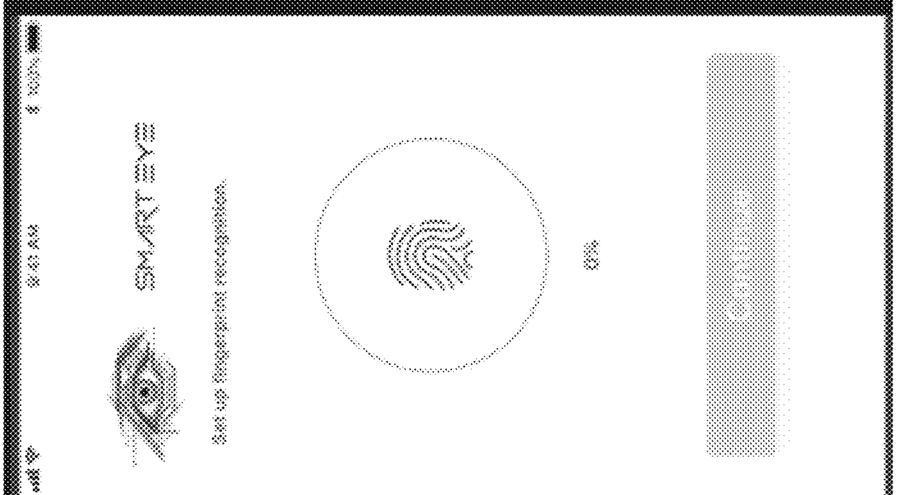
Figure 16.51
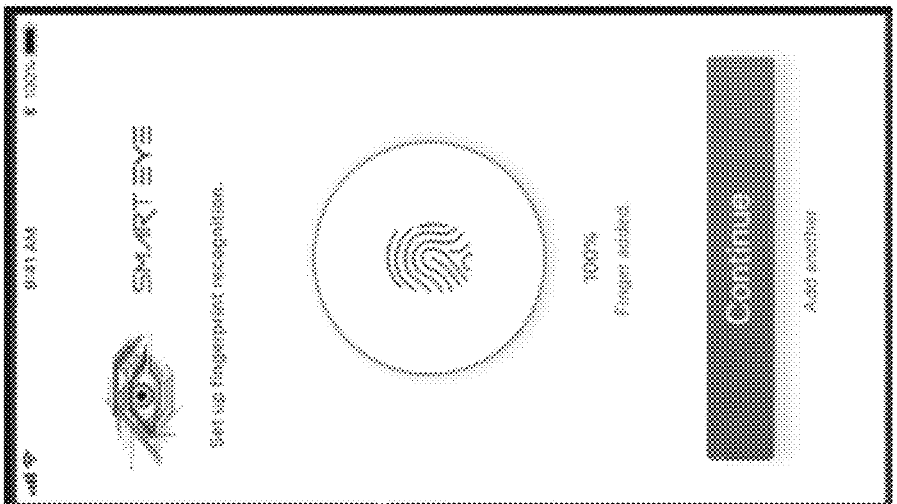
Figure 16.52

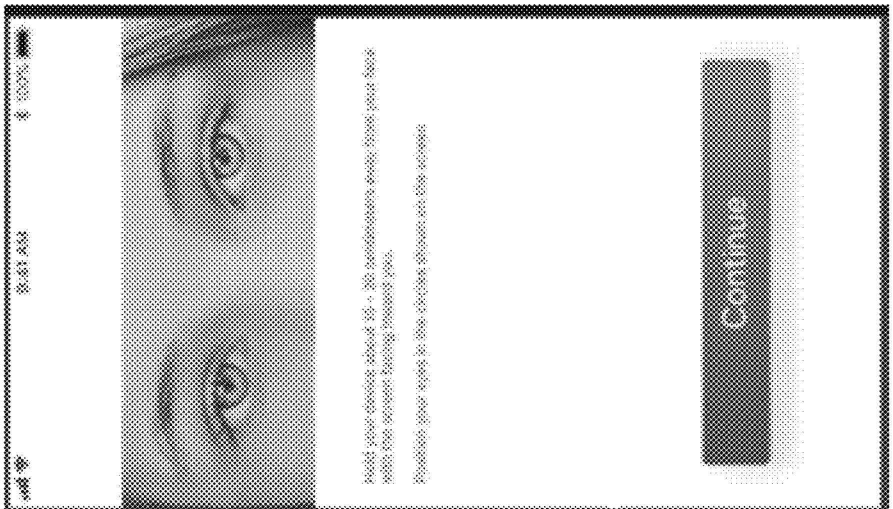
Figure 16.55
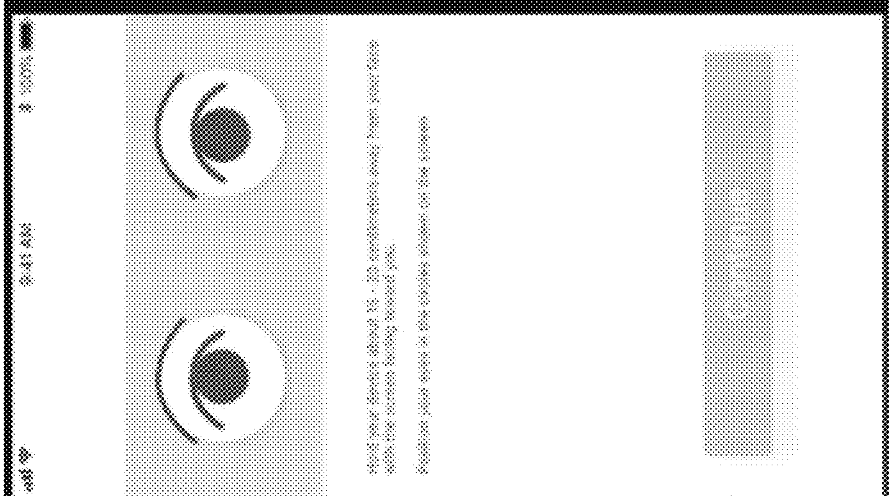
Figure 16.54
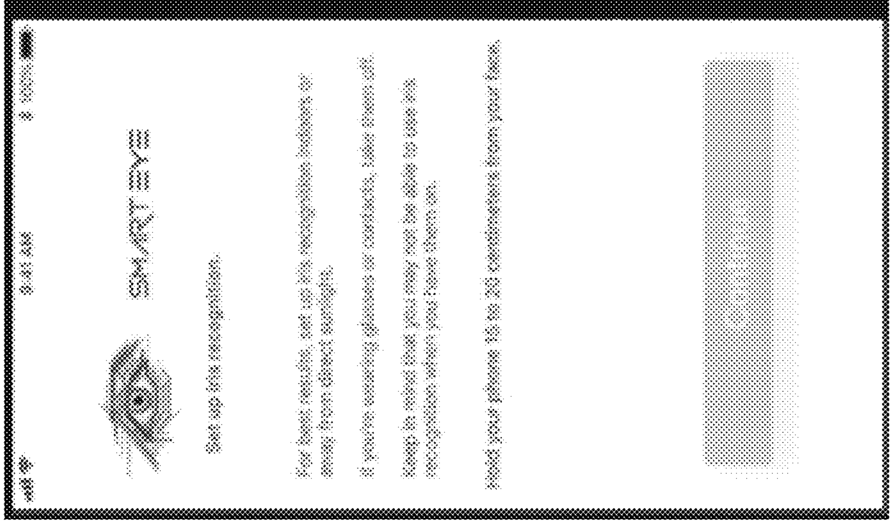
Figure 16.53

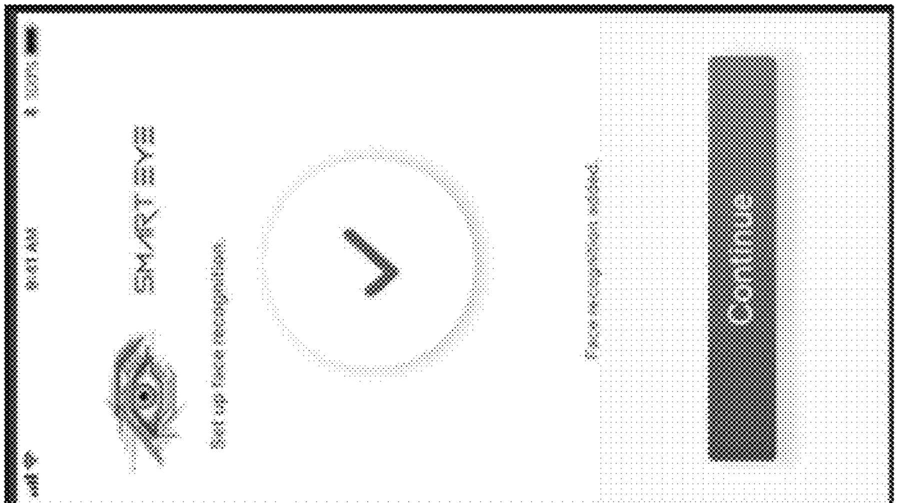
Figure 16.58
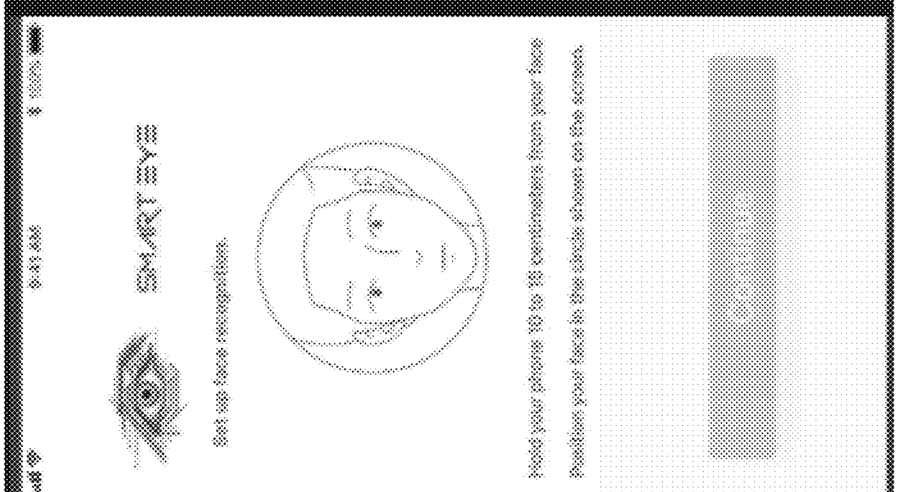
Figure 16.57
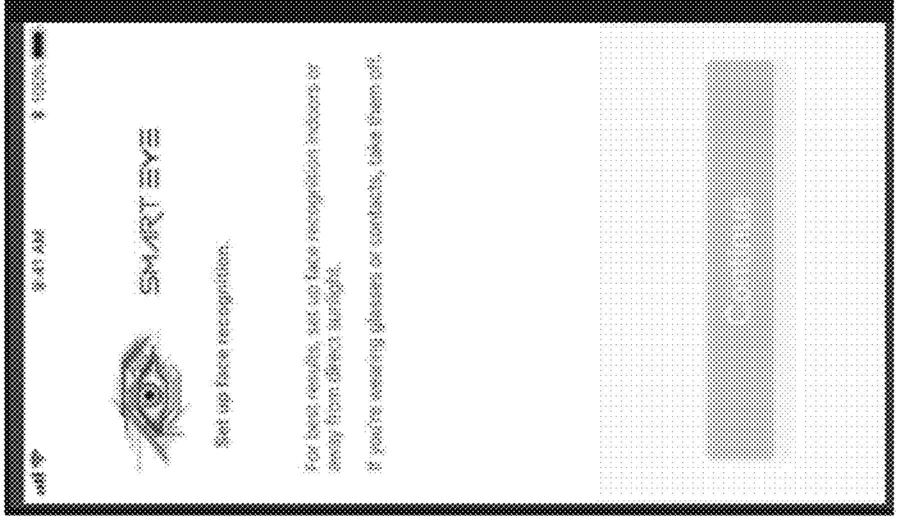
Figure 16.56

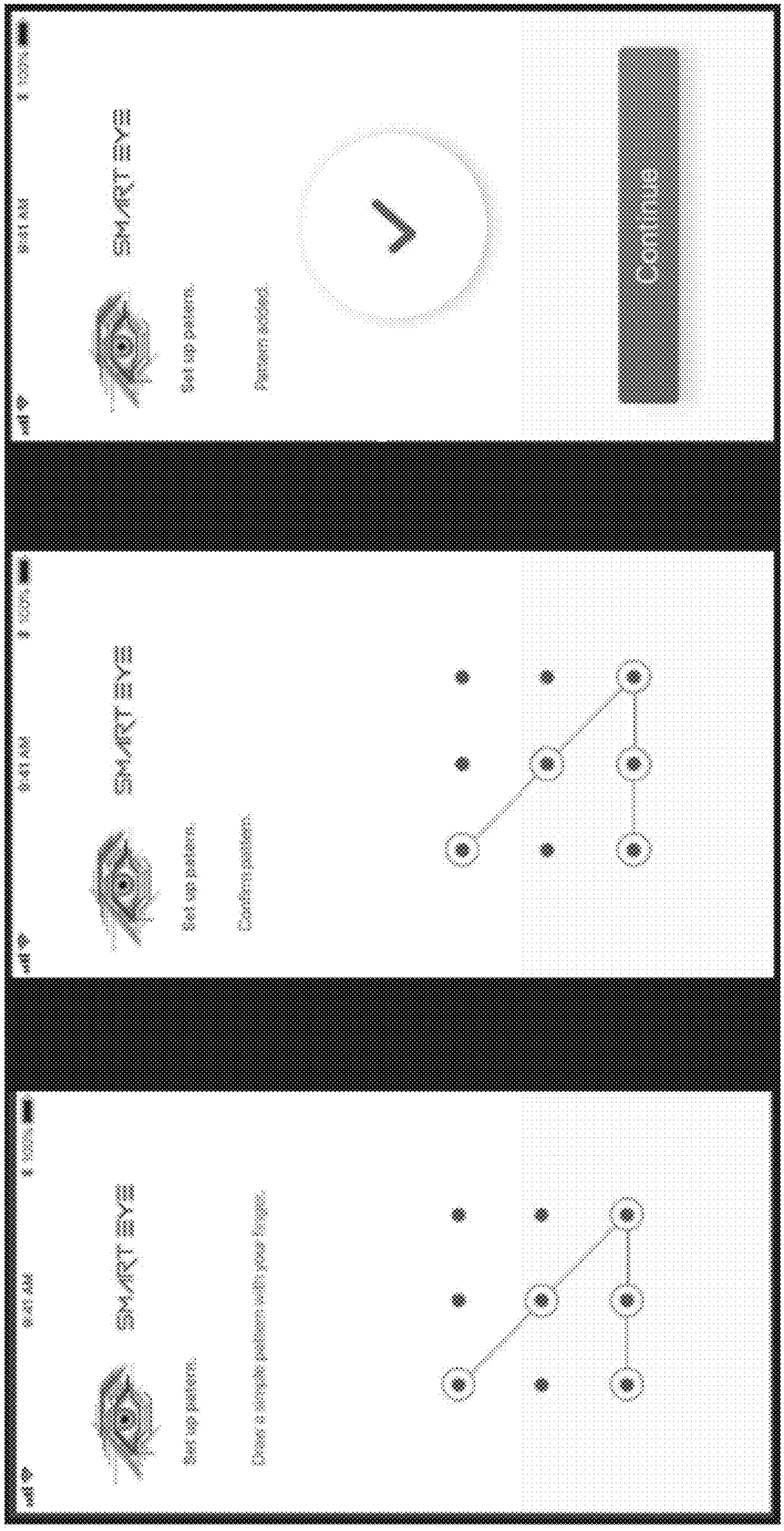
Figure 16.59
Figure 16.60
Figure 16.61

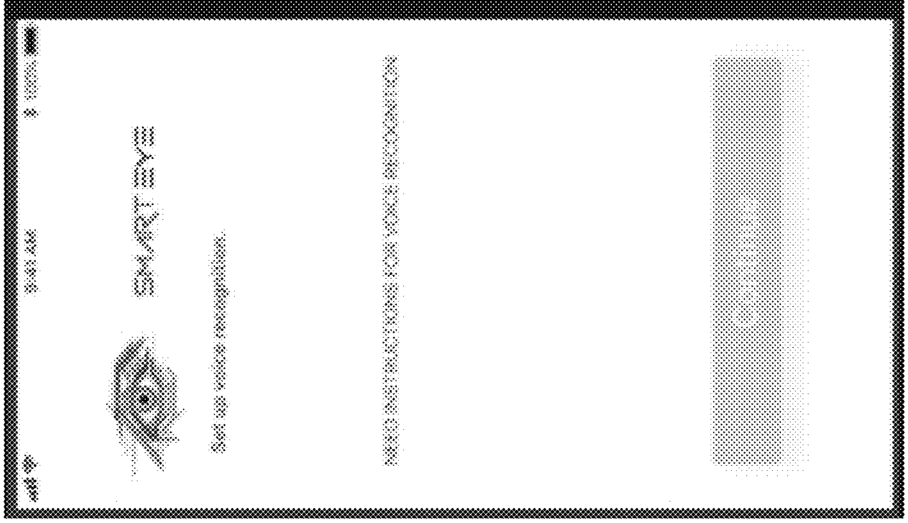
Figure 16.62
Figure 16.63
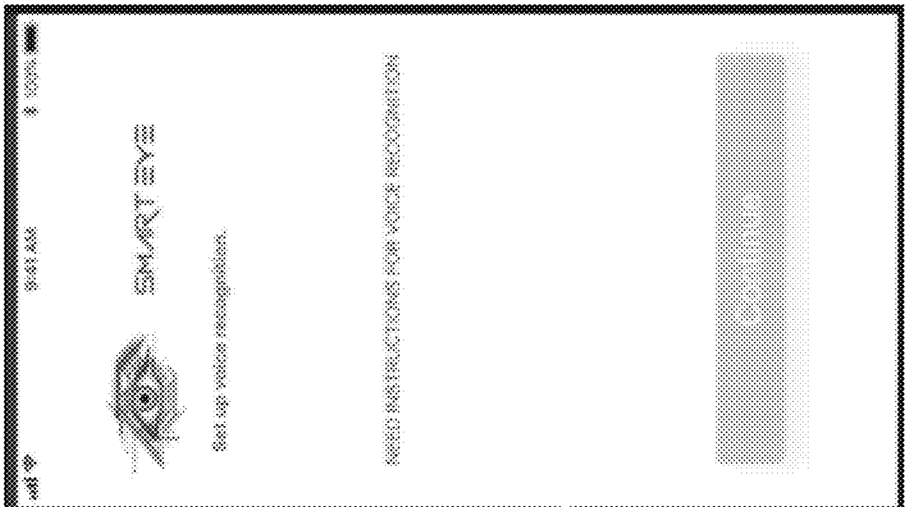
Figure 16.64

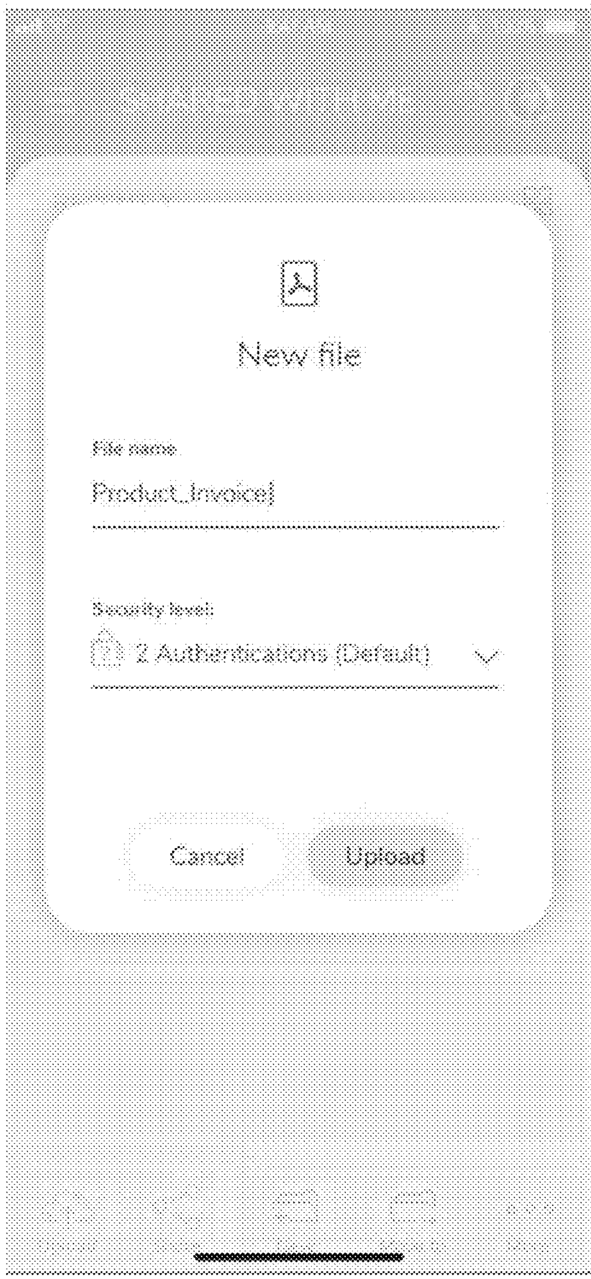
Fig. 17.1
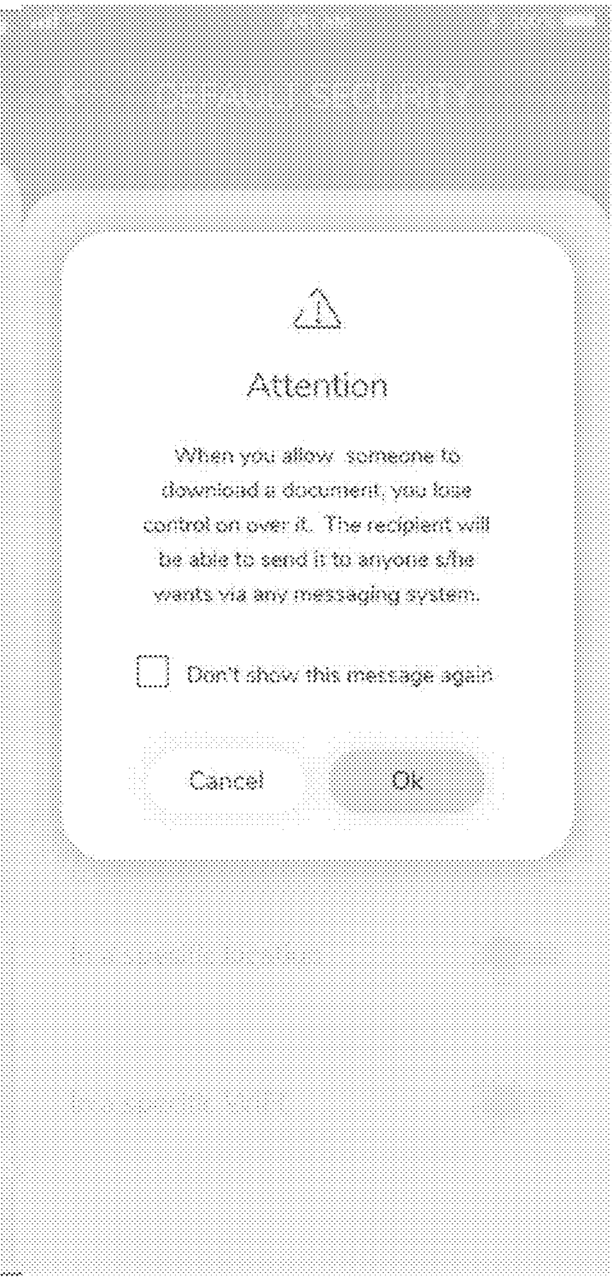
Fig. 17.2

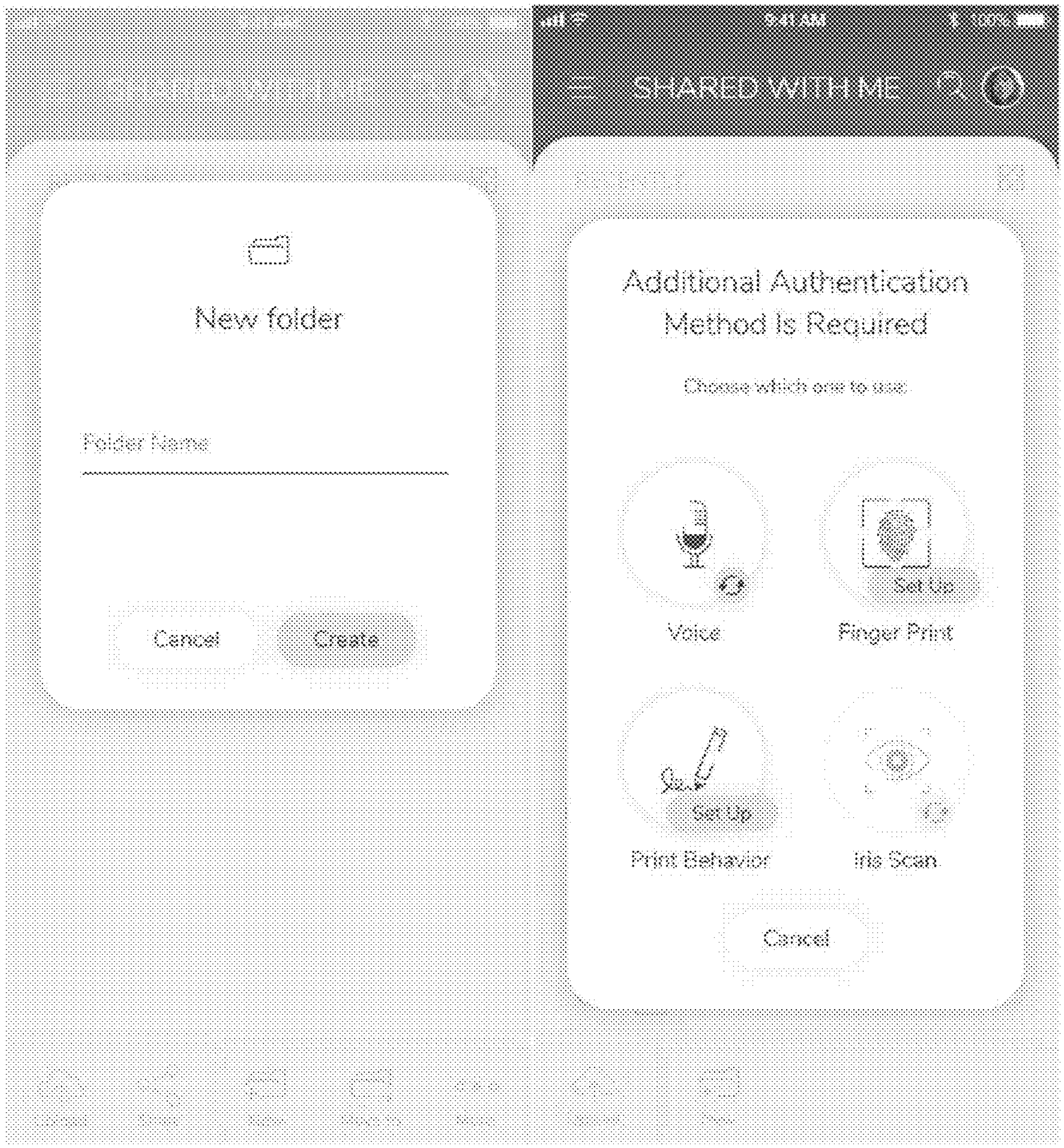
Fig. 17.3
Fig. 17.4

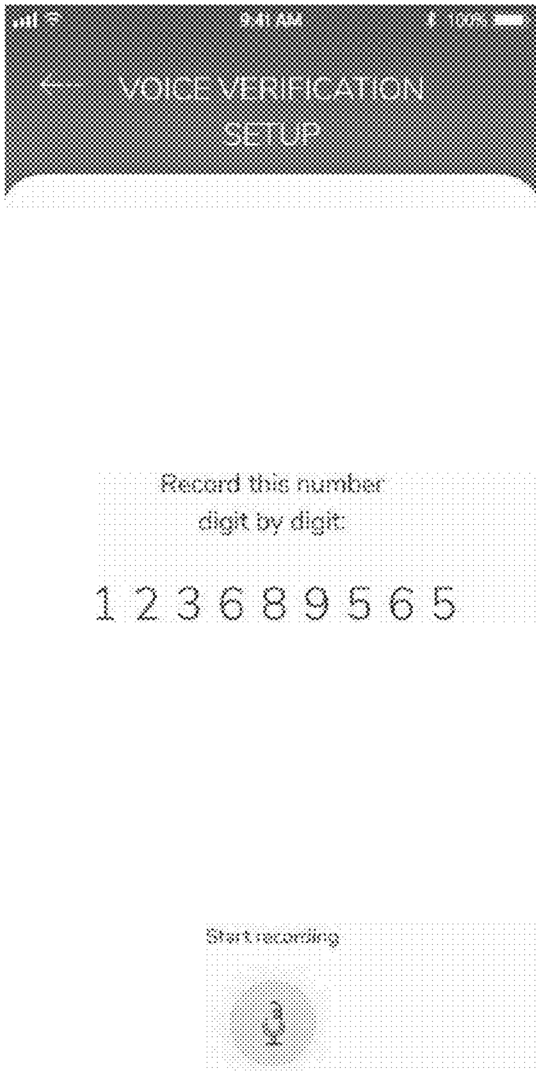
Fig. 17.5
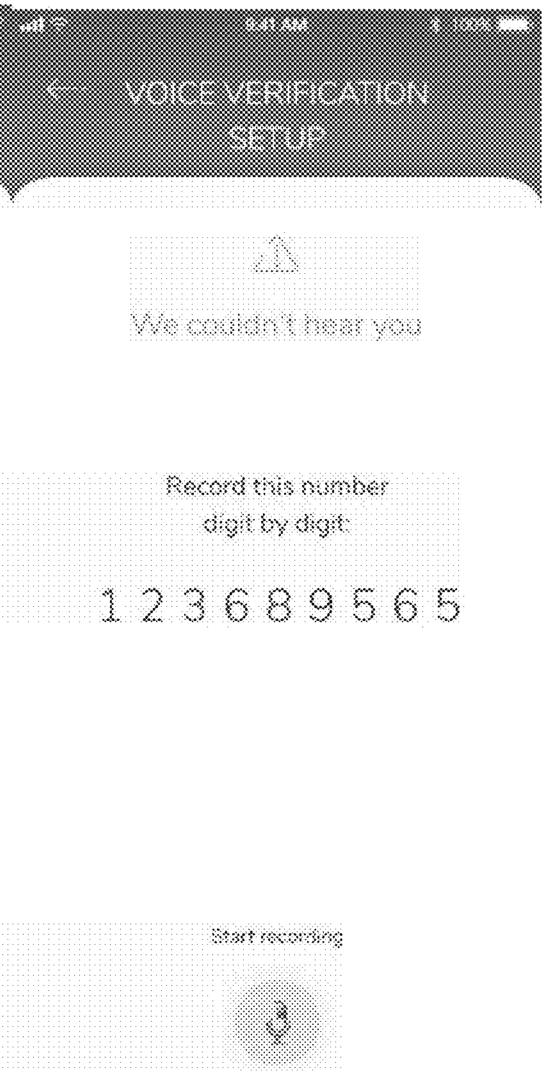
Fig. 17.6

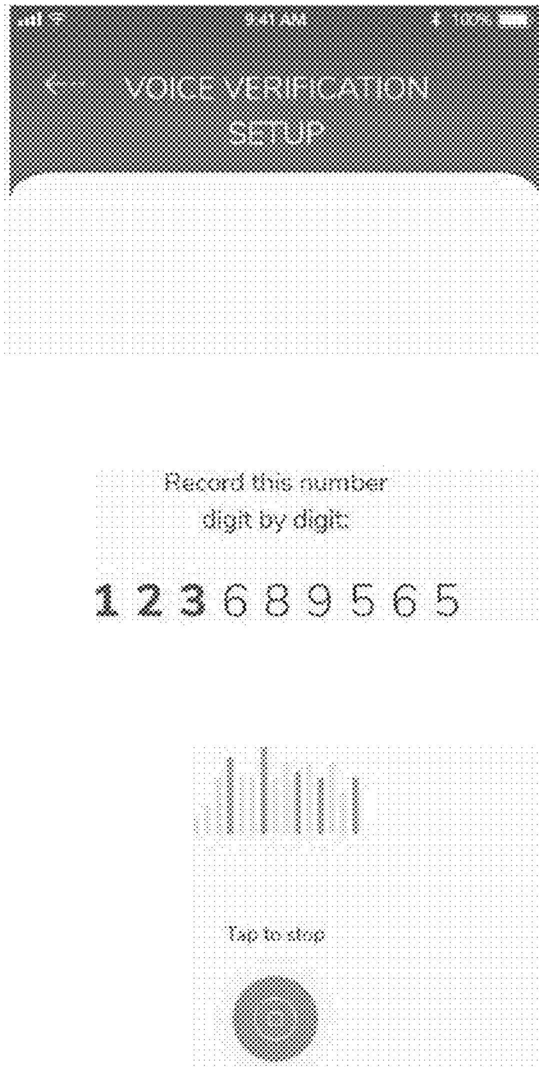
Fig. 17.7
Fig. 17.8

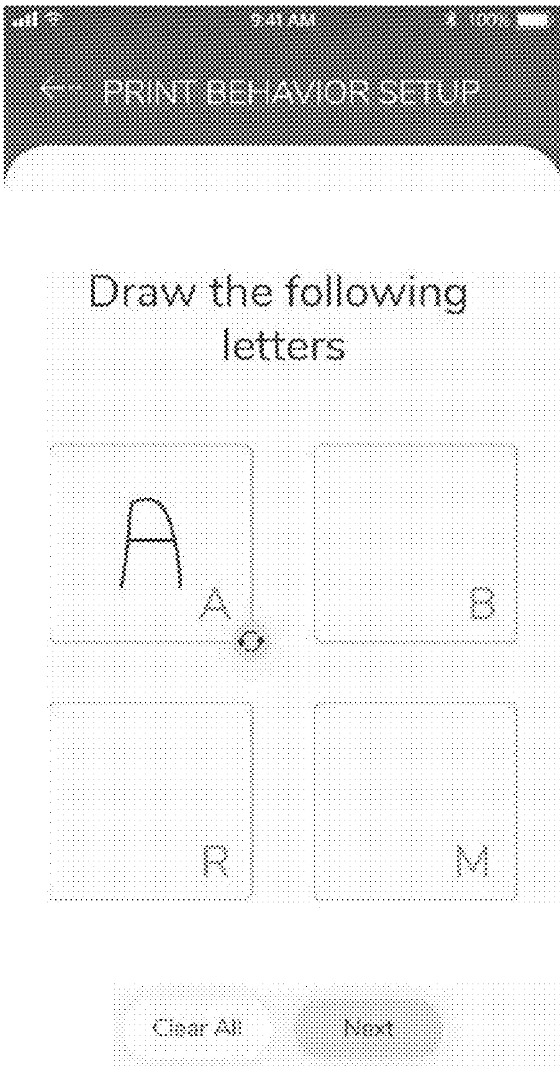
Fig. 17.9
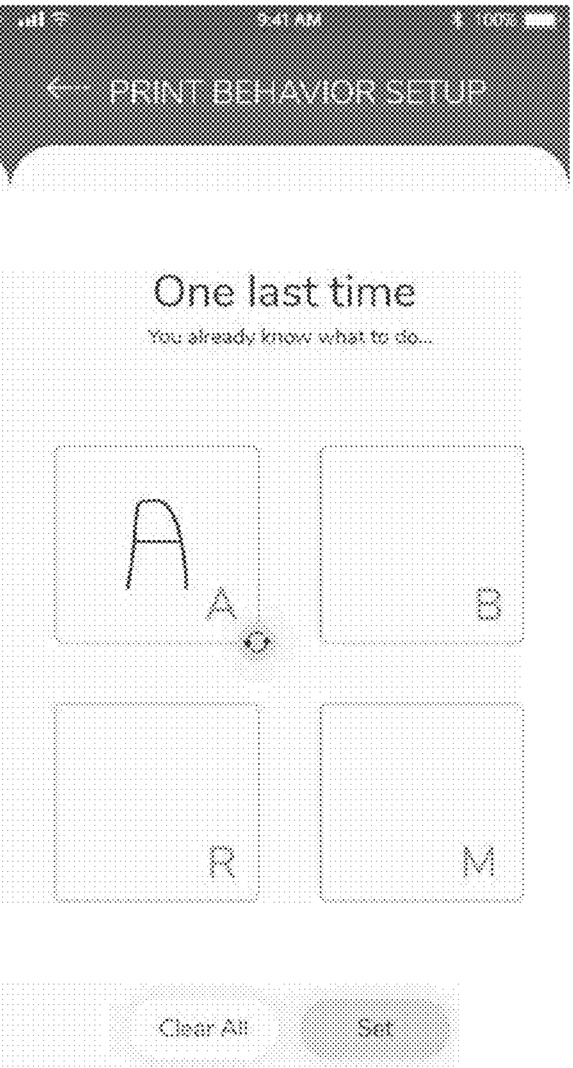
Fig. 17.10

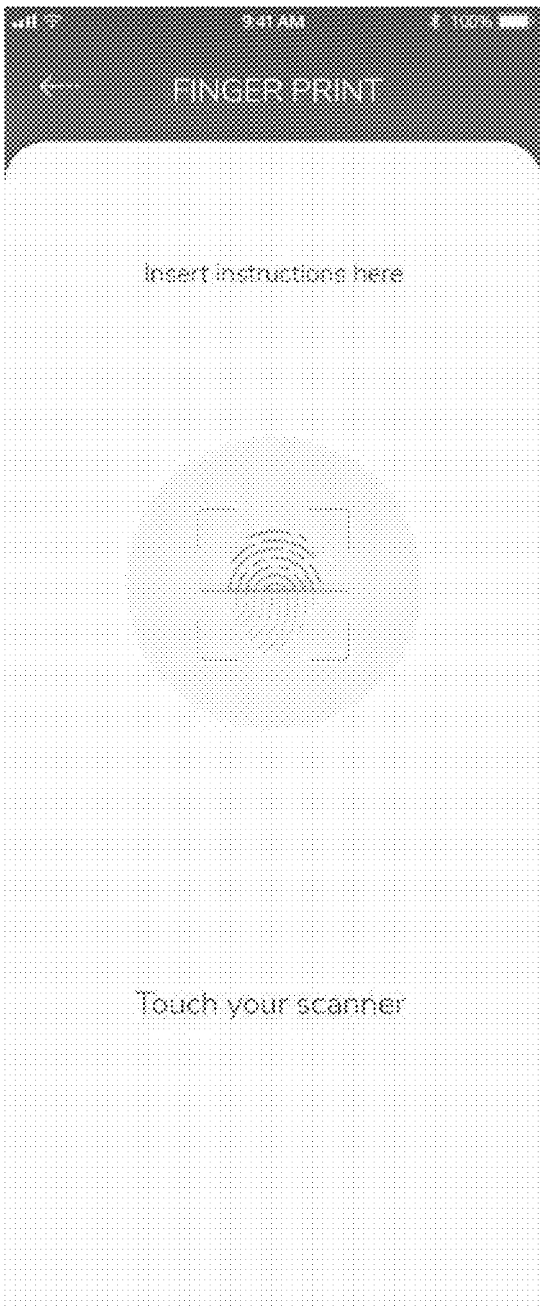
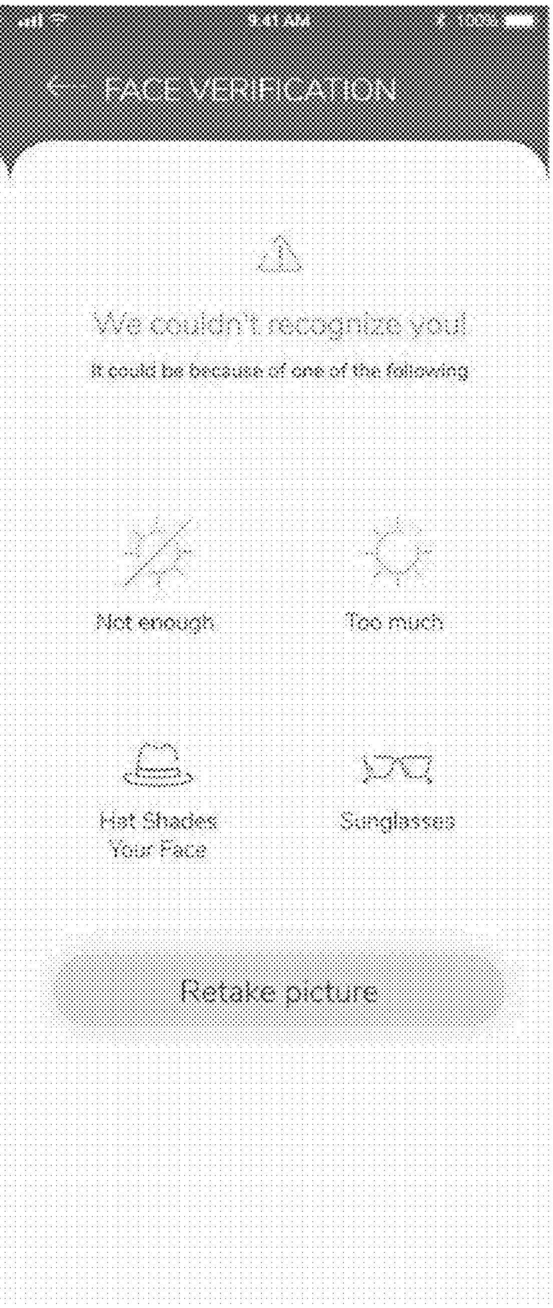
Fig. 17.11
Fig. 17.12

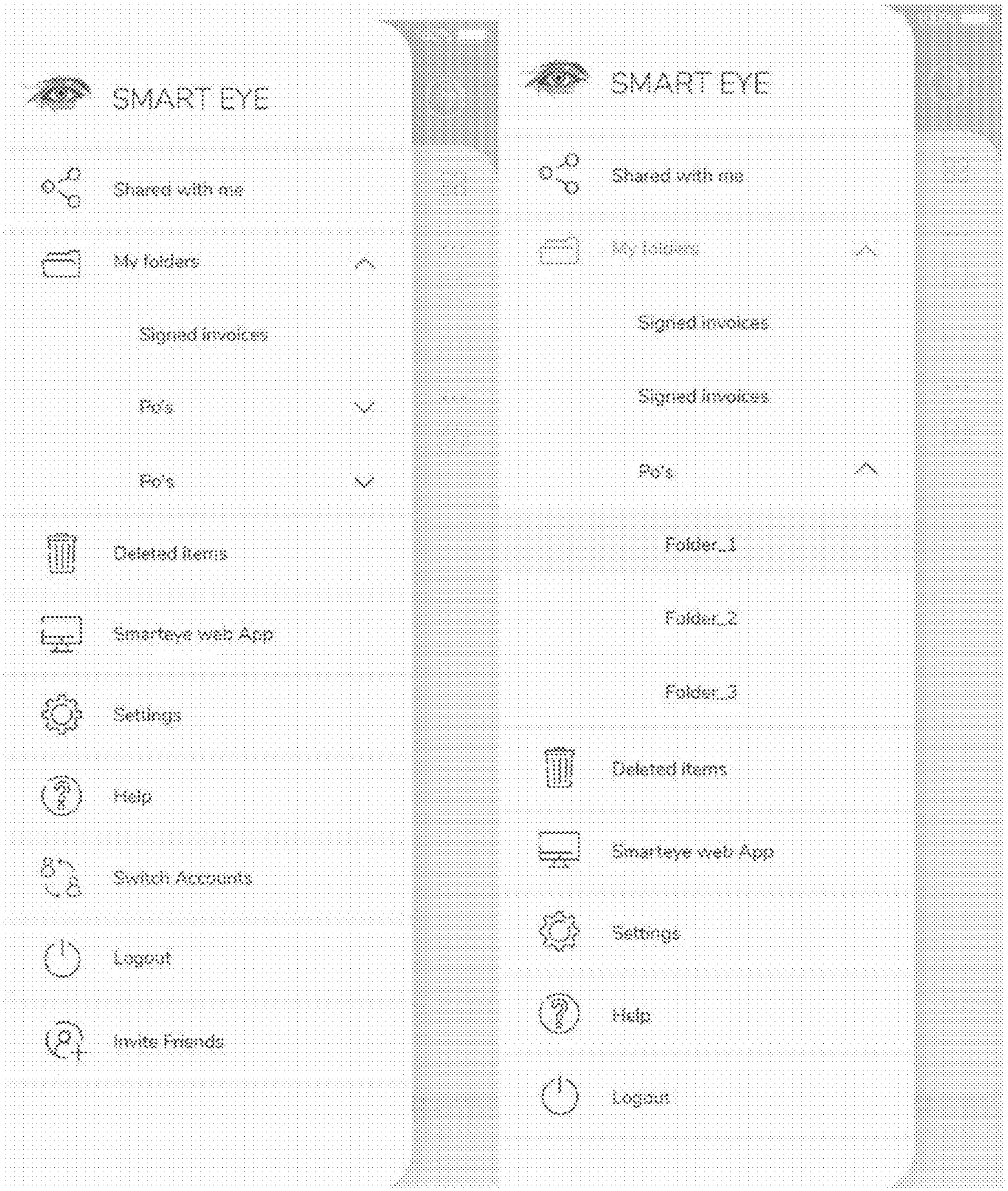
Fig. 17.13

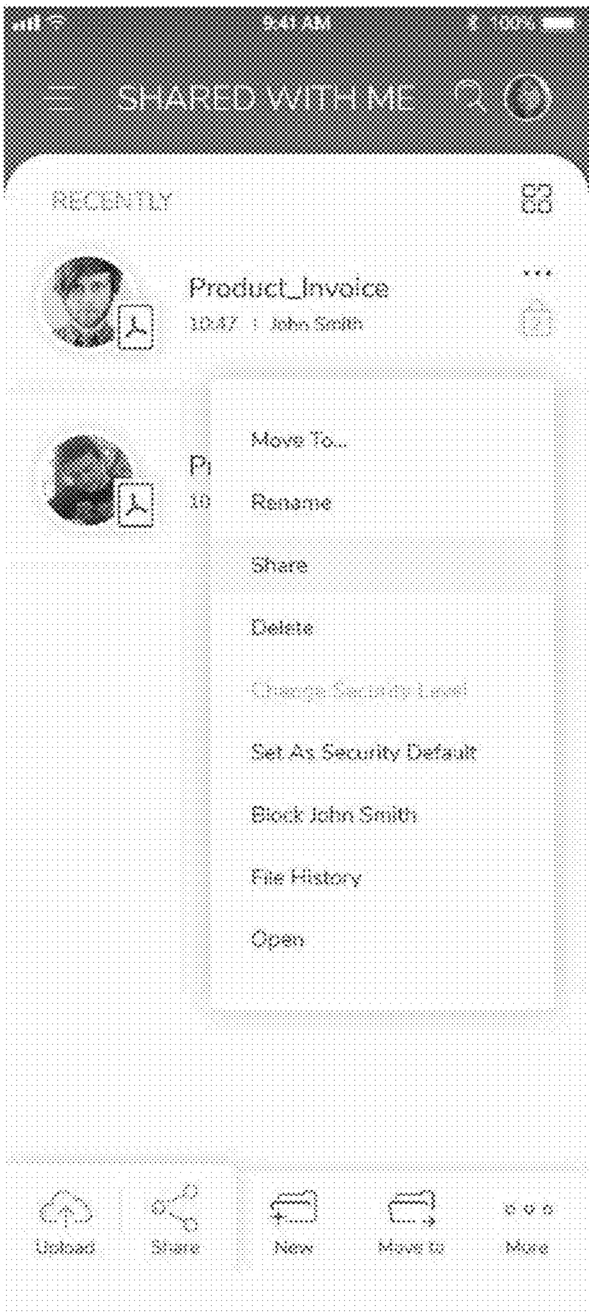
Fig. 17.14
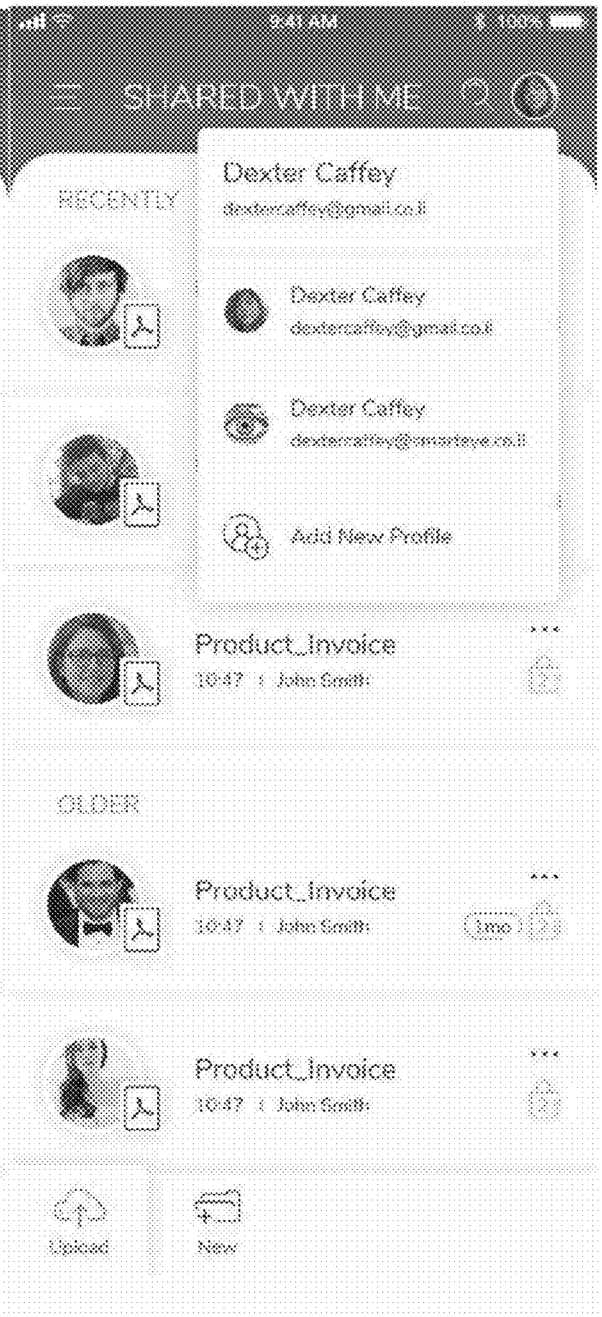
Fig. 17.15

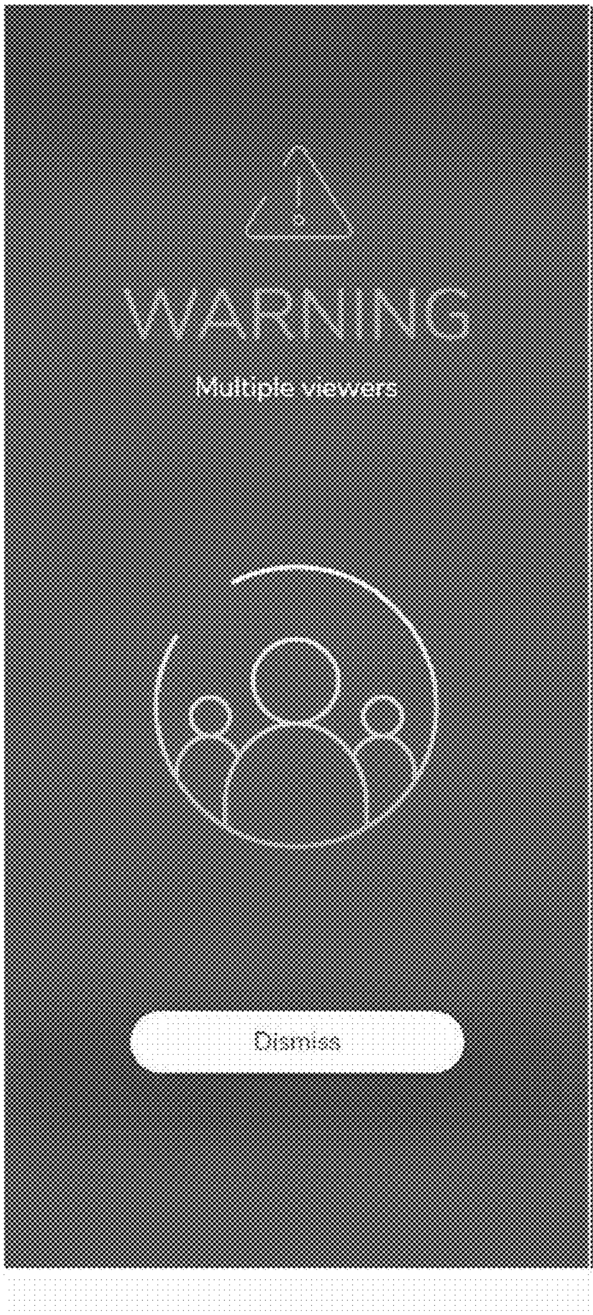
Fig. 17.16
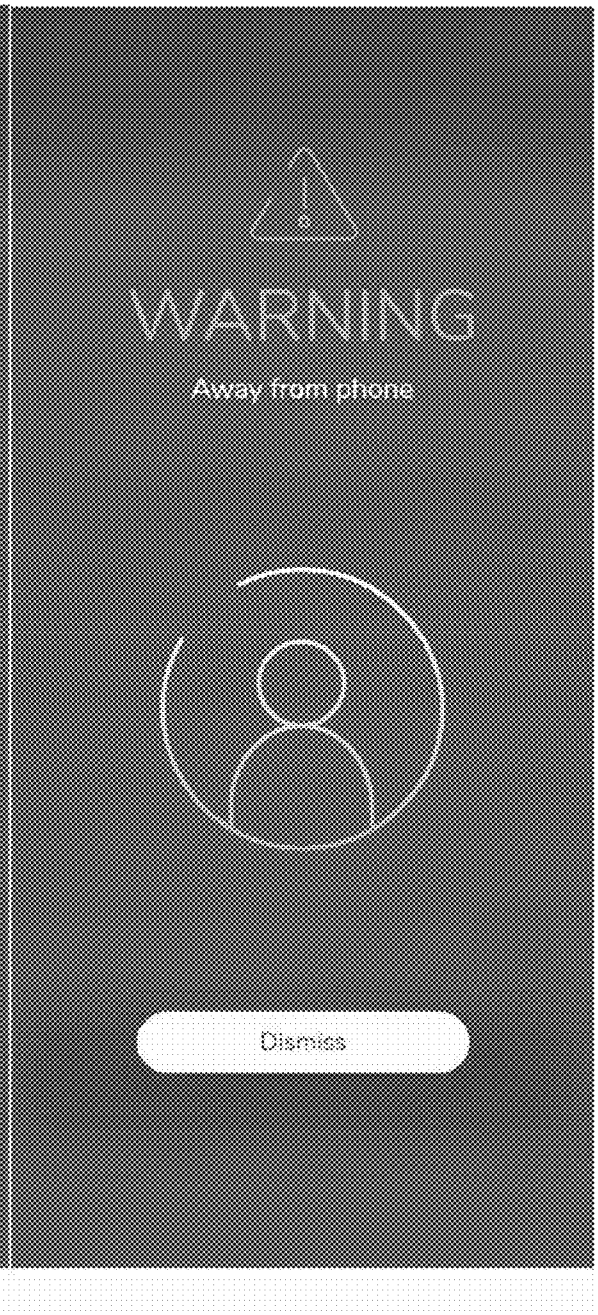
Fig. 17.17

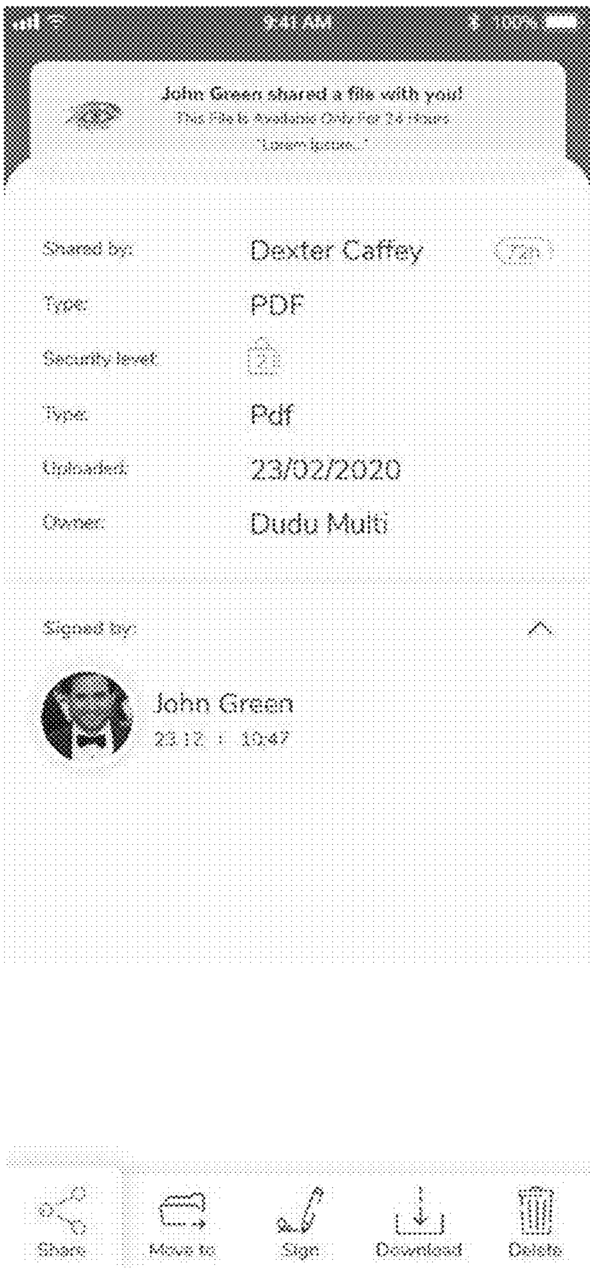
Fig. 17.18
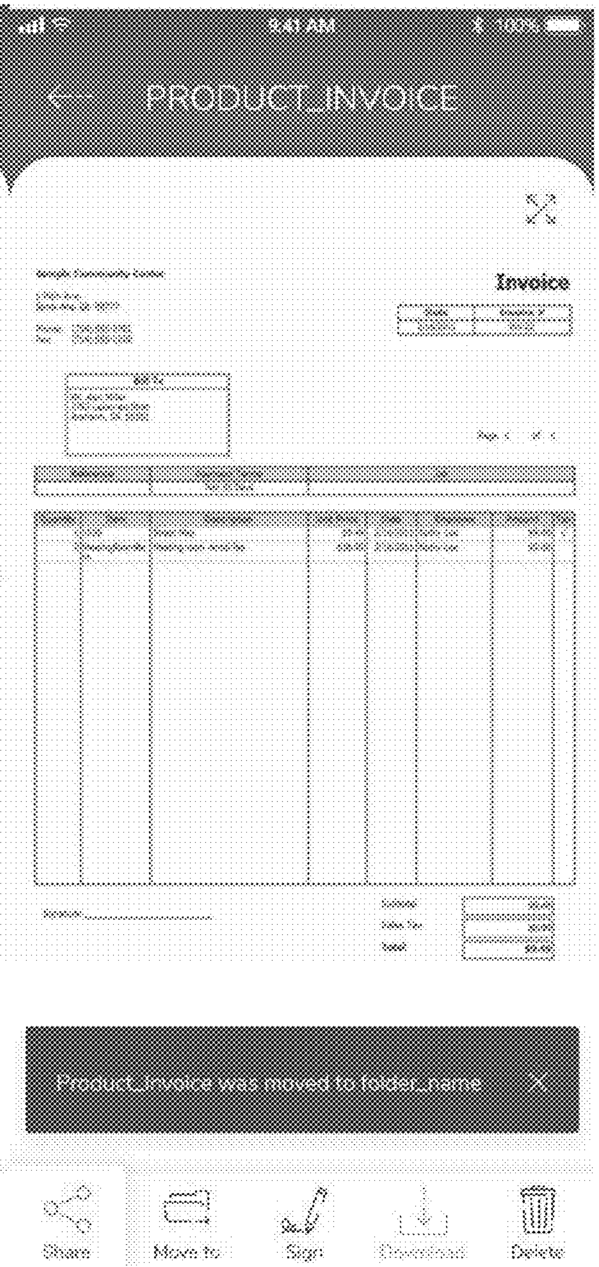
Fig. 17.19

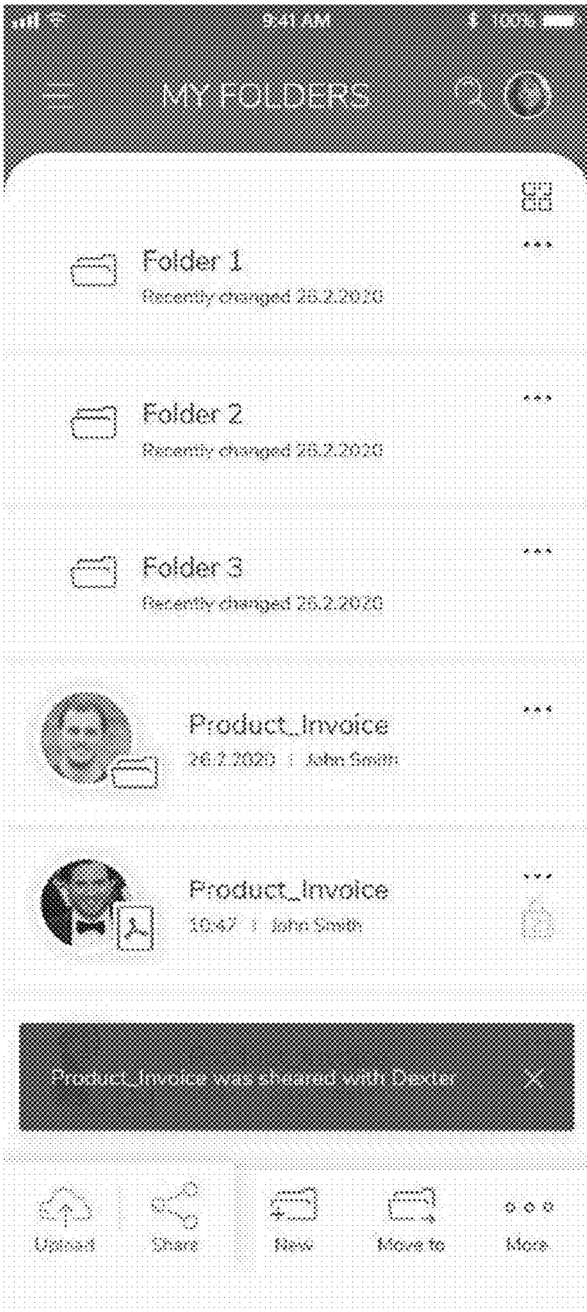
Fig. 17.20
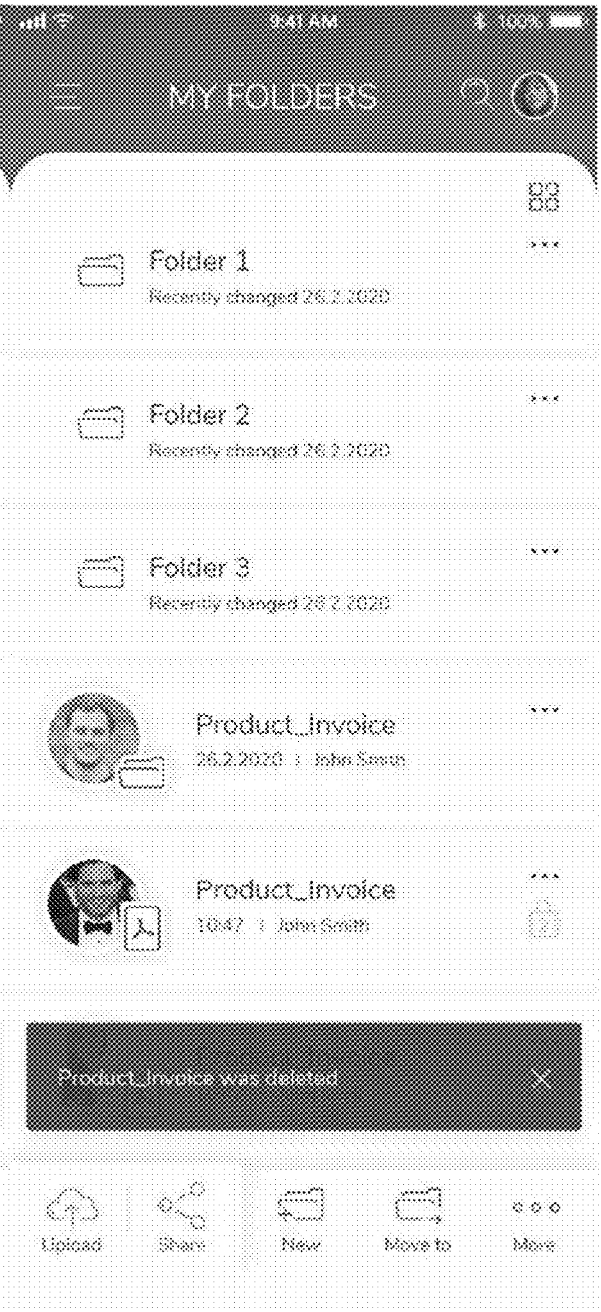
Fig. 17.21

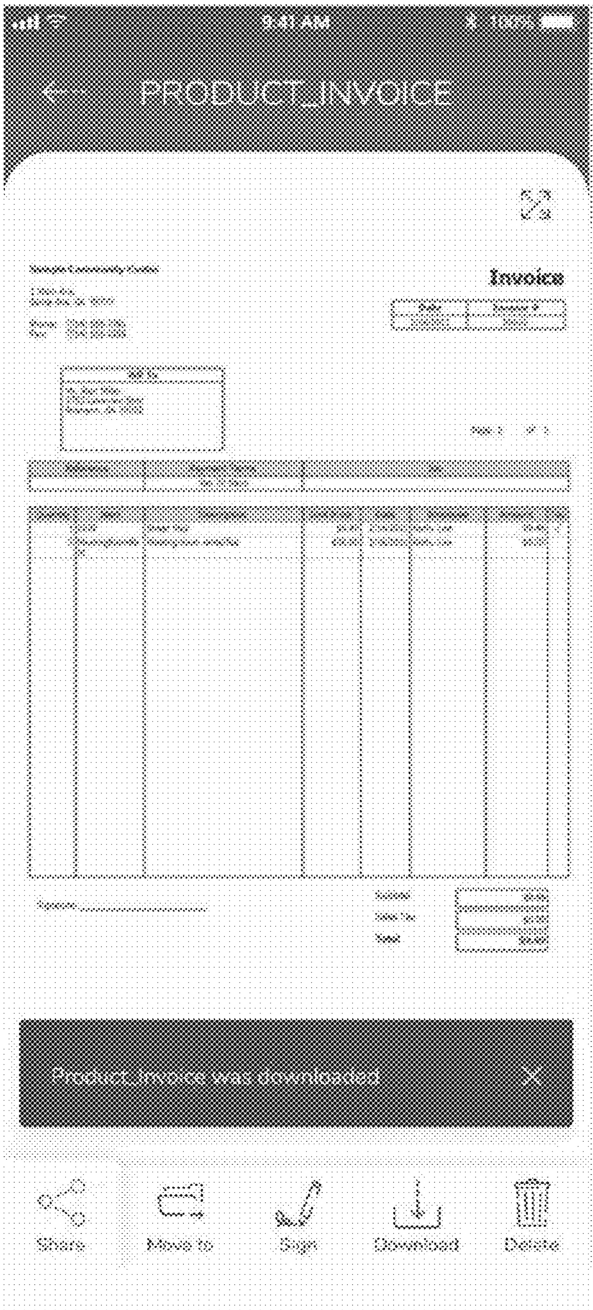
Fig. 17.22
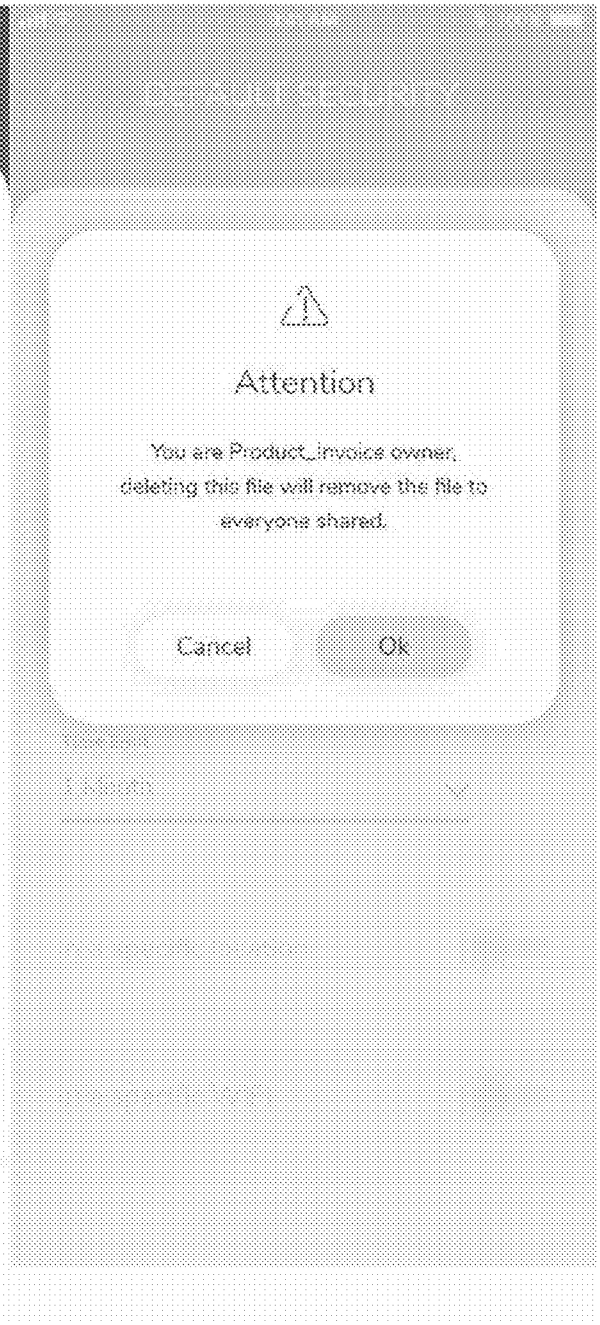
Fig. 17.23

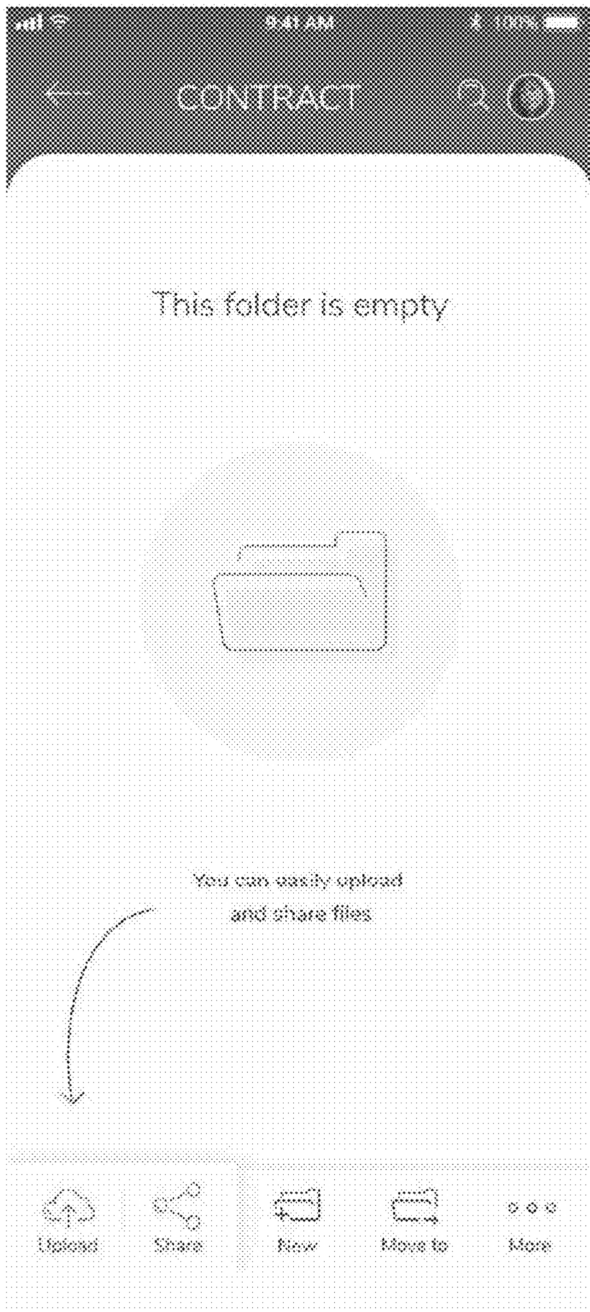
Fig. 17.24
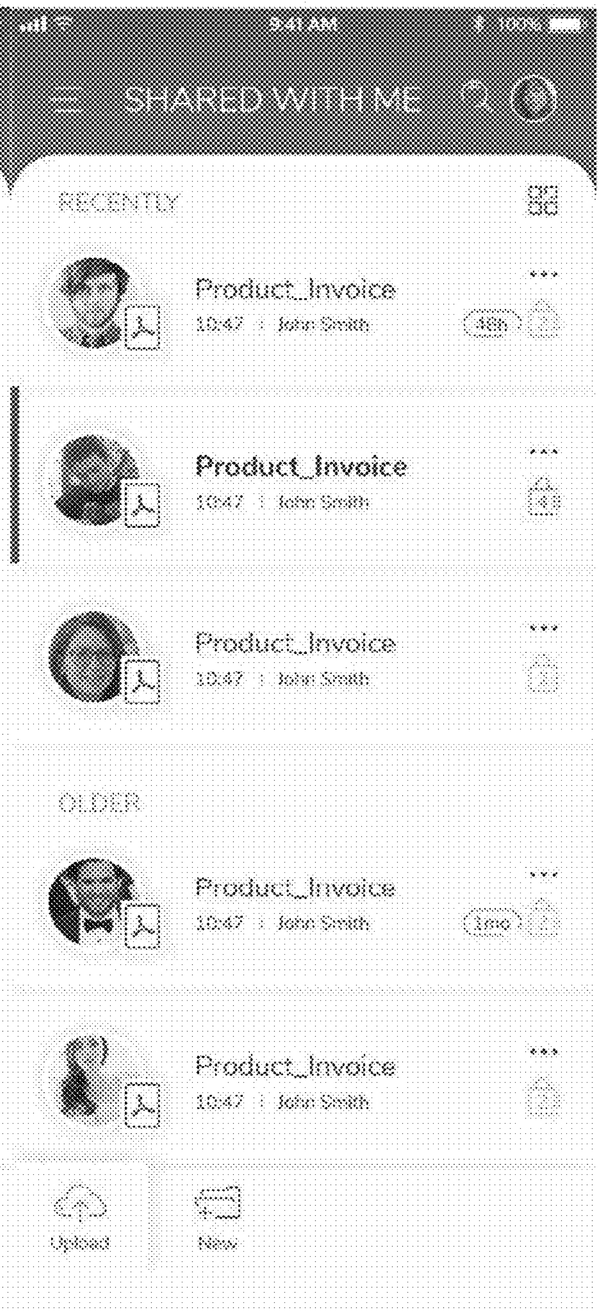
Fig. 17.25

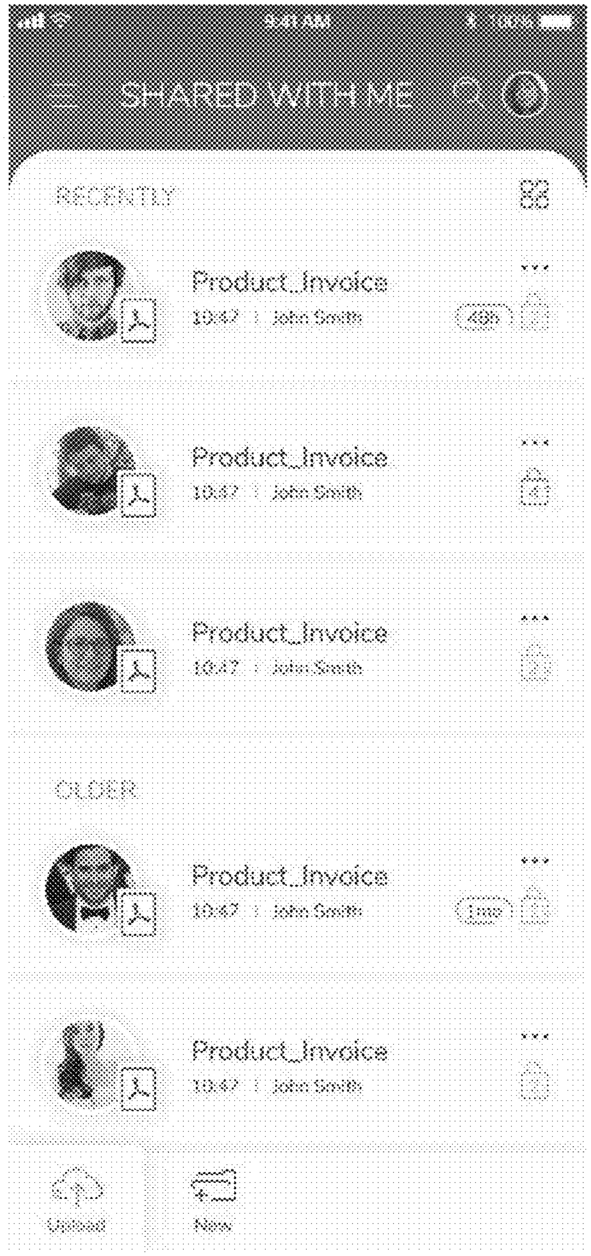
Fig. 17.26

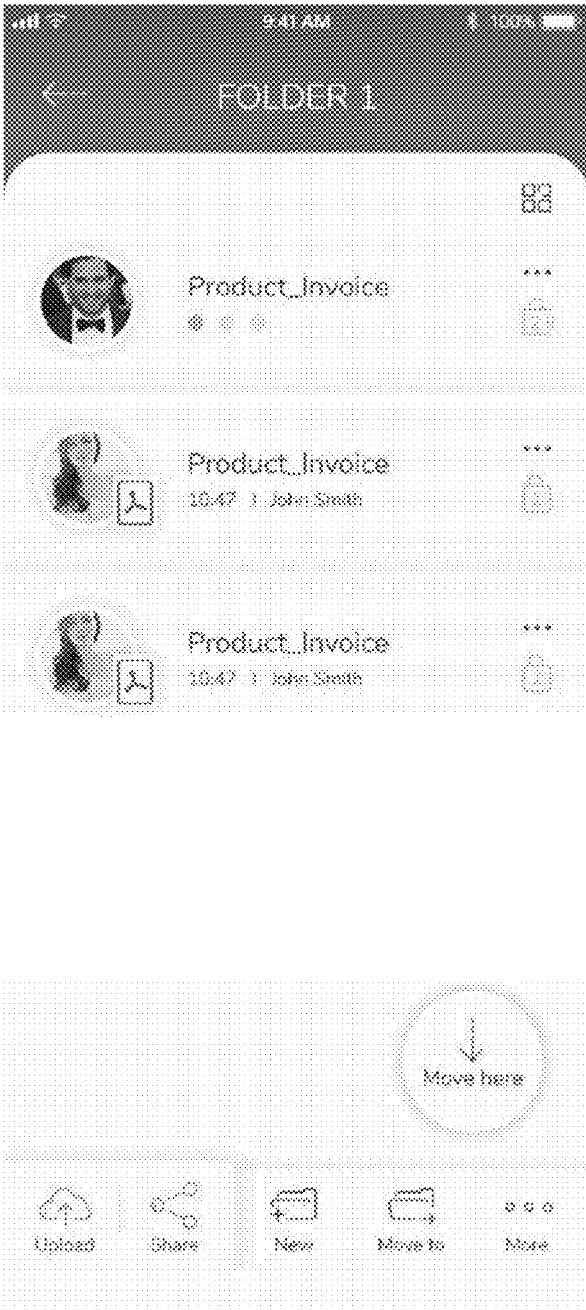
Fig. 17.27
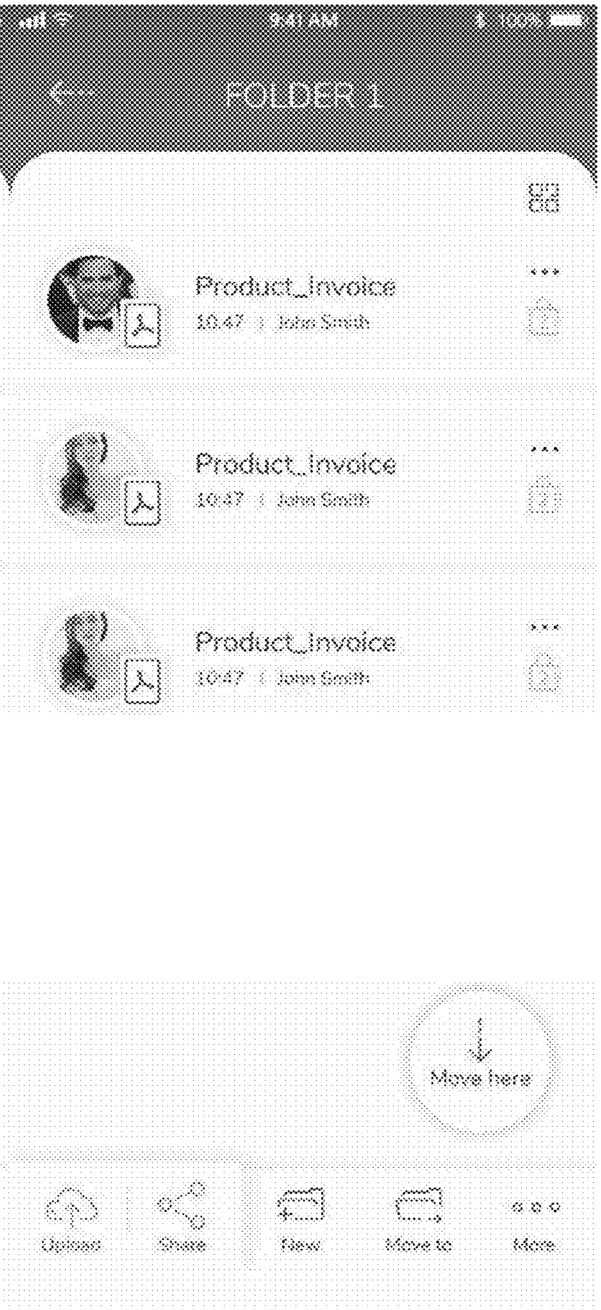
Fig. 17.28

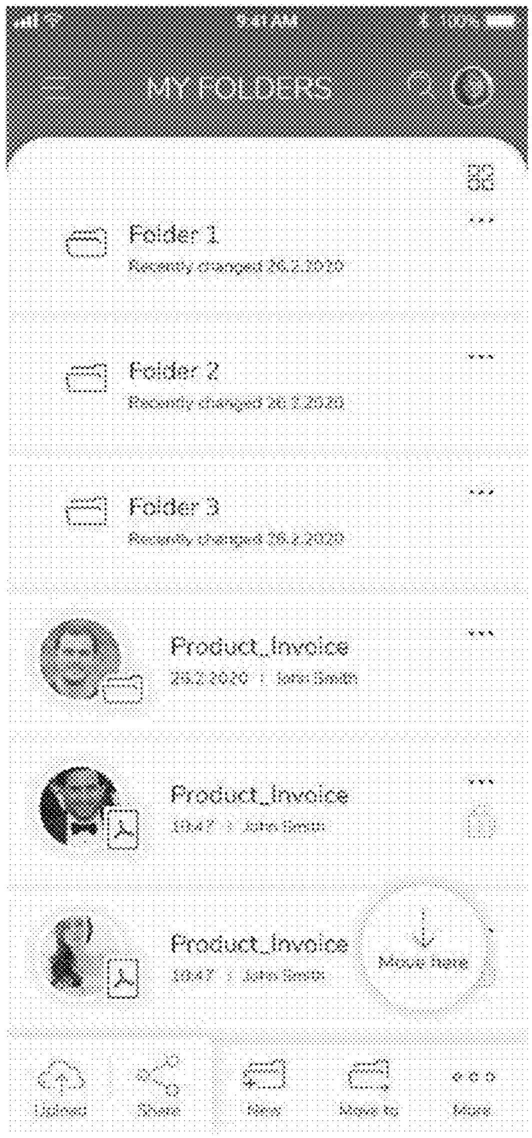
Fig. 17.29

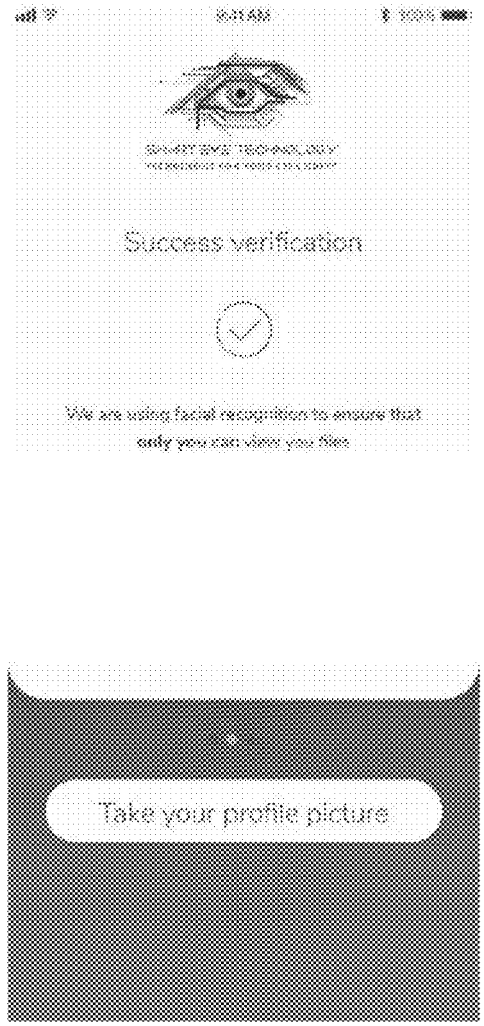
Fig. 17.30

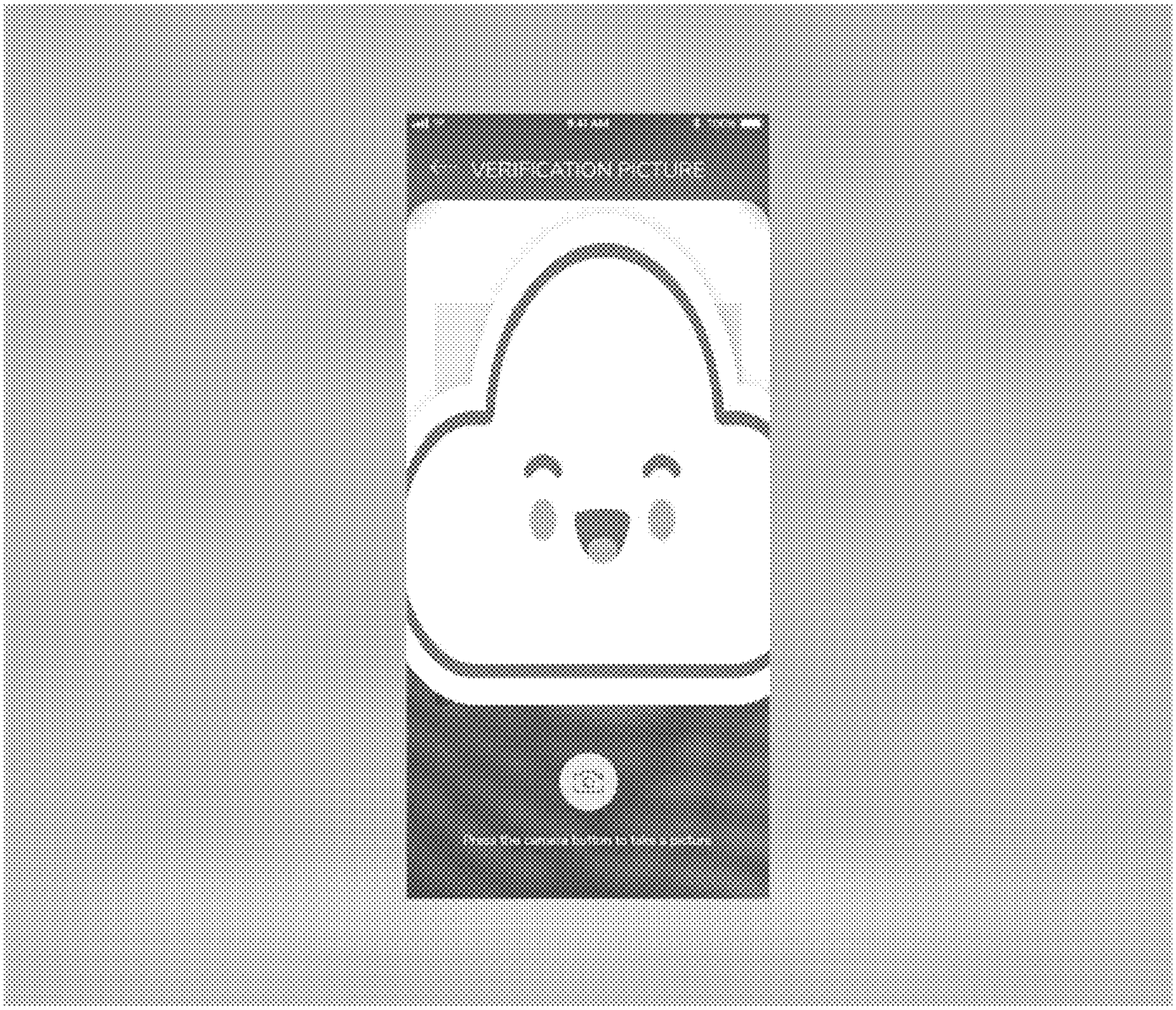
Fig. 17.31

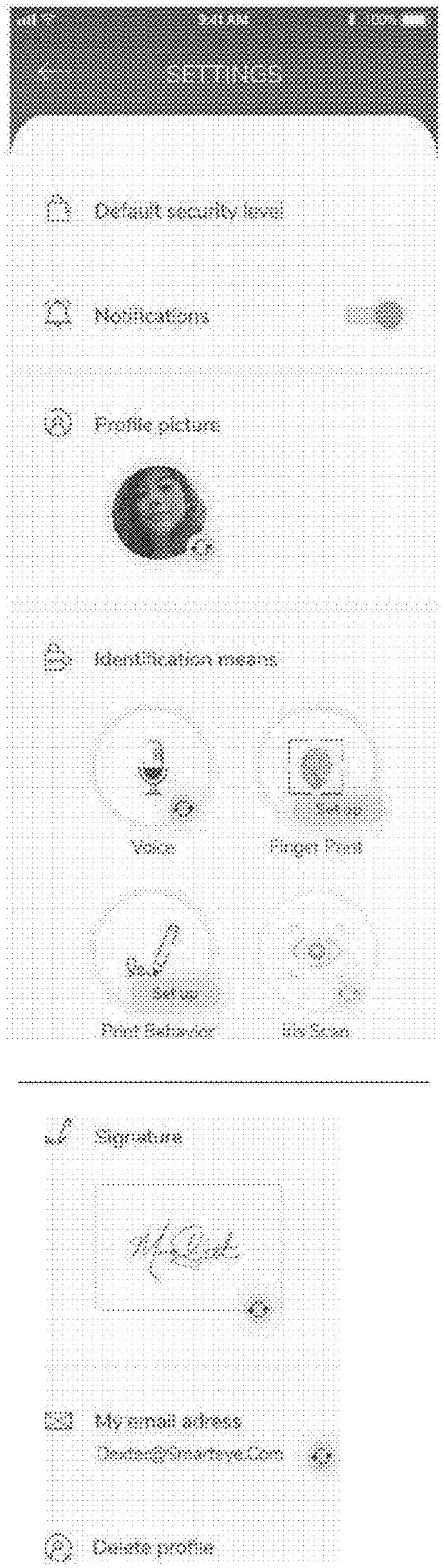
Fig. 17.32

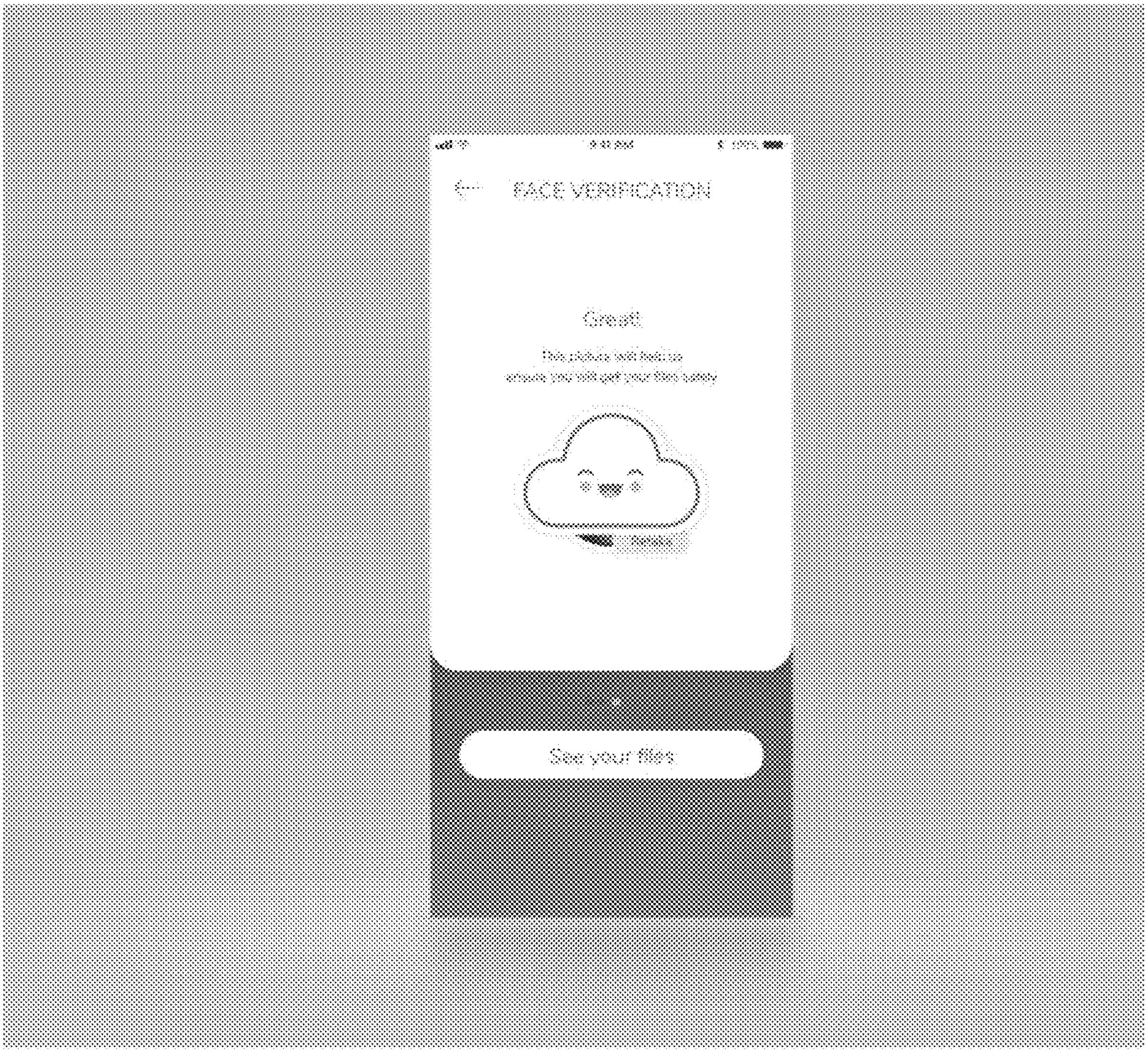
Fig. 17.33

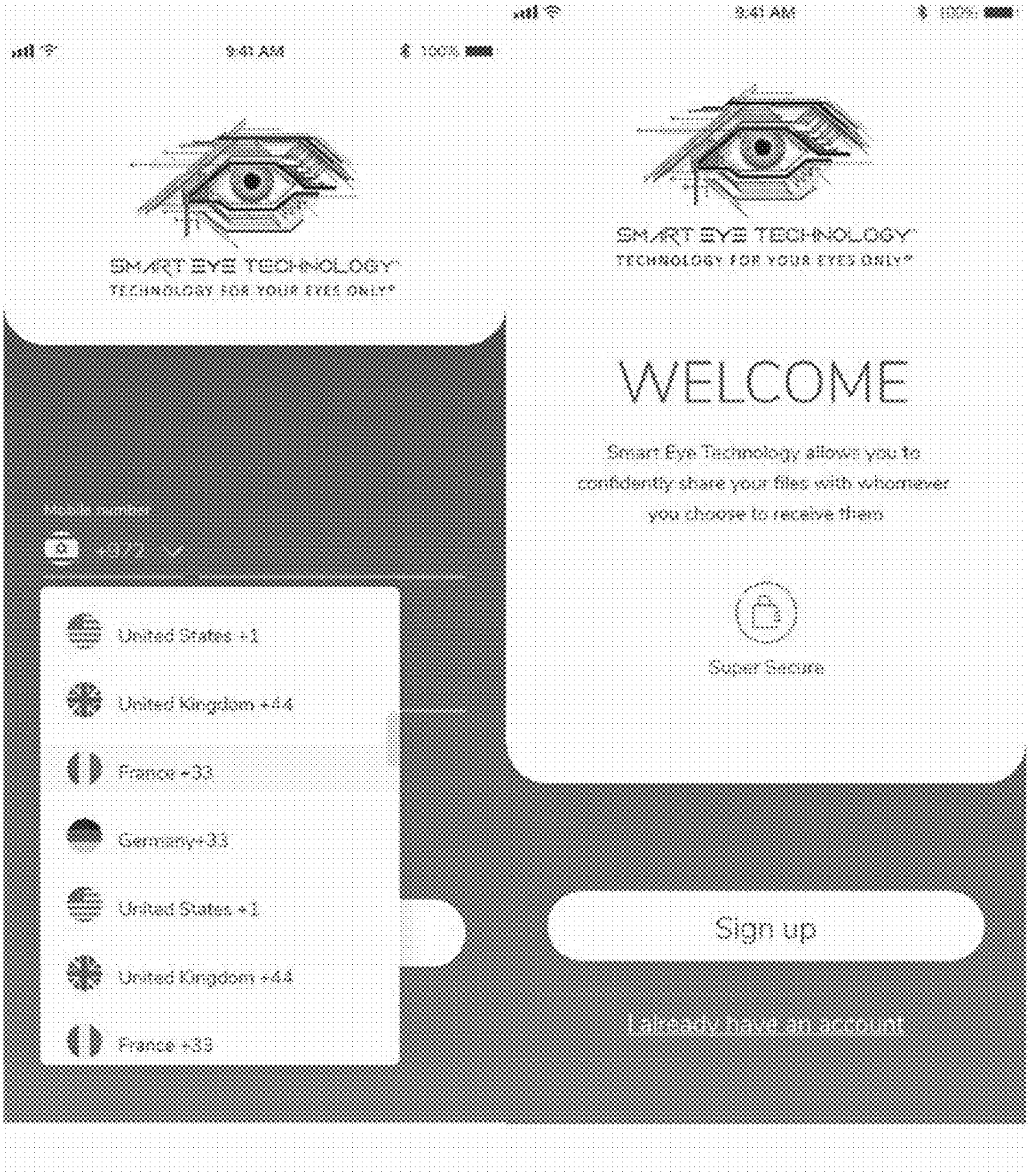
Fig. 17.34
Fig. 17.35

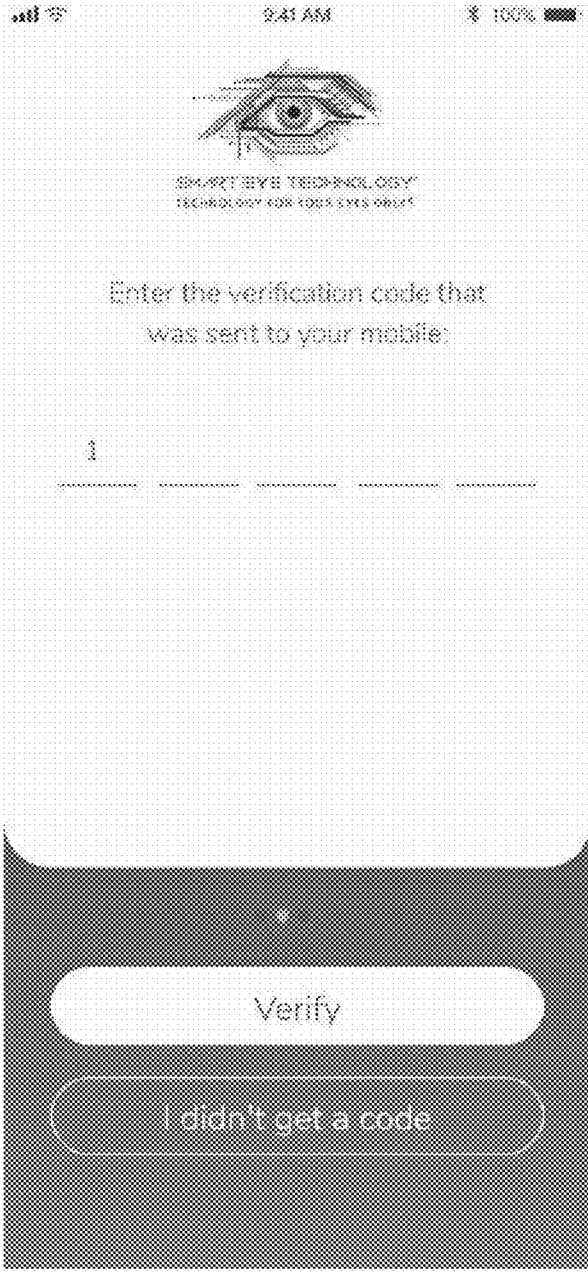
Fig. 17.36
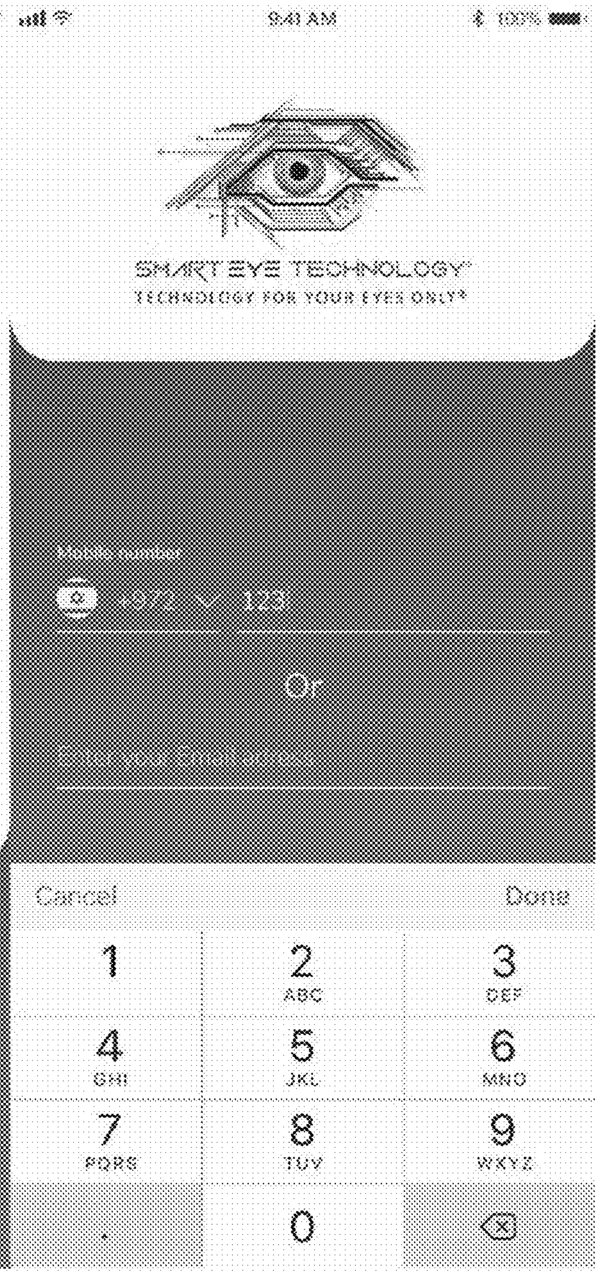
Fig. 17.37

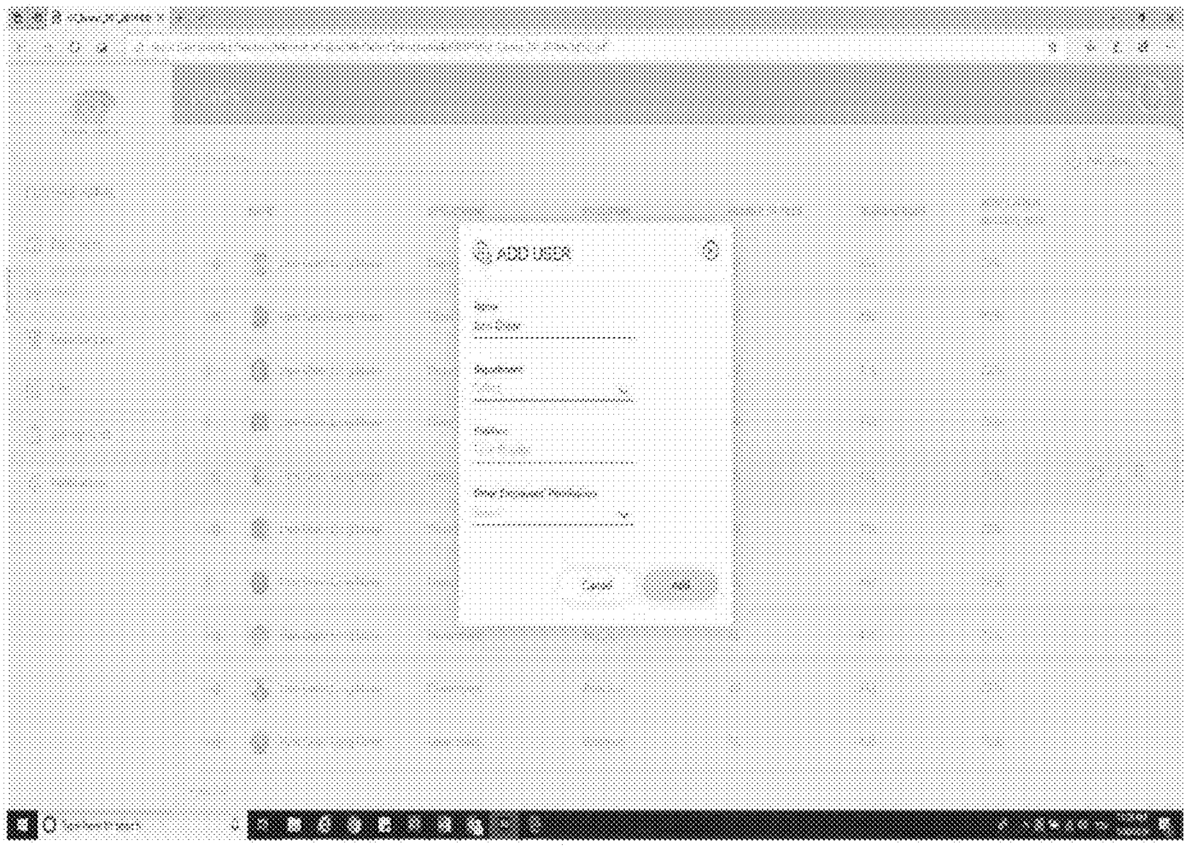
Fig. 17.38

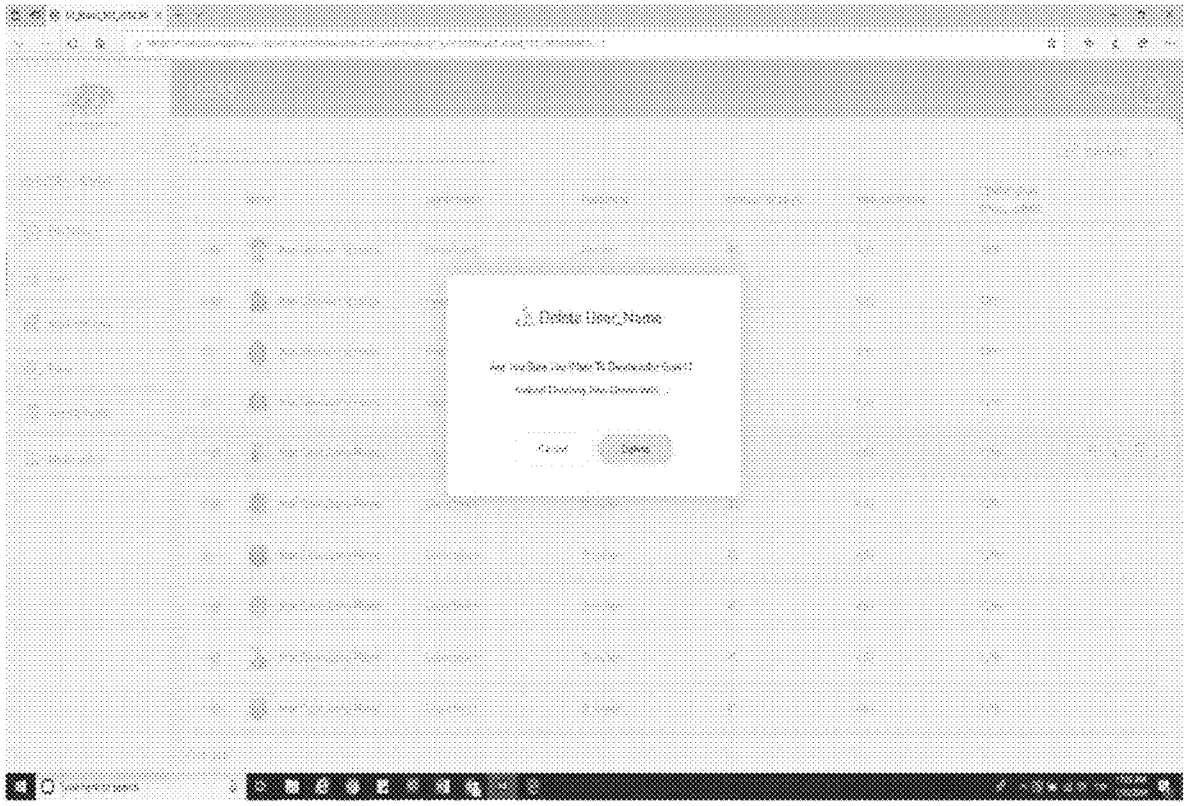
Fig. 17.39

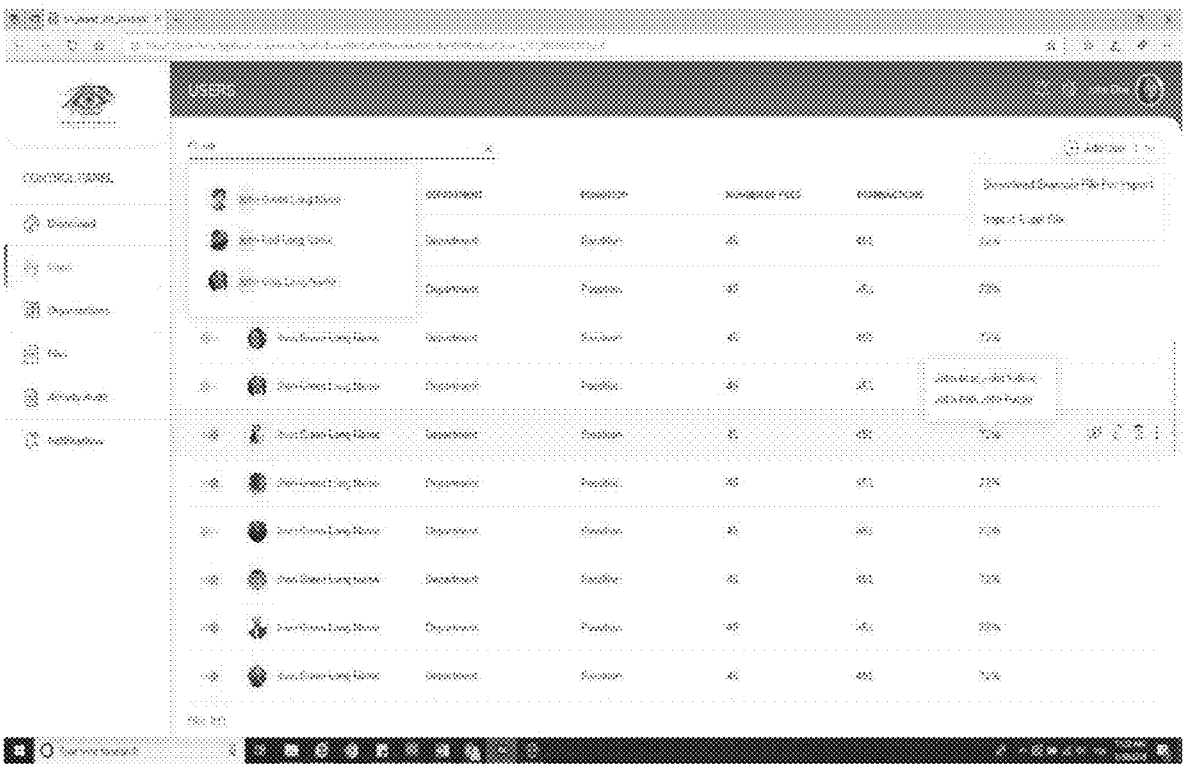
Fig. 17.40

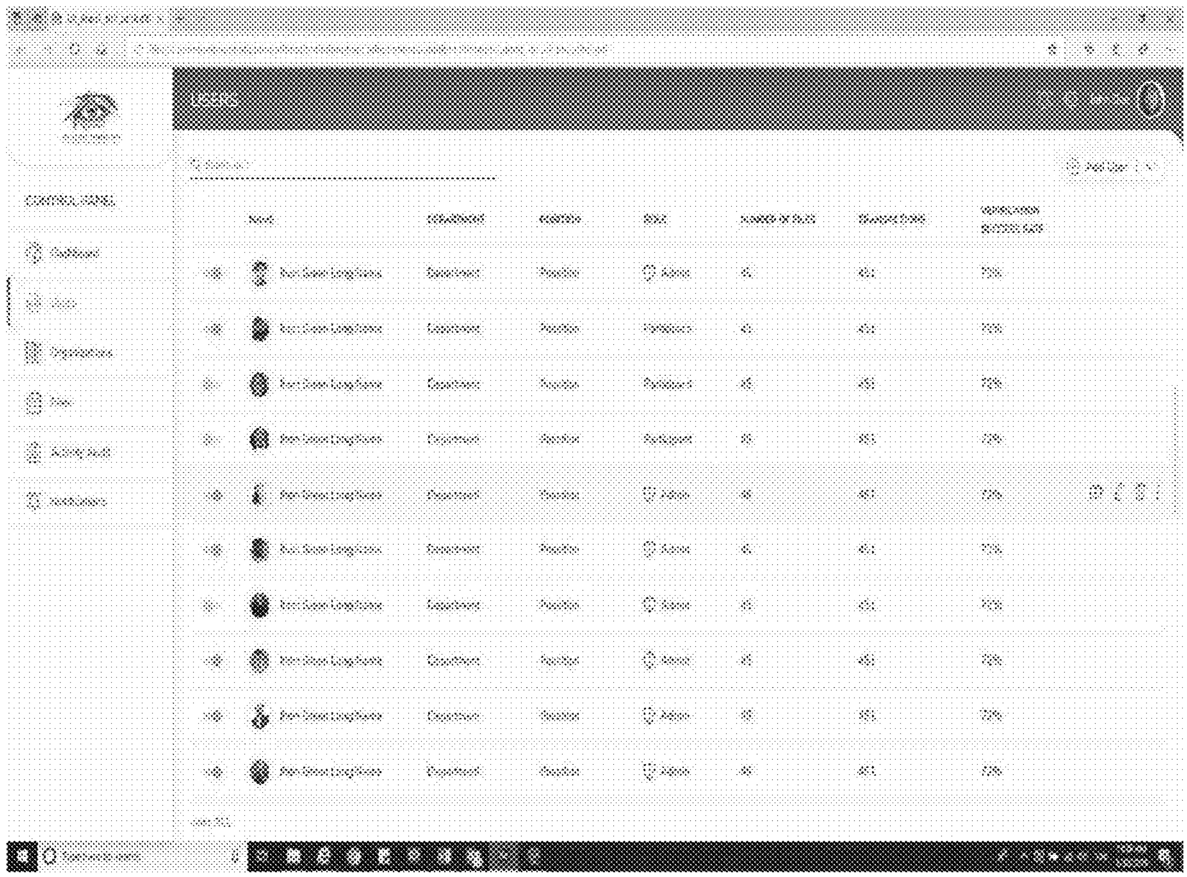
Fig. 17.41

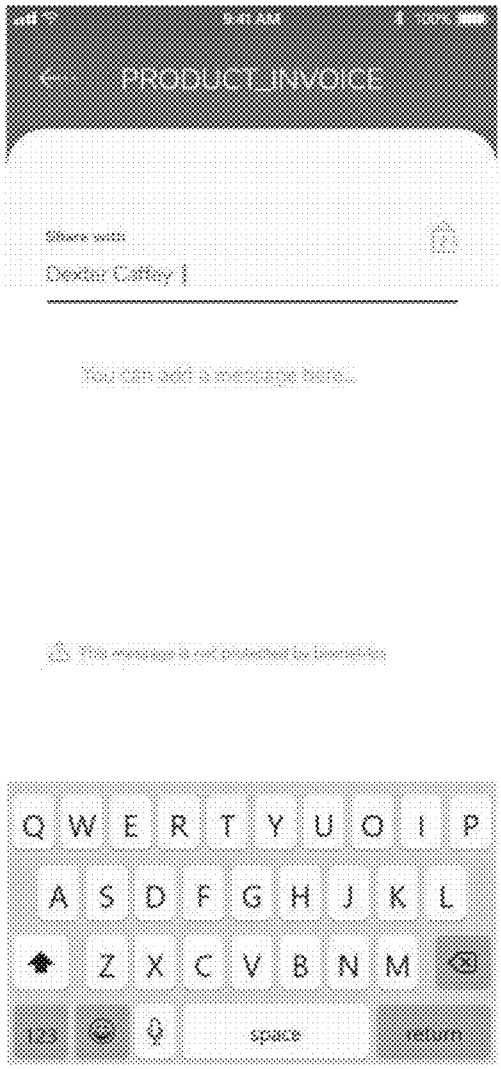
Fig. 17.42

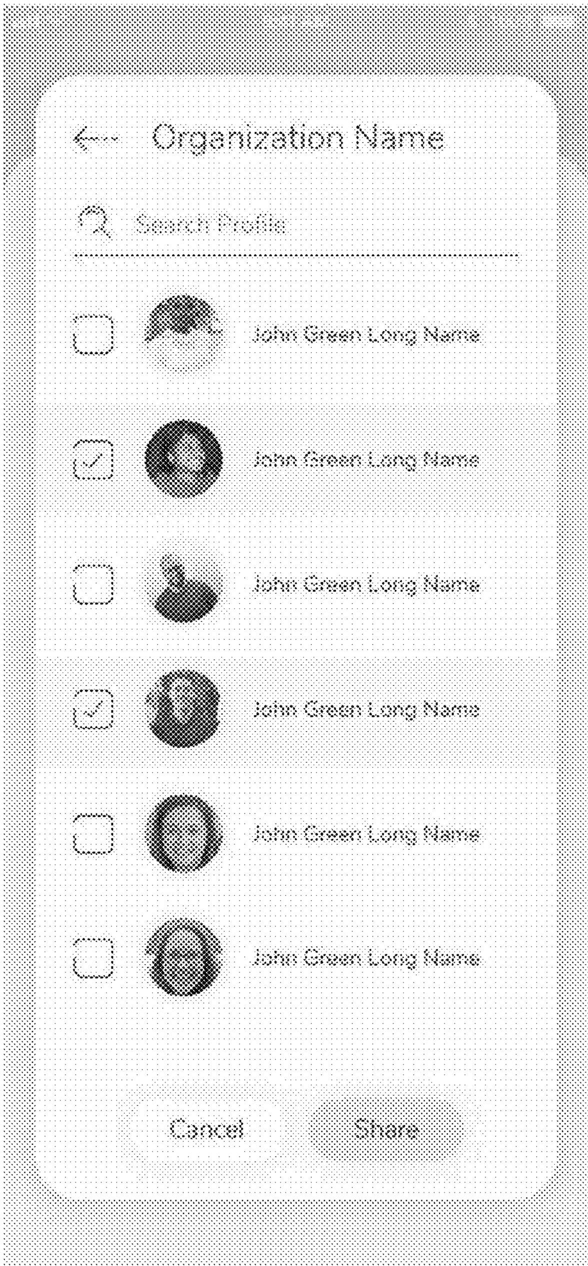
Fig. 17.43
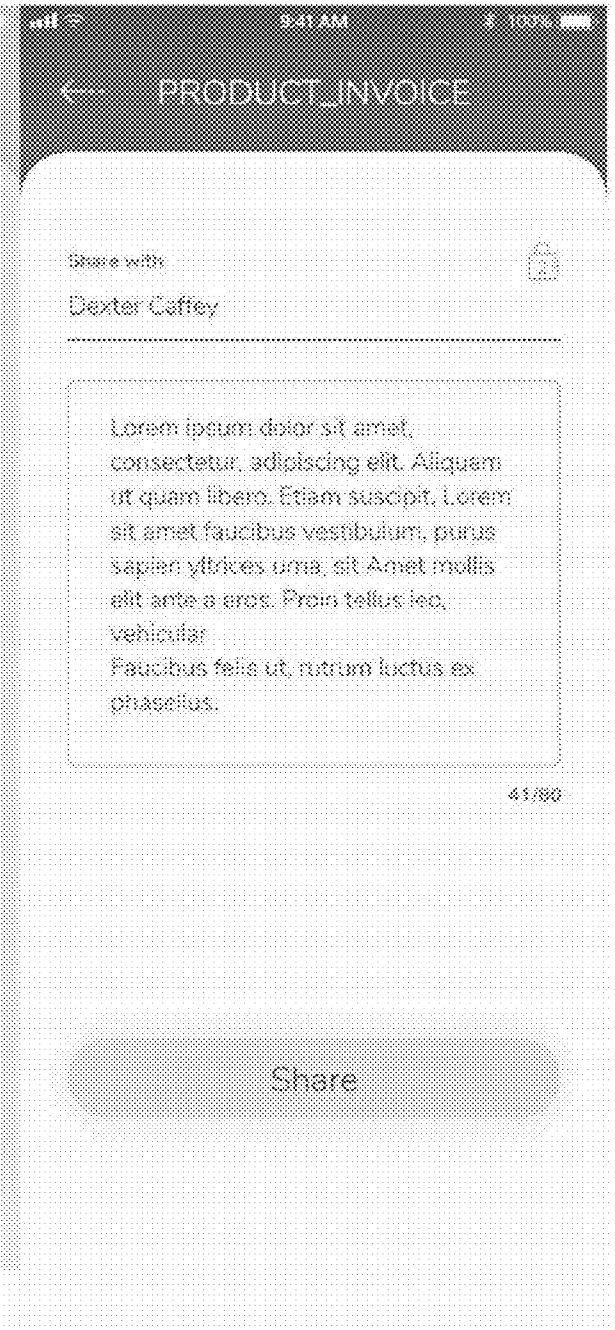
Fig. 17.44

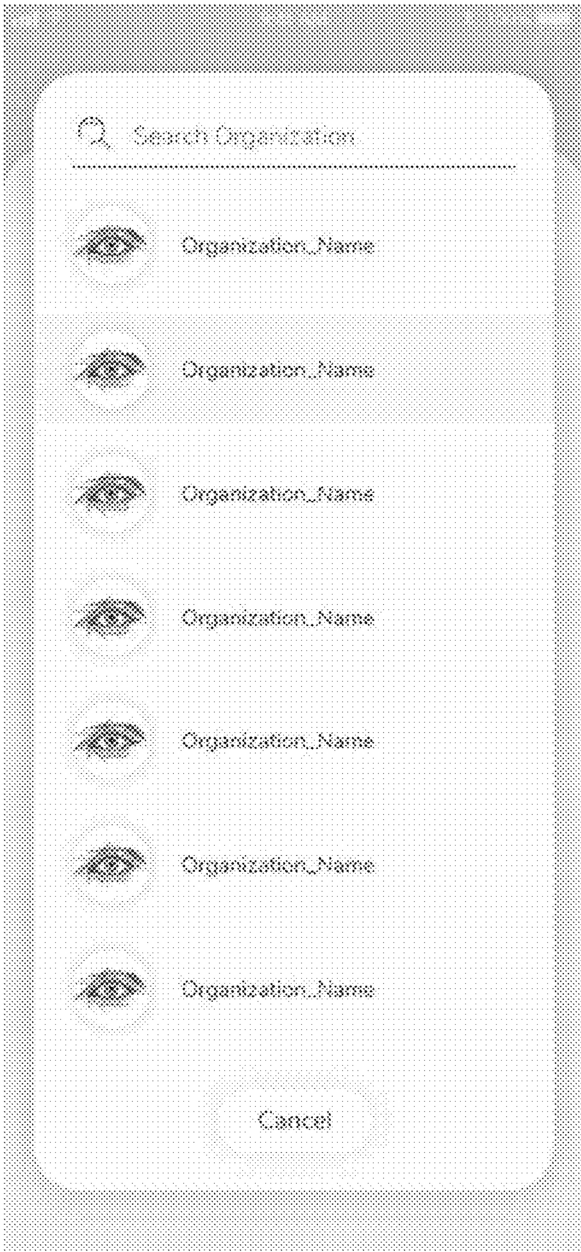
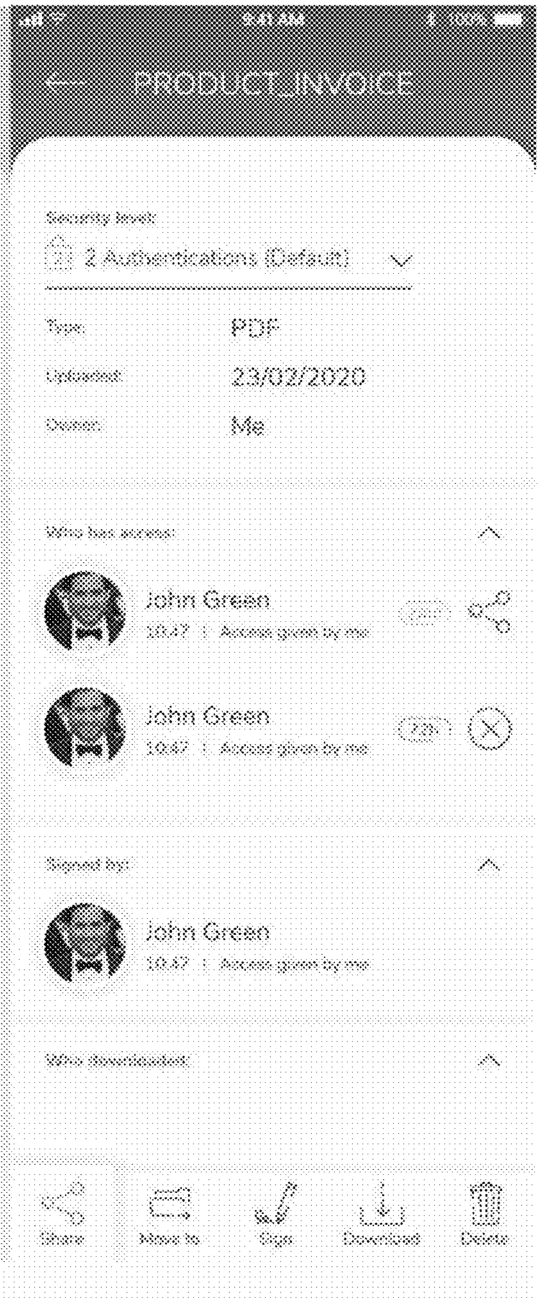
Fig. 17.45
Fig. 17.46

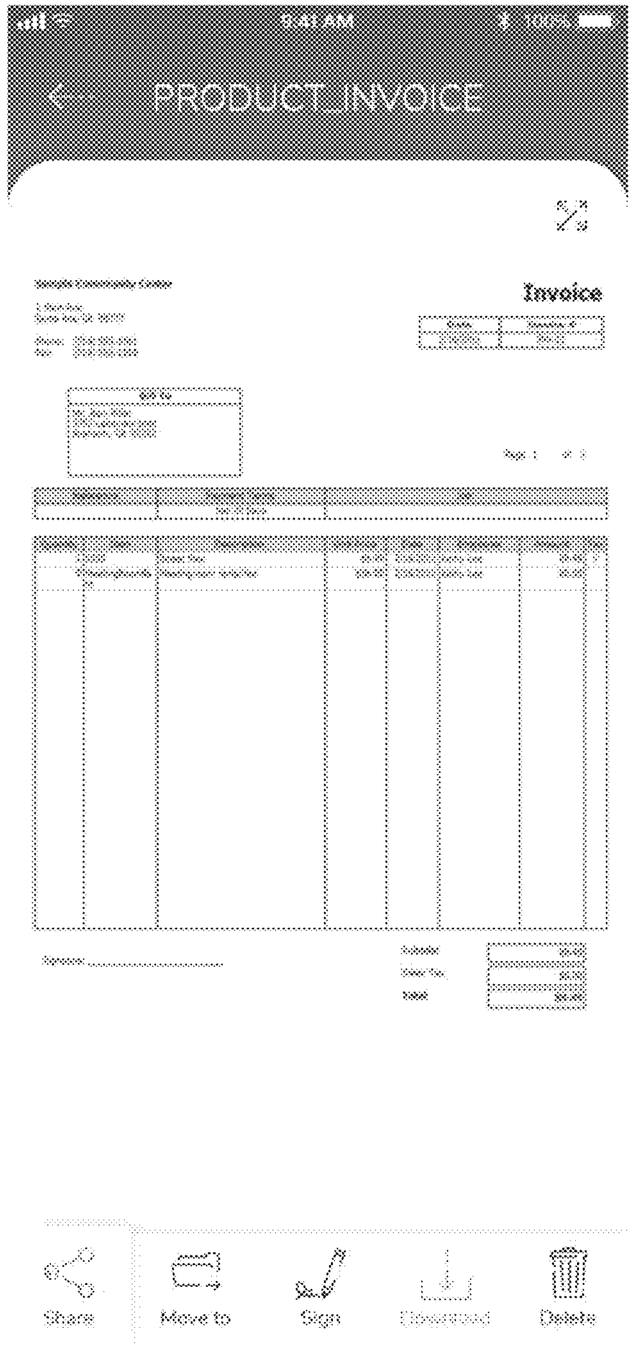
Fig. 17.47

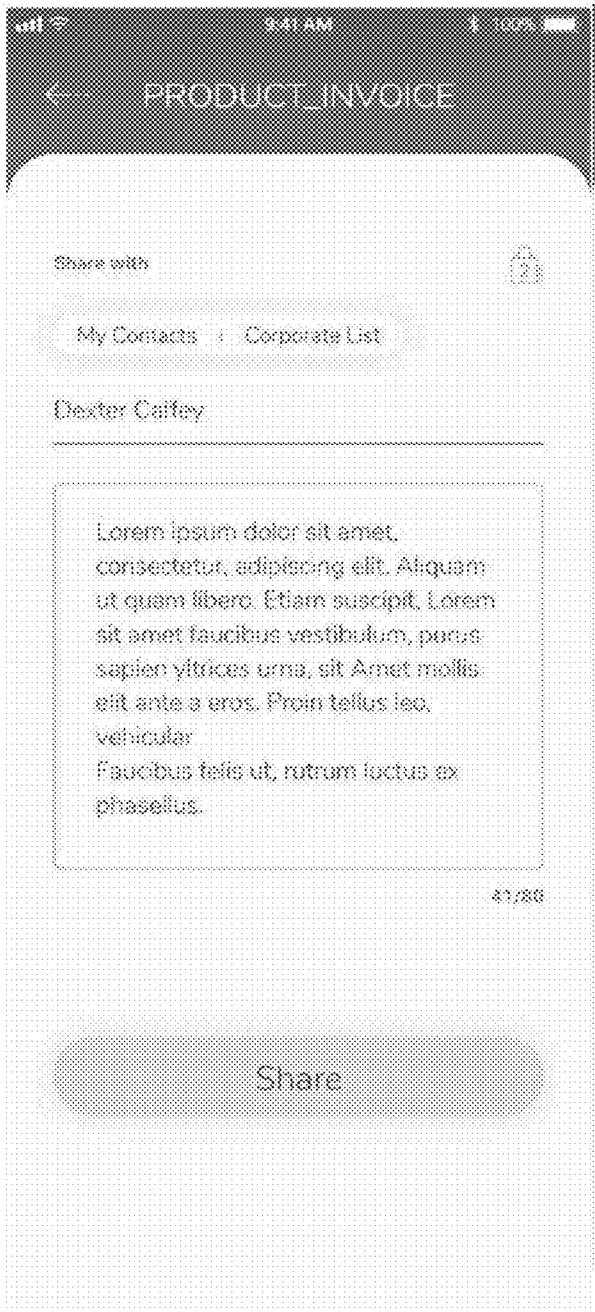
Fig. 17.48
Fig. 17.49

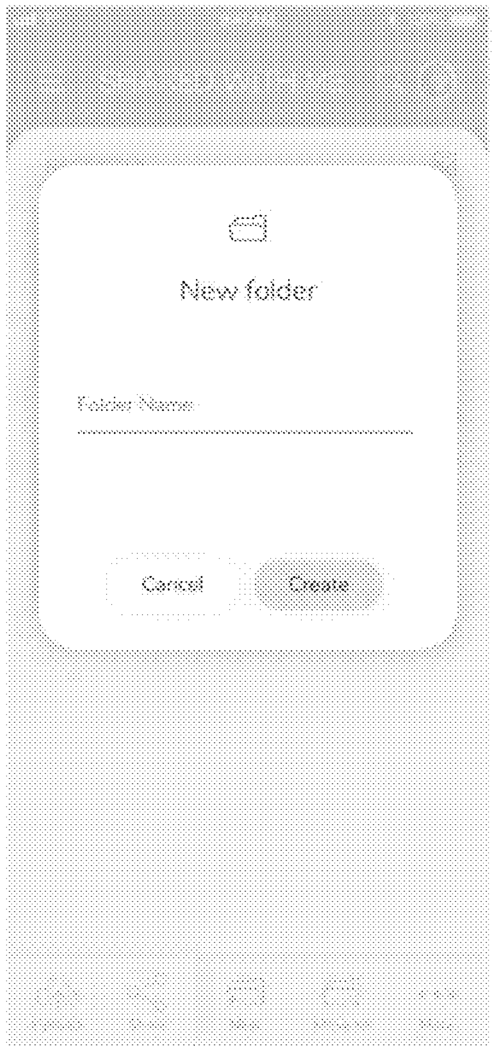
Fig. 17.50

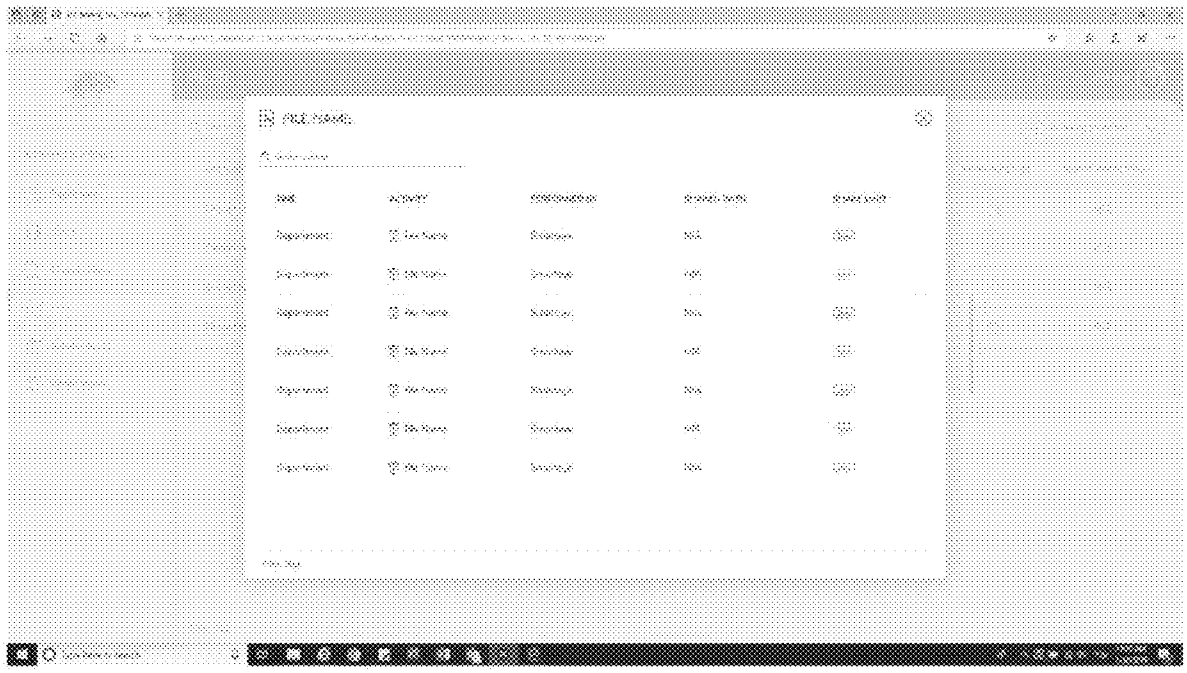
Fig. 17.51

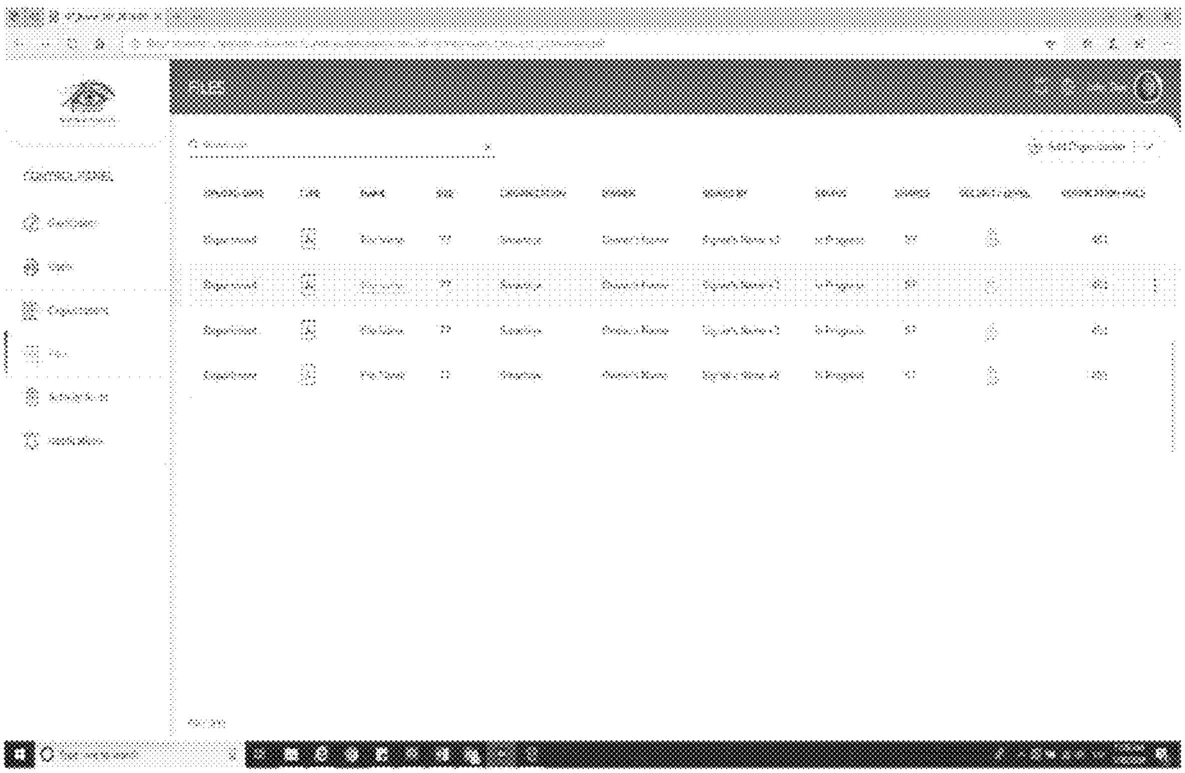
Fig. 17.52

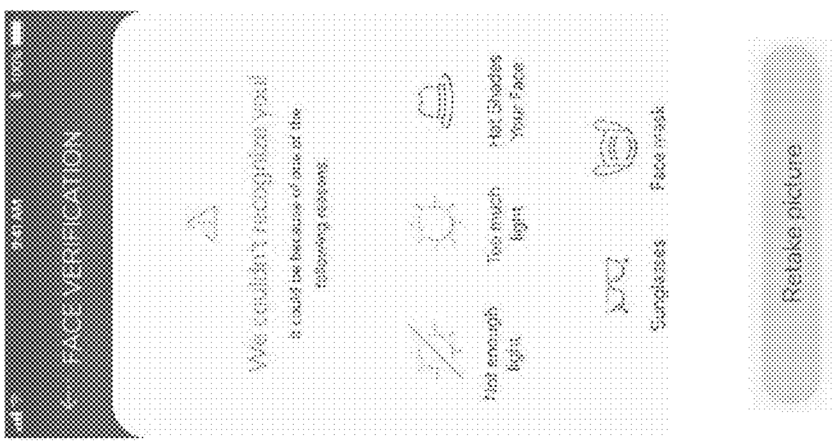
Fig. 17.53

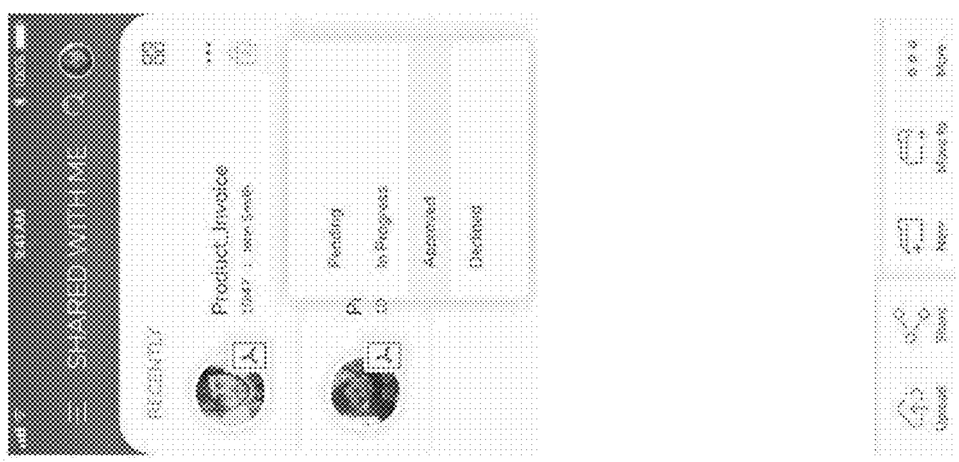
Fig. 17.54

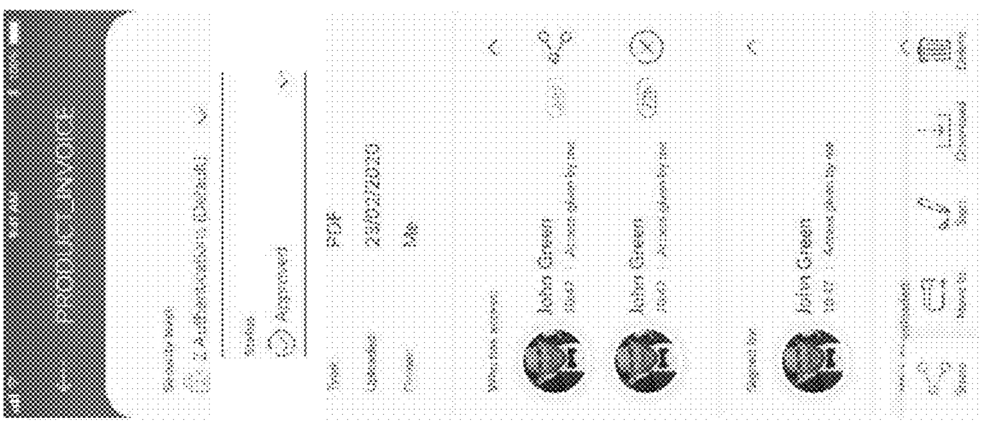
Fig. 17.55

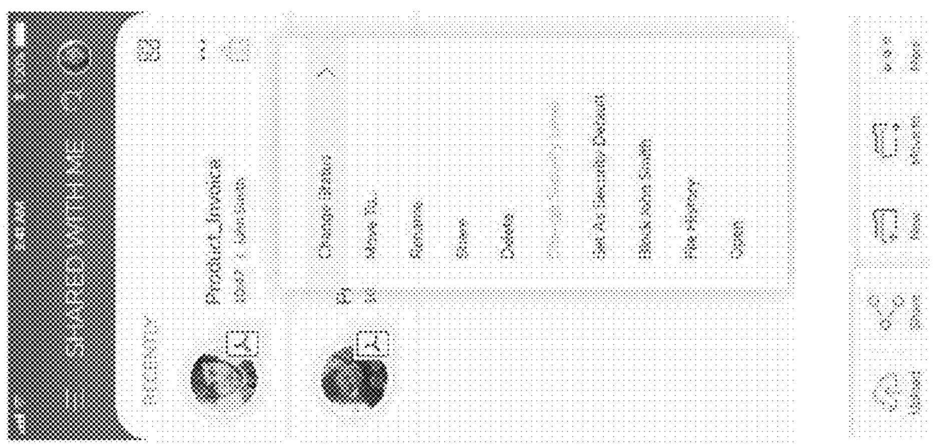
Fig. 17.56

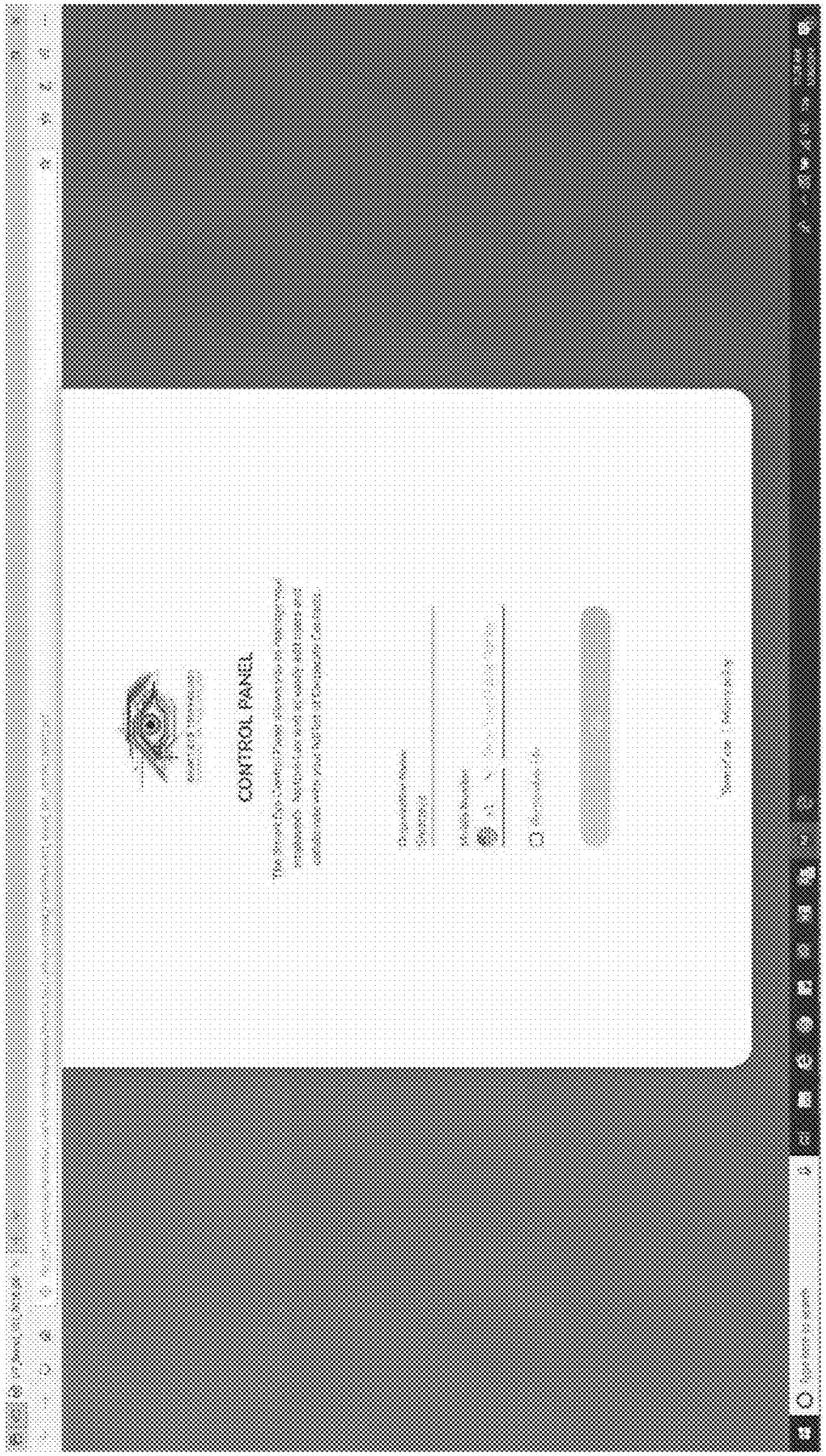
Fig. 17.57

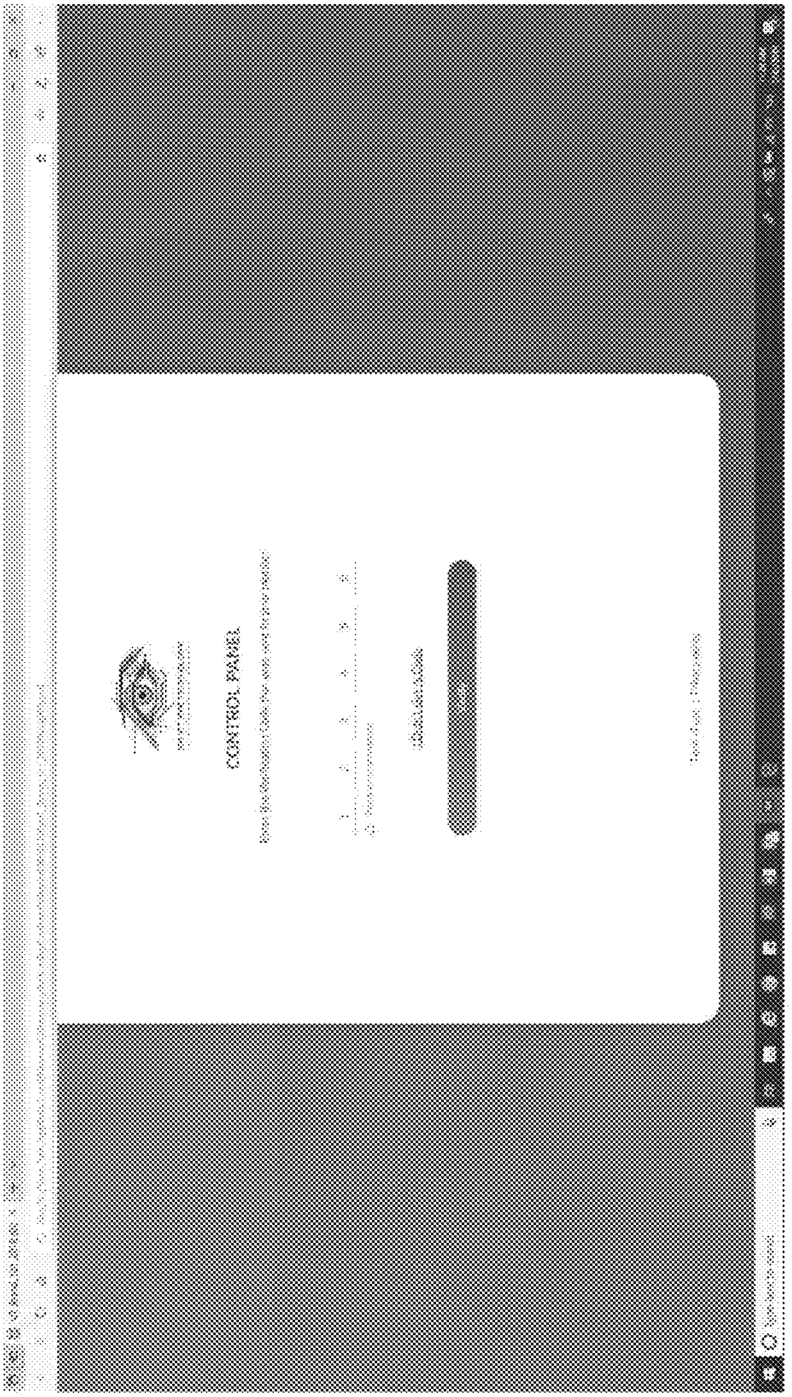
Fig. 17.58

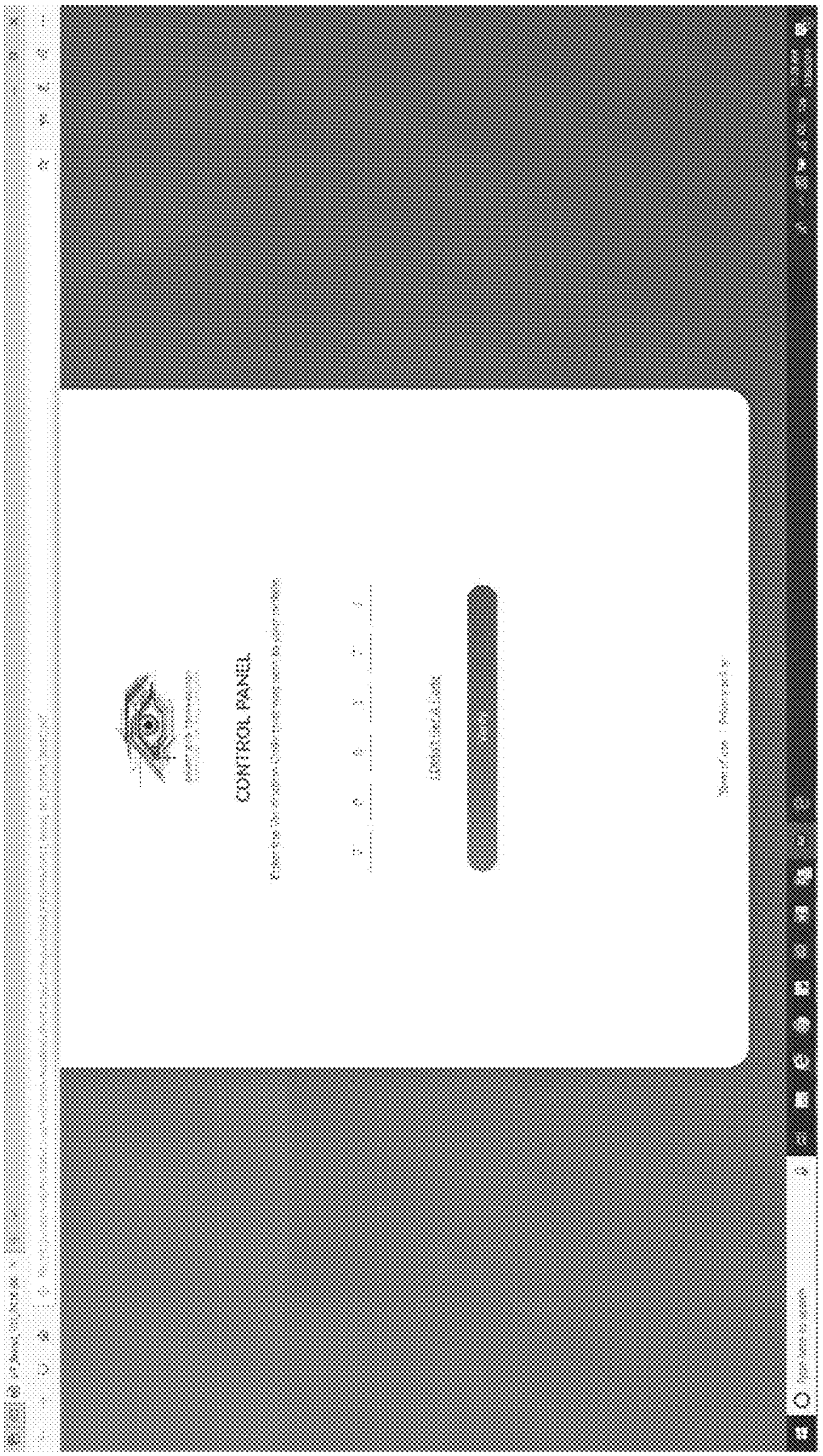
Fig. 17.59

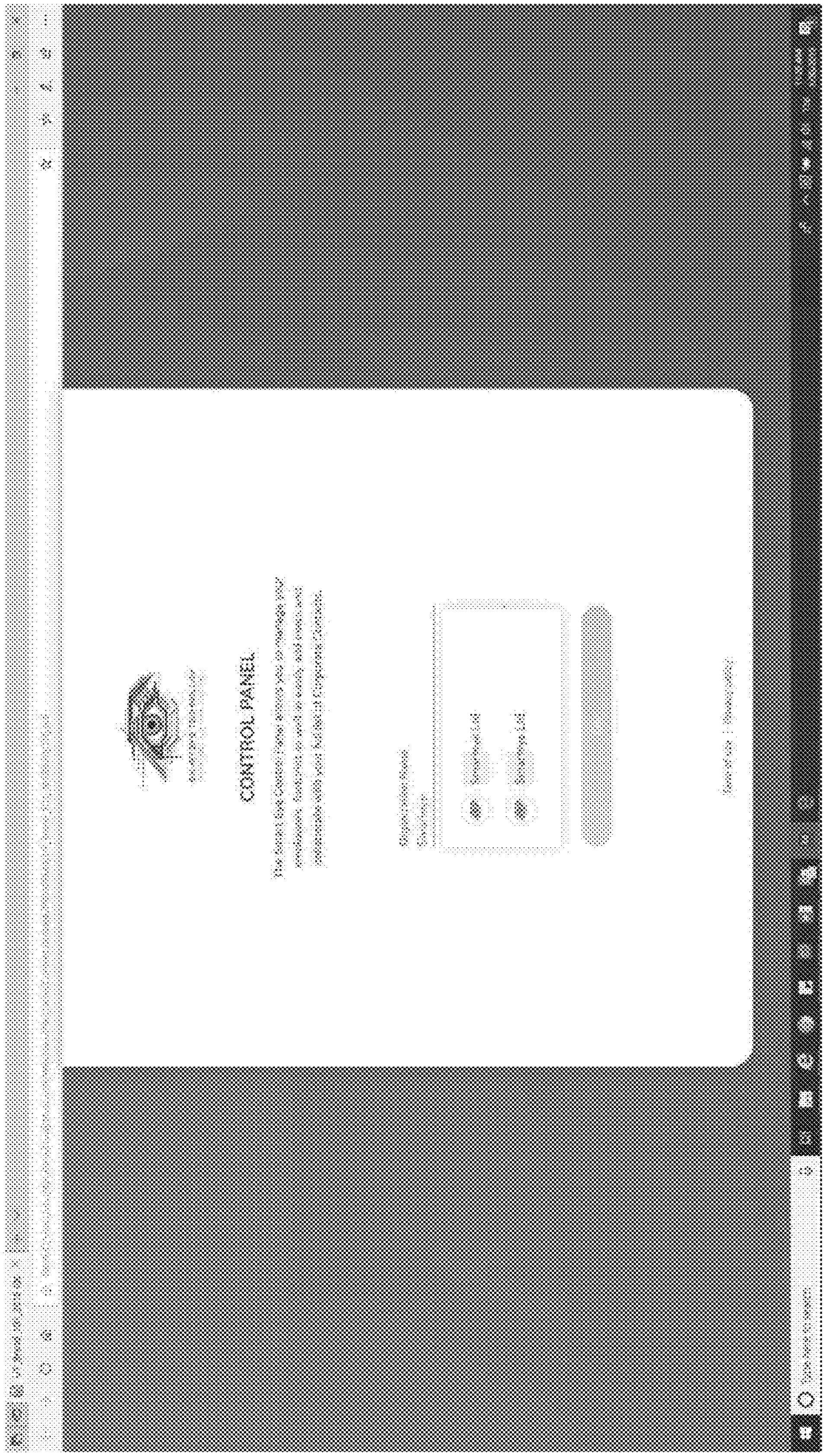
Fig. 17.60

Fig. 17.61

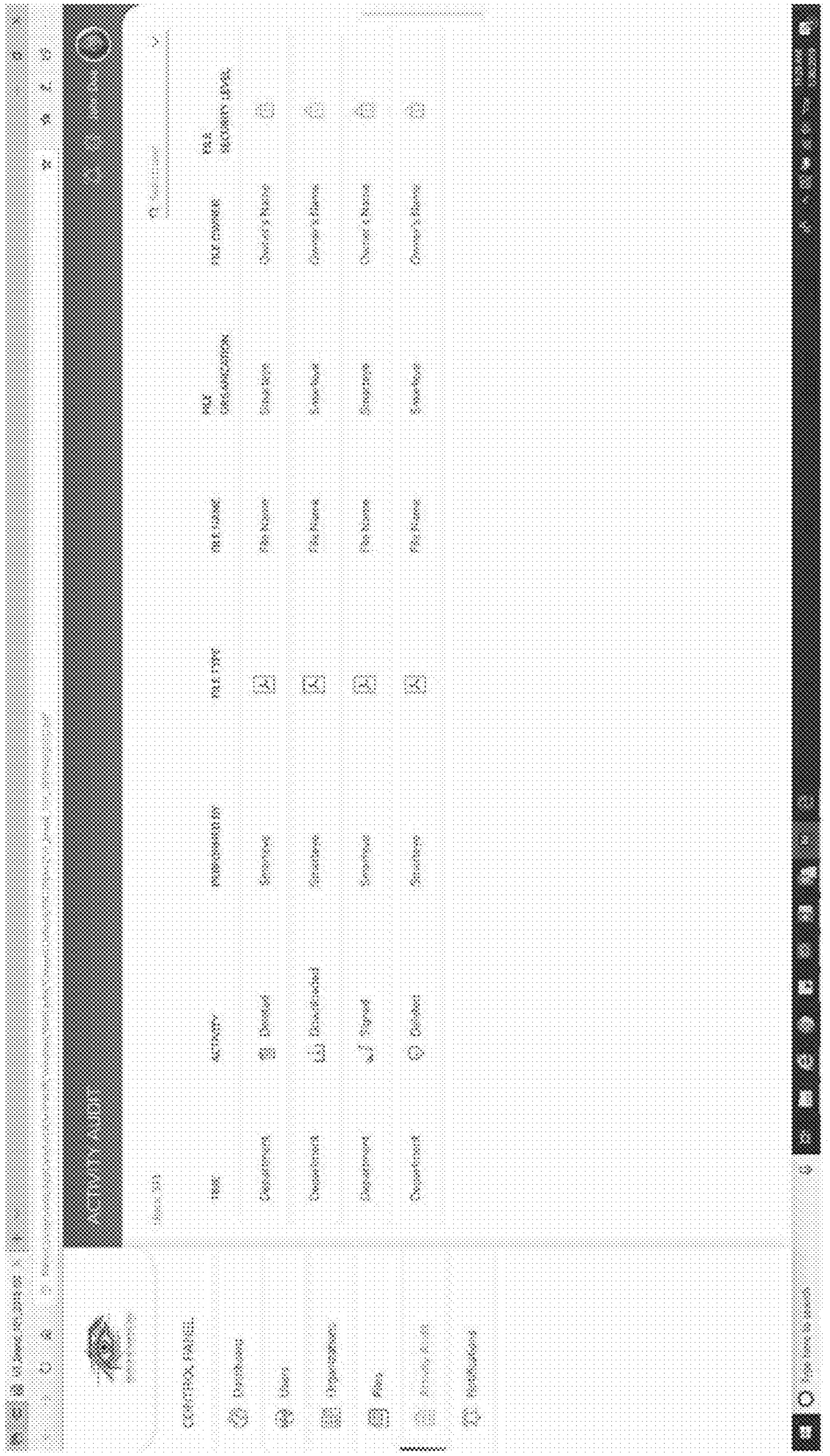
Fig. 17.62

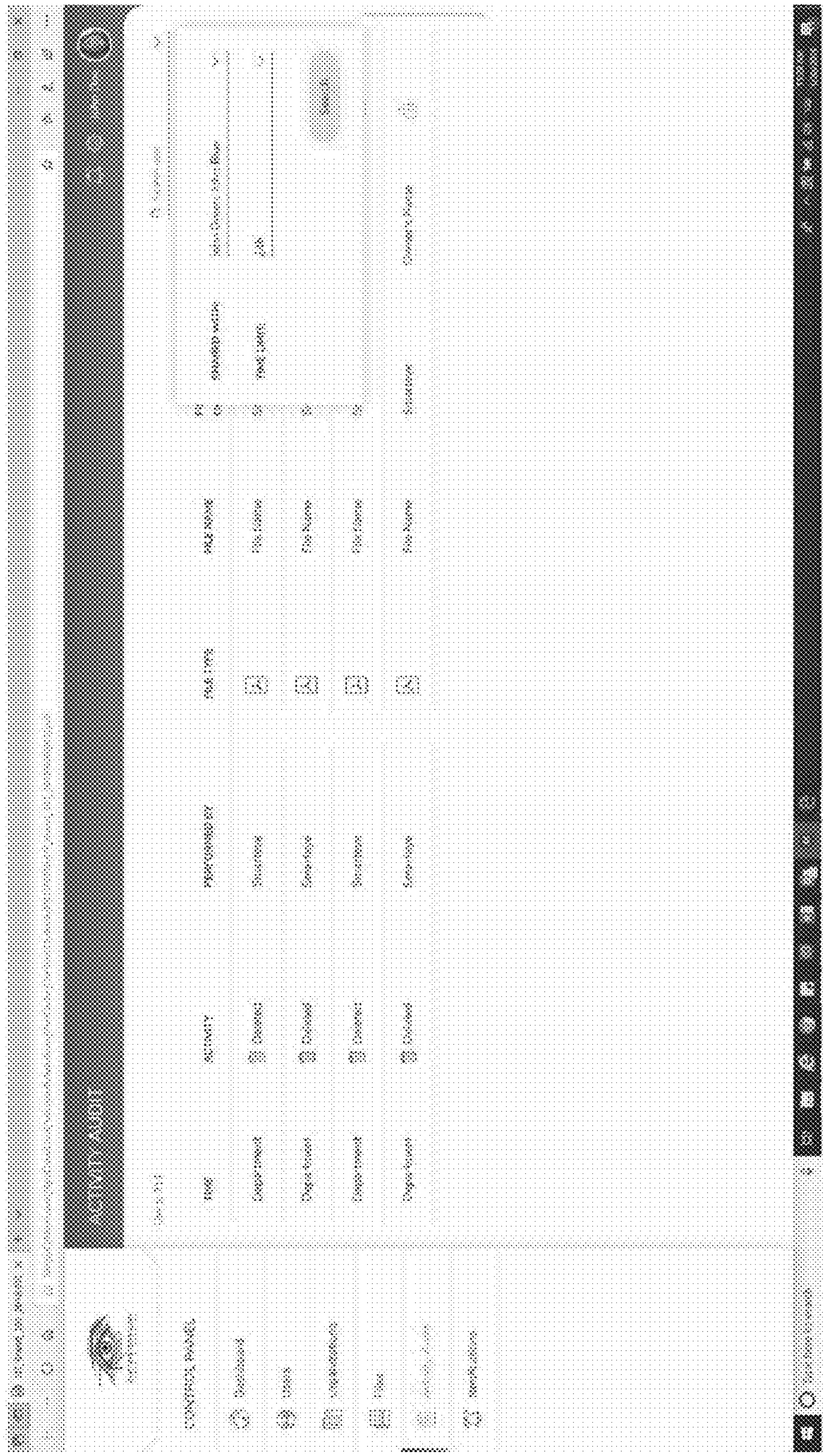
Fig. 17.63

Fig. 17.64

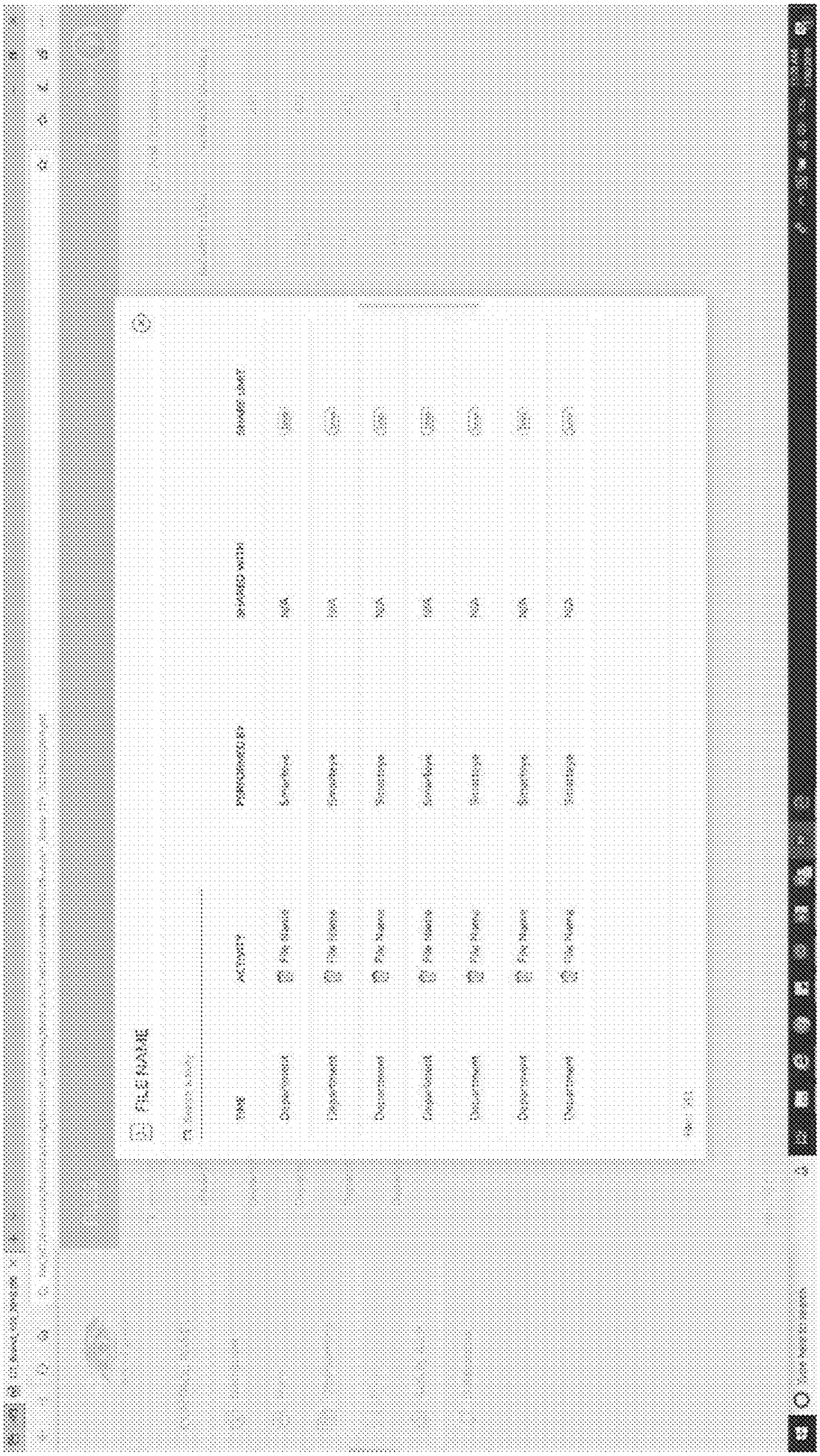
Fig. 17.65

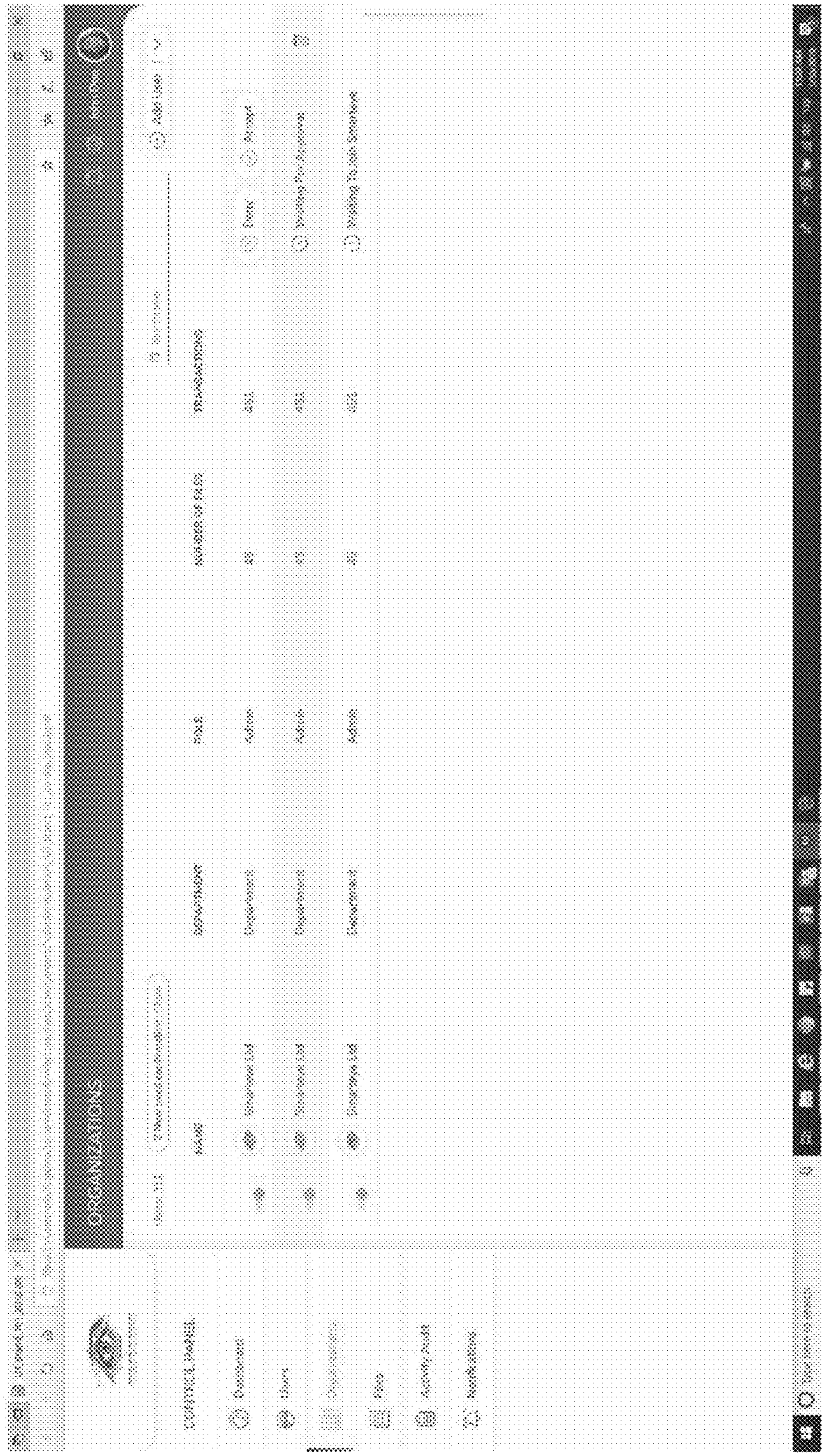
Fig. 17.66

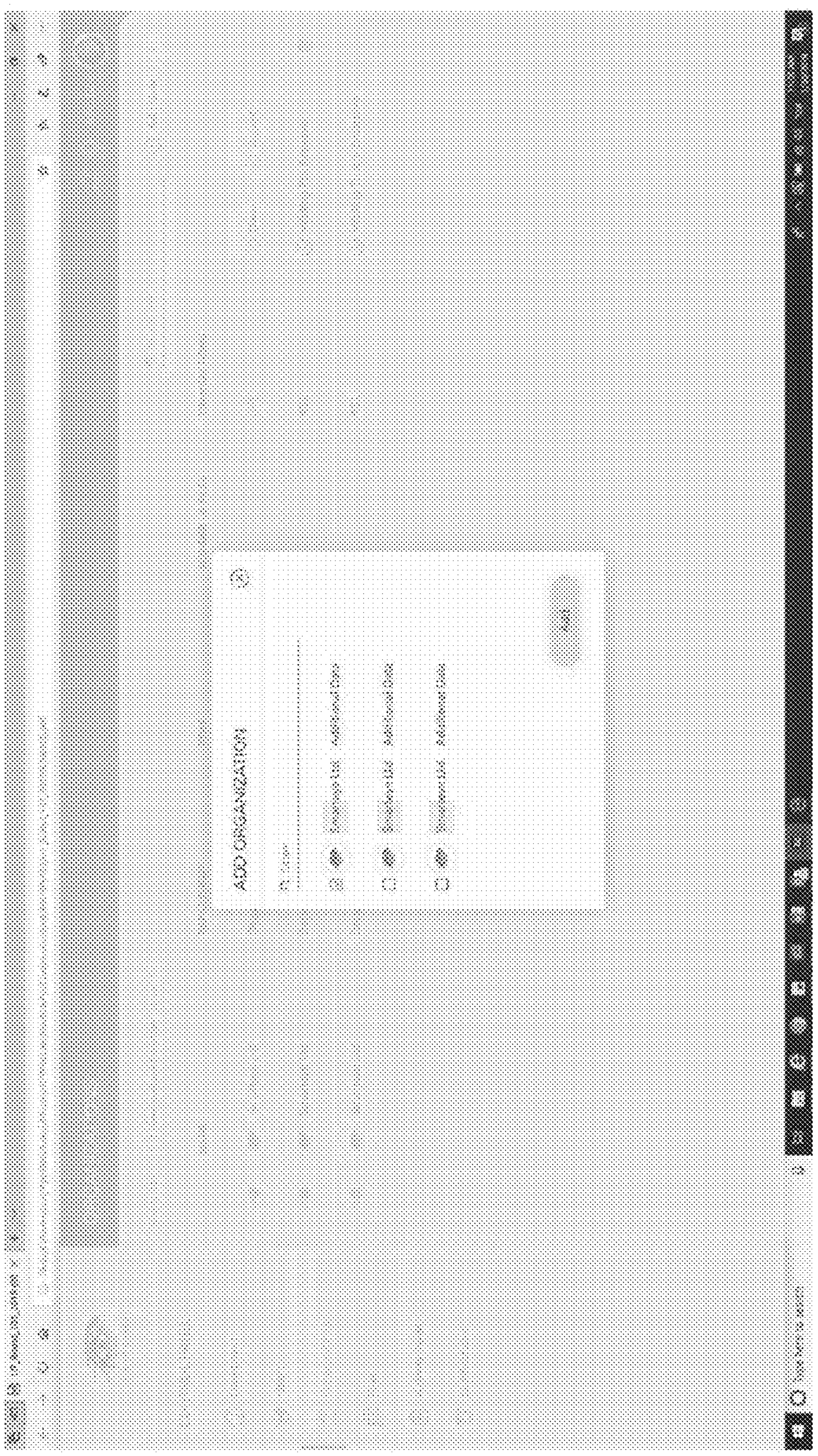
Fig. 17.67

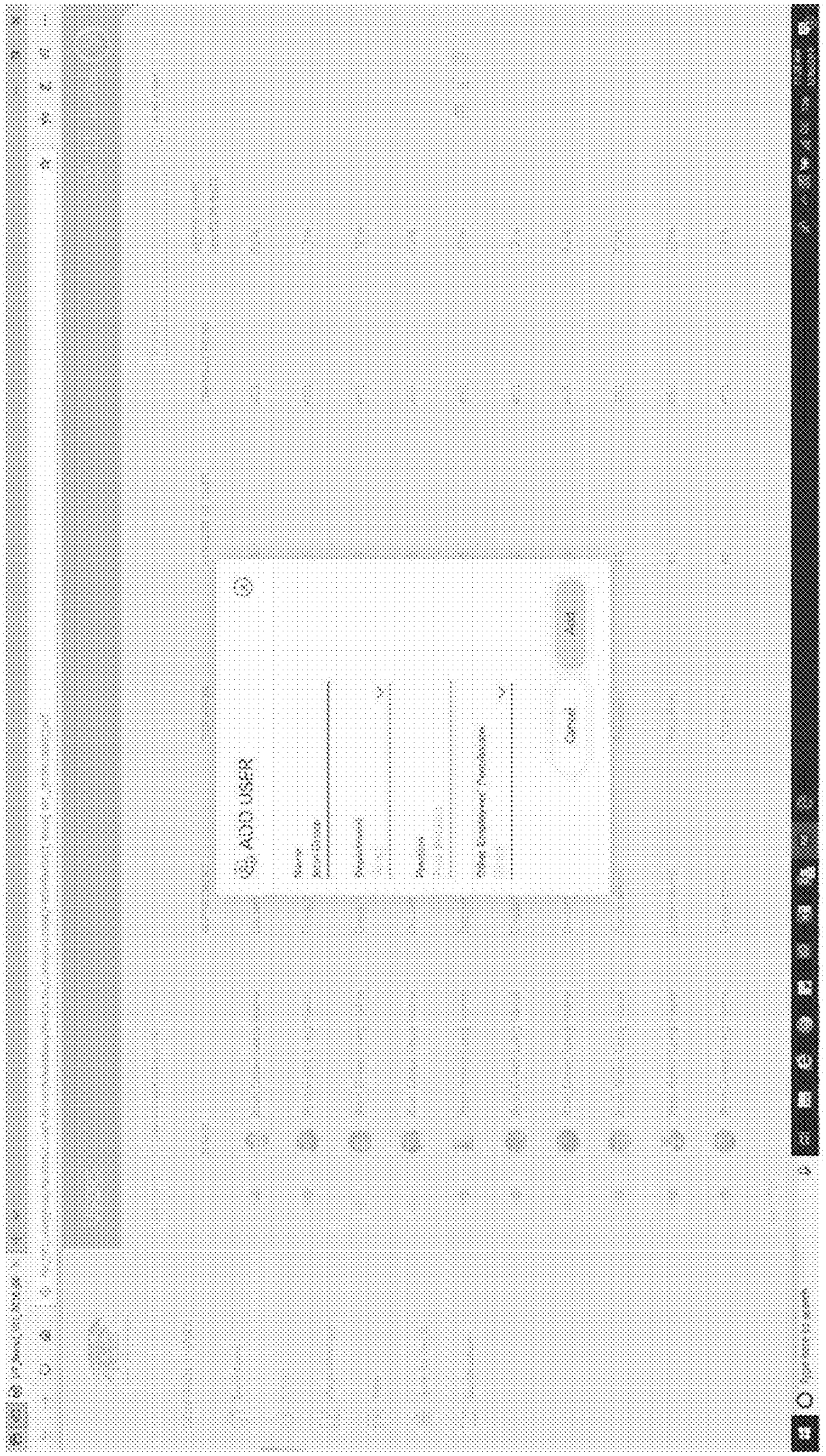
Fig. 17.68

Fig. 17.69

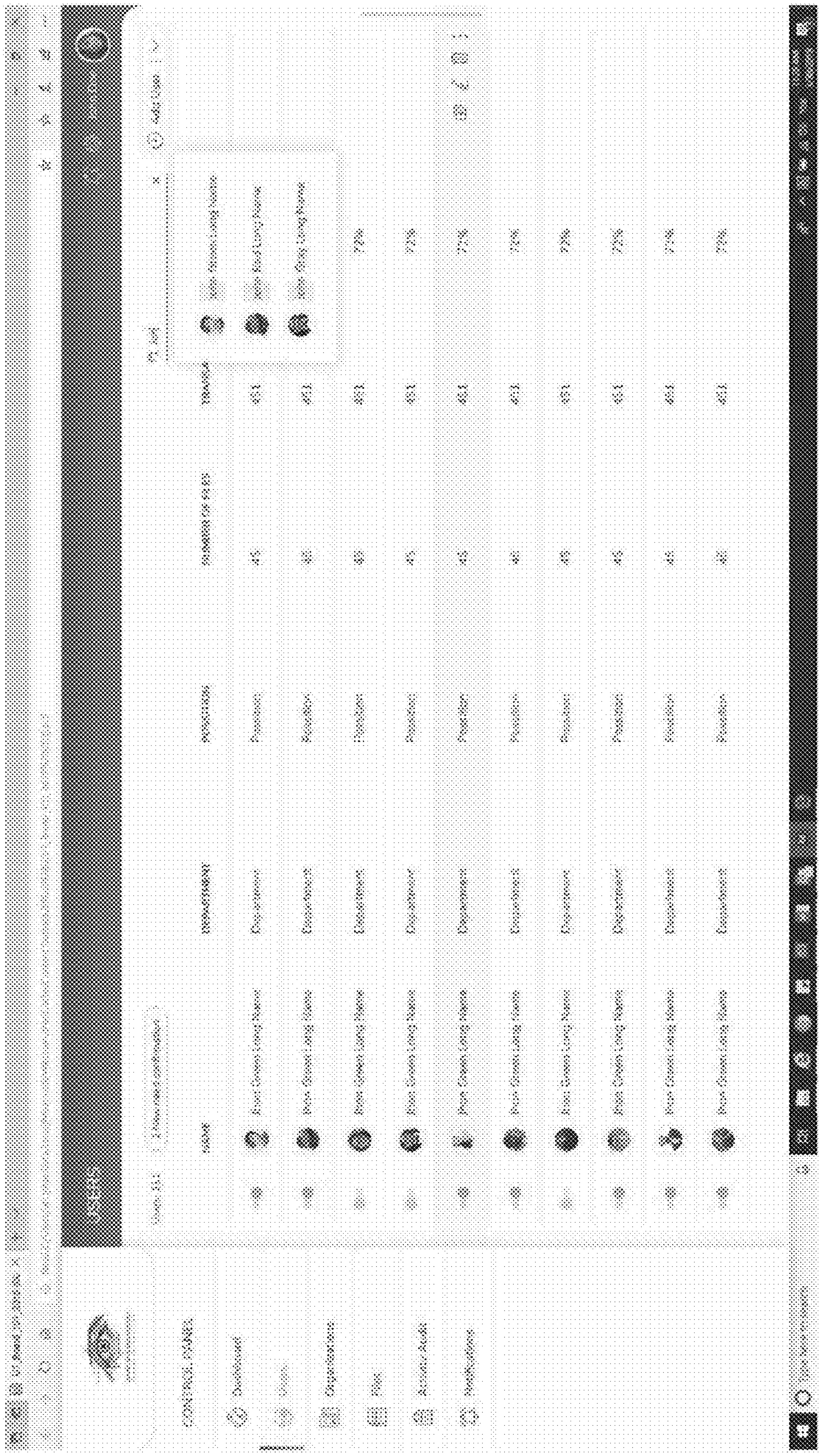
Fig. 17.70

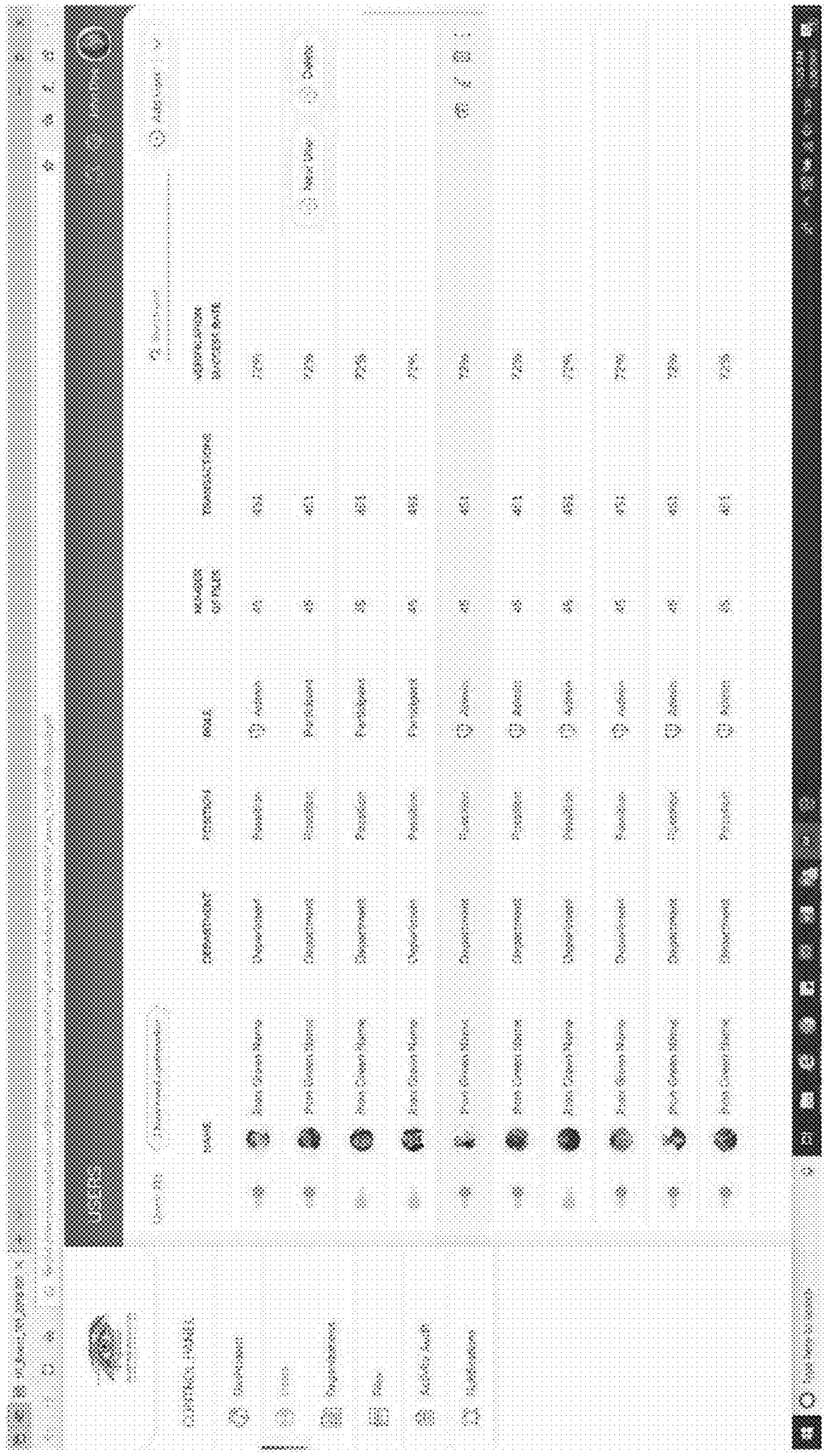
Fig. 17.71

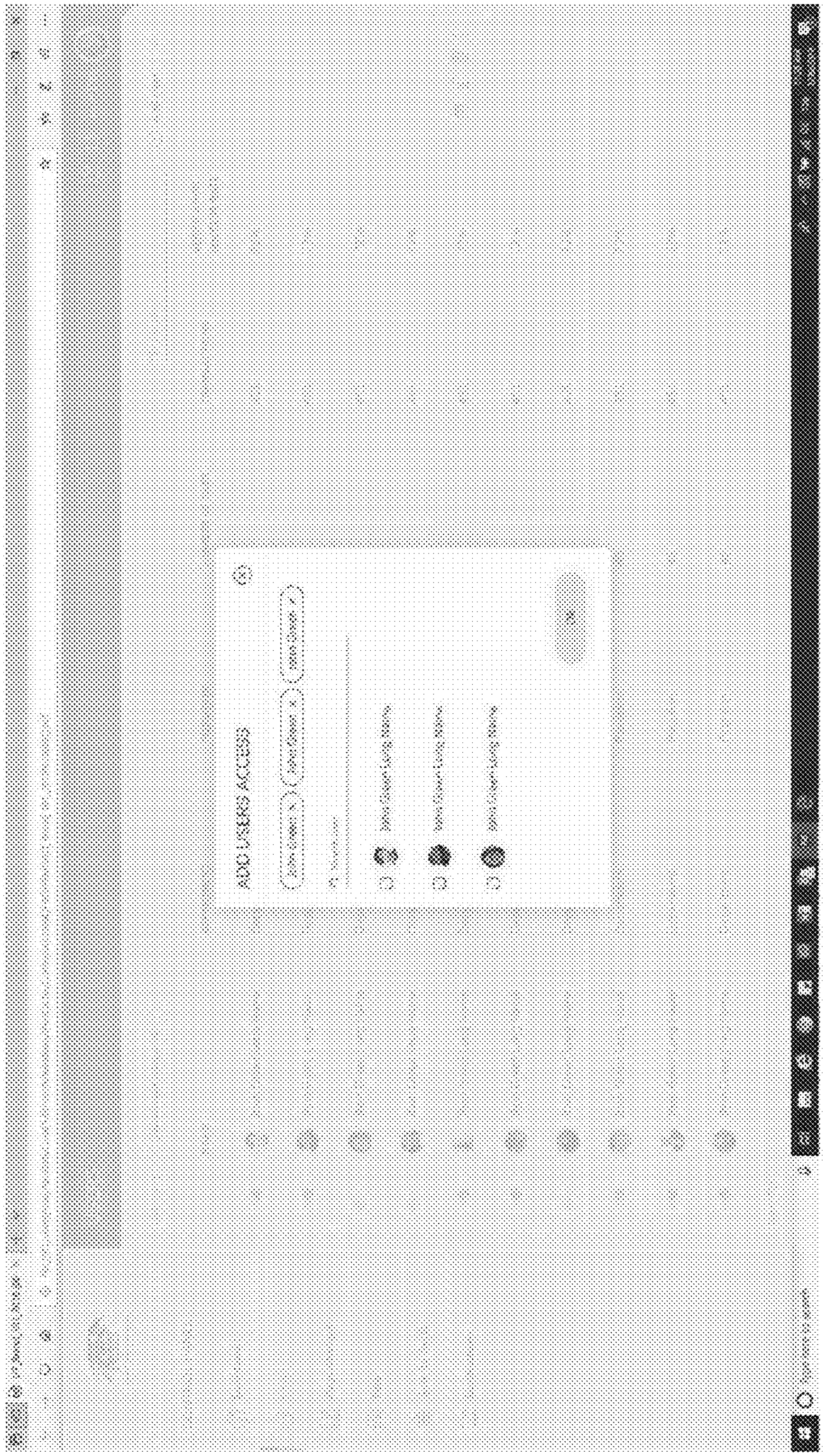
Fig. 17.72

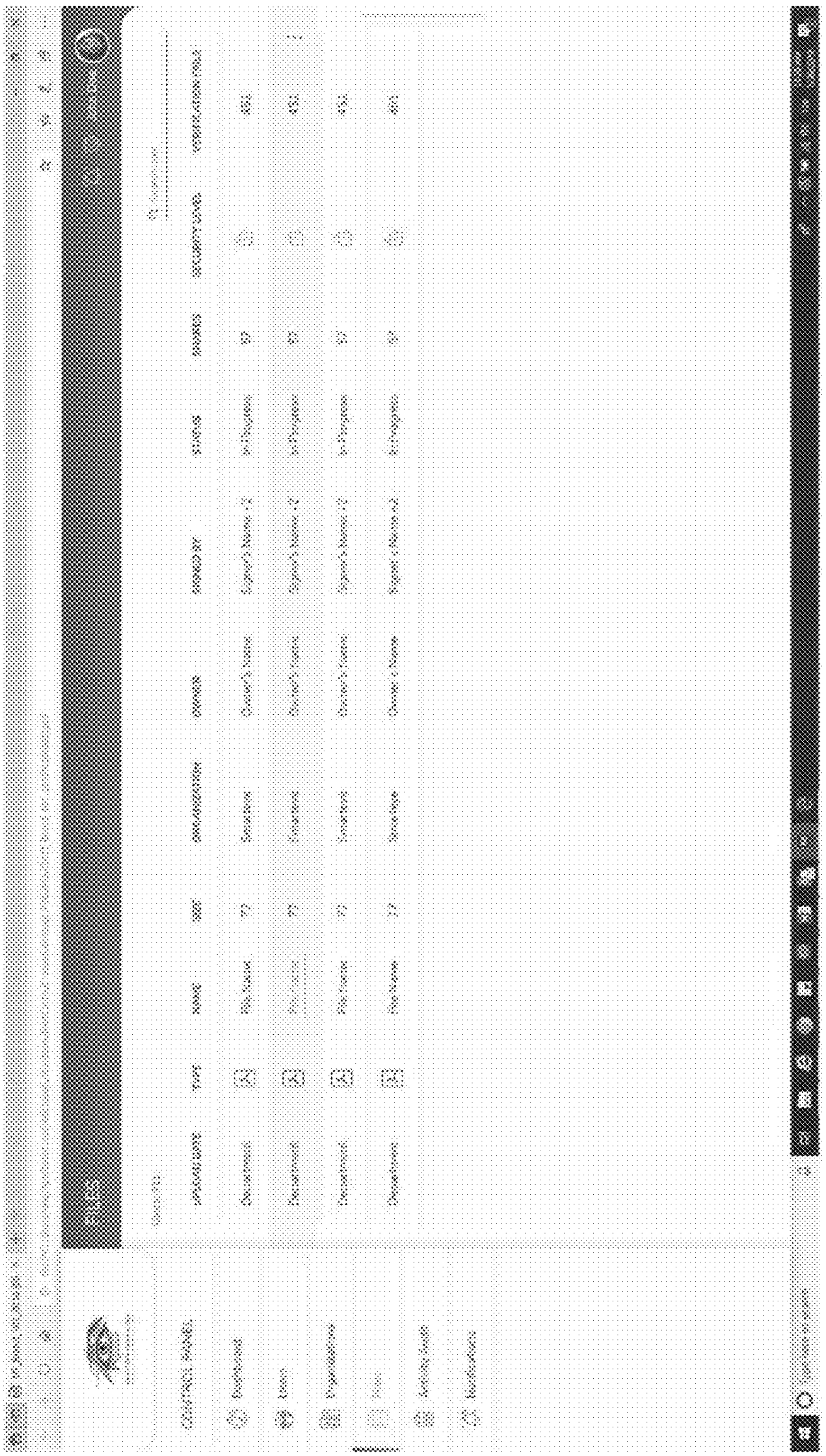
Fig. 17.73

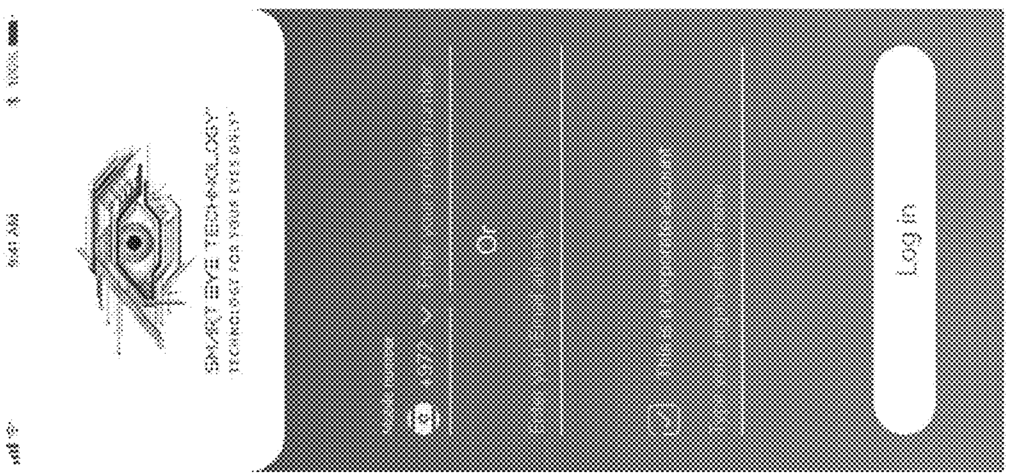
Fig. 17.74

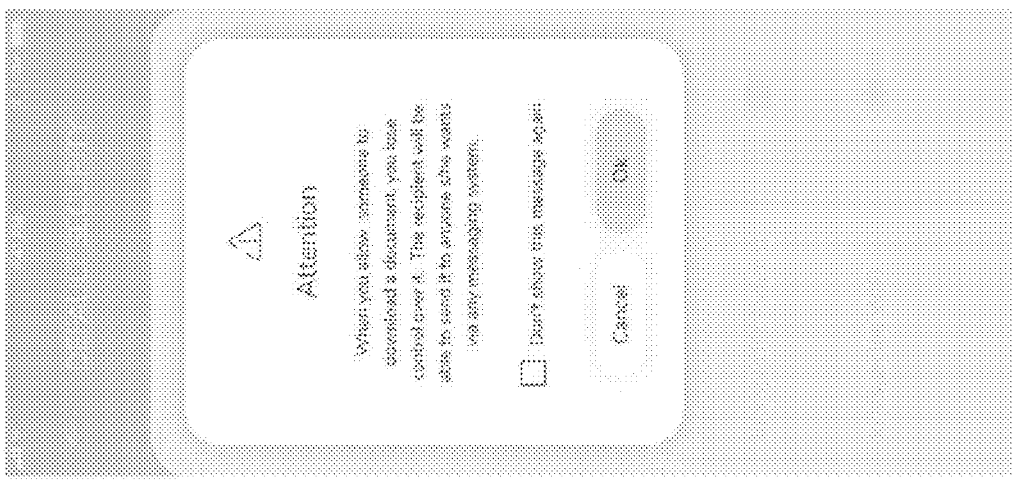
Fig. 17.75

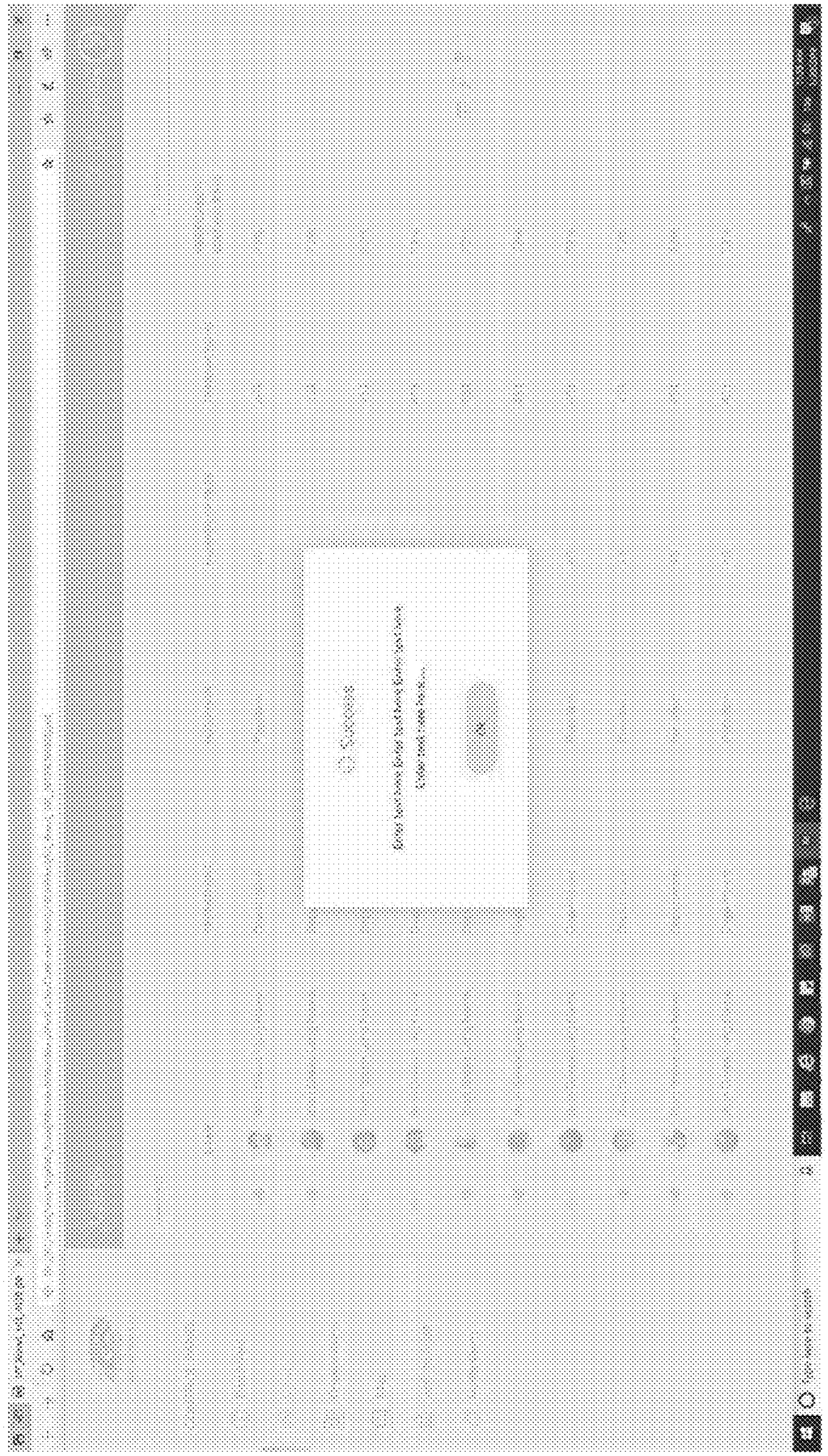
Fig. 17.76

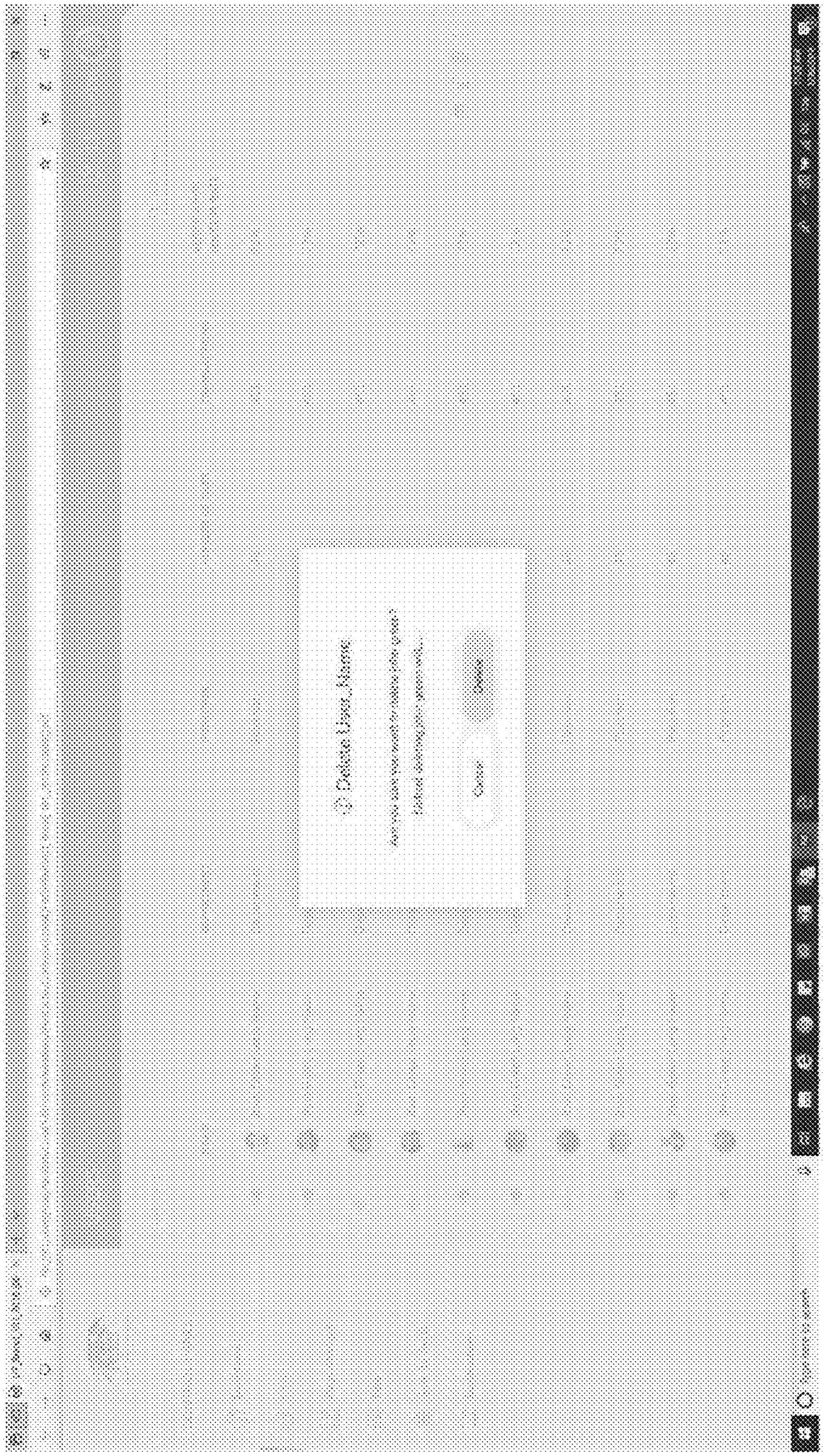
Fig. 17.77

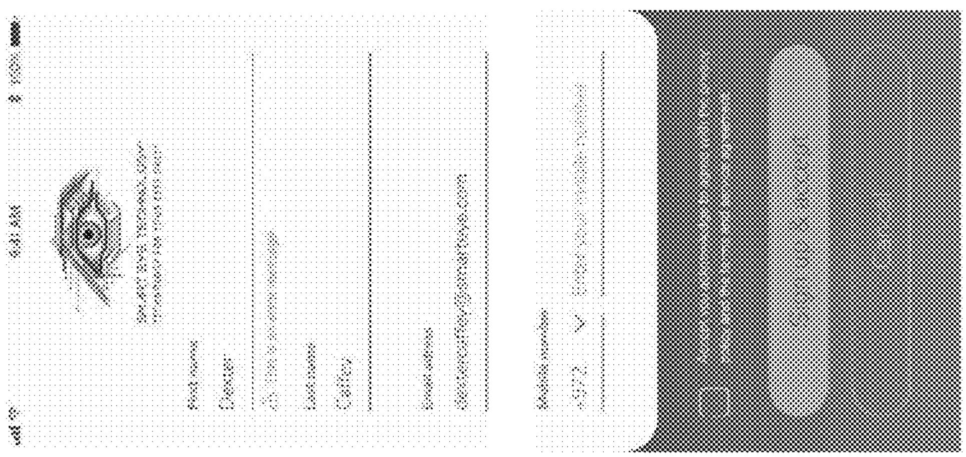
Fig. 17.78

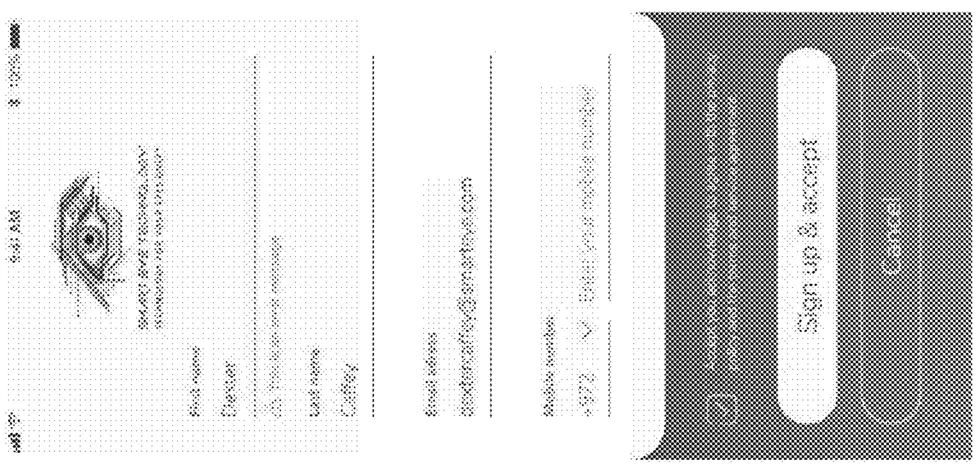
Fig. 17.79

Fig. 17.80
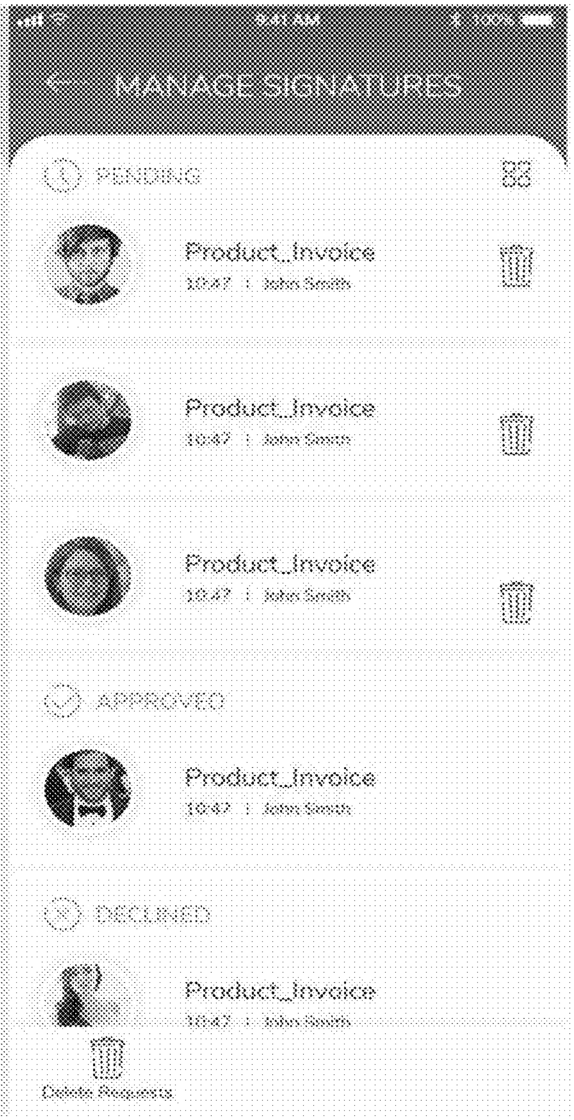
Fig. 17.81

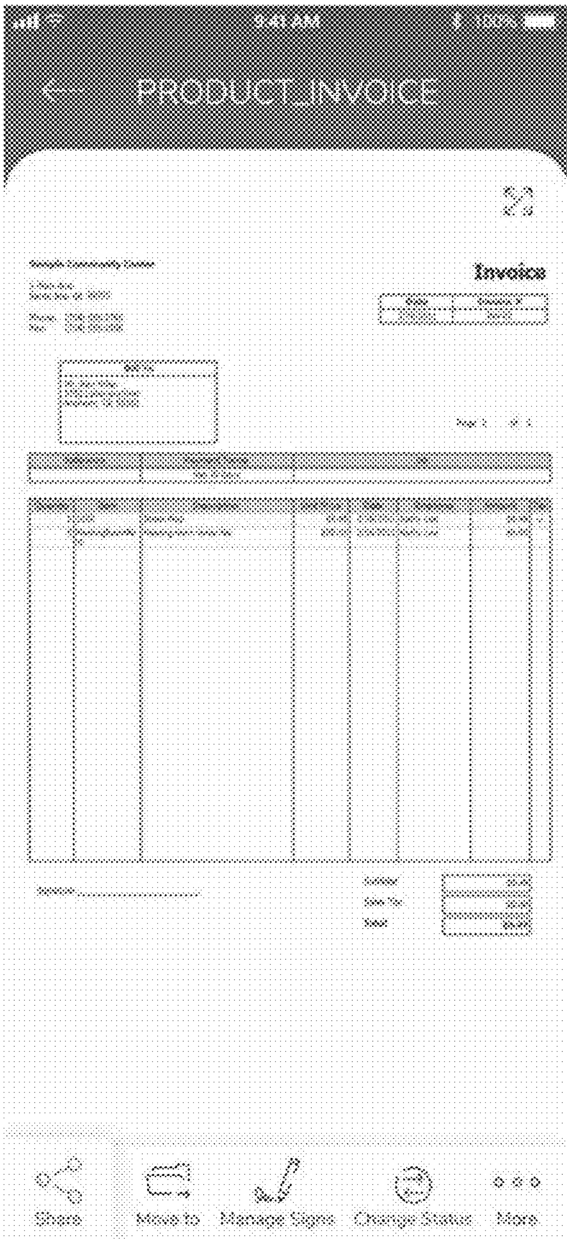
Fig. 17.82
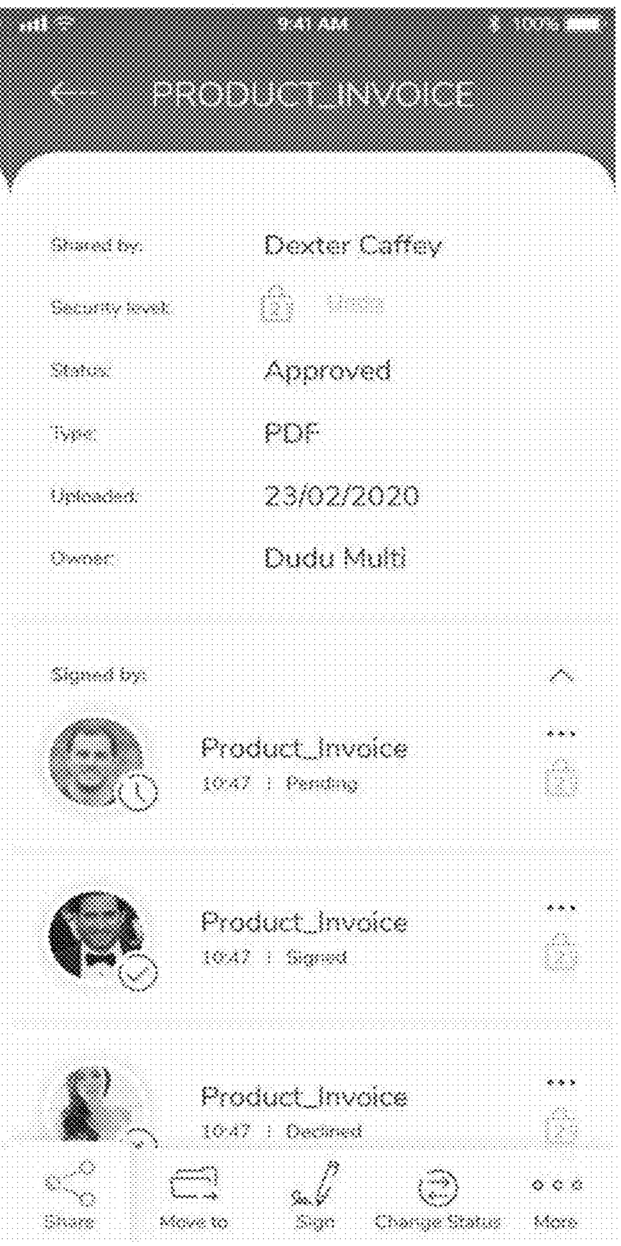
Fig. 17.83

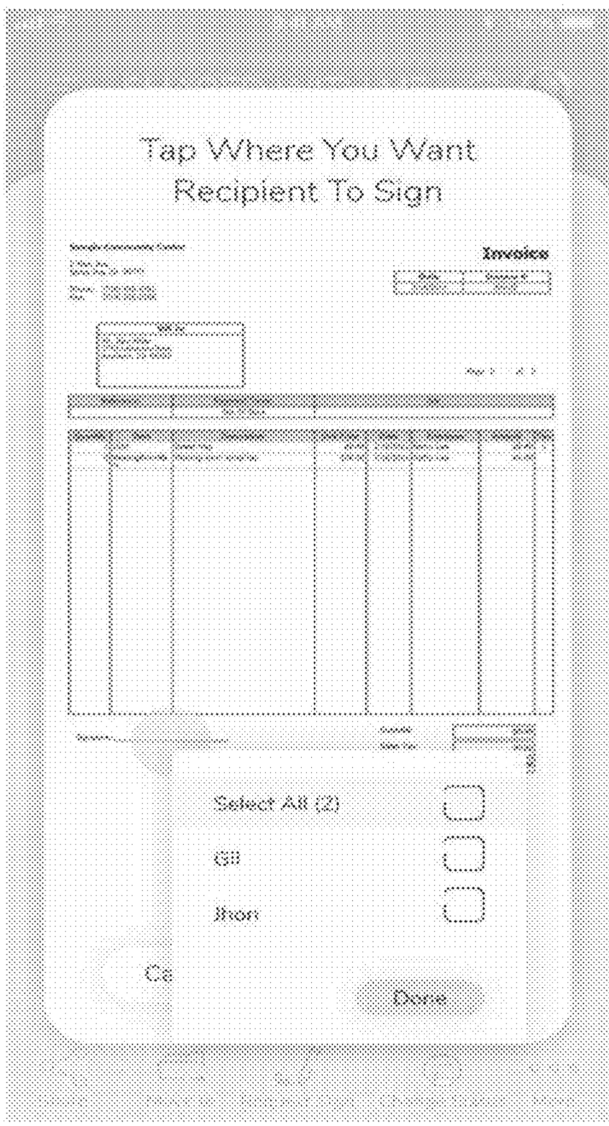
Fig. 17.84
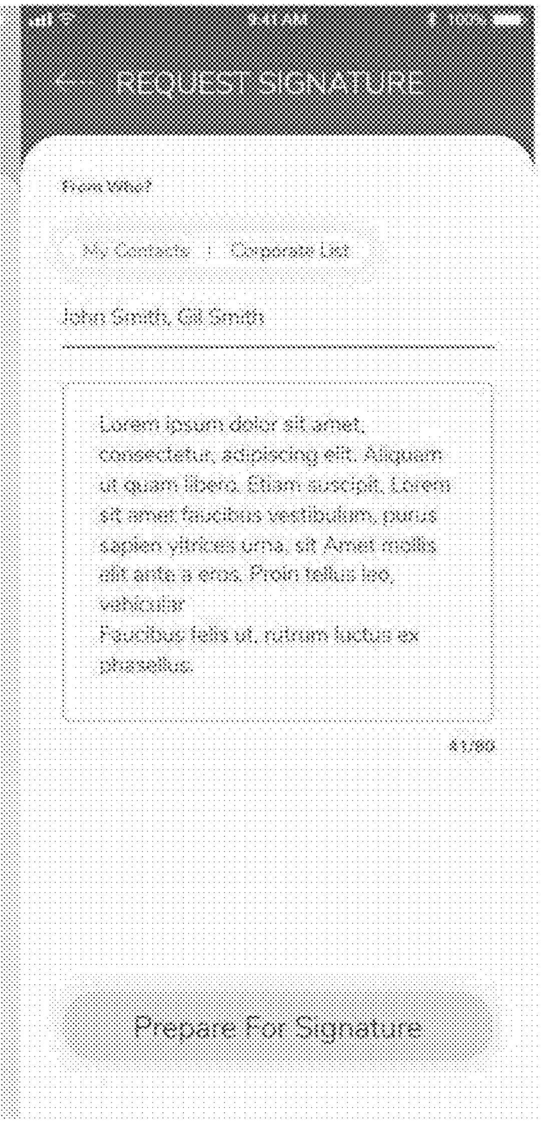
Fig. 17.85

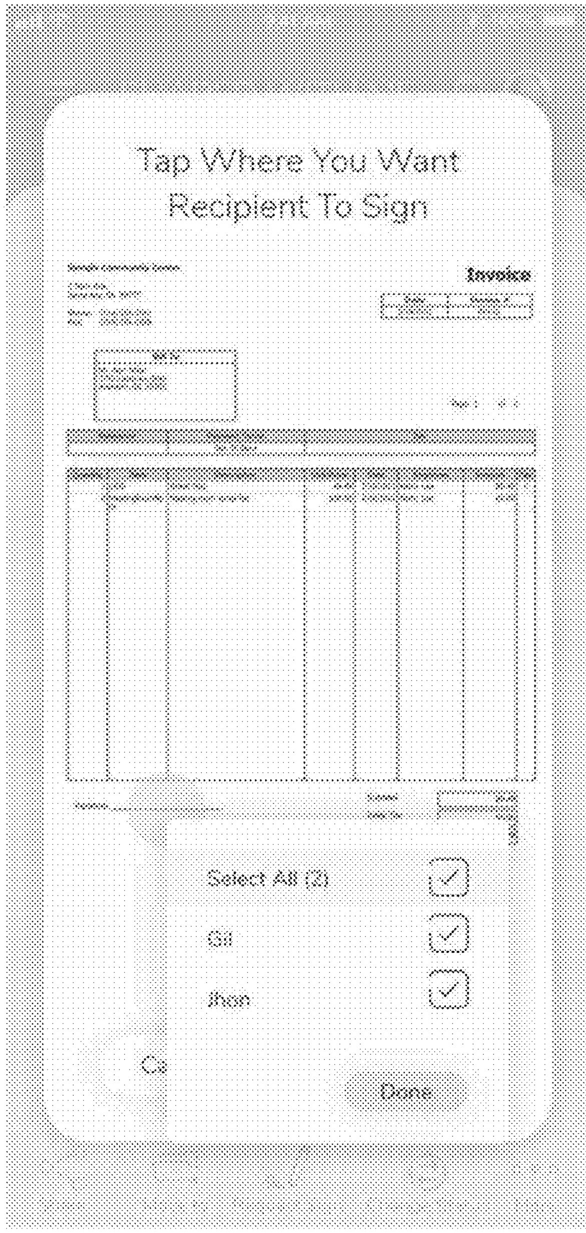
Fig. 17.86
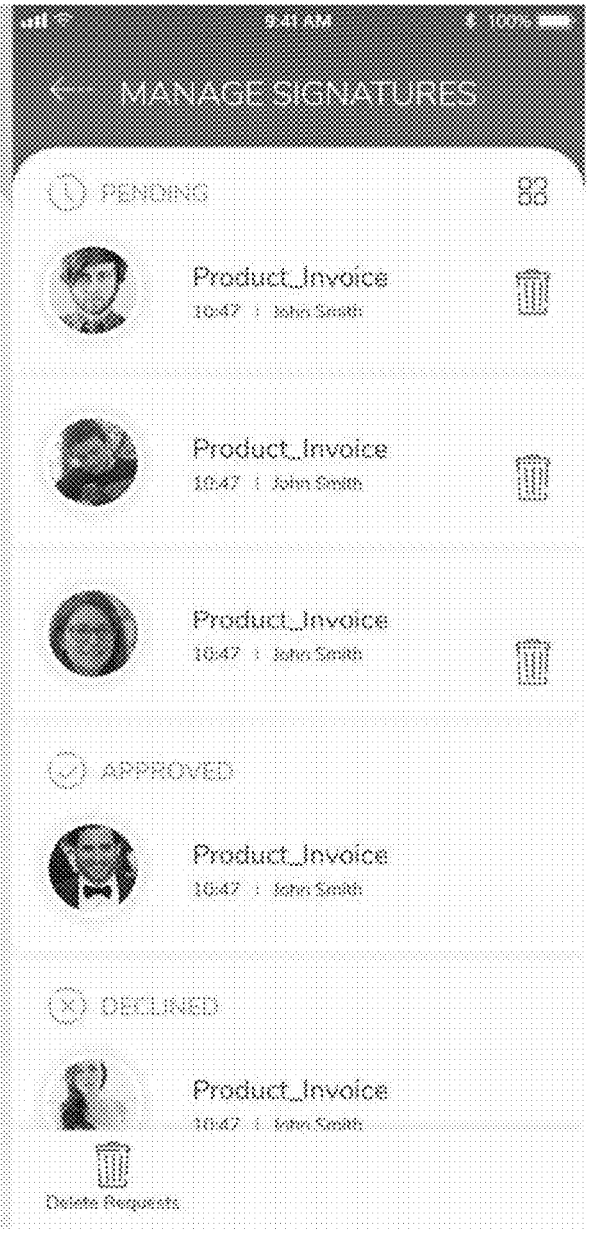
Fig. 17.87

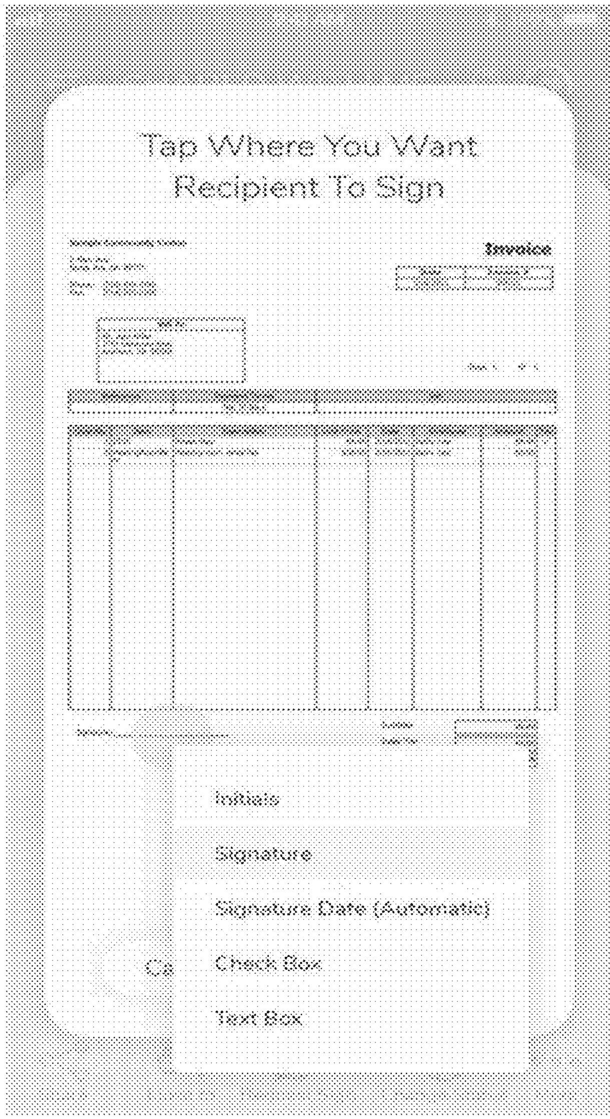
Fig. 17.88
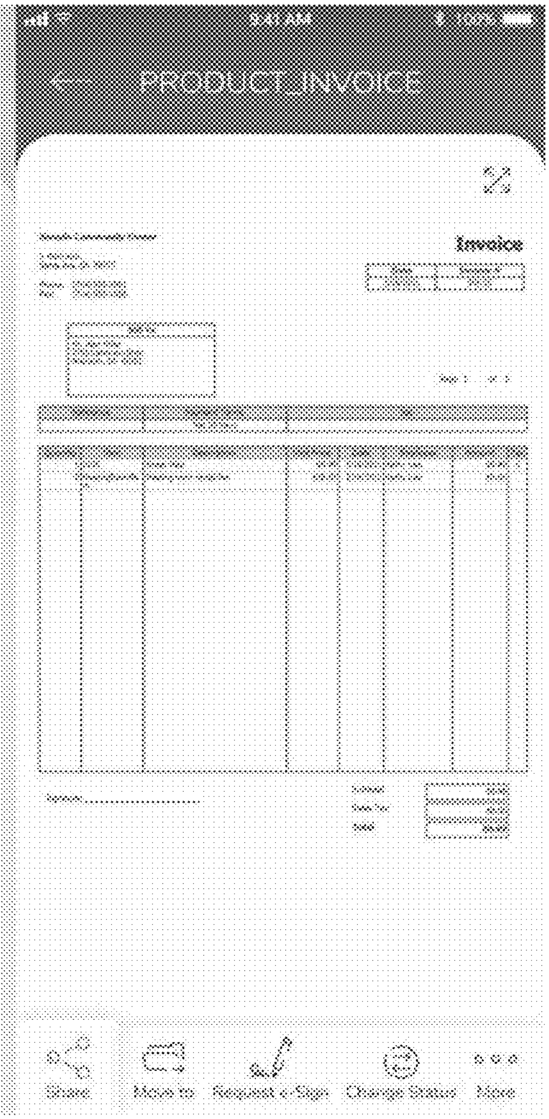
Fig. 17.89

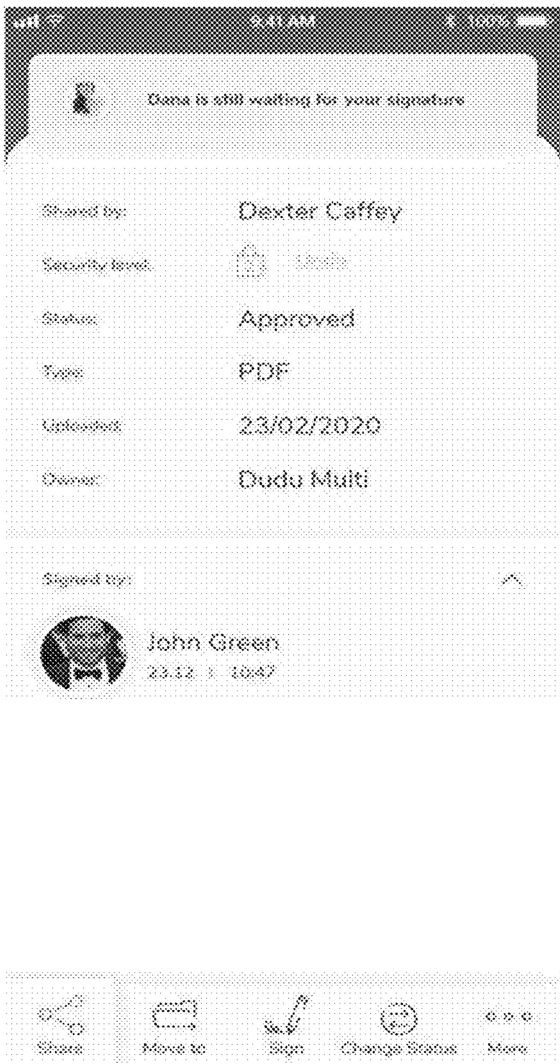
Fig. 17.90
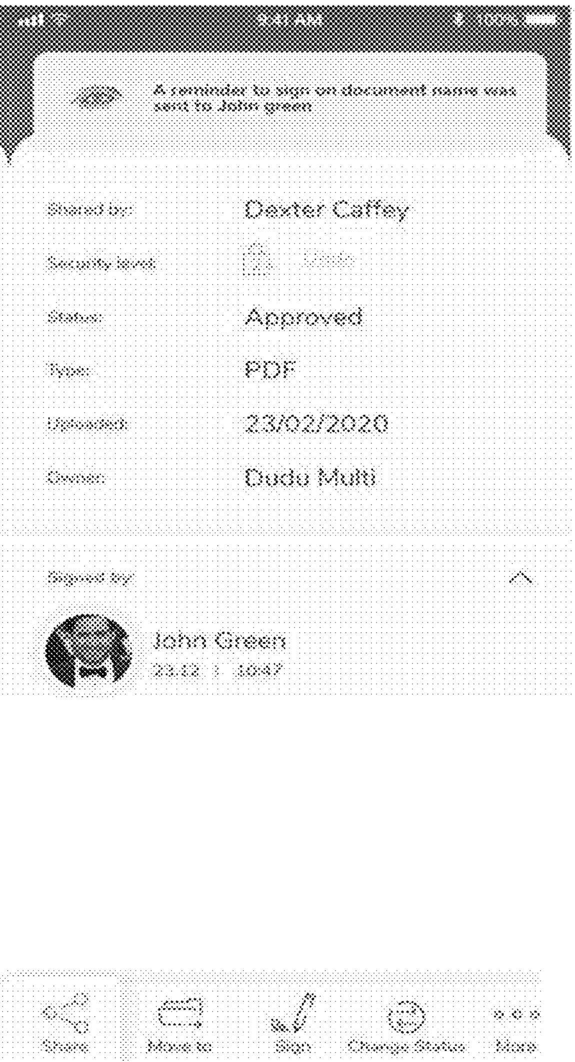
Fig. 17.91

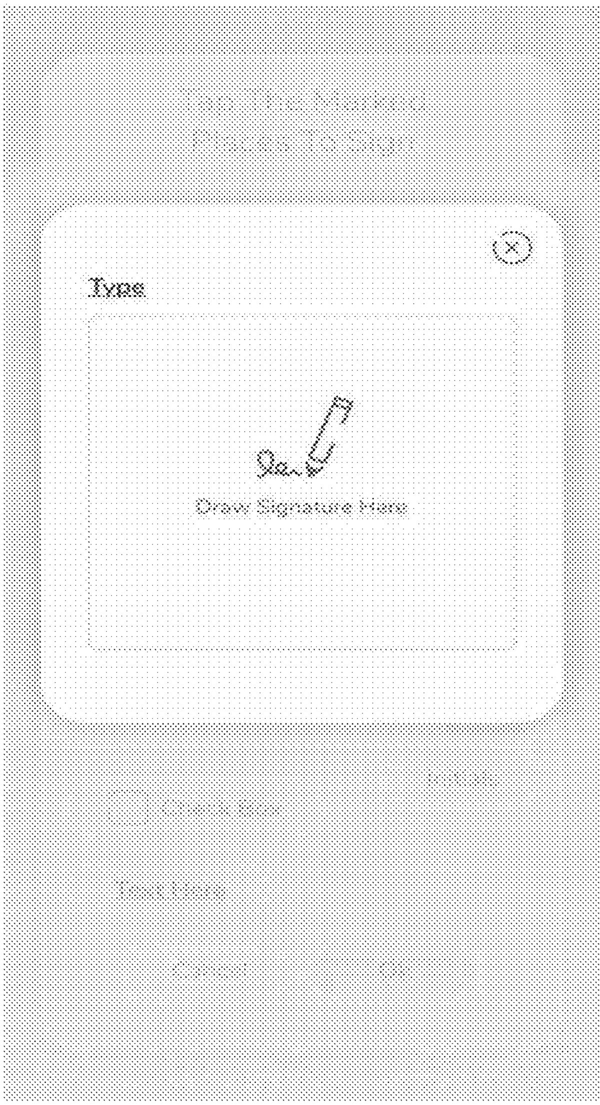
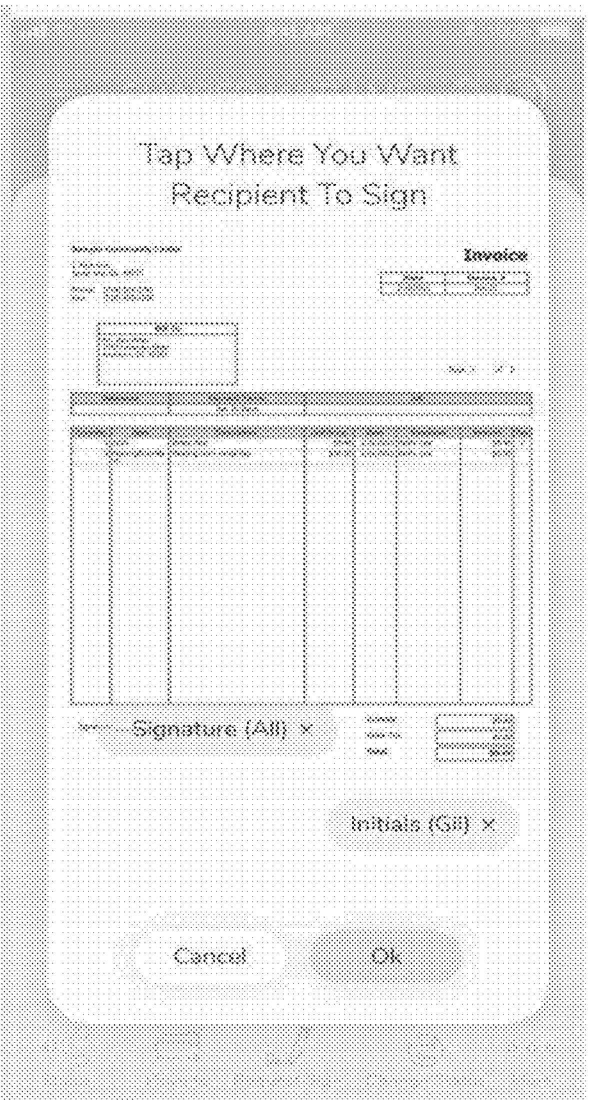
Fig. 17.92
Fig. 17.93

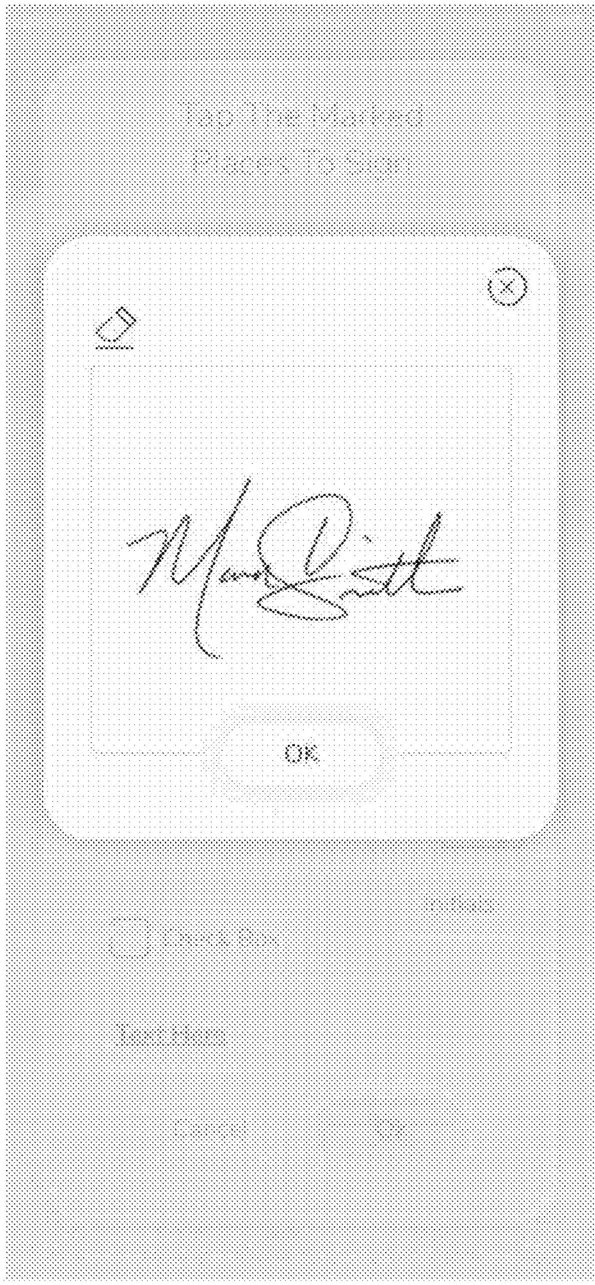
Fig. 17.94
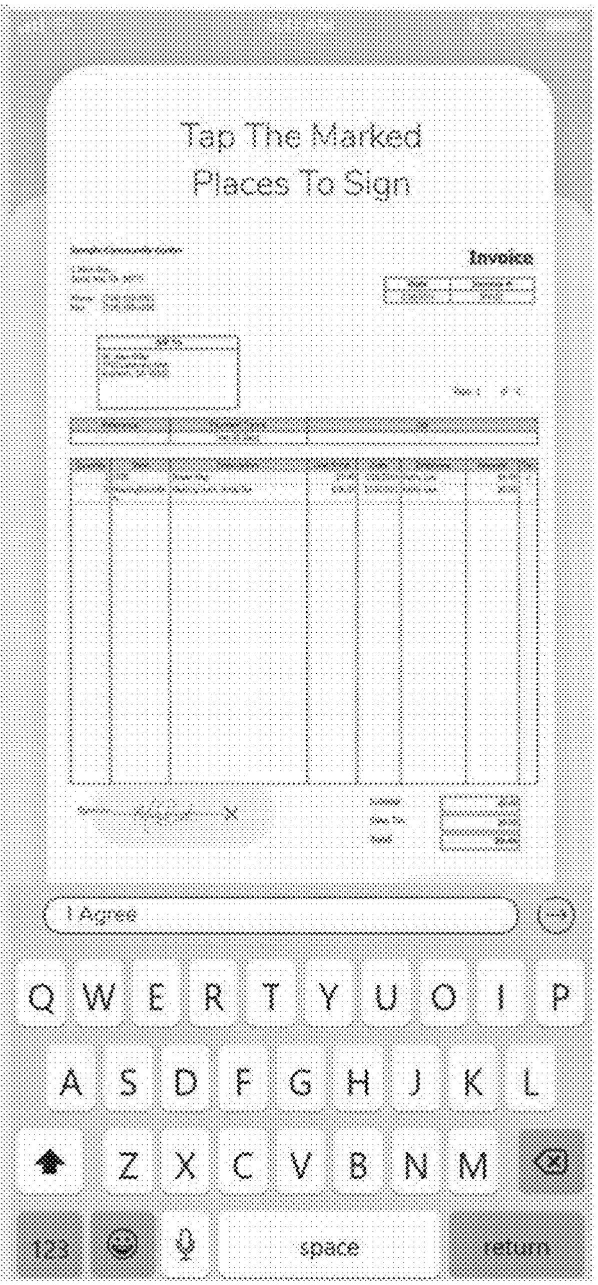
Fig. 17.95

Fig. 17.96
Fig. 17.97

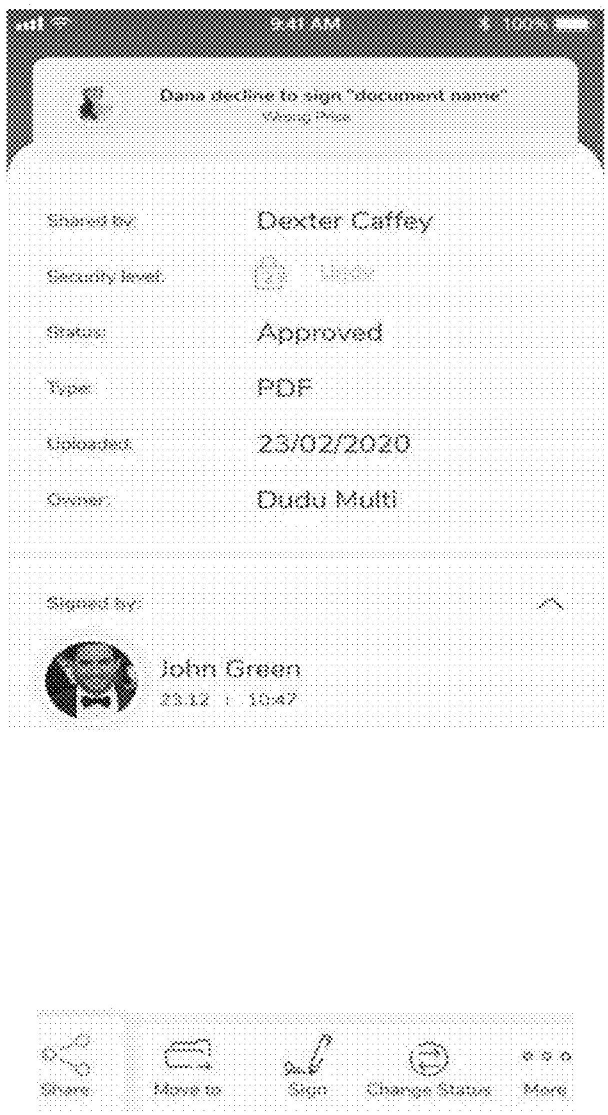
Fig. 17.98

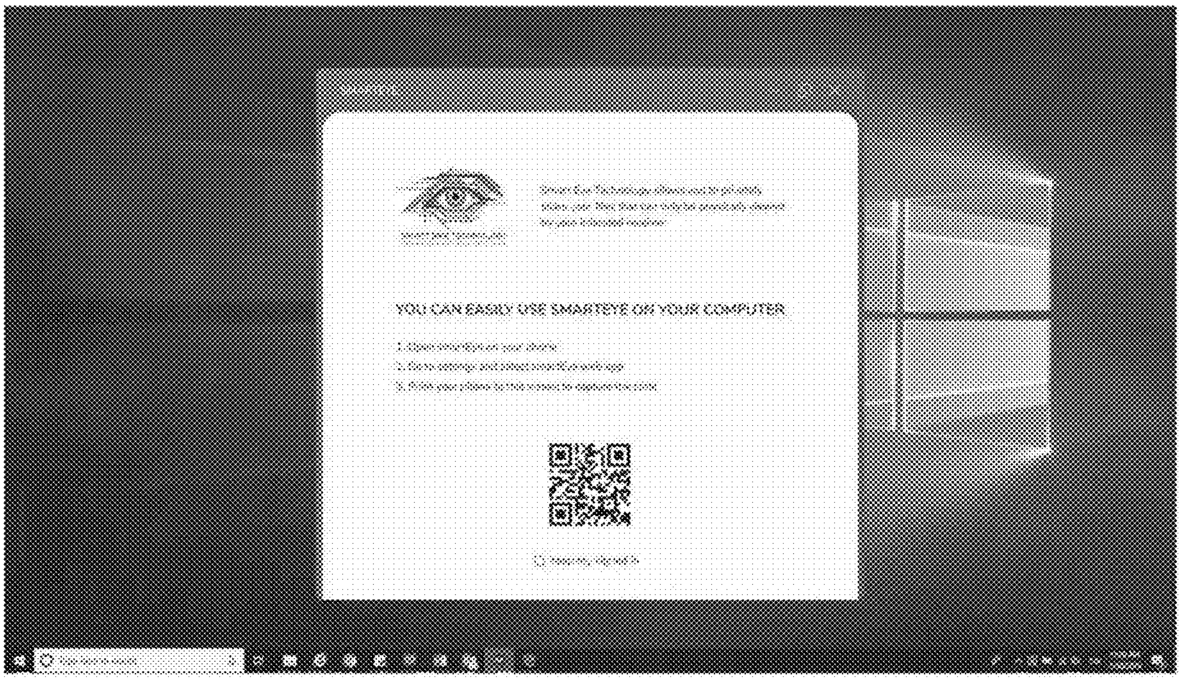
Fig. 17.99

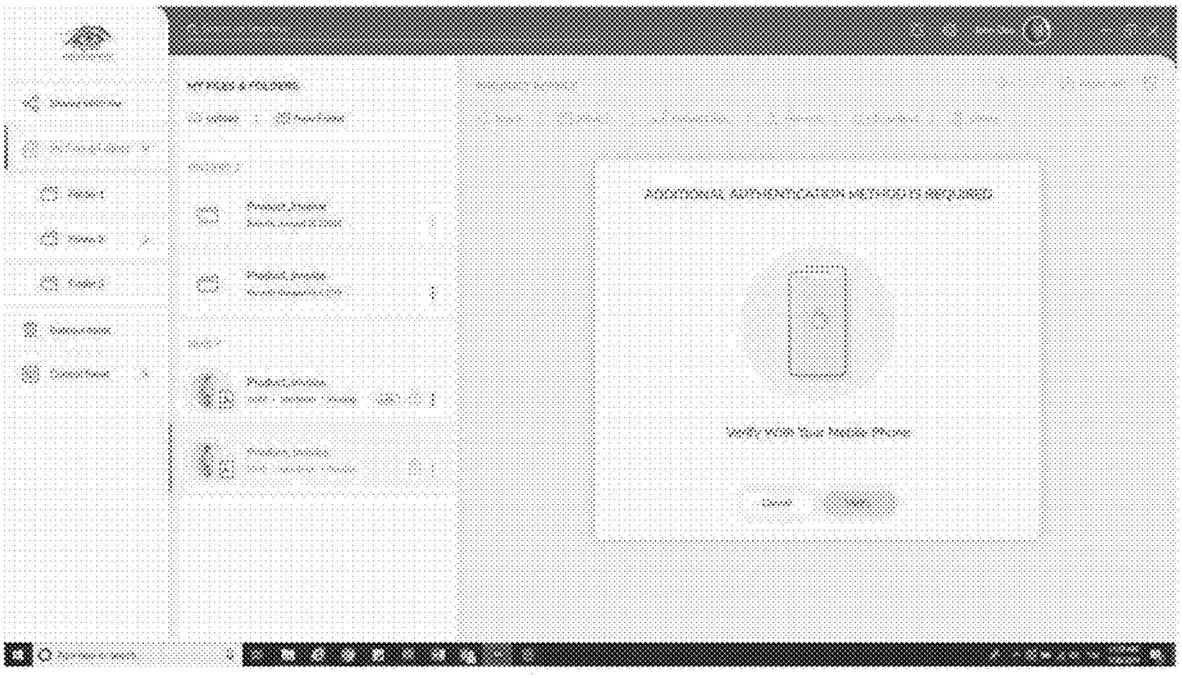
Fig. 18.00

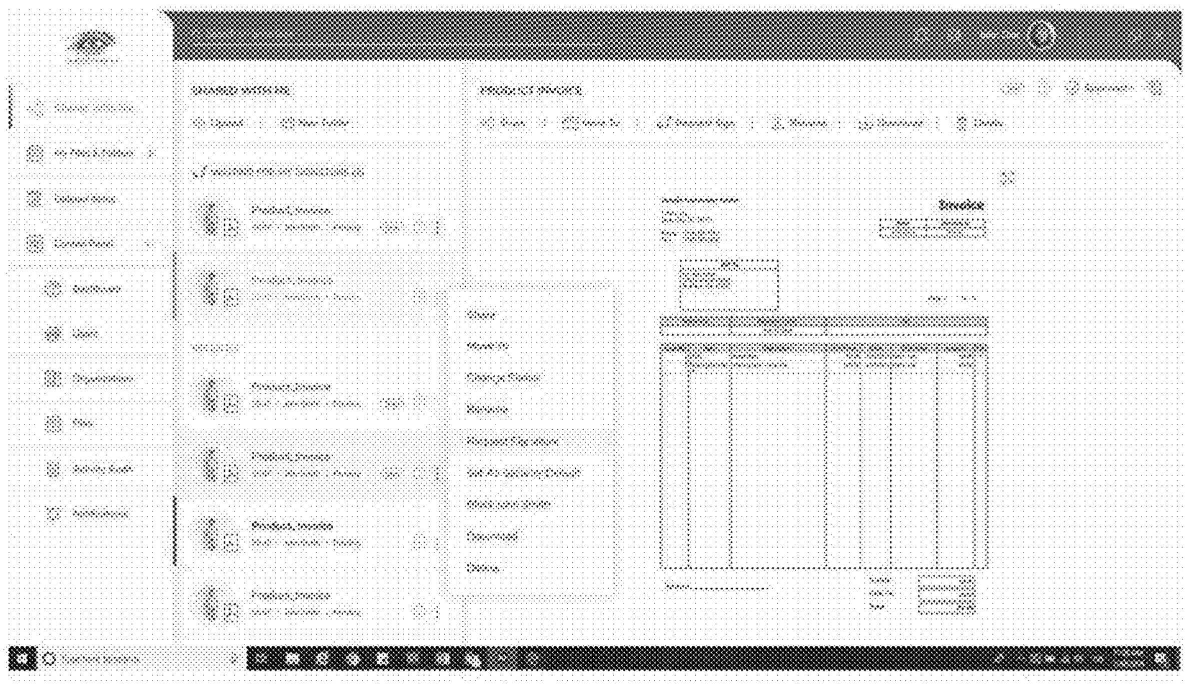
Fig. 18.01

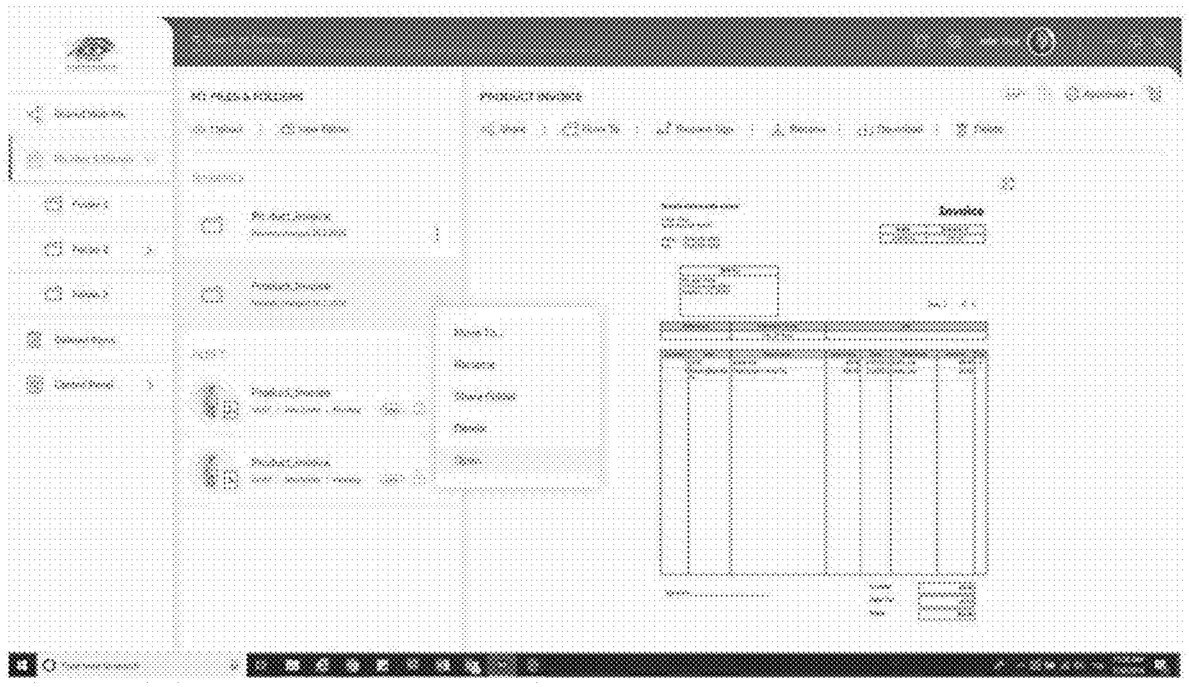
Fig. 18.02

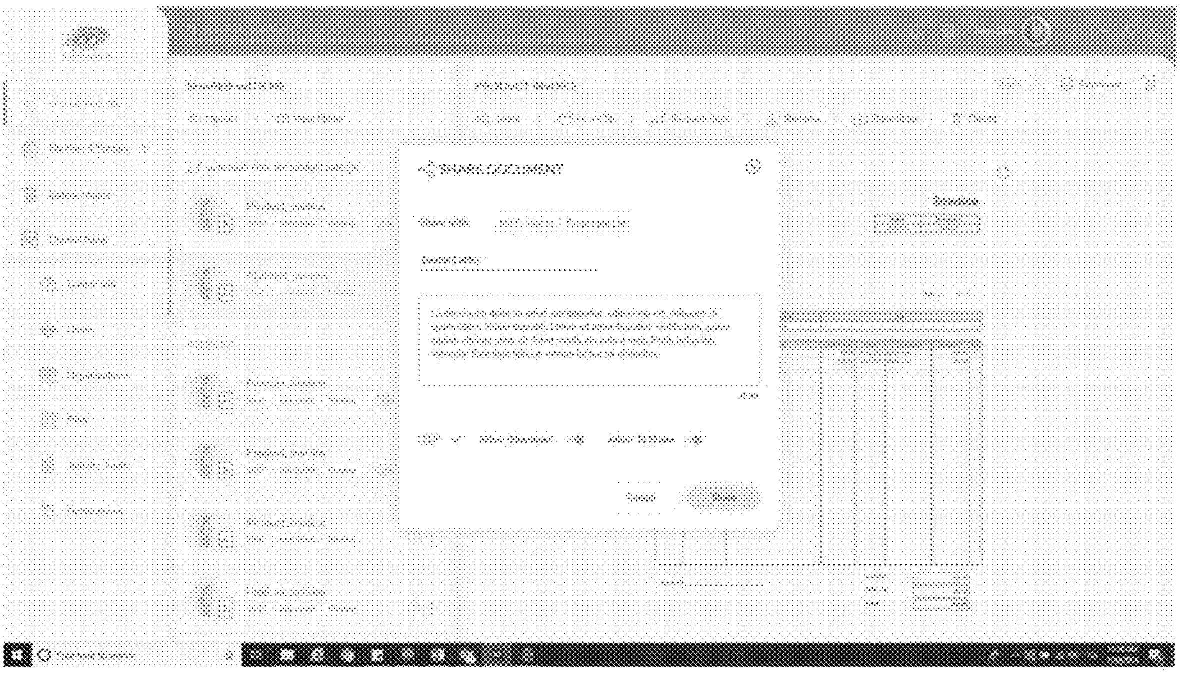
Fig. 18.03

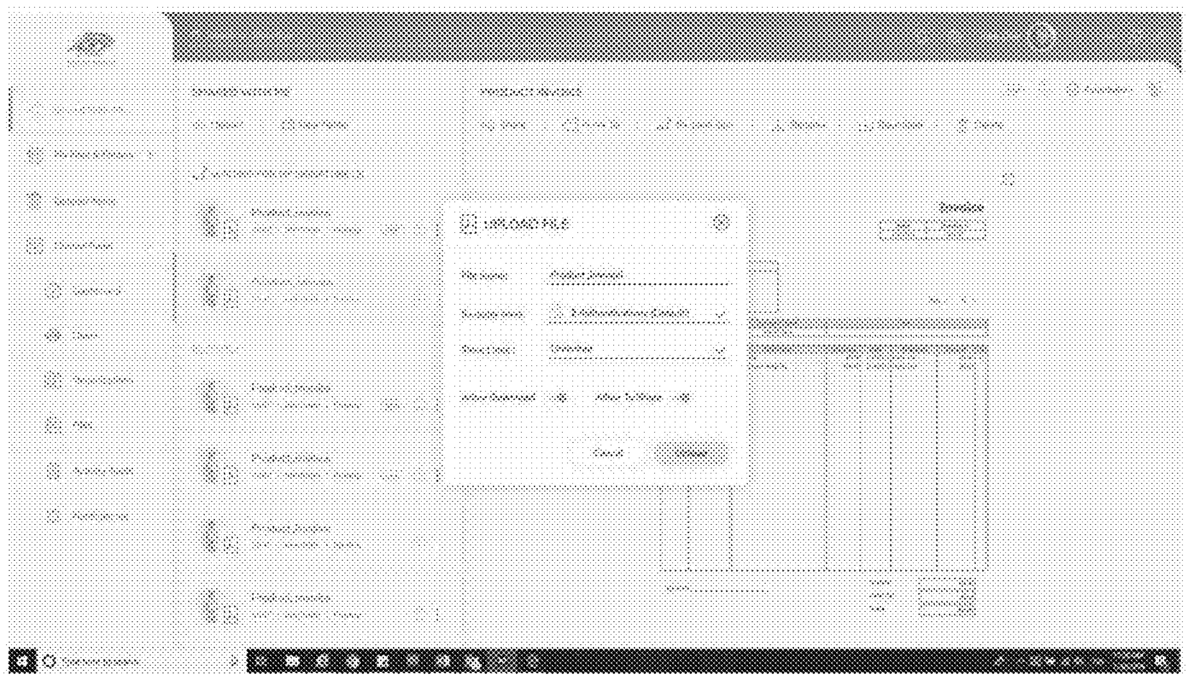
Fig. 18.04

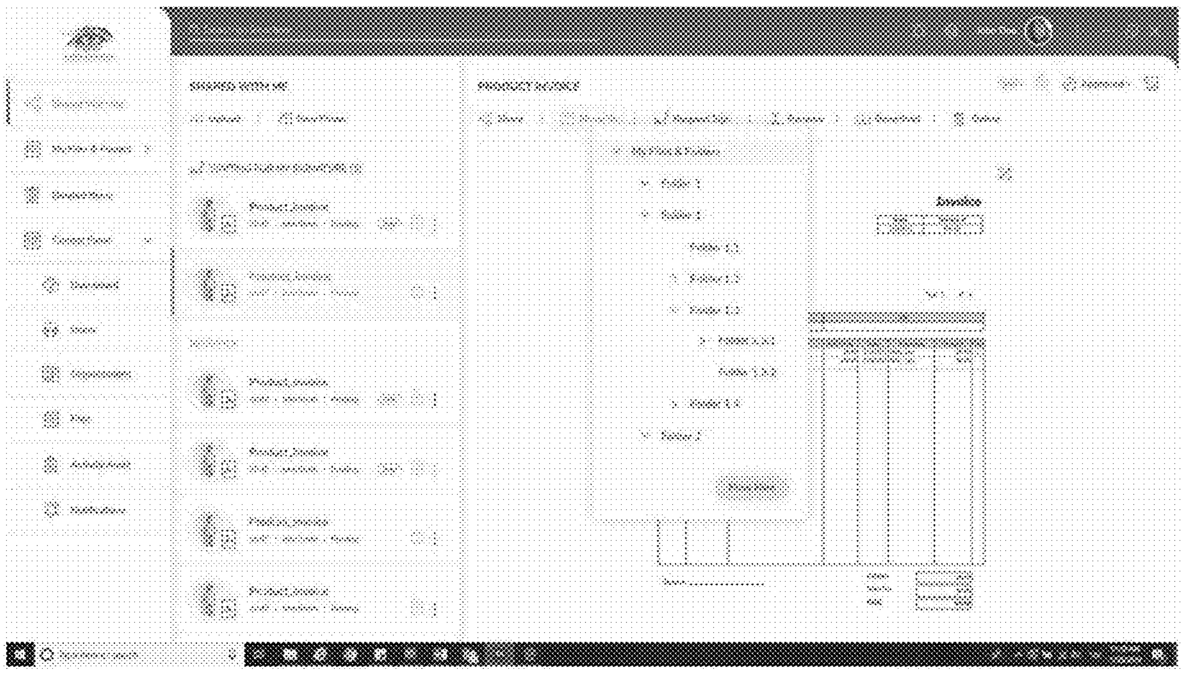
Fig. 18.05

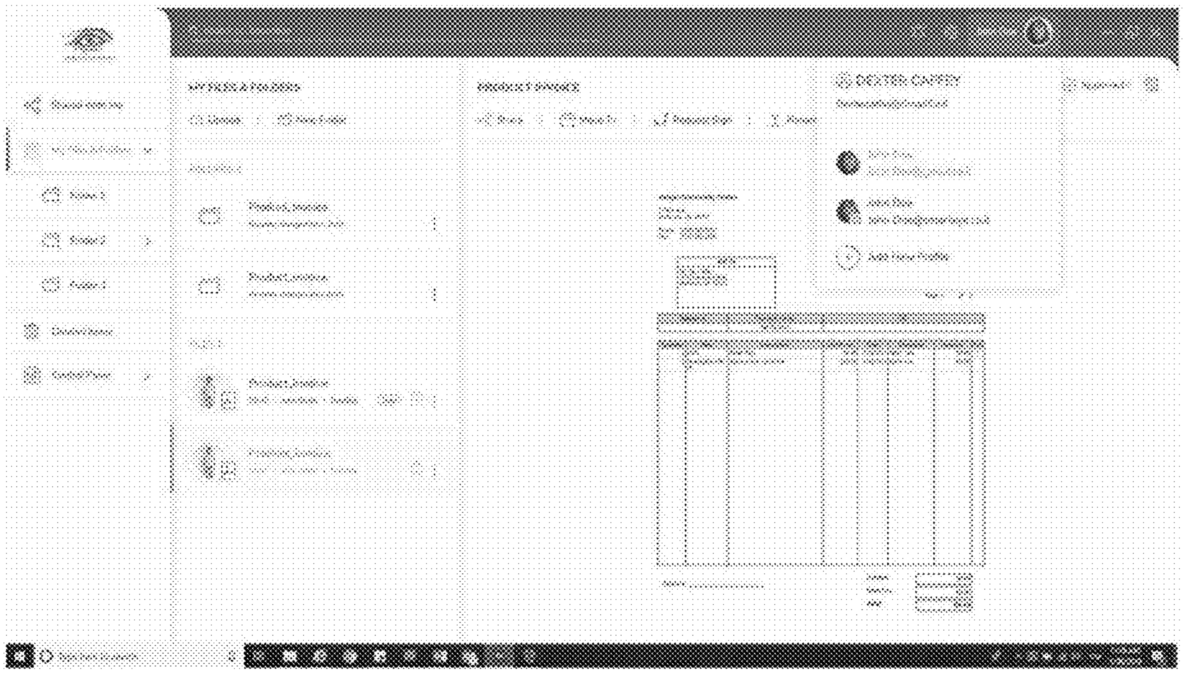
Fig. 18.06

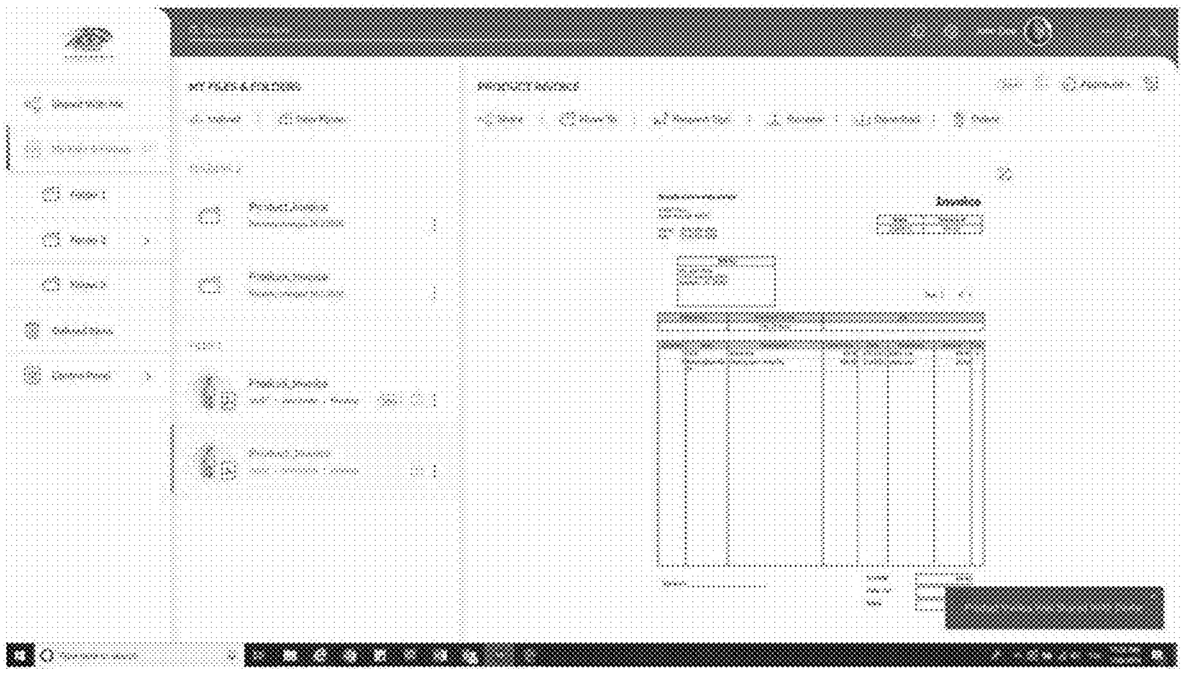
Fig. 18.07

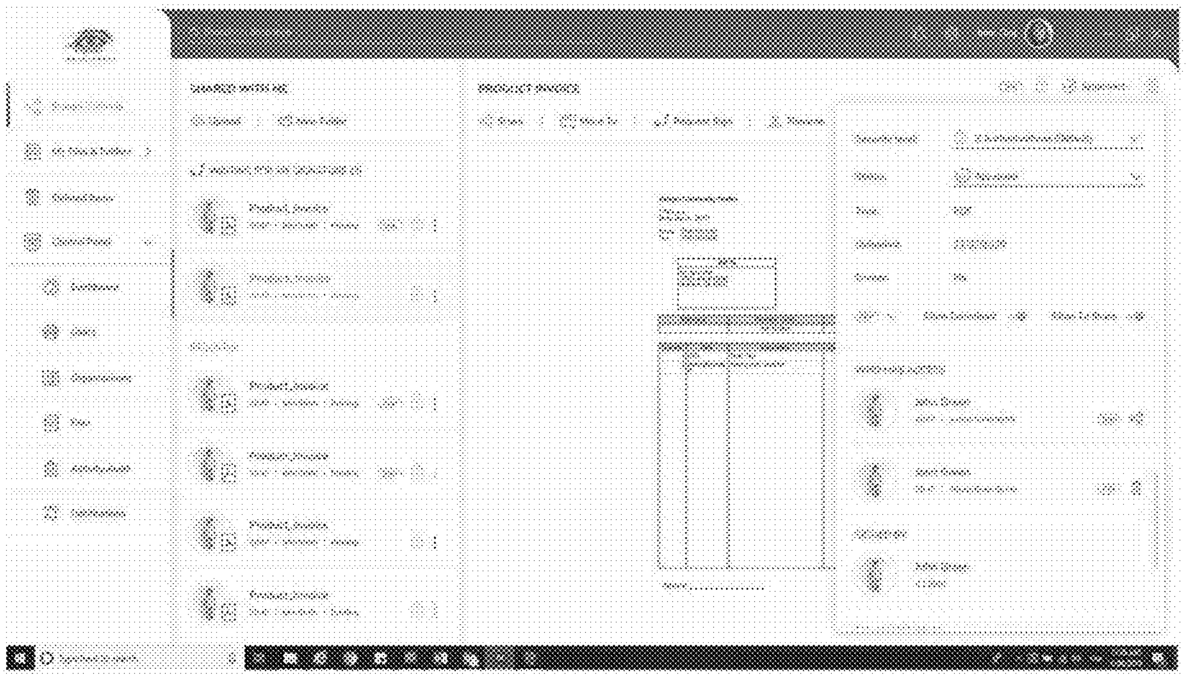
Fig. 18.08

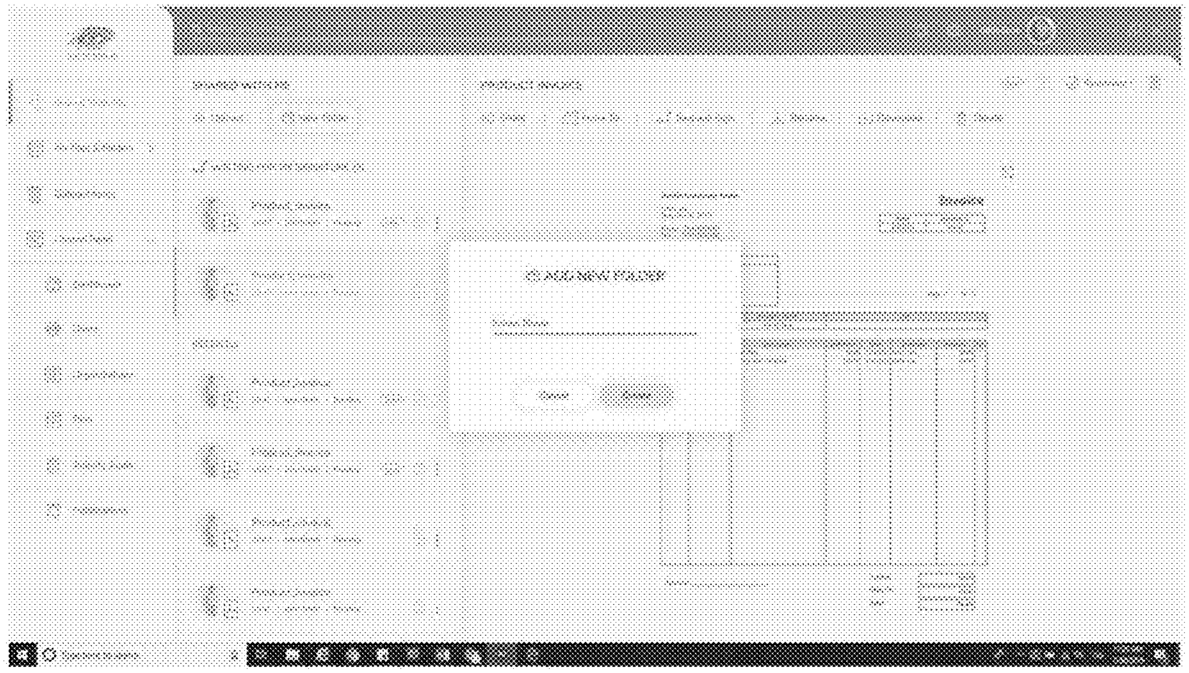
Fig. 18.09

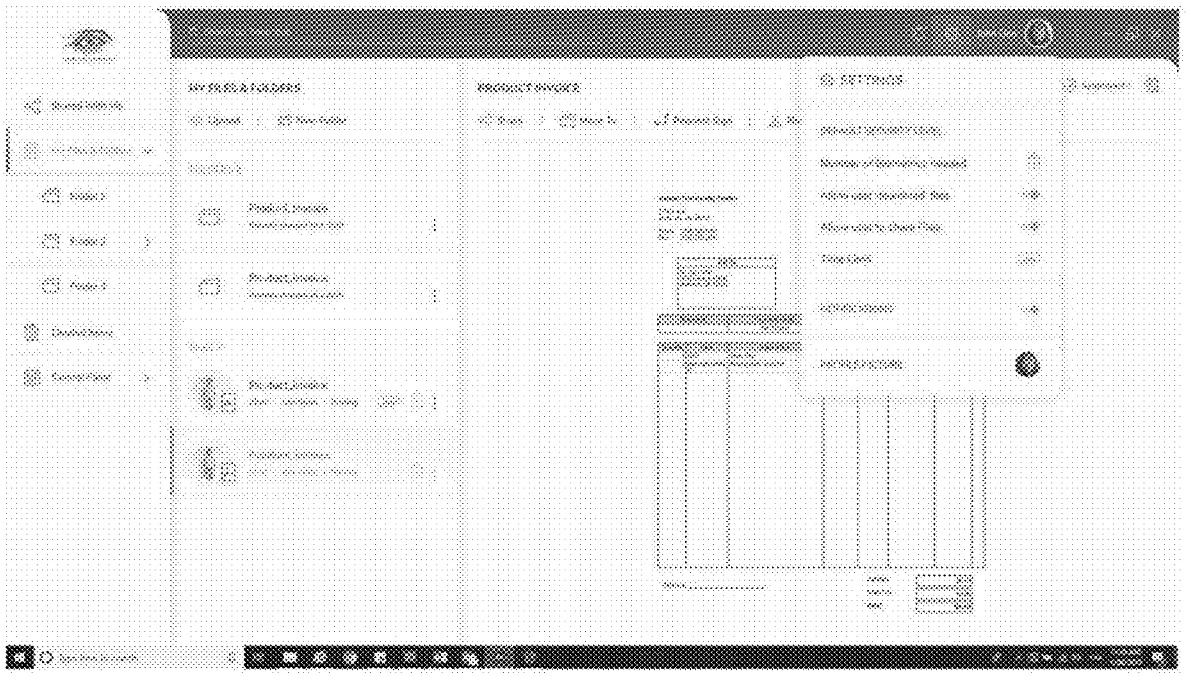
Fig. 18.10

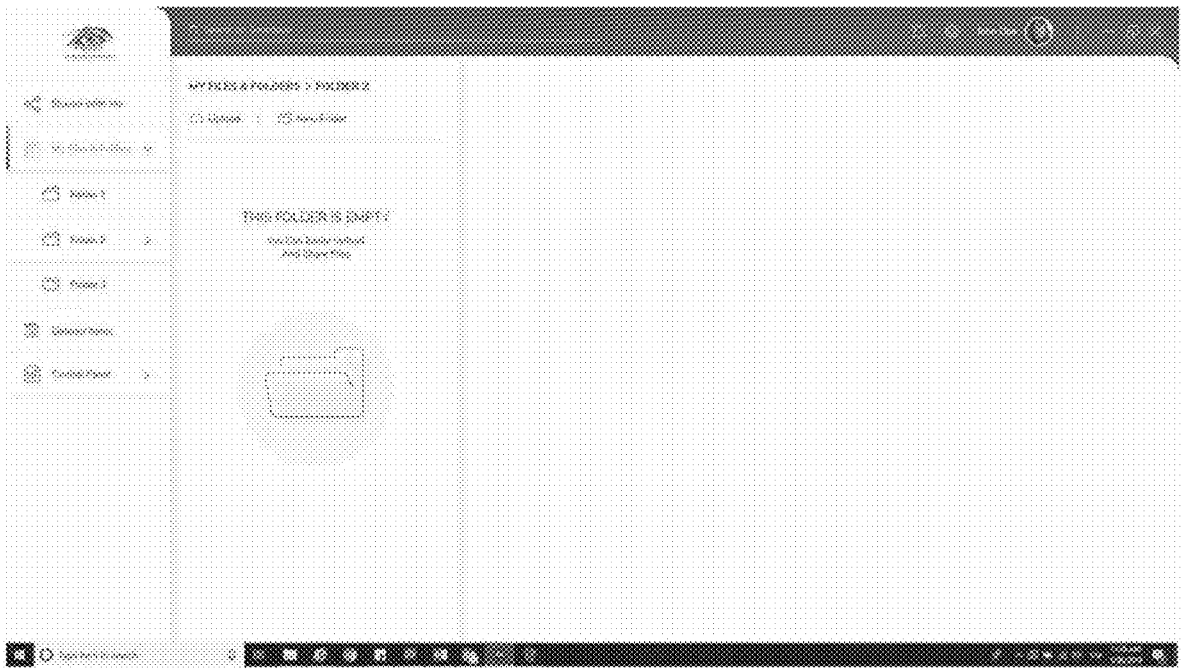
Fig. 18.11

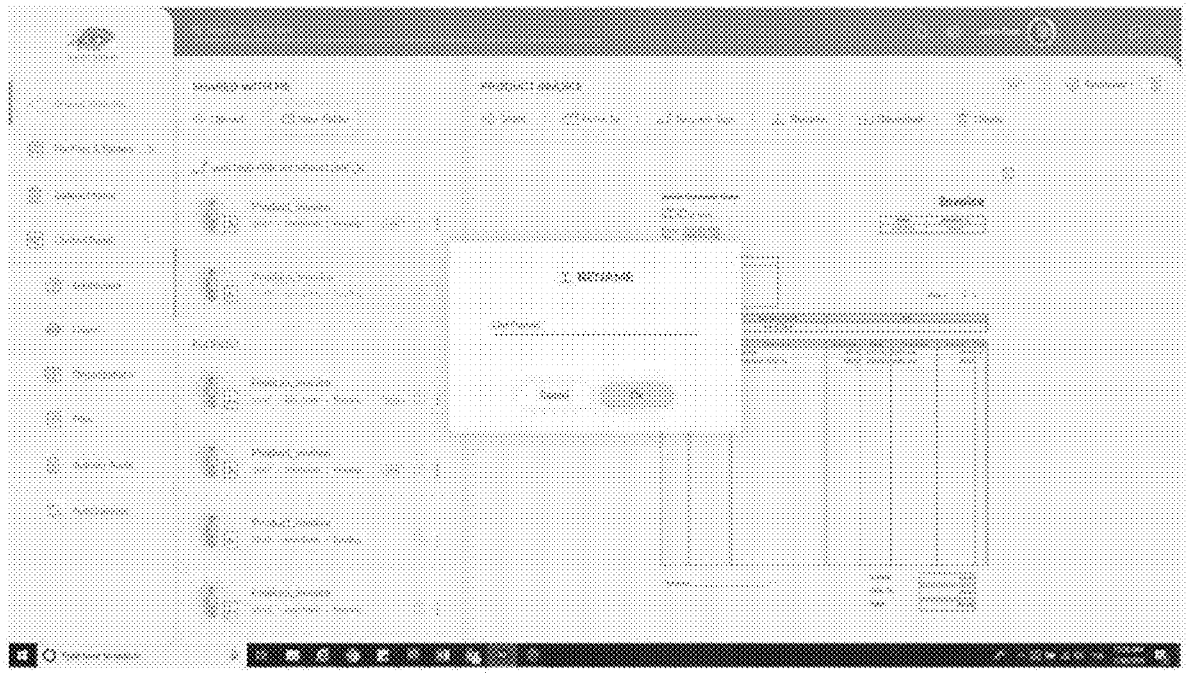
Fig. 18.12

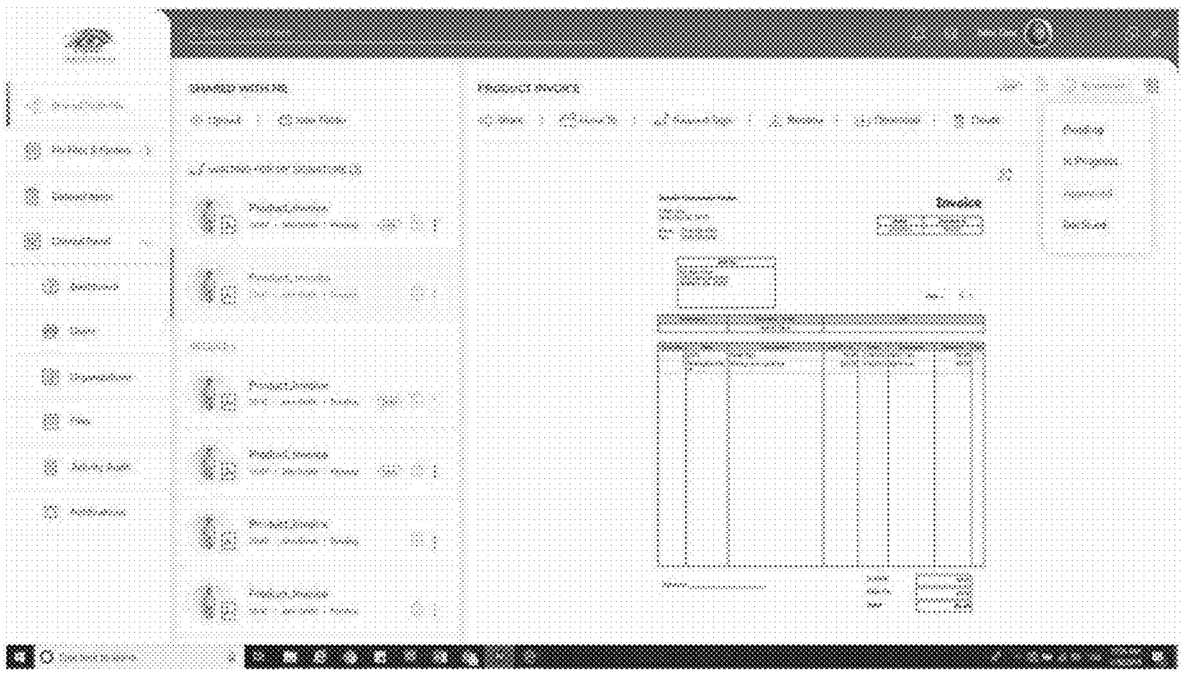
Fig. 18.13

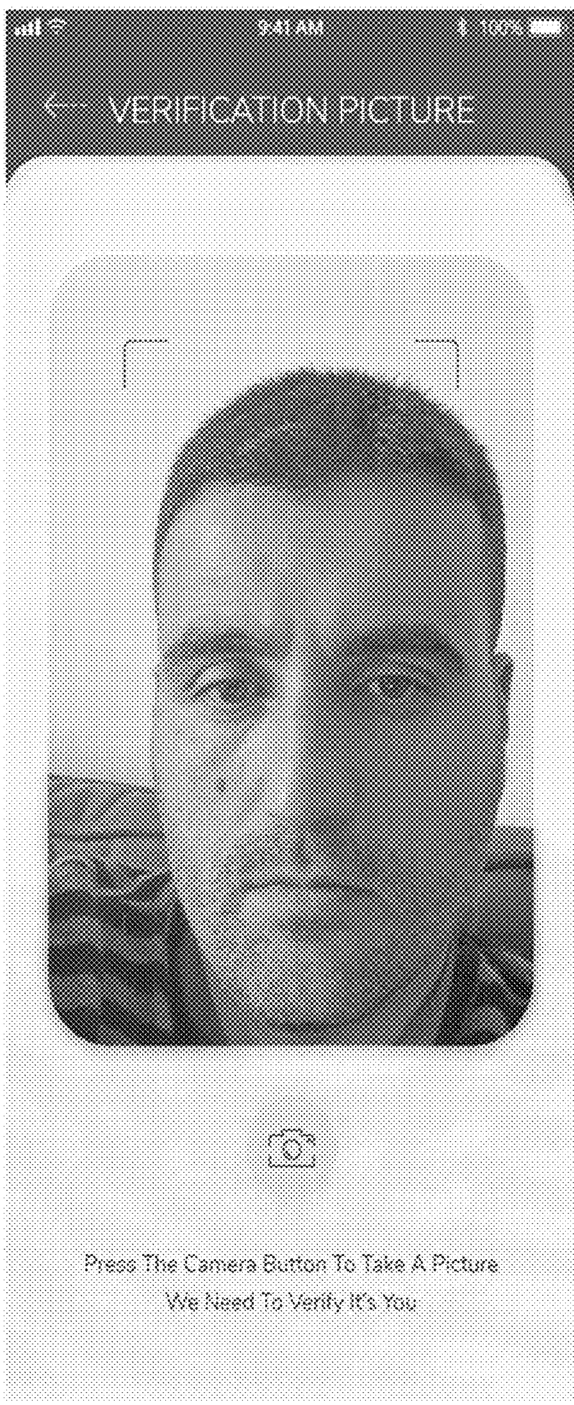
Fig. 18.14
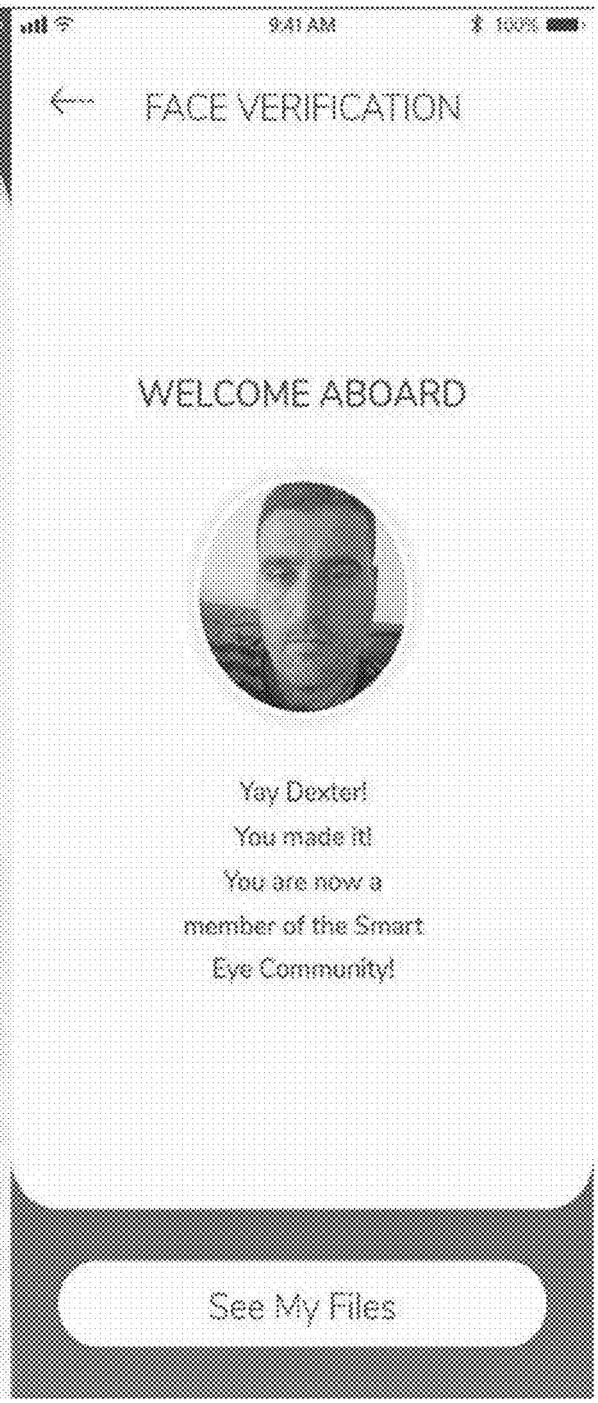
Fig. 18.15

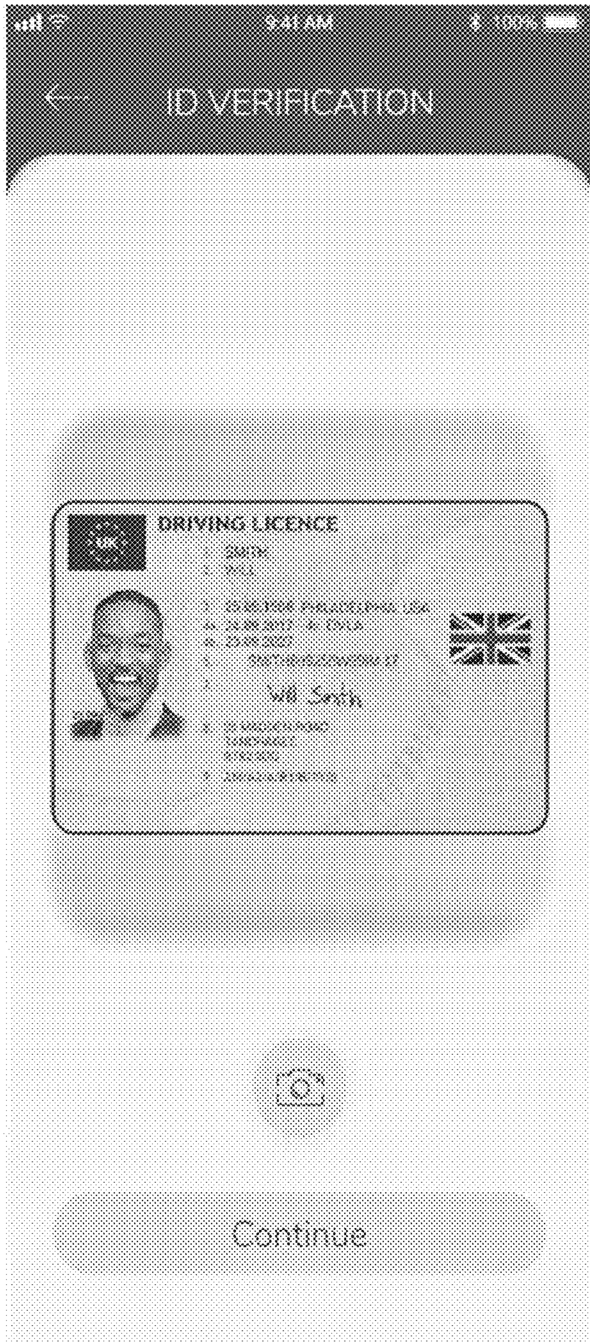
Fig. 18.16
Fig. 18.17

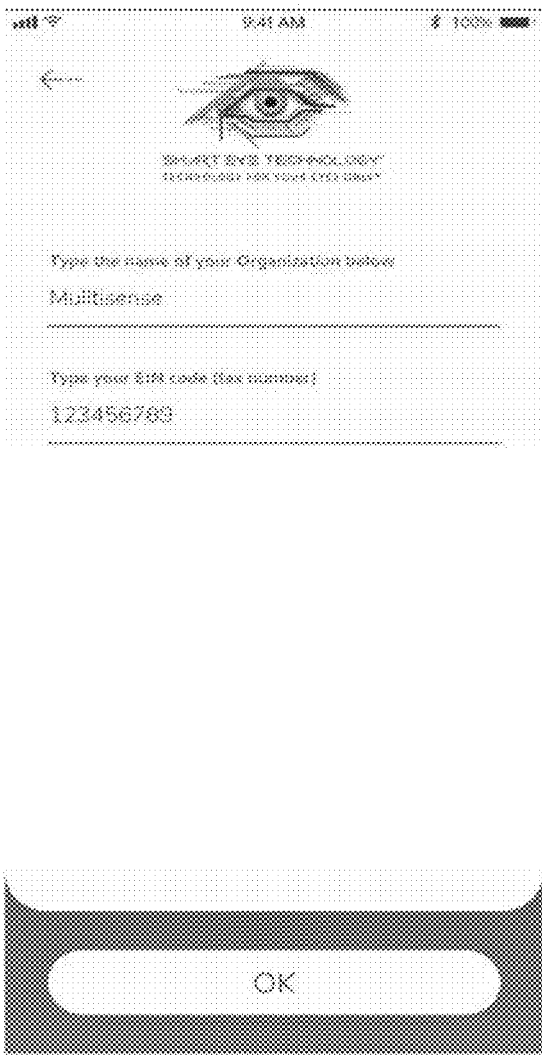
Fig. 18.18
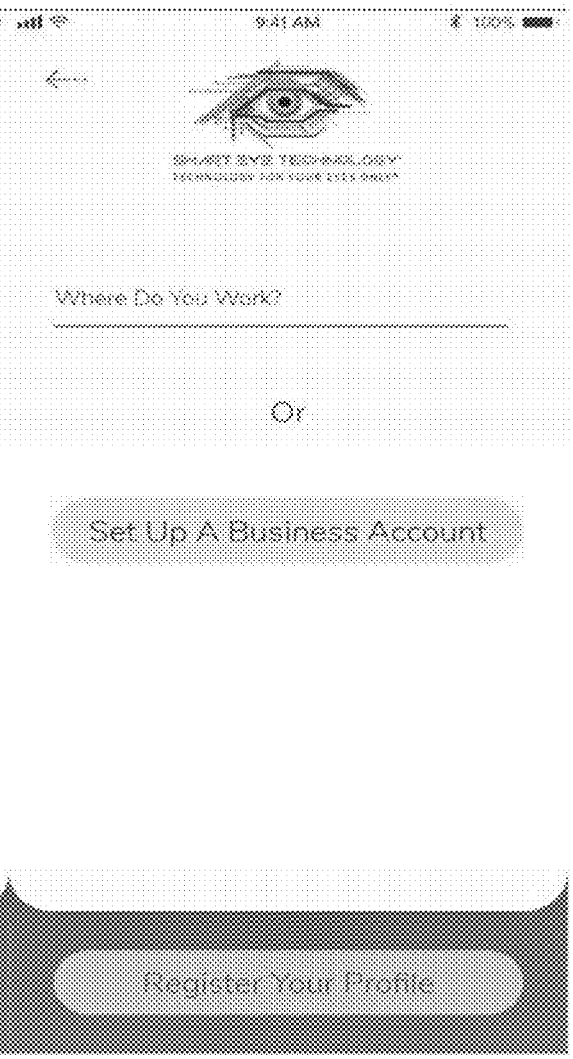
Fig. 18.19

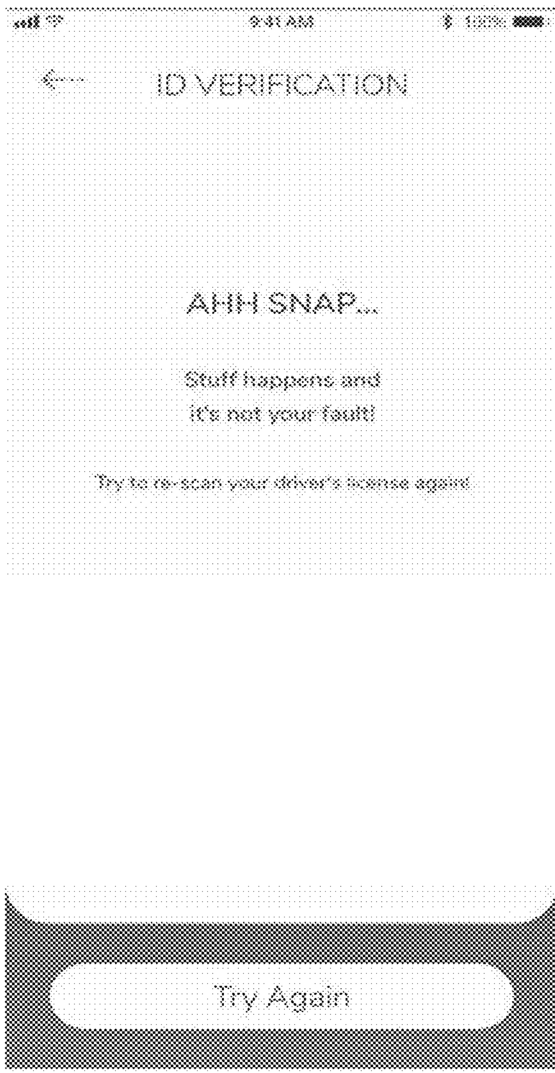
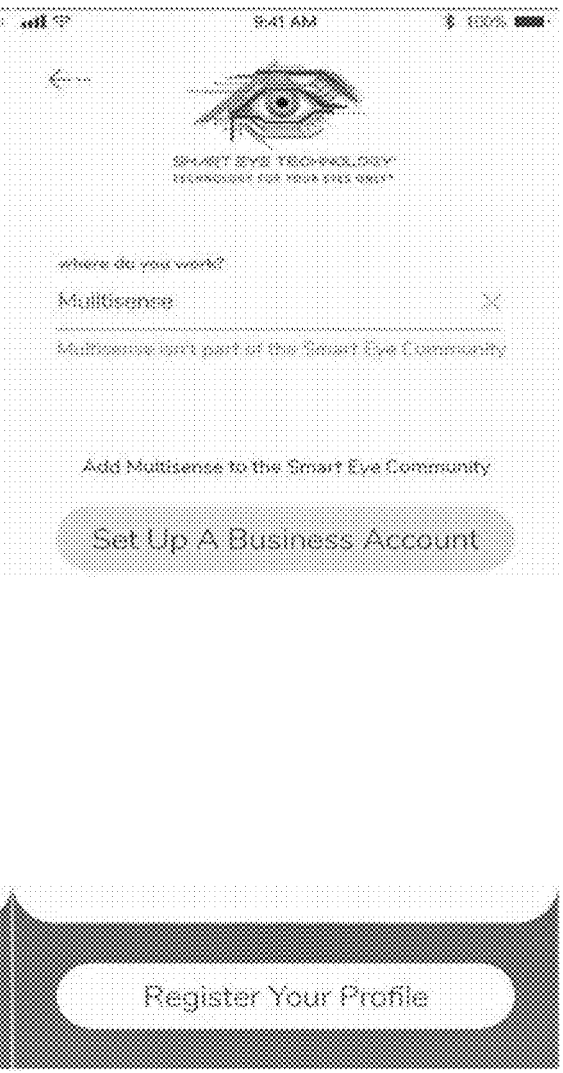
Fig. 18.20
Fig. 18.21

Fig. 18.22
Fig. 18.23

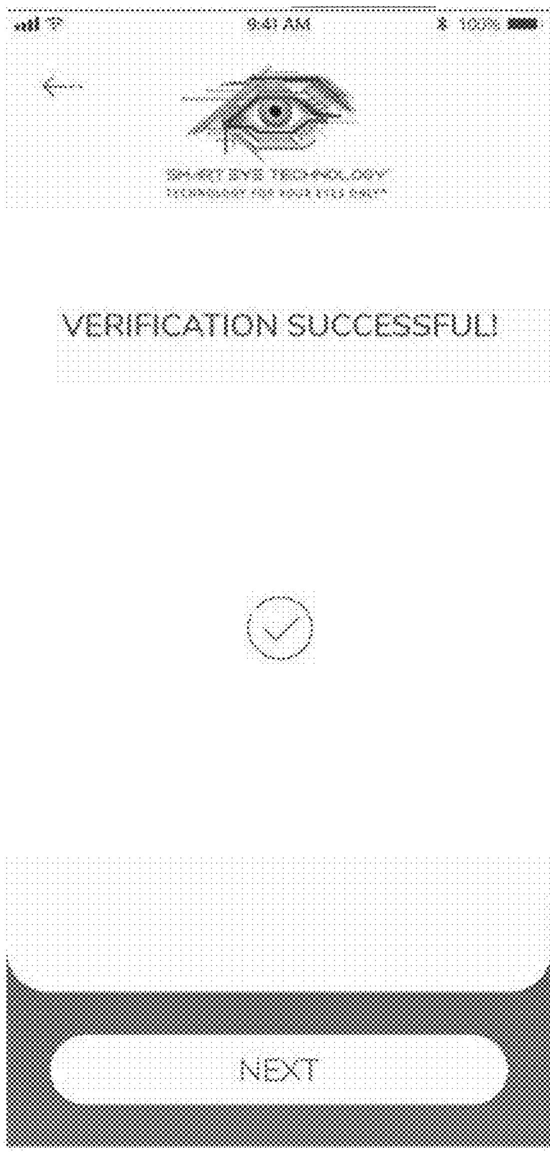
Fig. 18.24
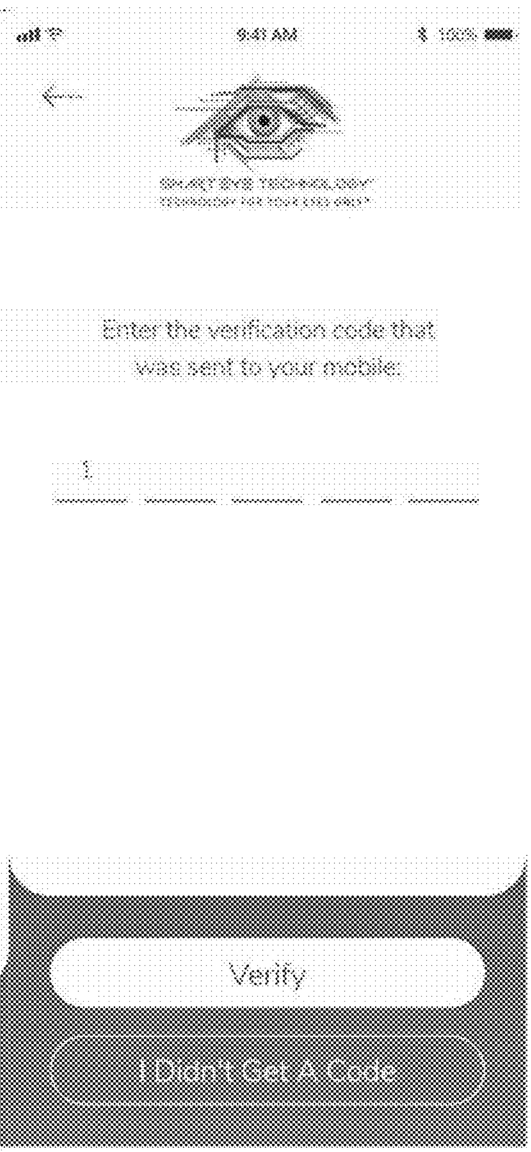
Fig. 18.25

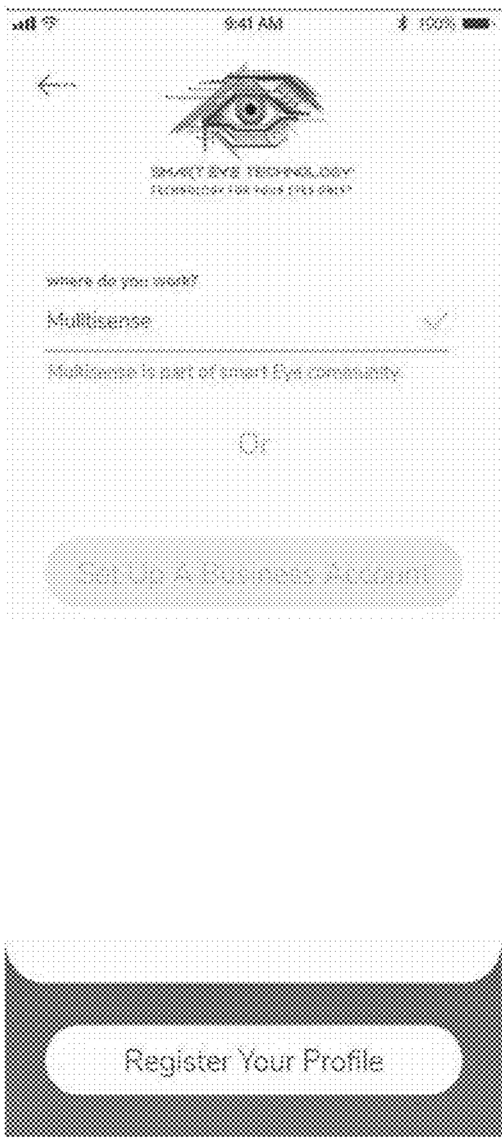
Fig. 18.26
Fig. 18.27

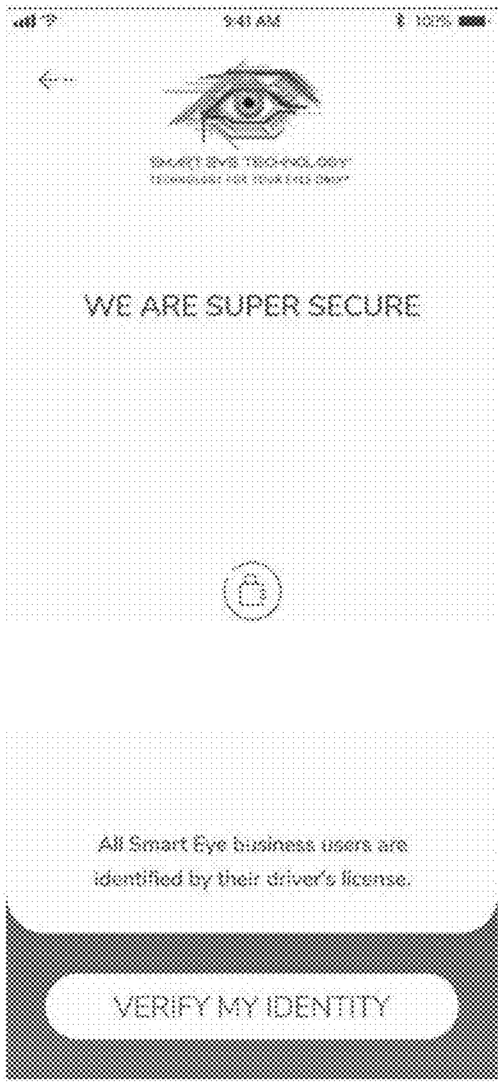
Fig. 18.28
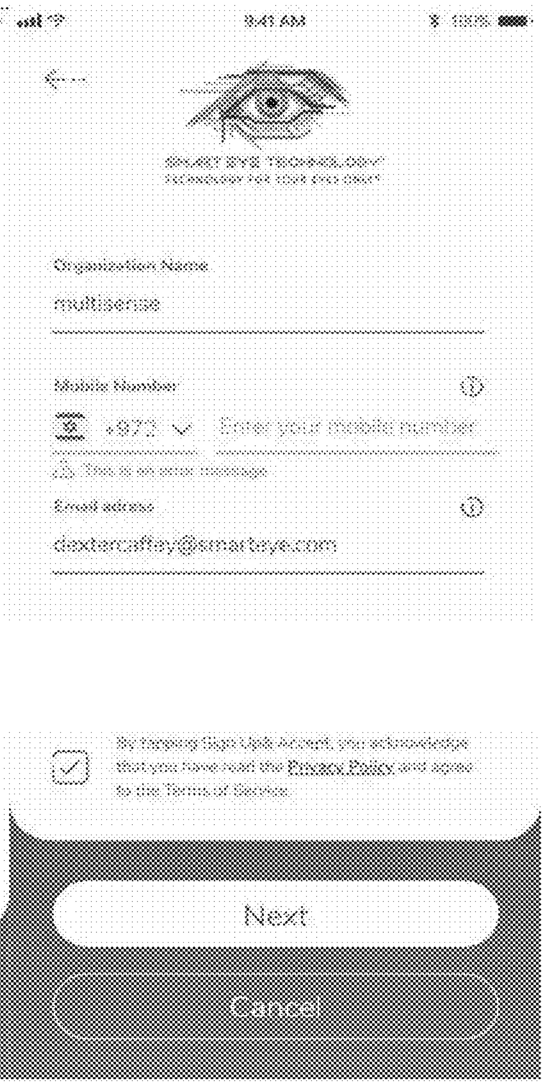
Fig. 18.29

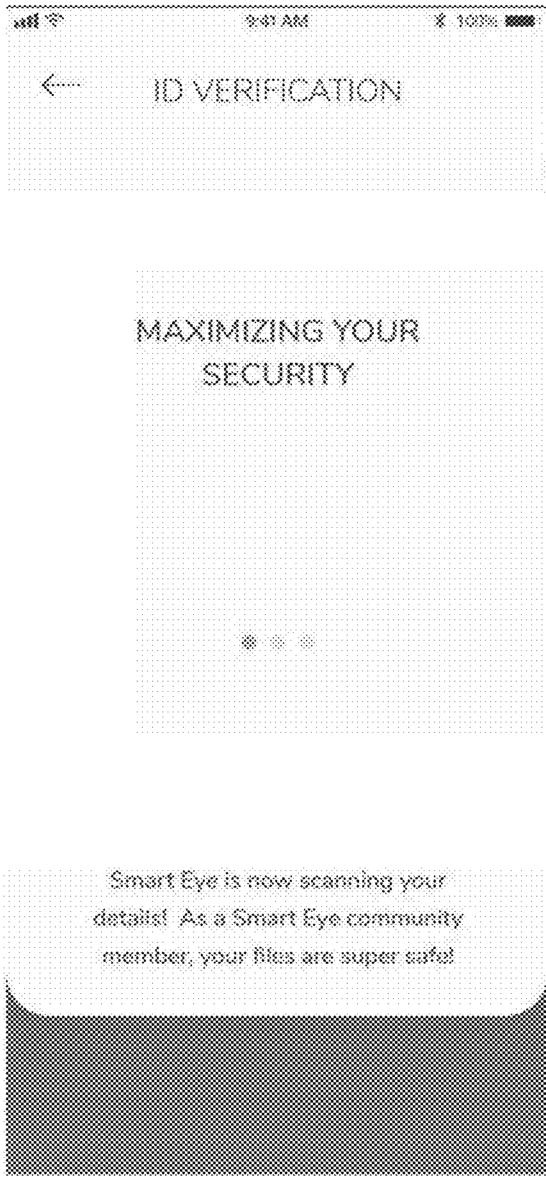
Fig. 18.30
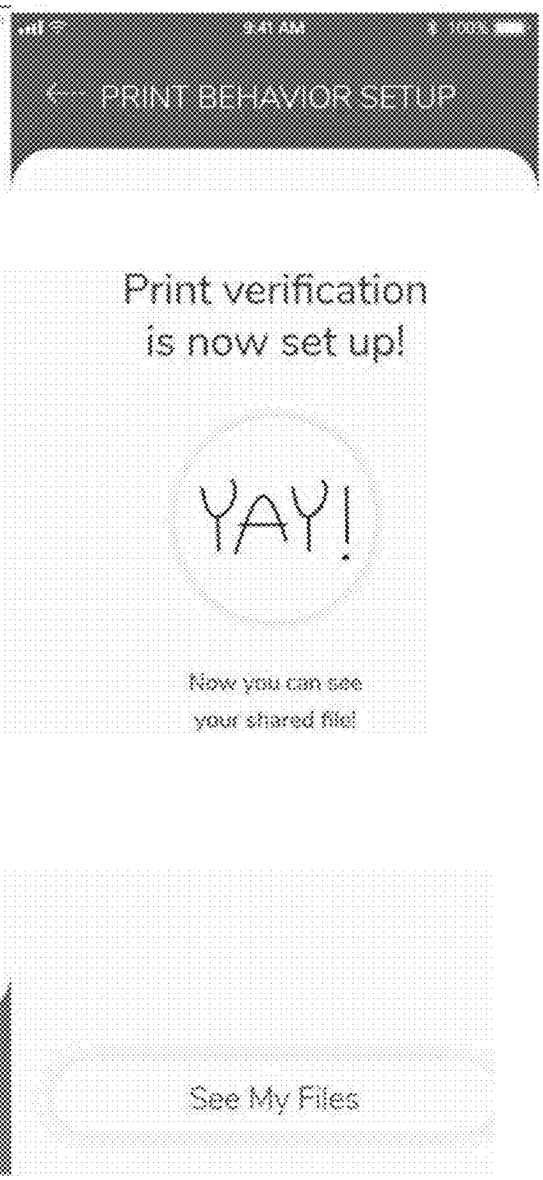
Fig. 18.31

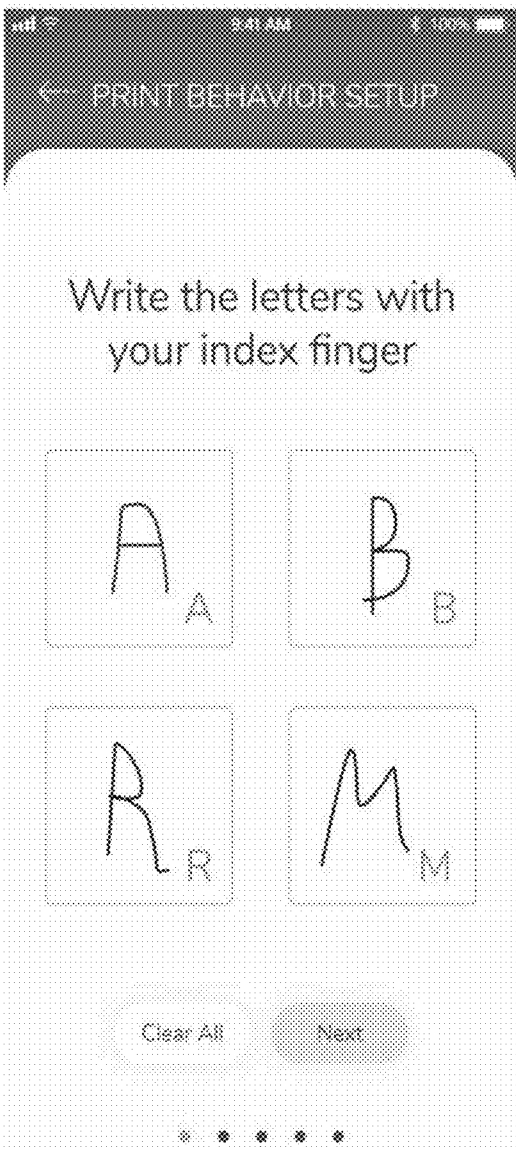
Fig. 18.32
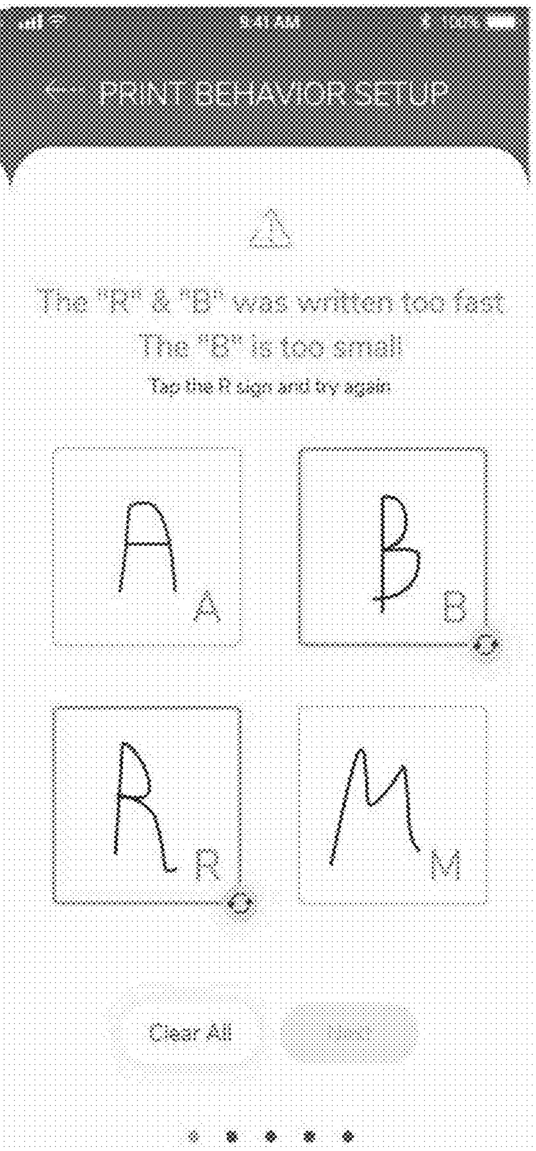
Fig. 18.33

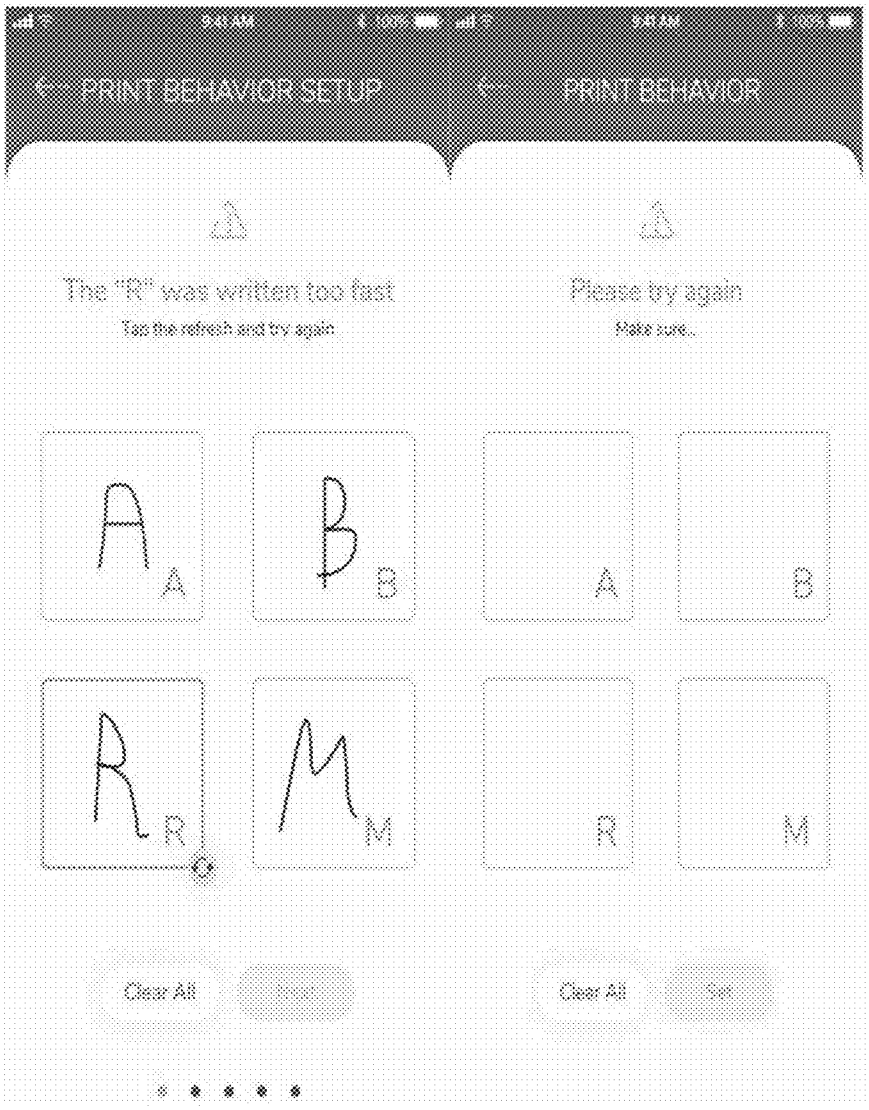
Fig. 18.34
Fig. 18.35

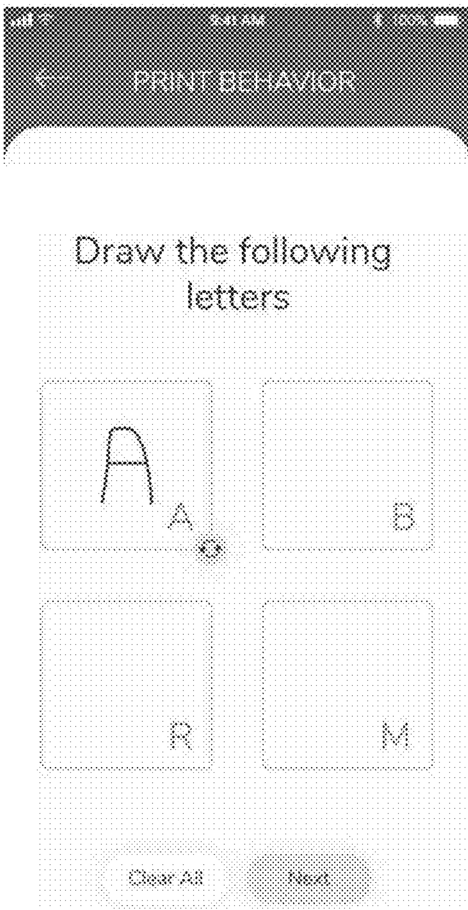
Fig. 18.36
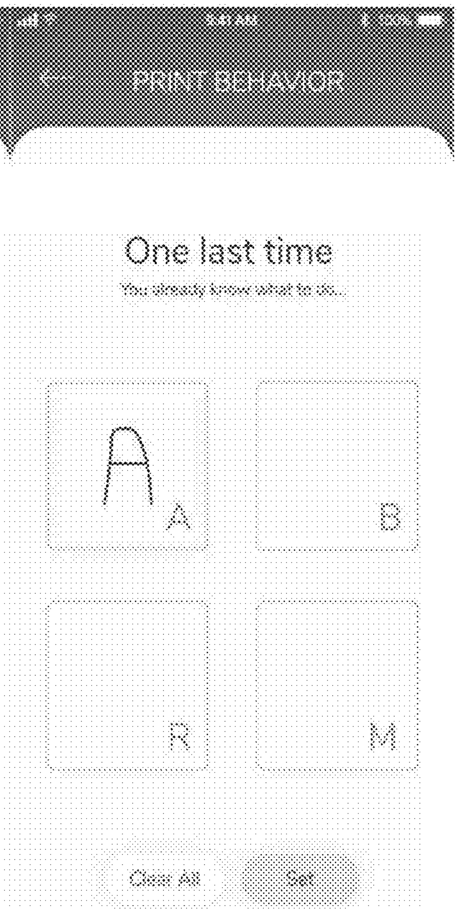
Fig. 18.37

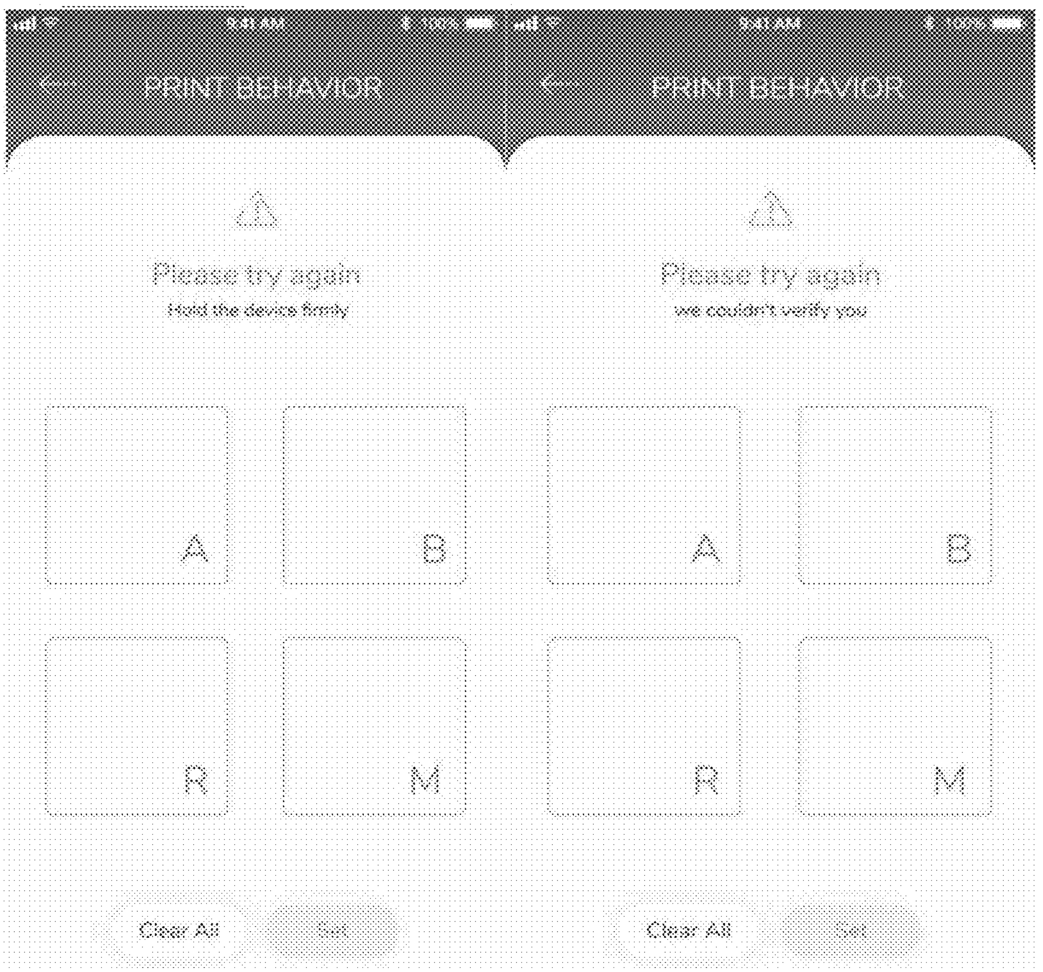
Fig. 18.38
Fig. 18.39

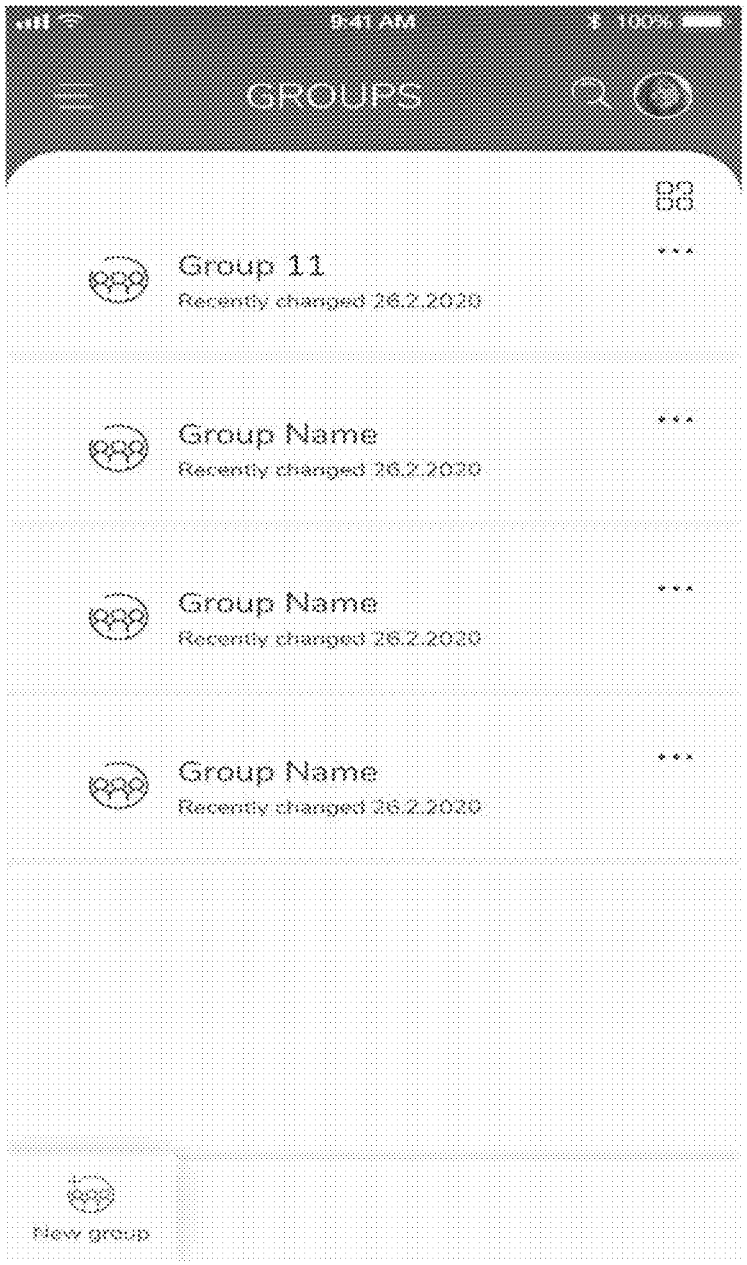
Figure 22.1

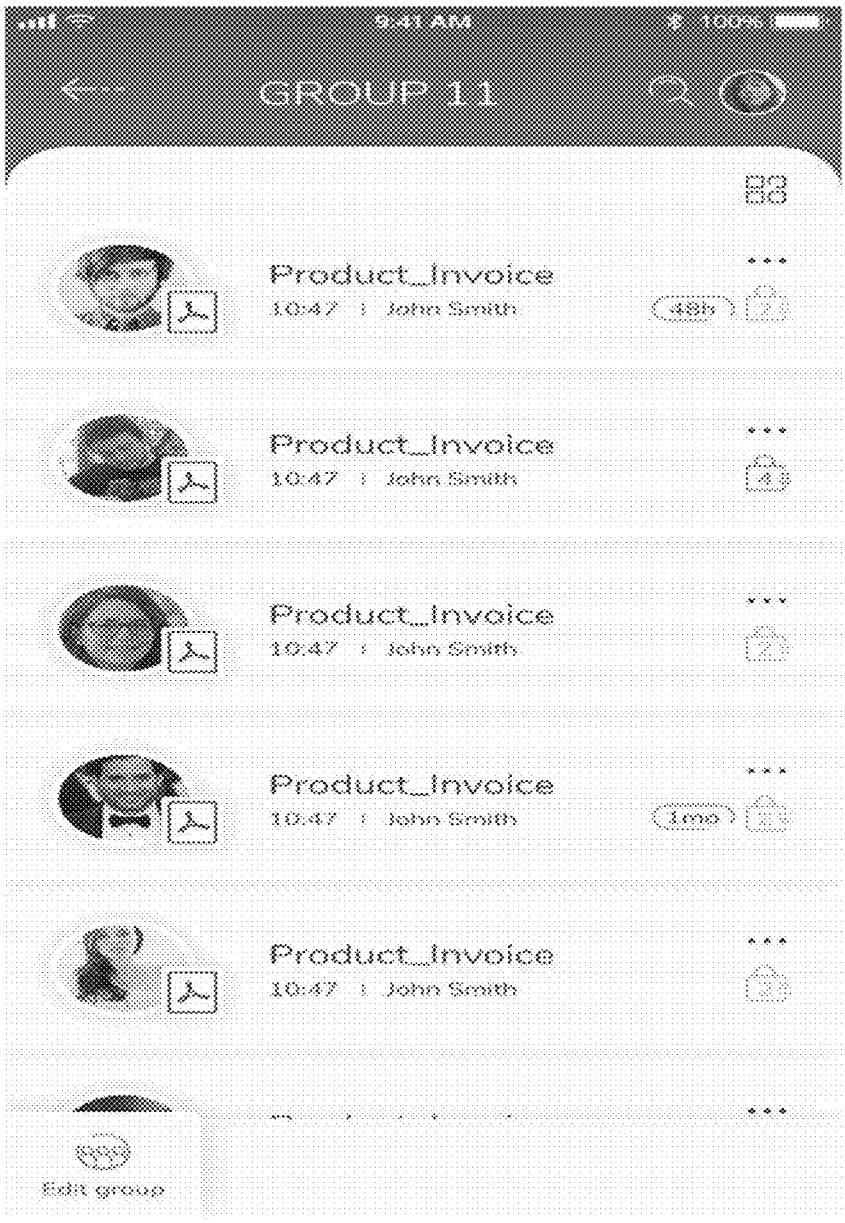
Figure 22.2

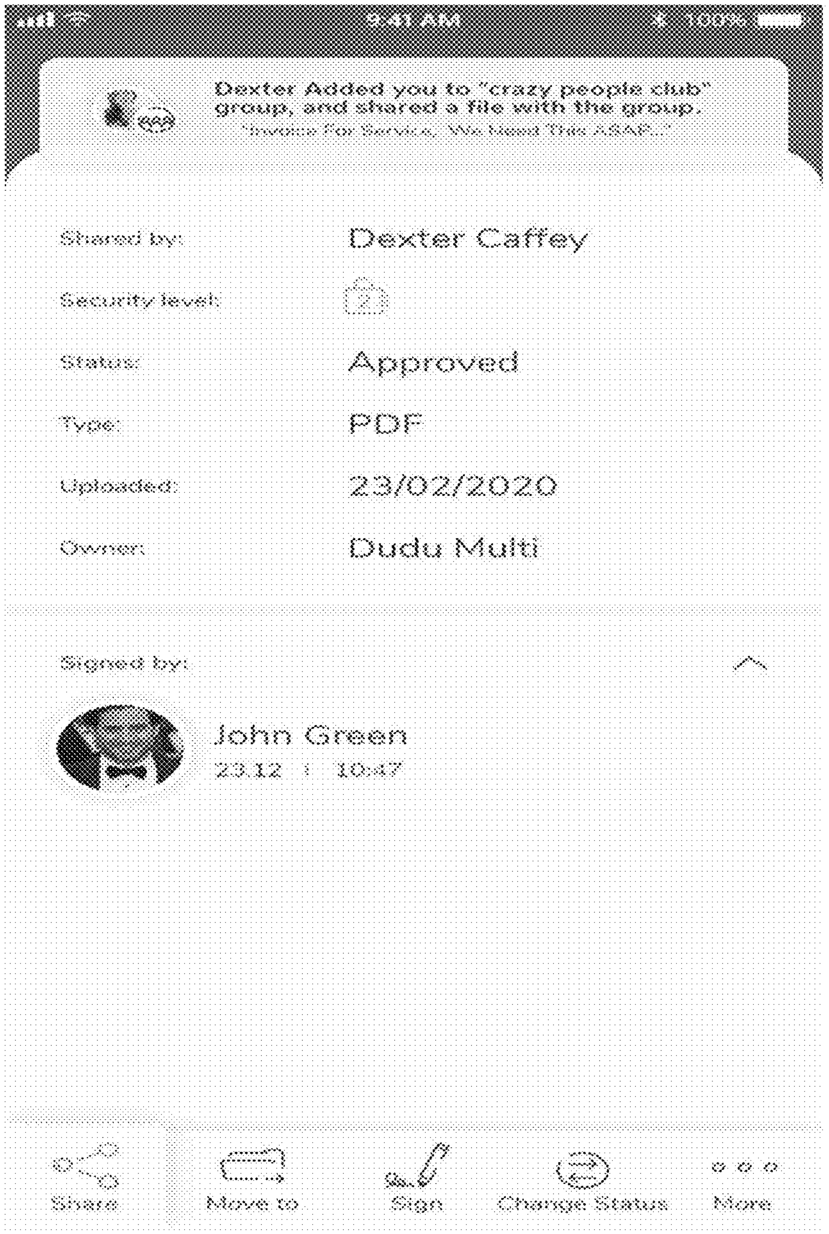
Figure 22.3

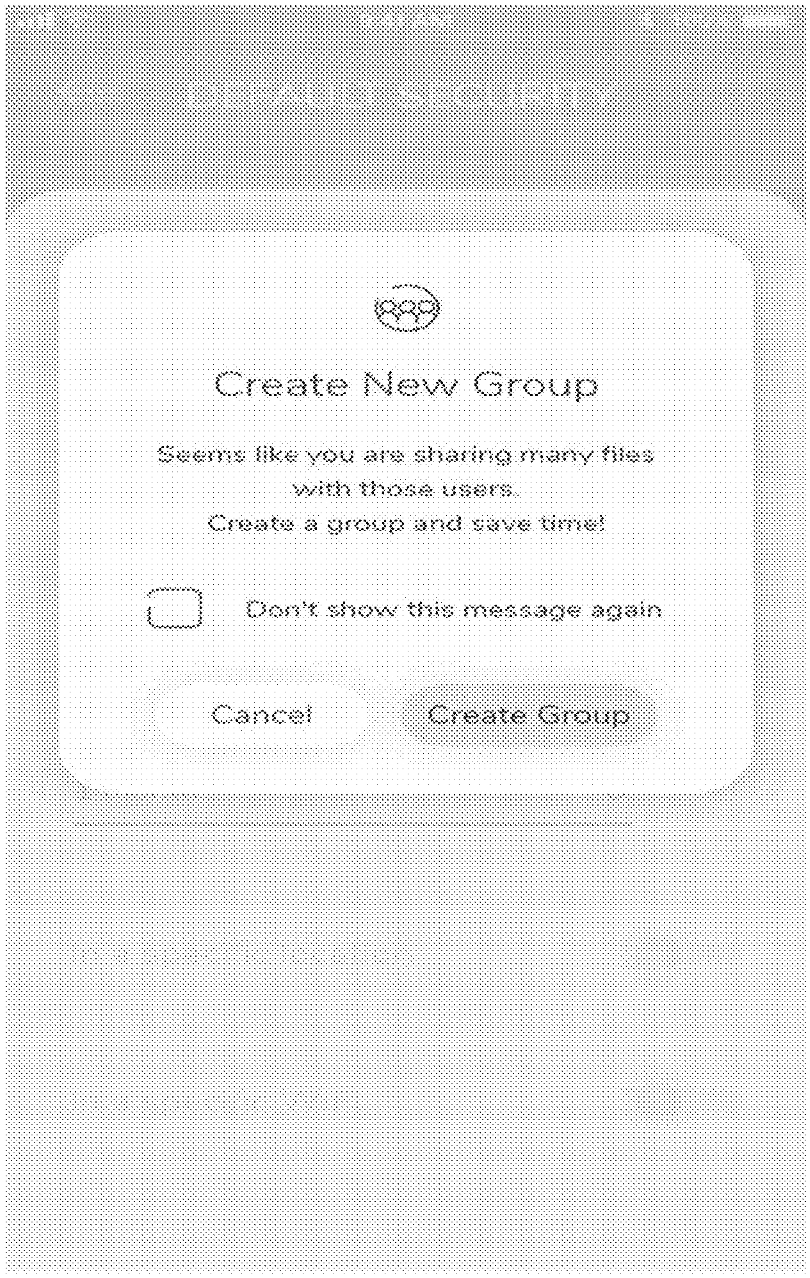
Figure 22.4

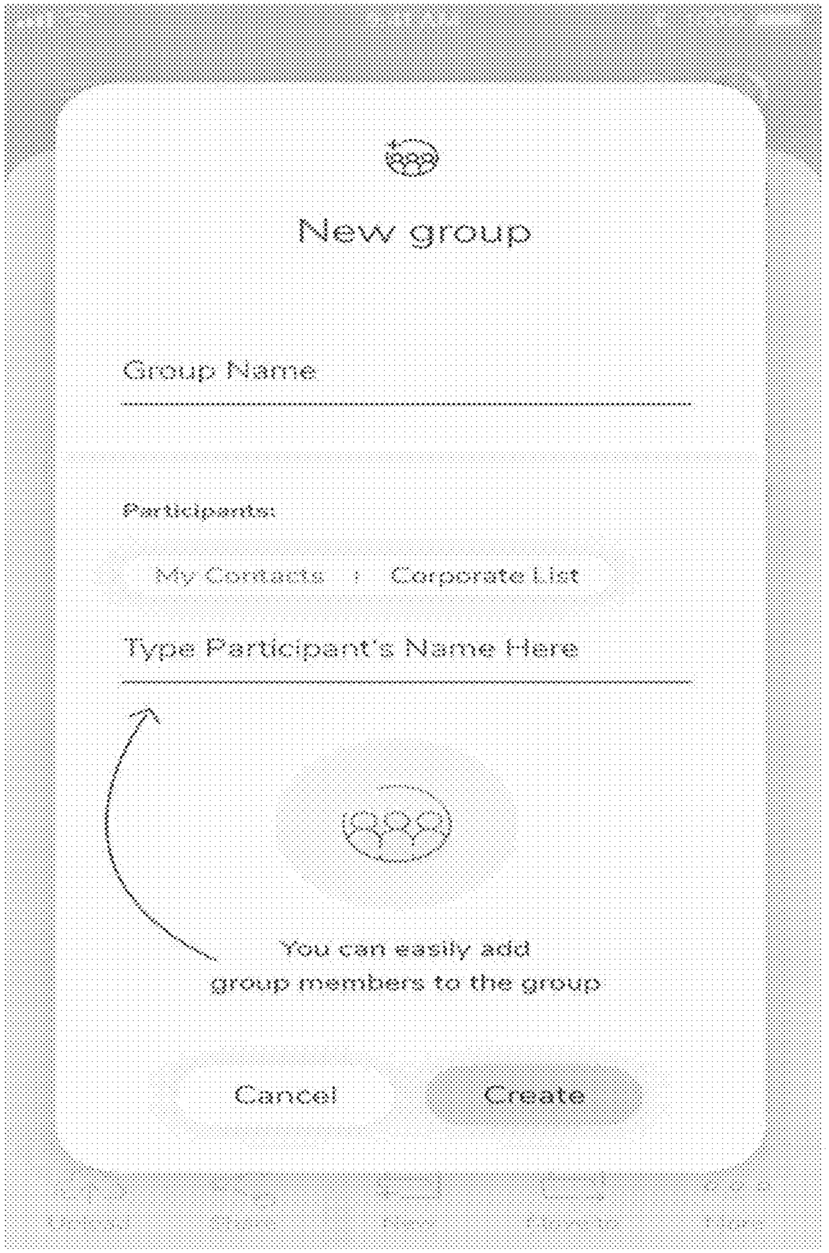
Figure 22.5

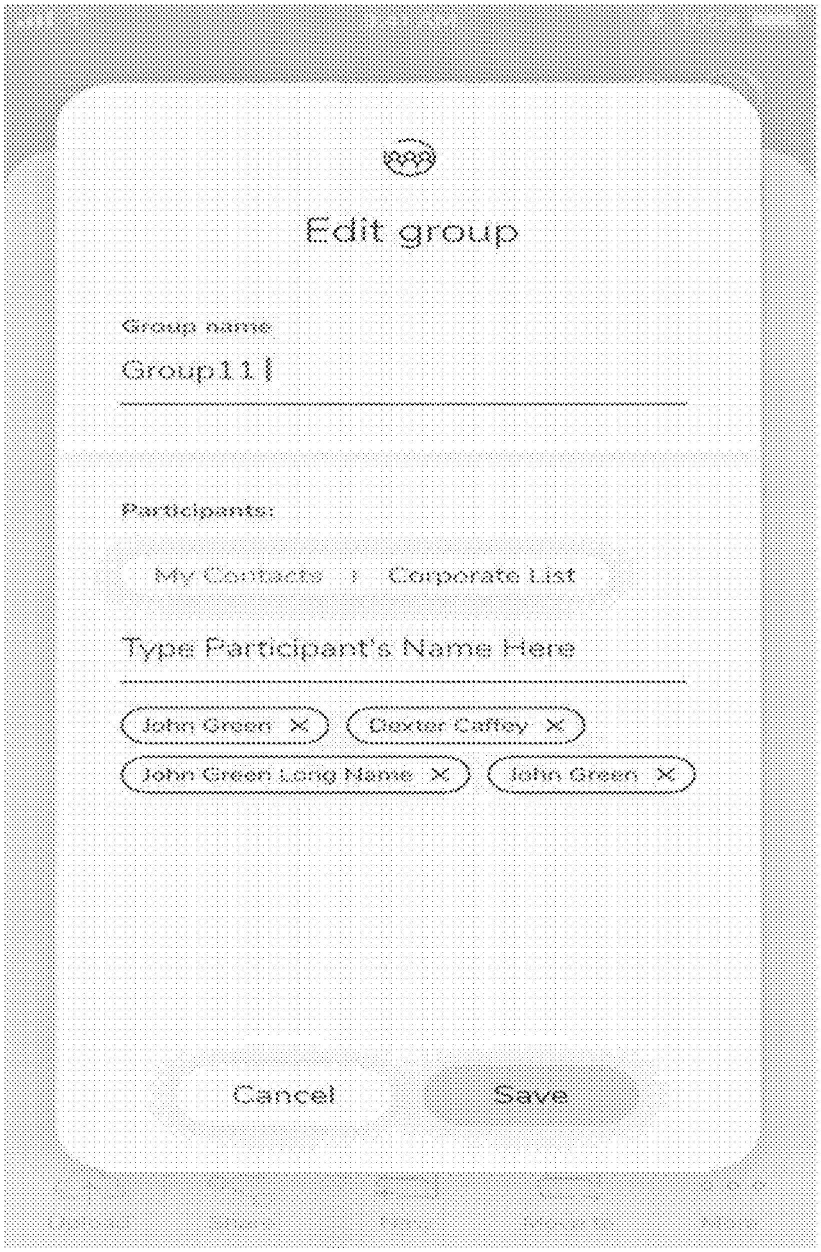
Figure 22.6

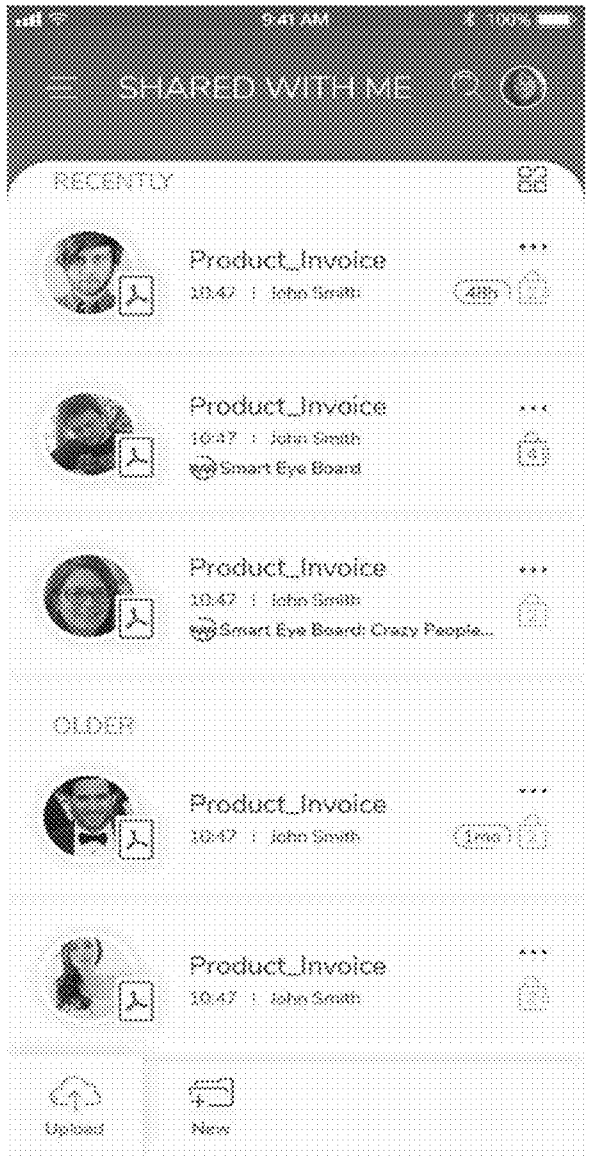
Figure 22.7

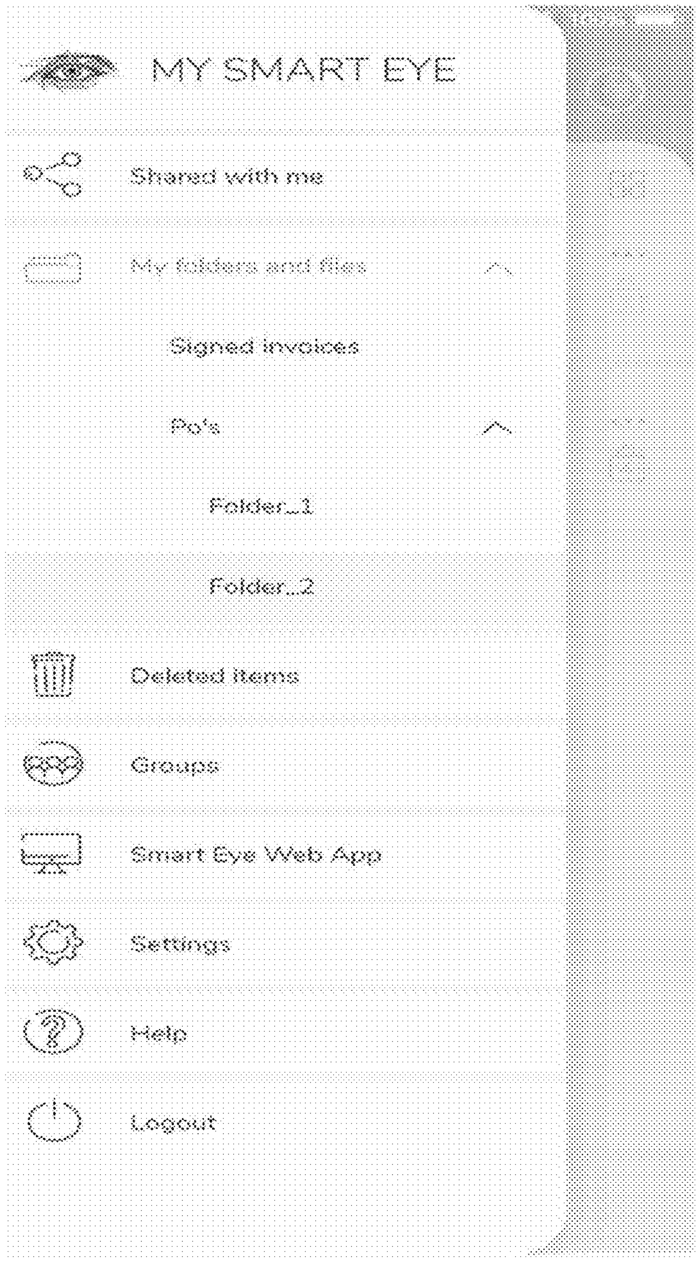
Figure 22.8

Figure 22.9

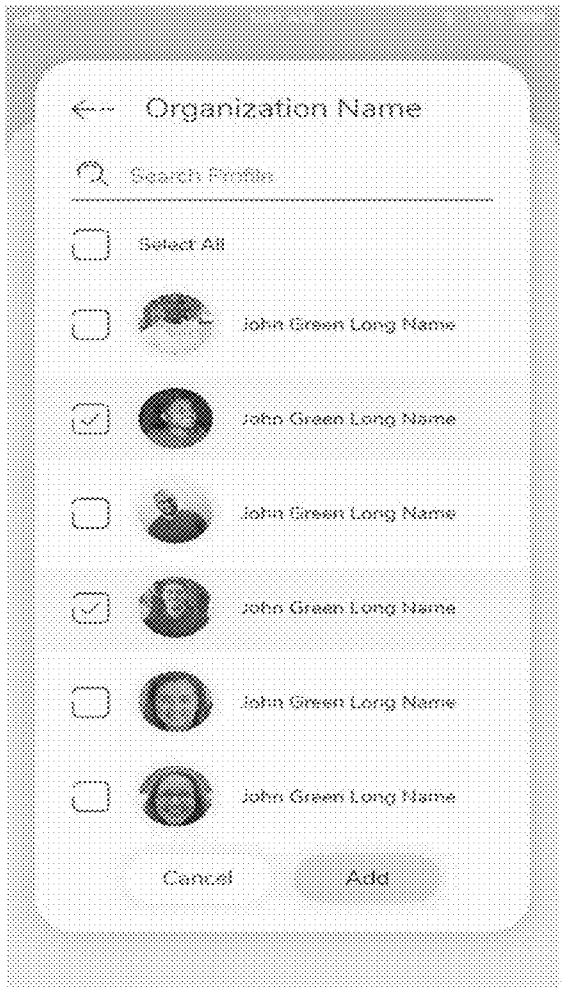
Figure 22.10

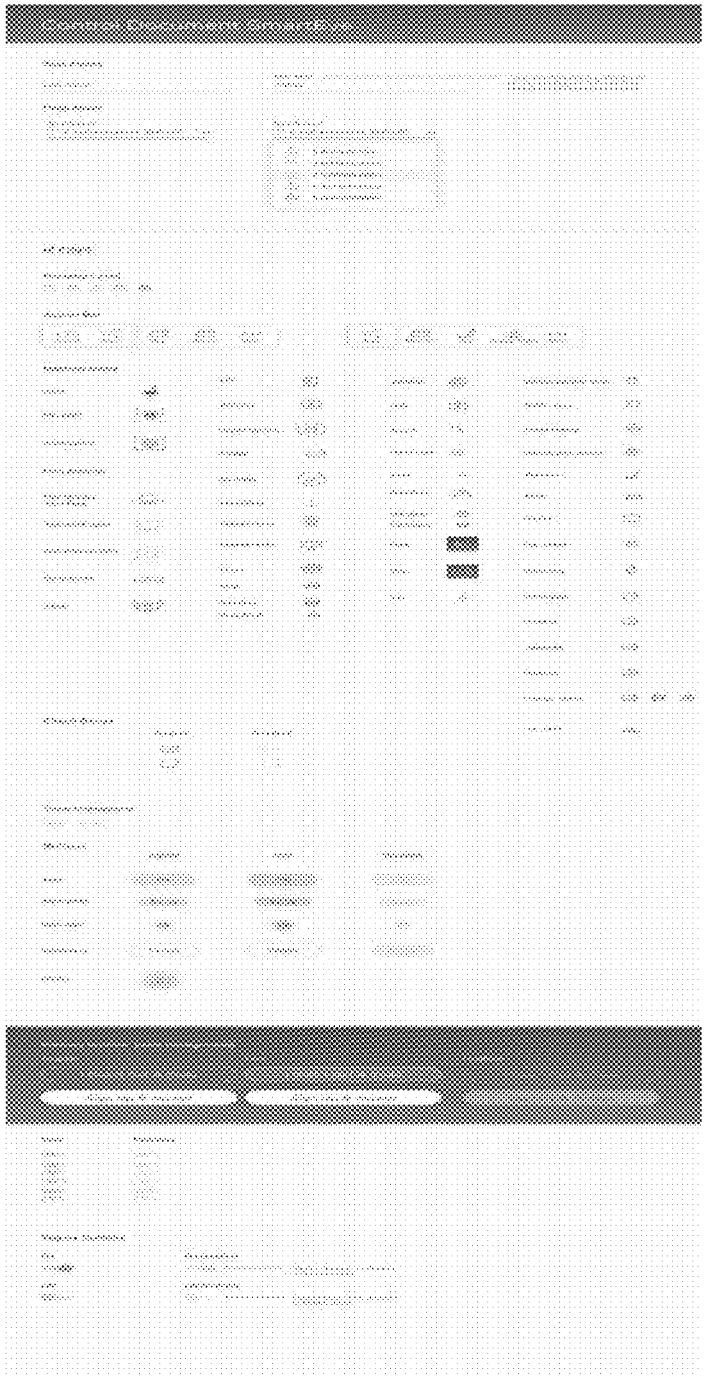
Figure 22.11

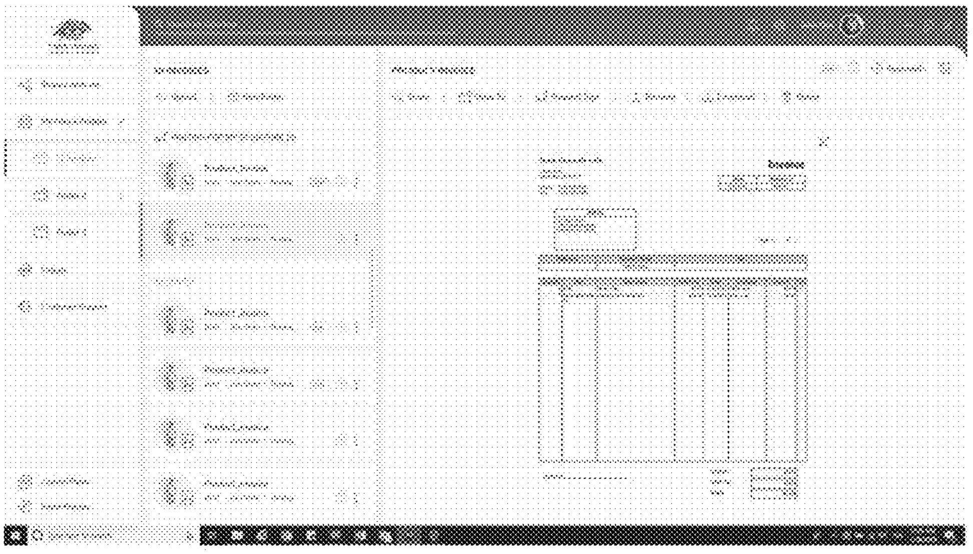
Figure 22.12

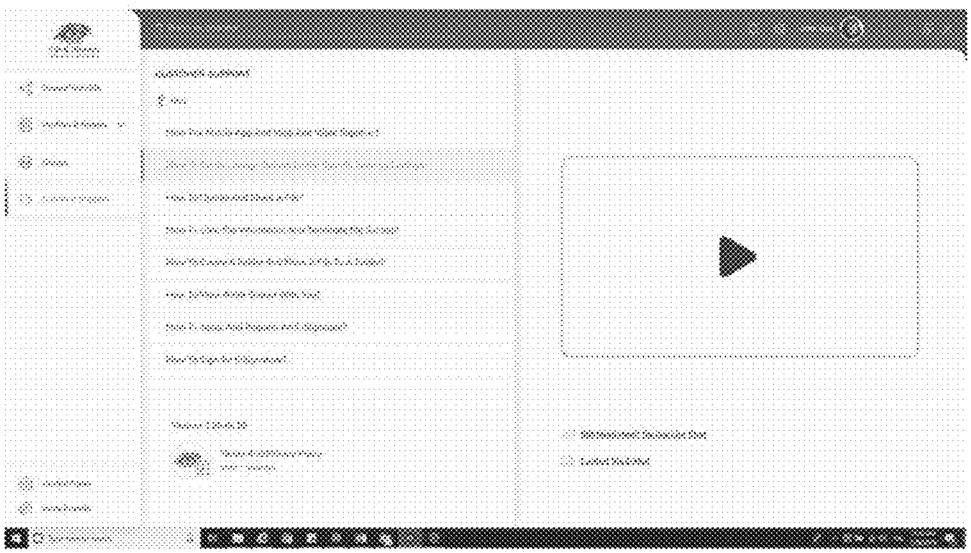
Figure 22.13

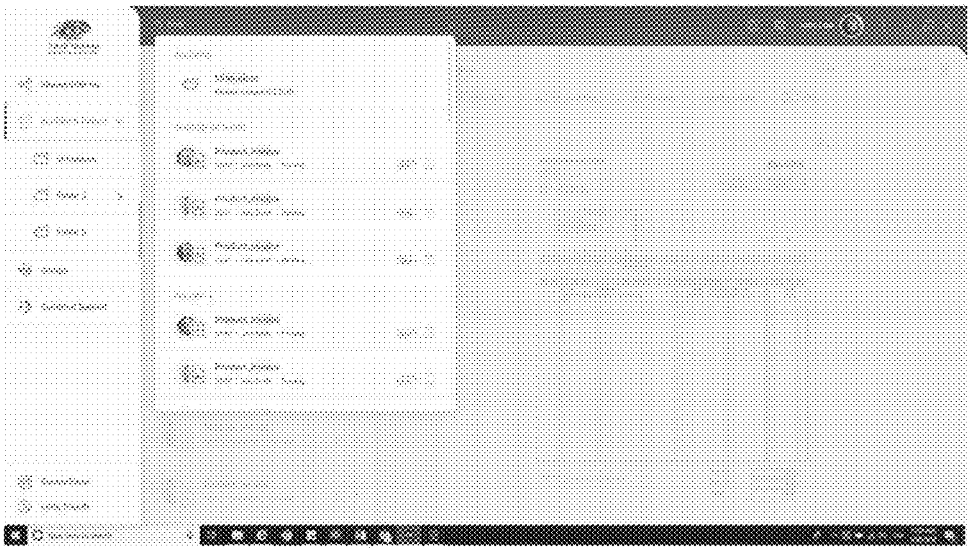
Figure 22.14

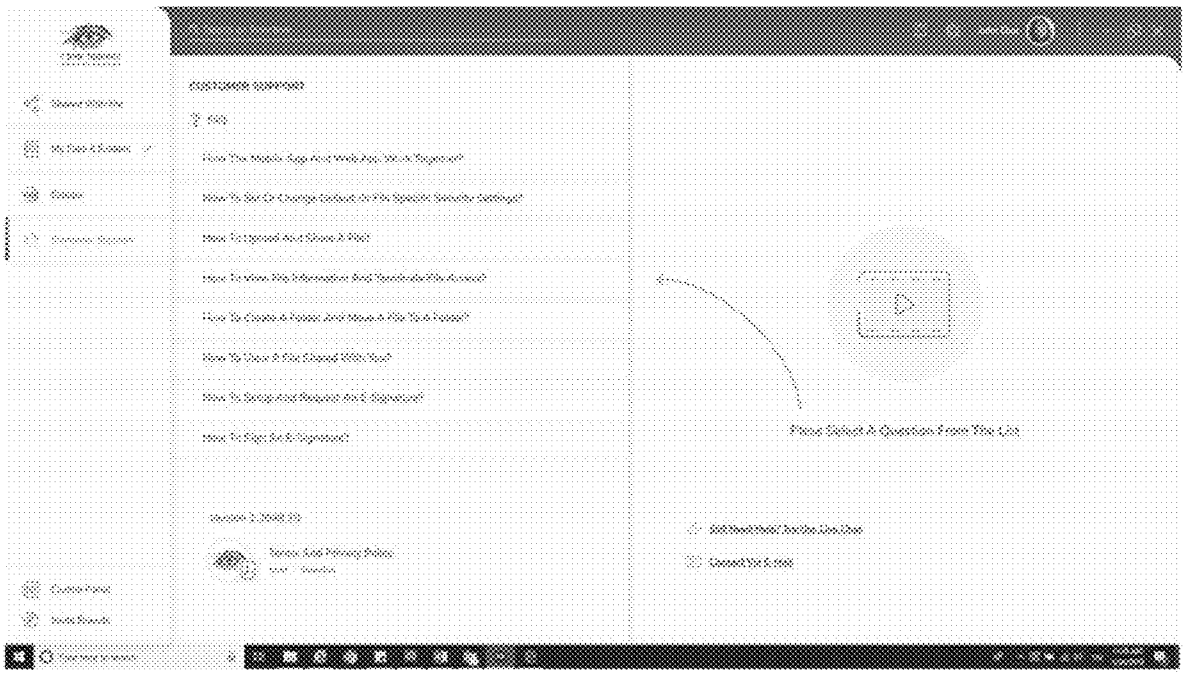
Figure 22.15

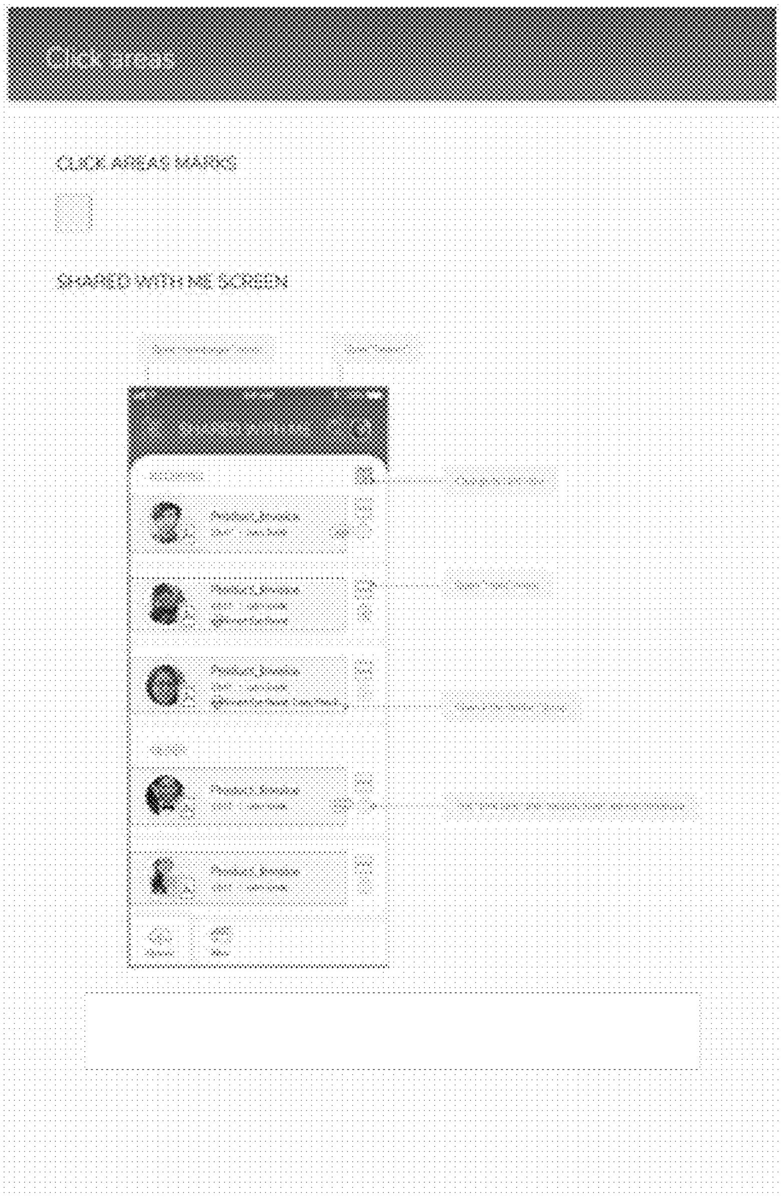
Figure 22.16

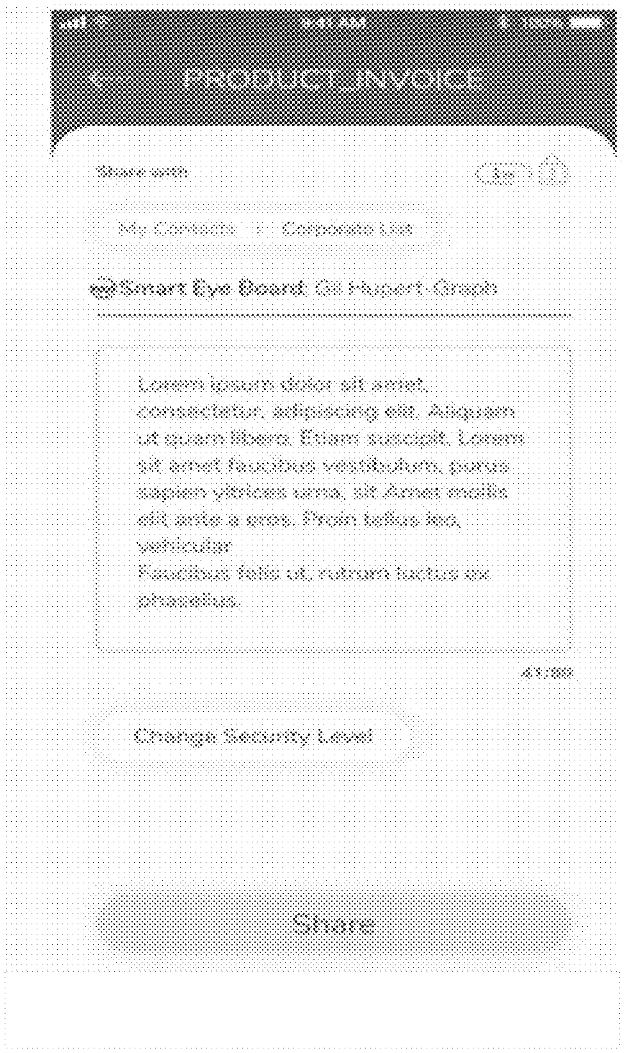
Figure 22.17

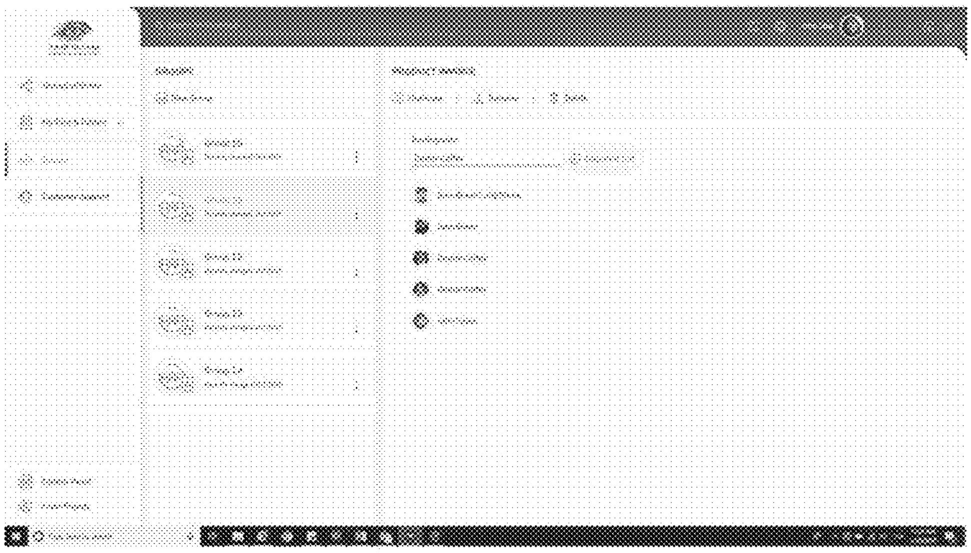
Figure 22.18

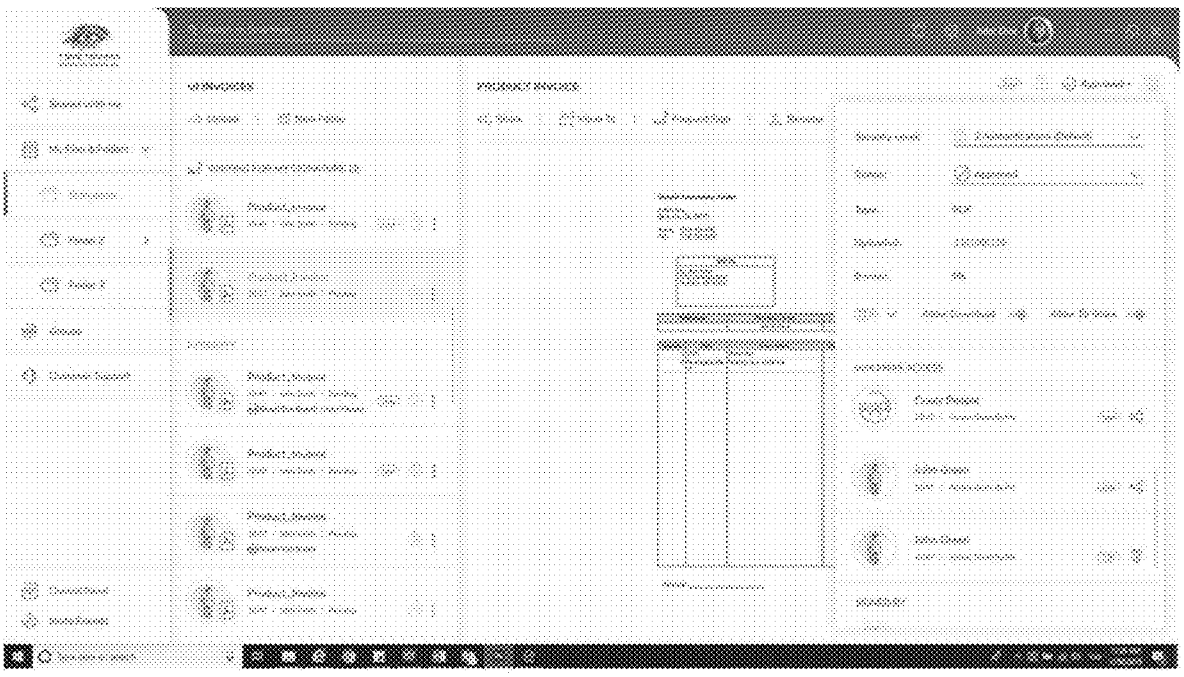
Figure 22.19

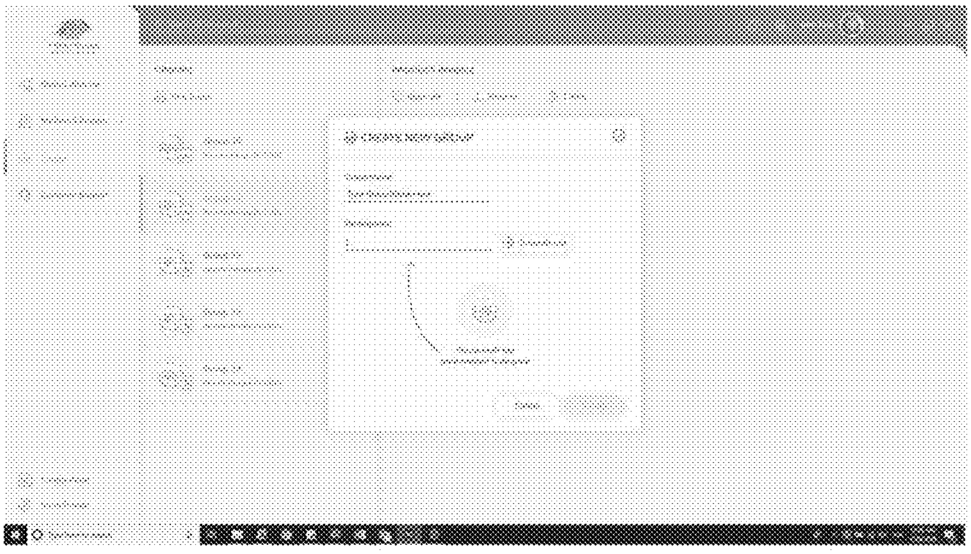
Figure 22.20

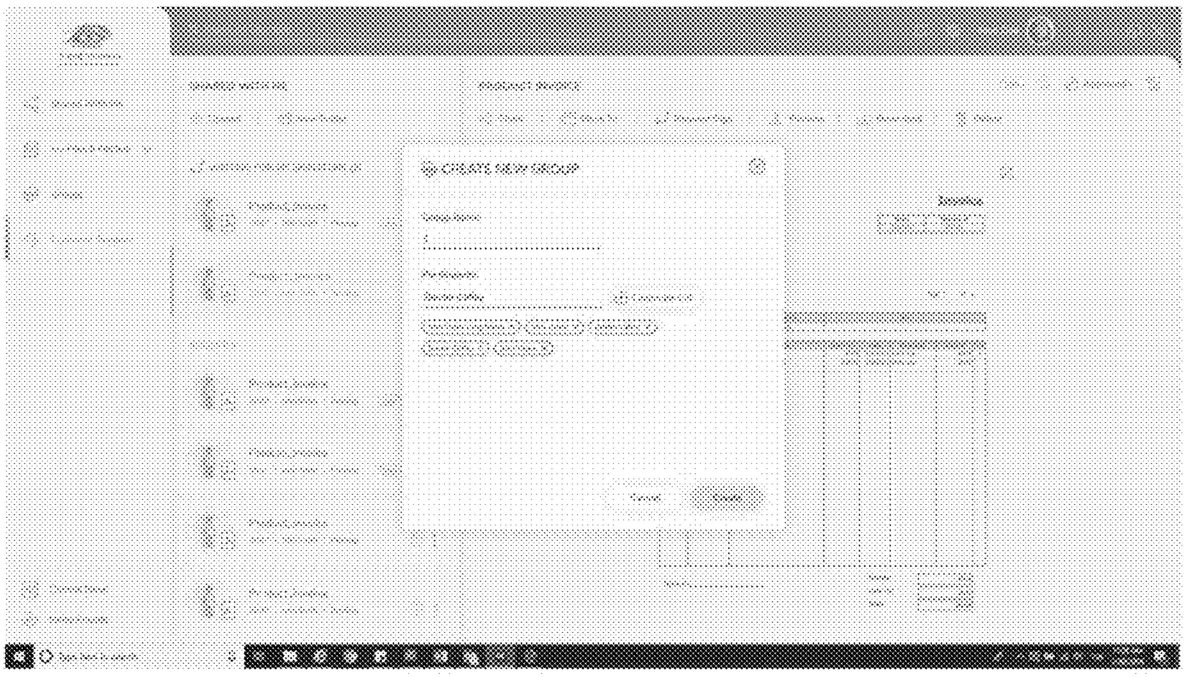
Figure 22.21

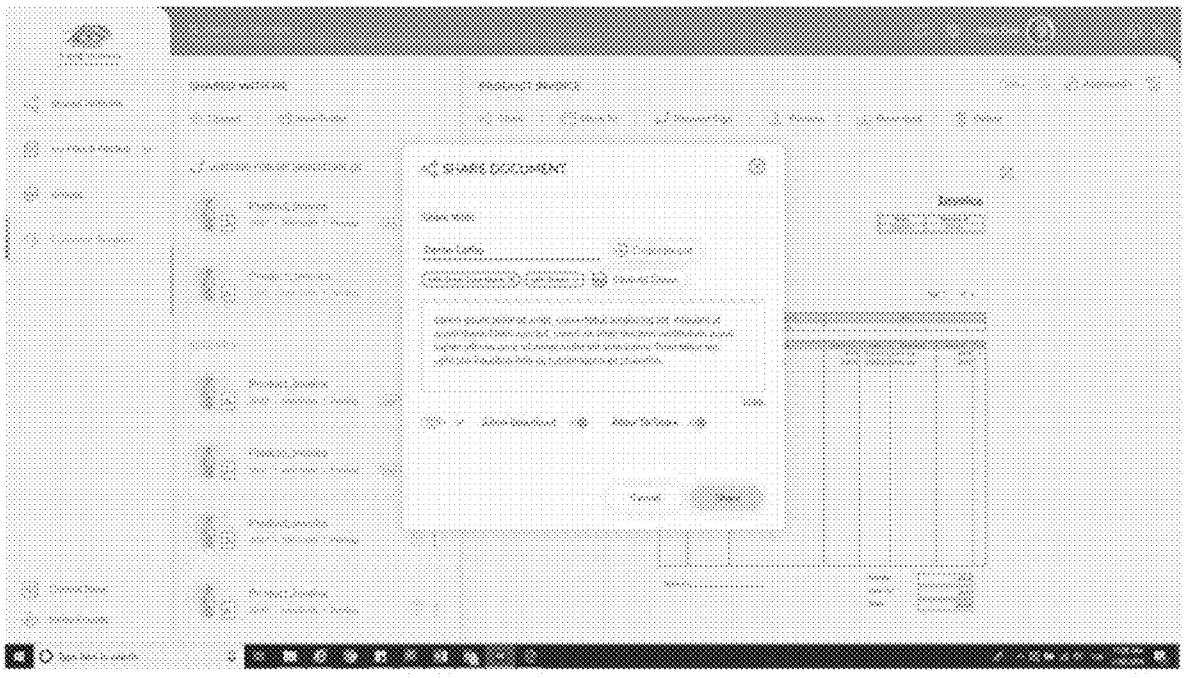
Figure 22.22

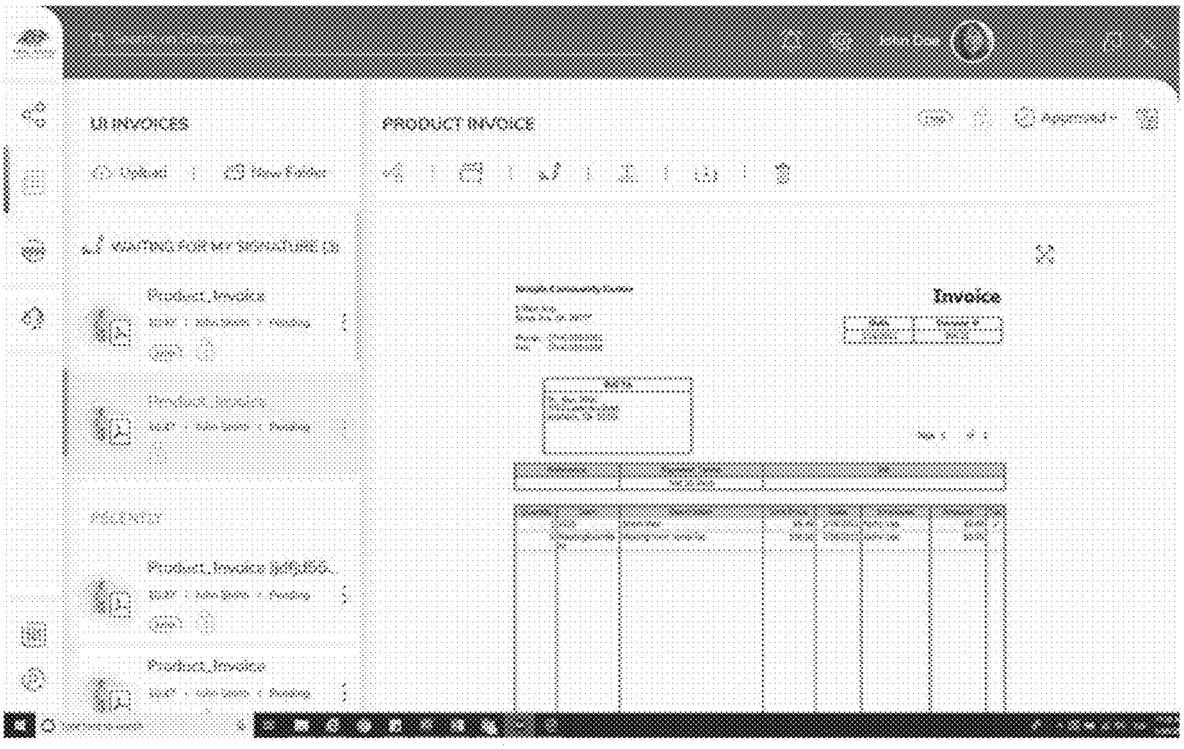
Figure 22.23

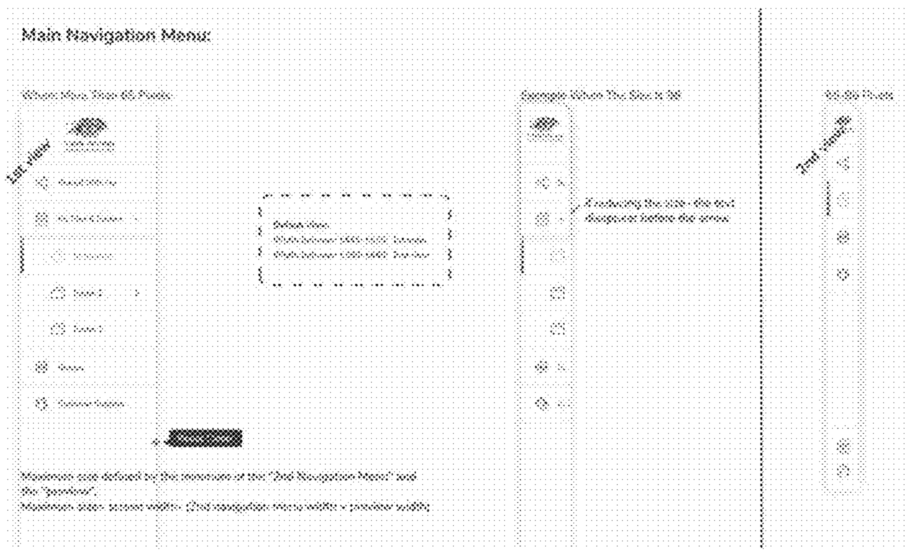
Figure 22.24

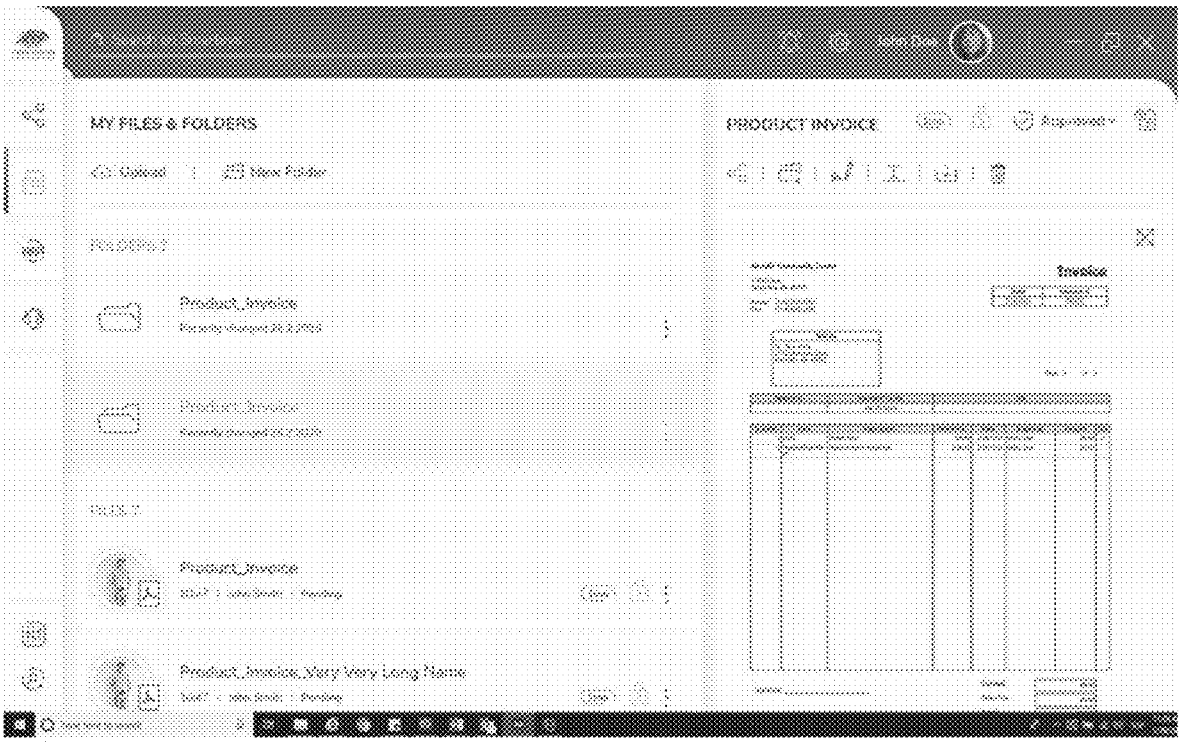
Figure 22.25

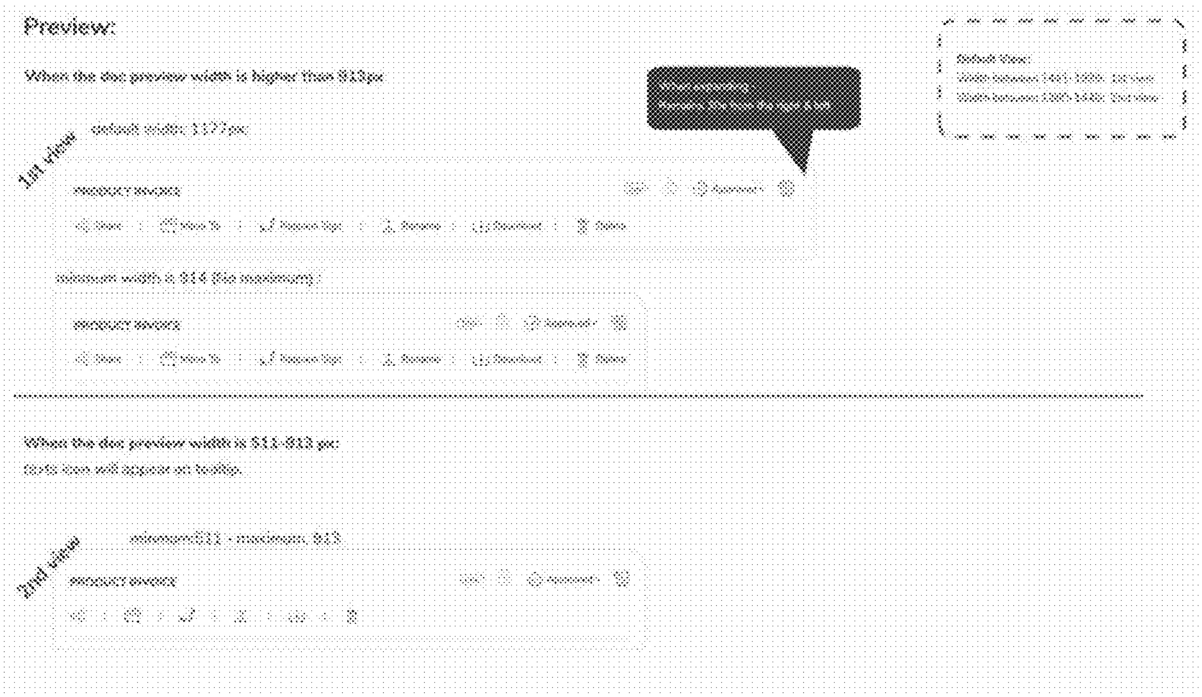
Figure 22.26

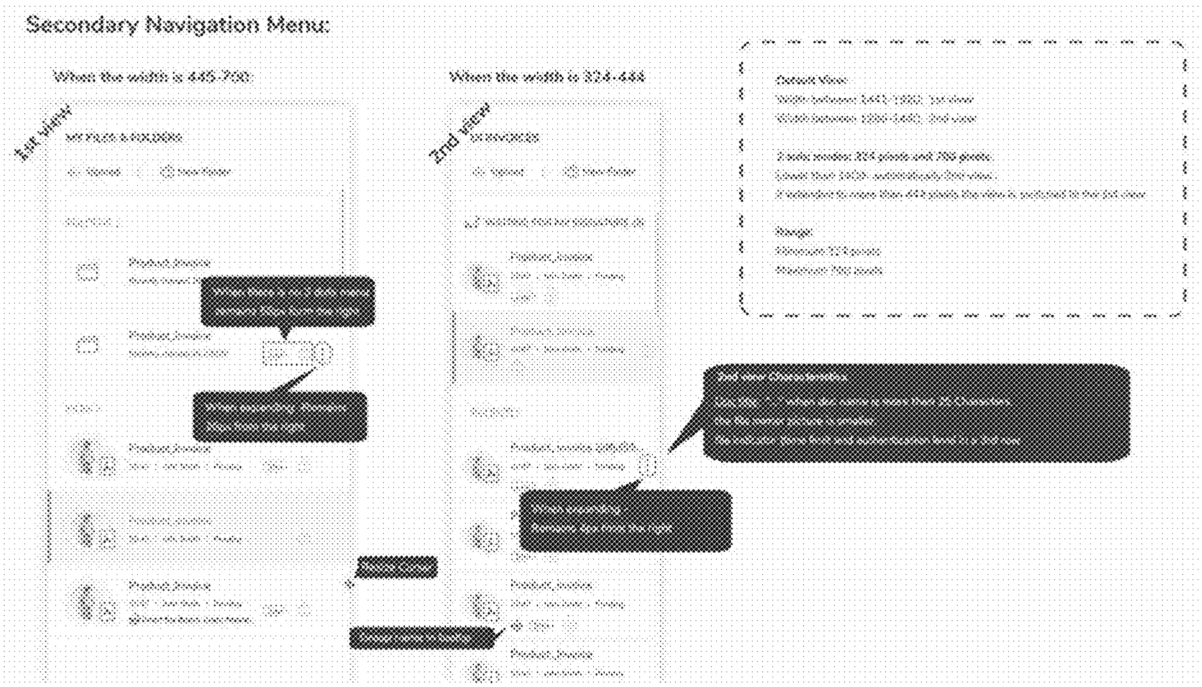
Figure 22.27

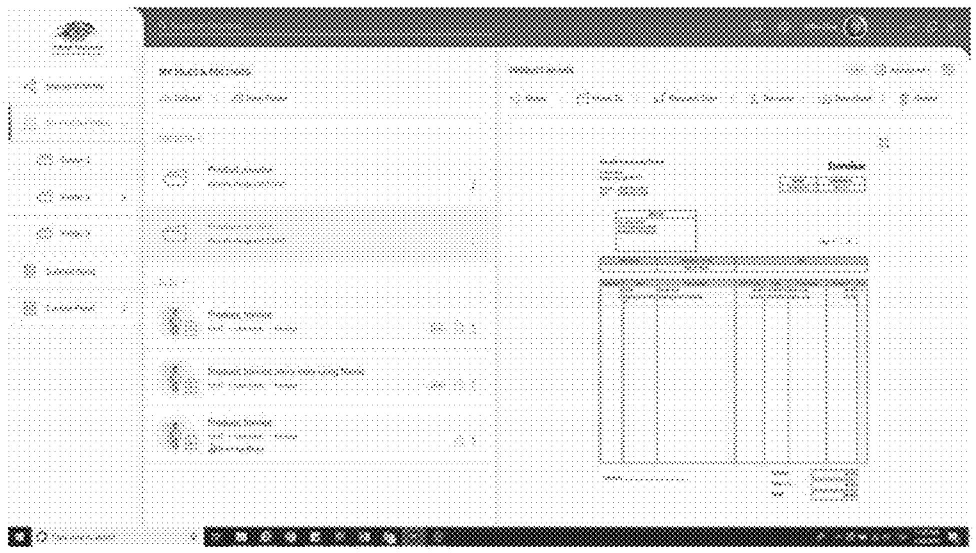
Figure 22.28

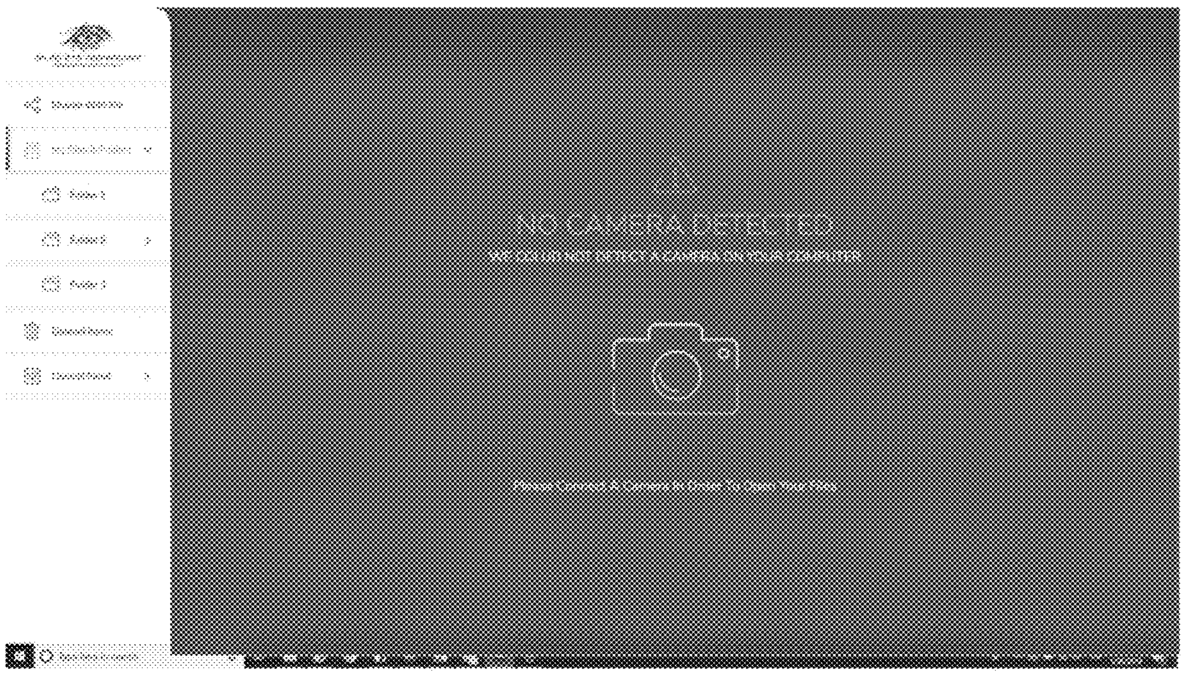
Figure 22.29

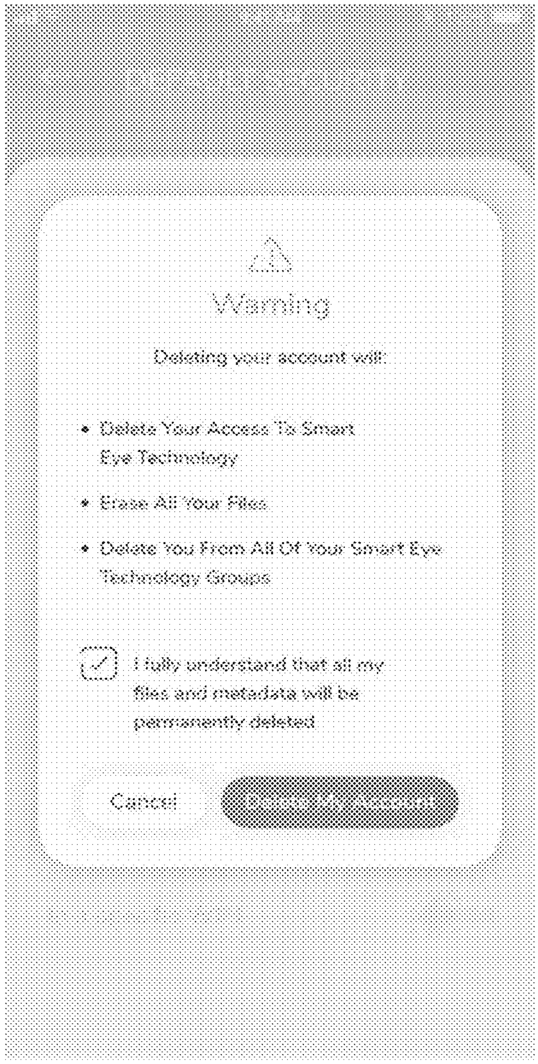
Figure 22.30

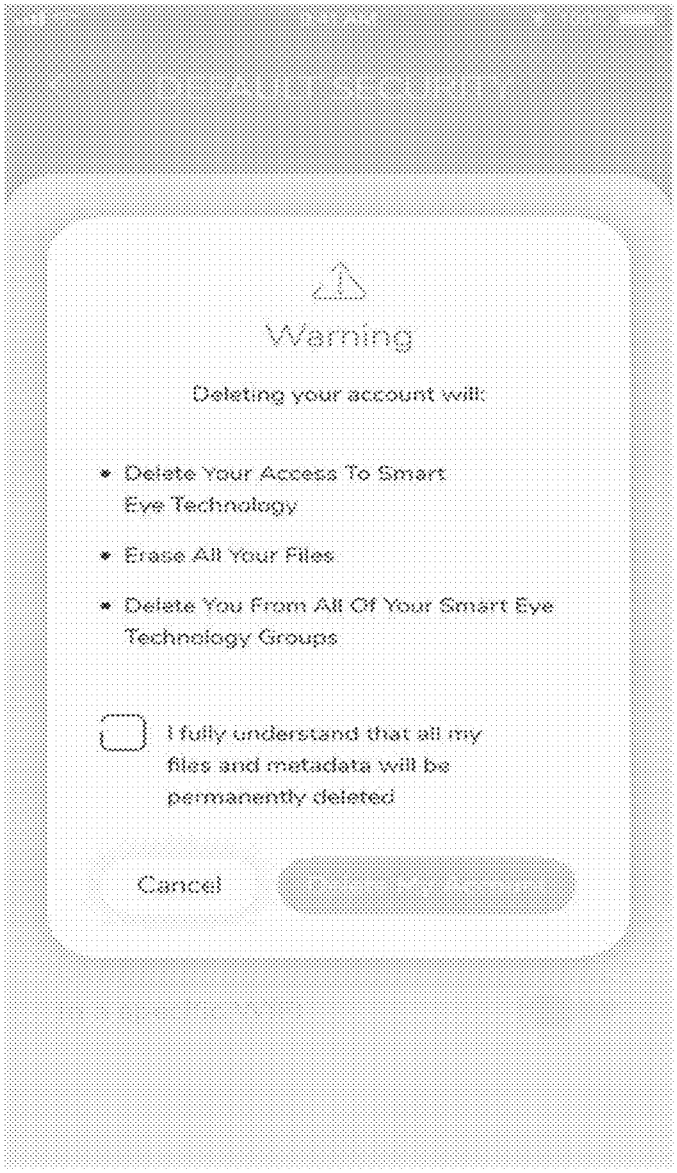
Figure 22.31

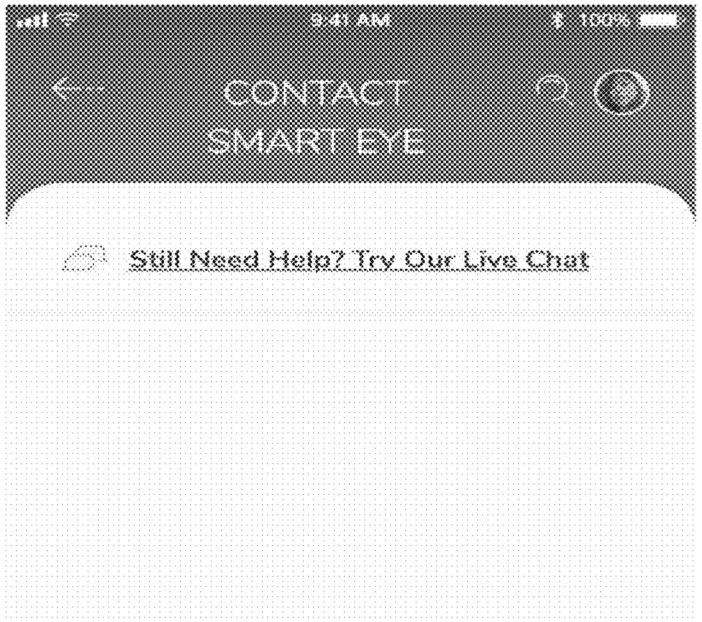
Figure 22.32

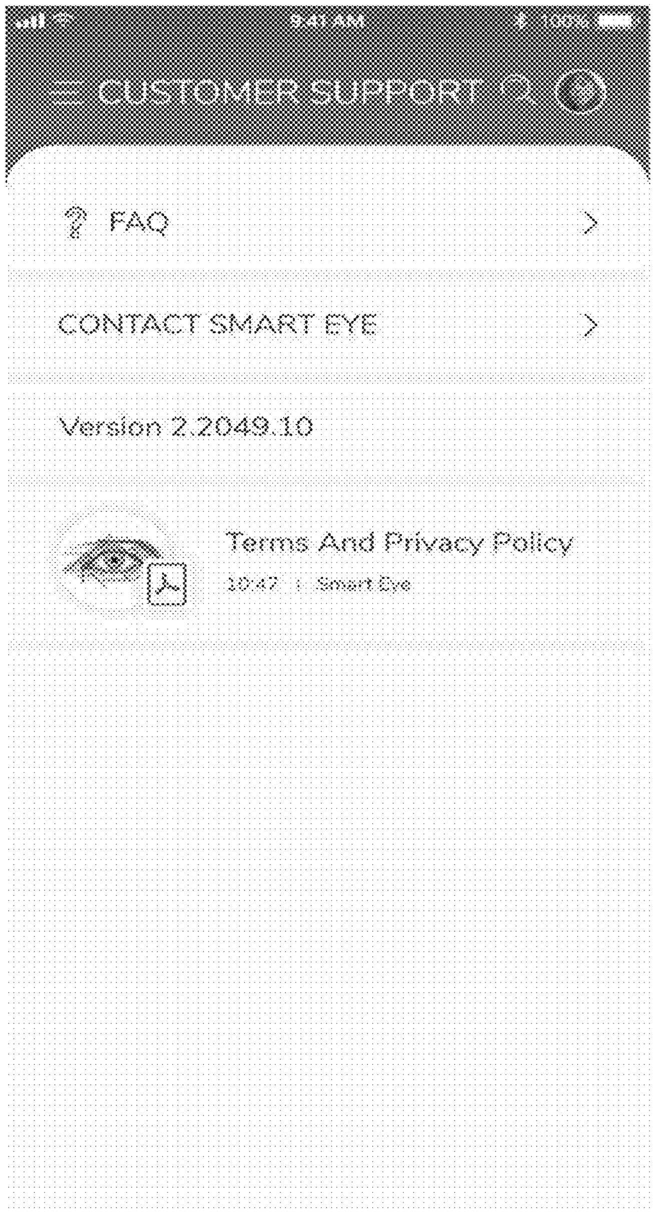
Figure 22.33

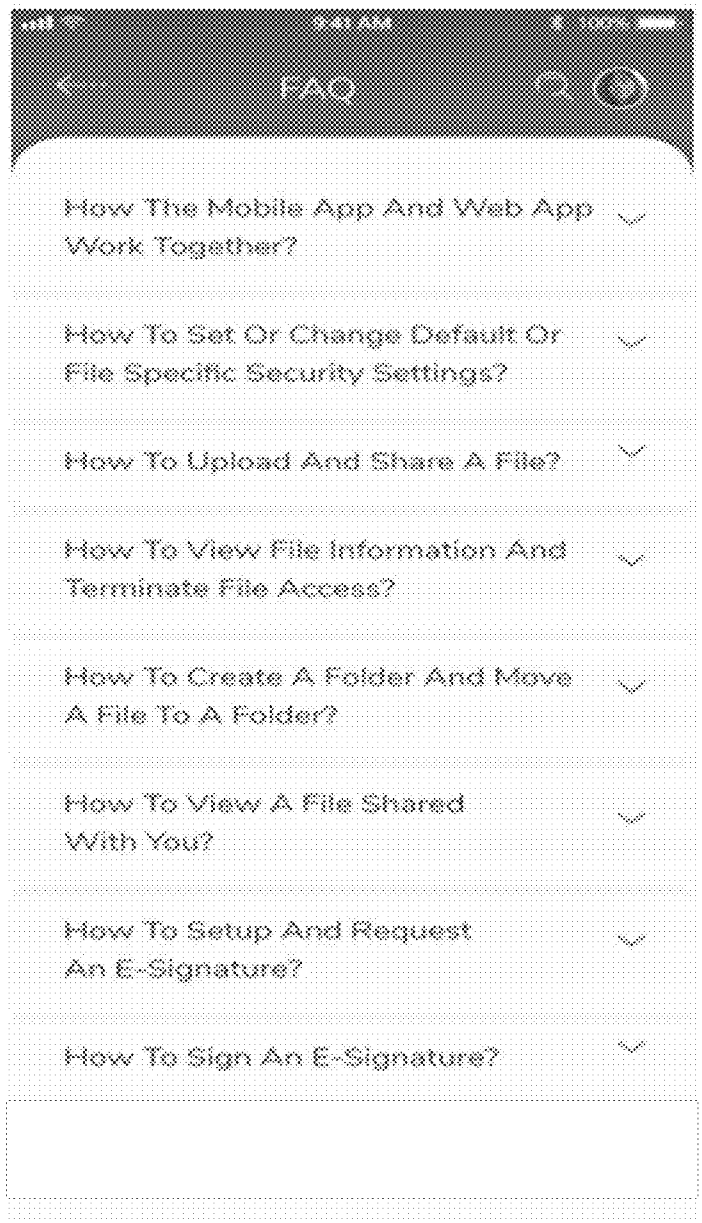
Figure 22.34

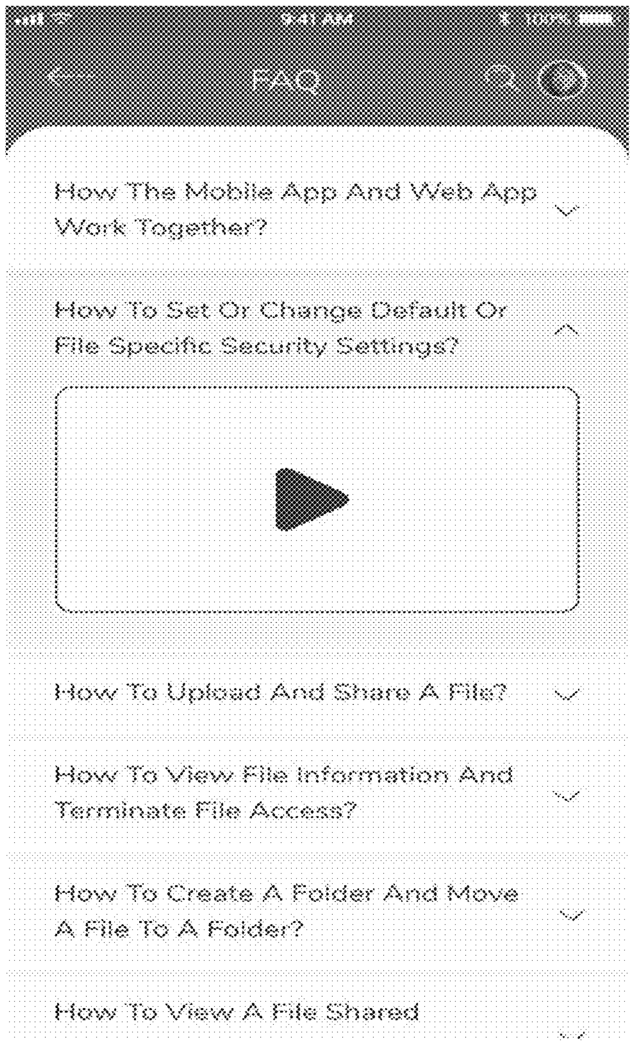
Figure 22.35

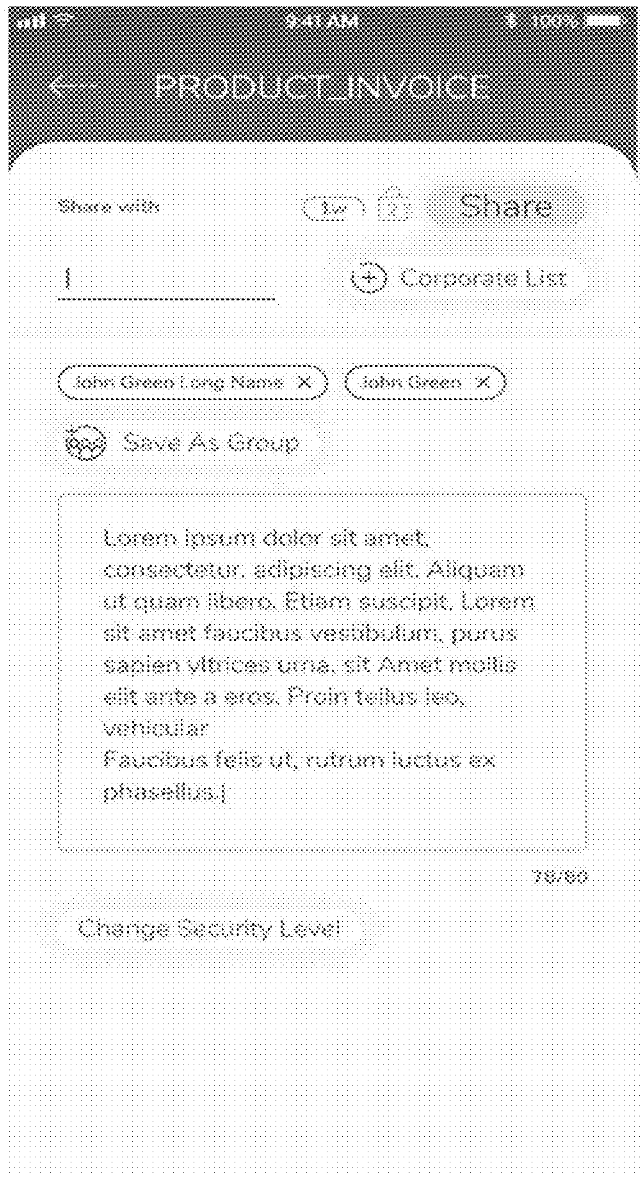
Figure 22.36

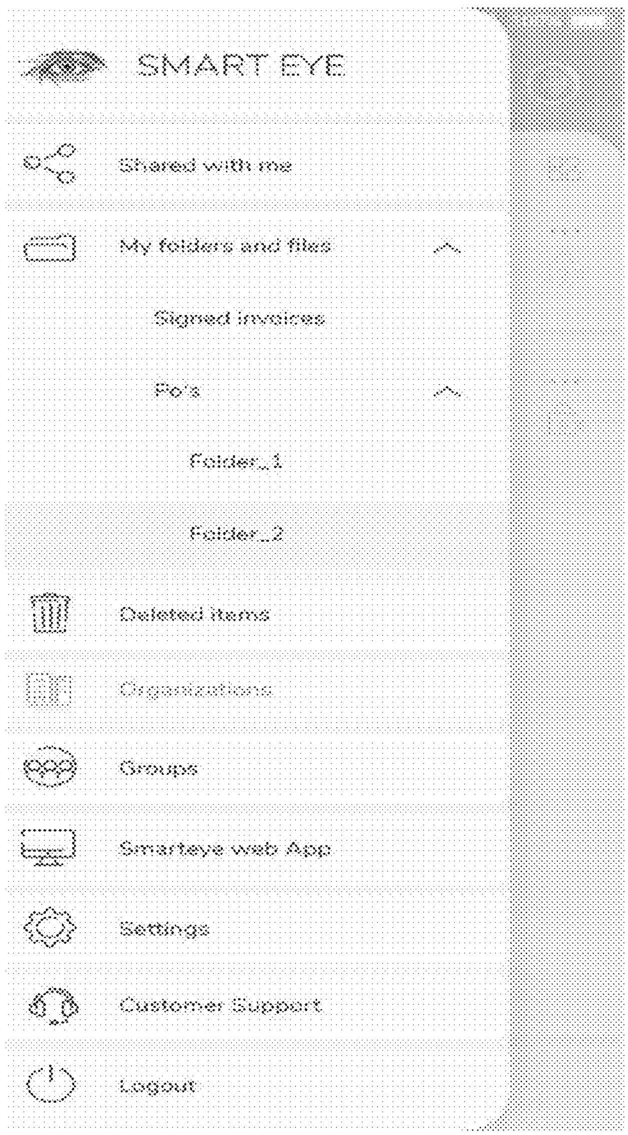
Figure 22.37

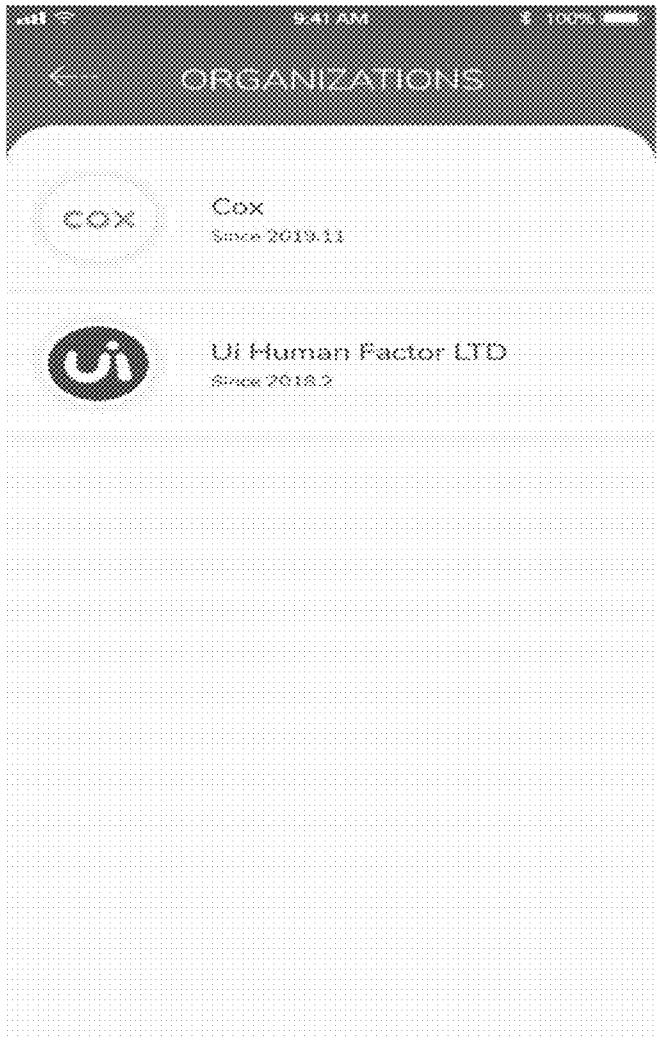
Figure 22.38

Figure 22.39

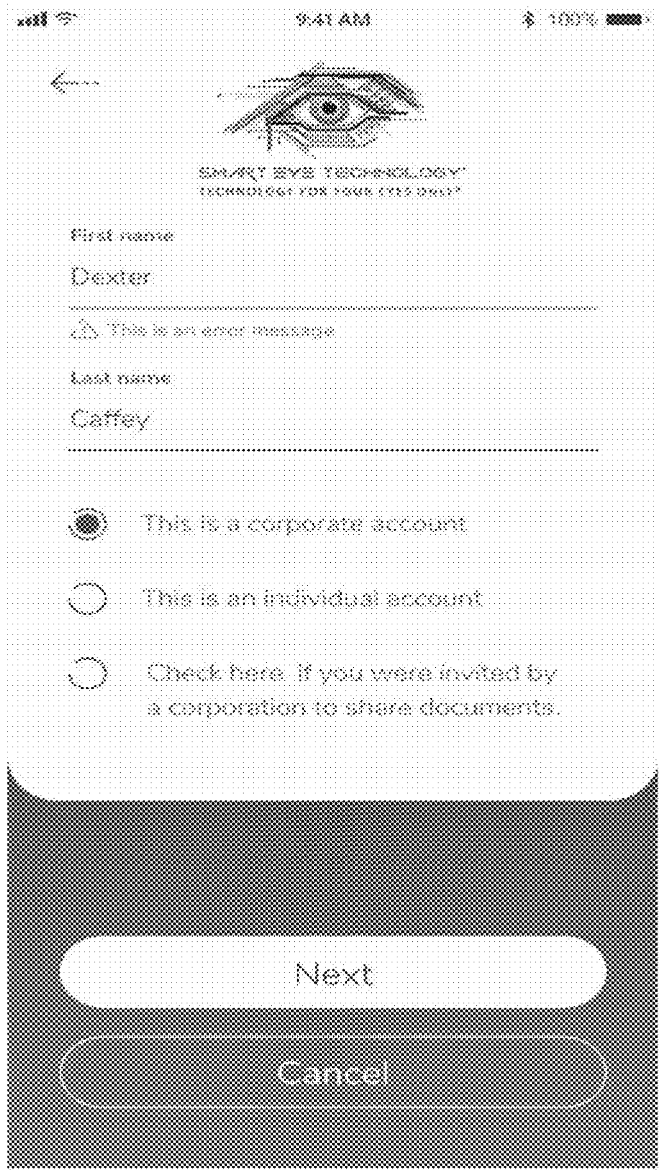
Figure 22.40

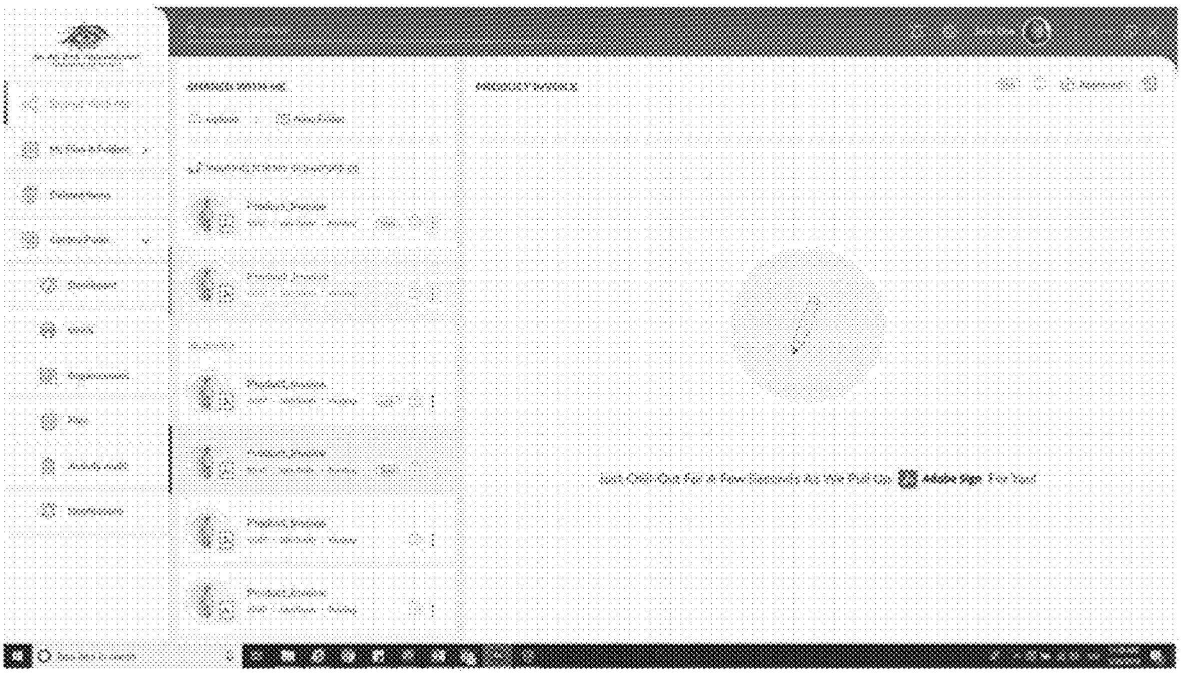
Figure 22.41

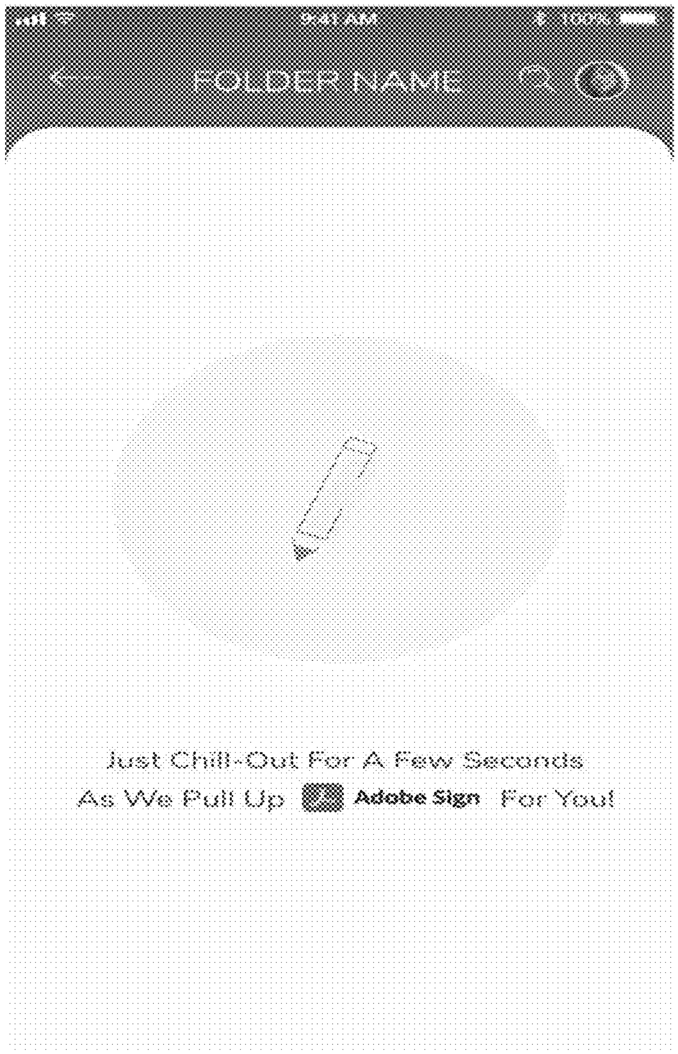
Figure 22.42

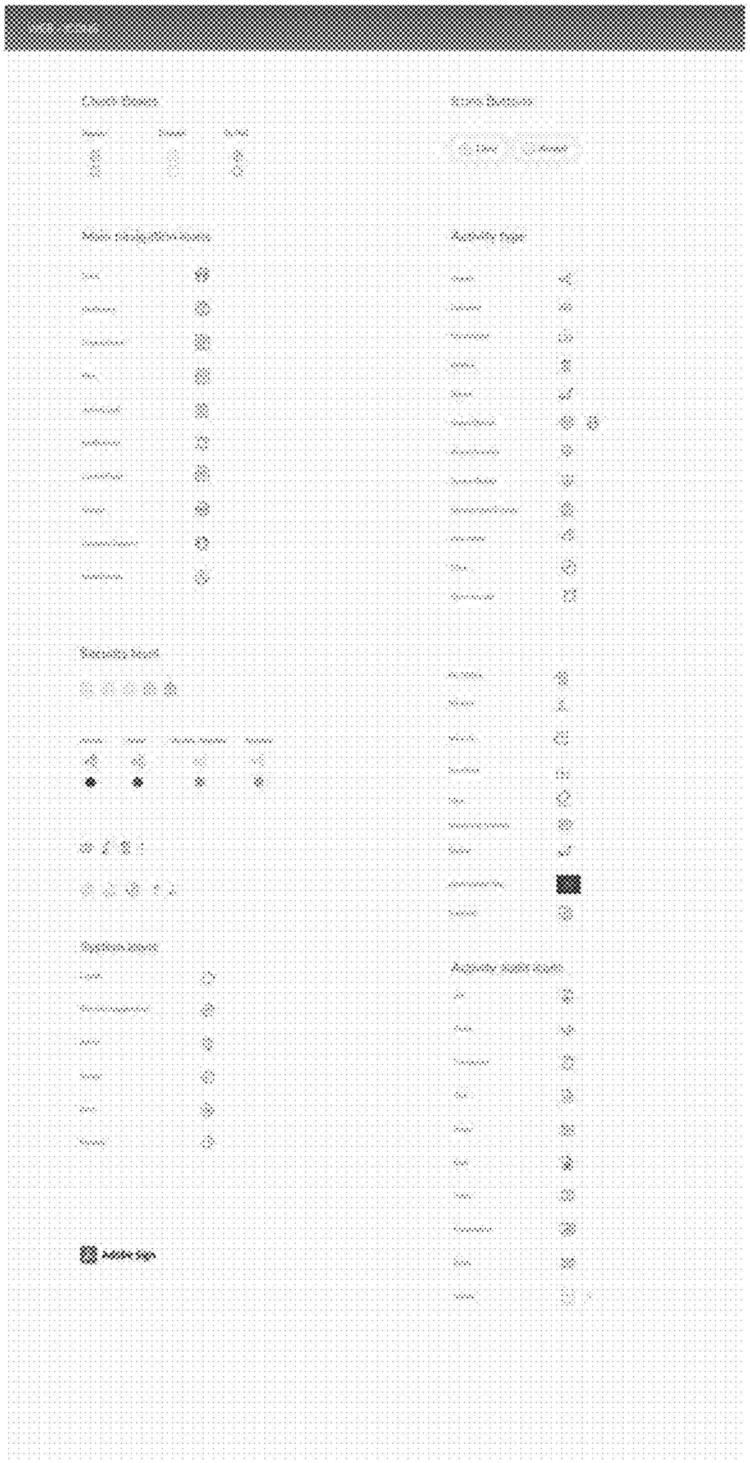
Figure 22.43

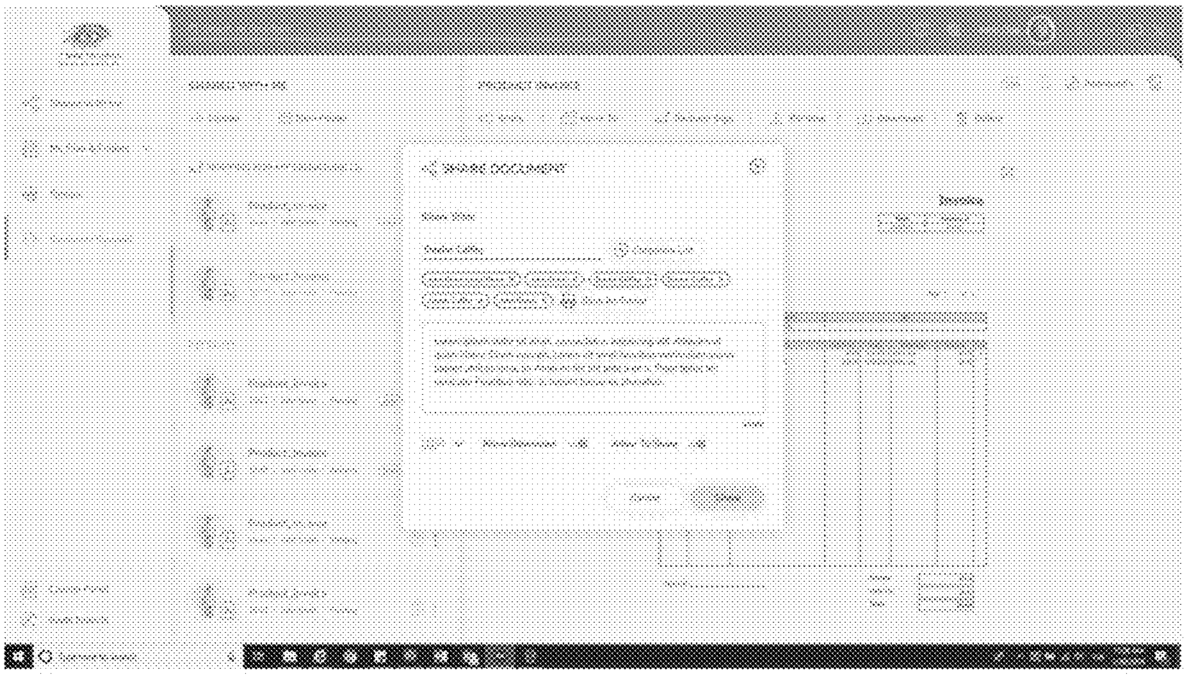
Figure 22.44

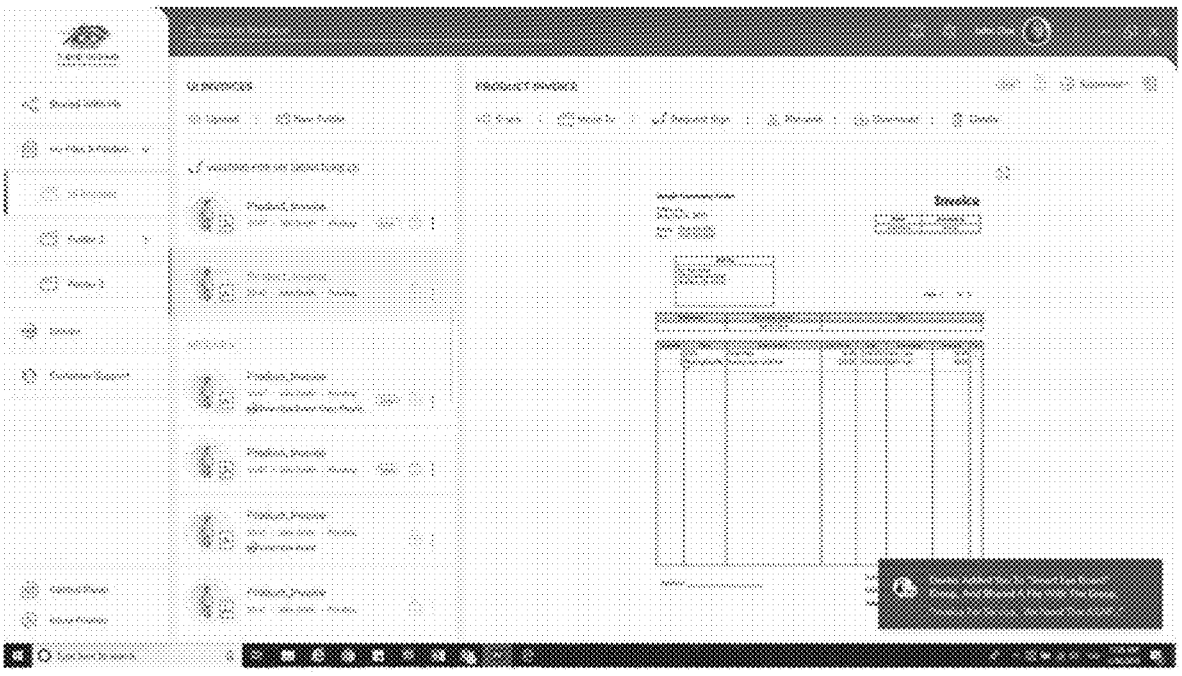
Figure 22.45

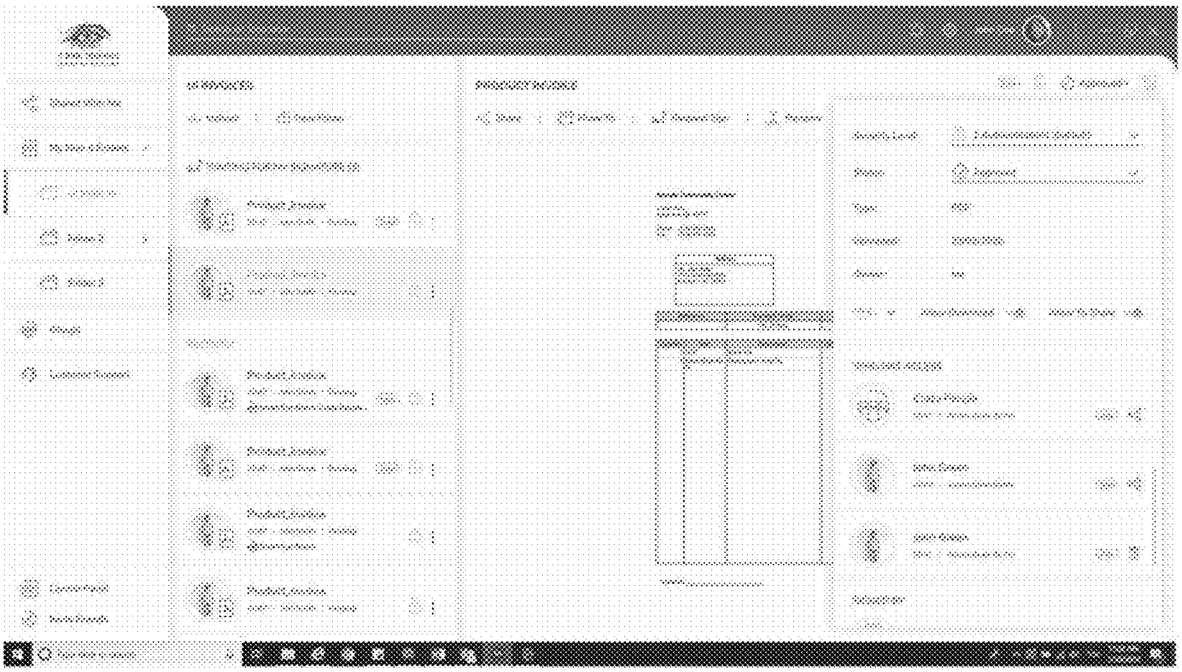
Figure 22.46

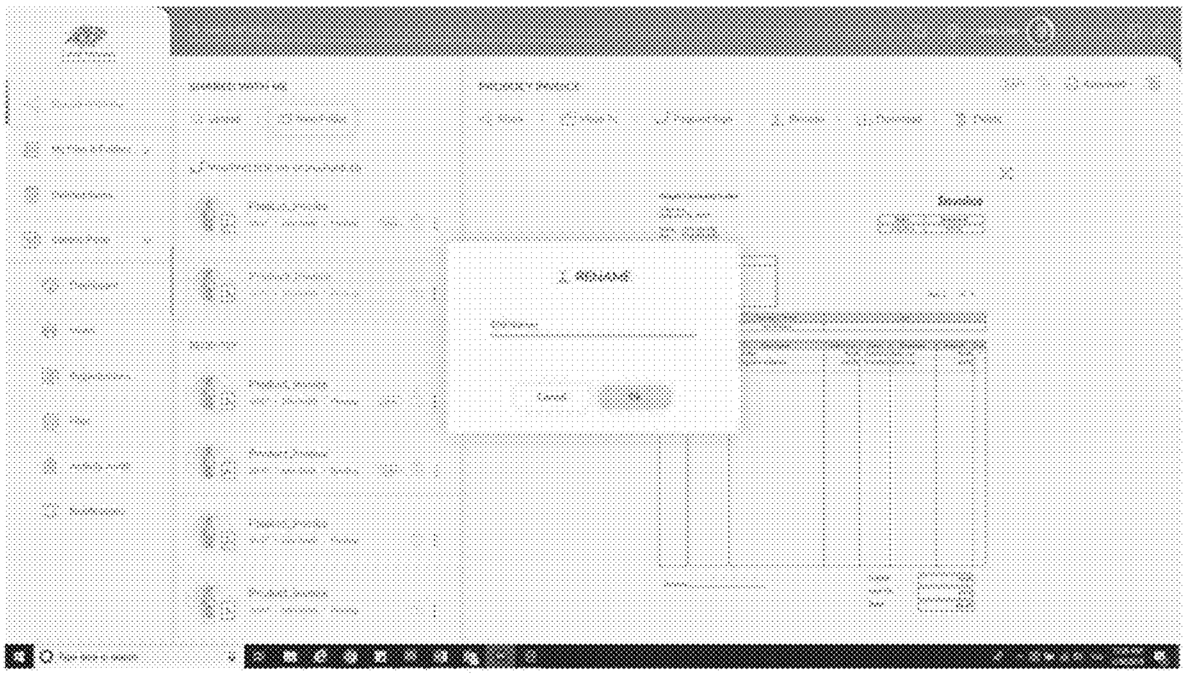
Figure 22.47

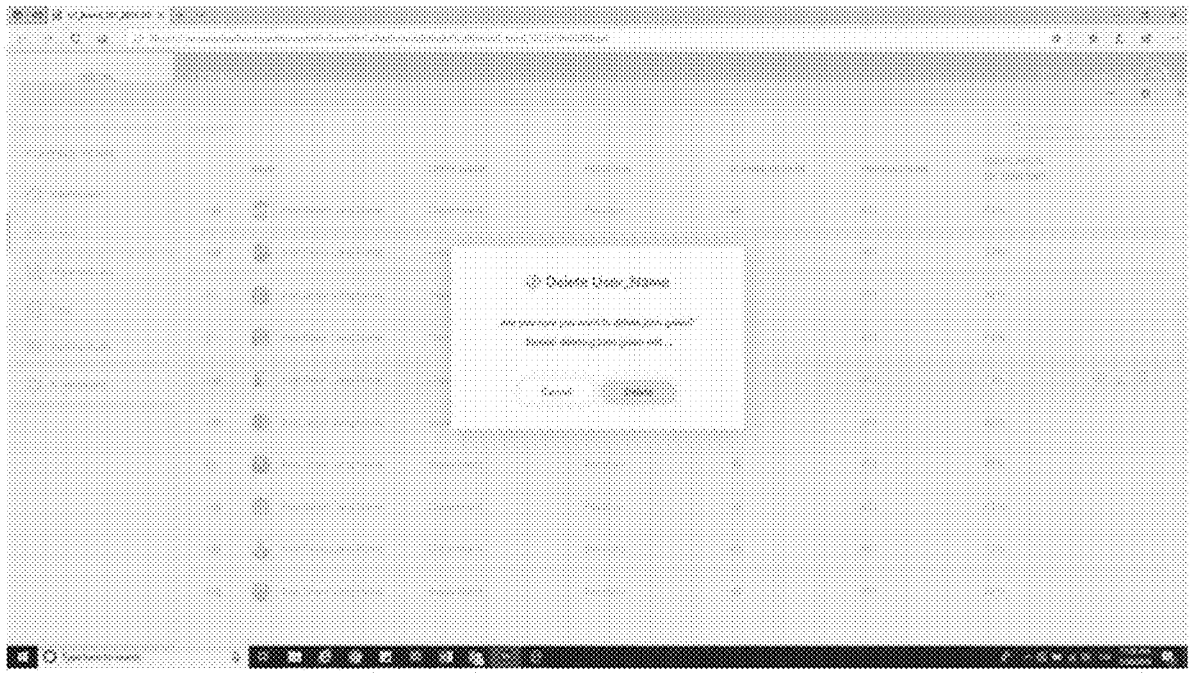
Figure 22.48

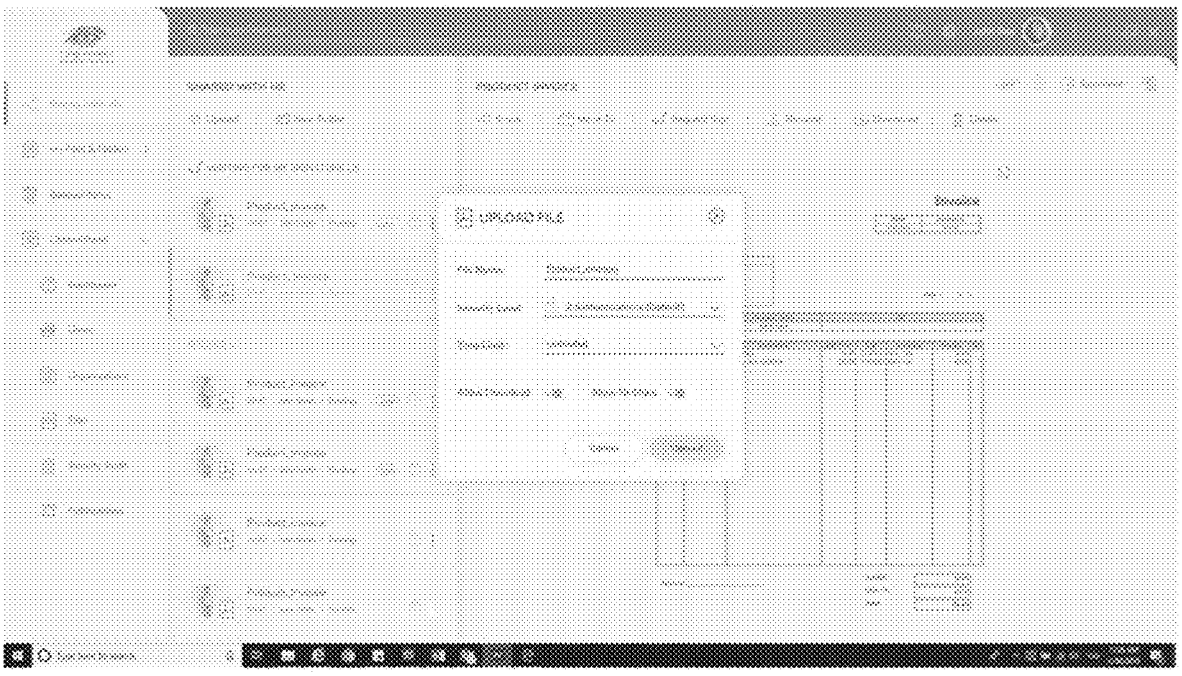
Figure 22.49

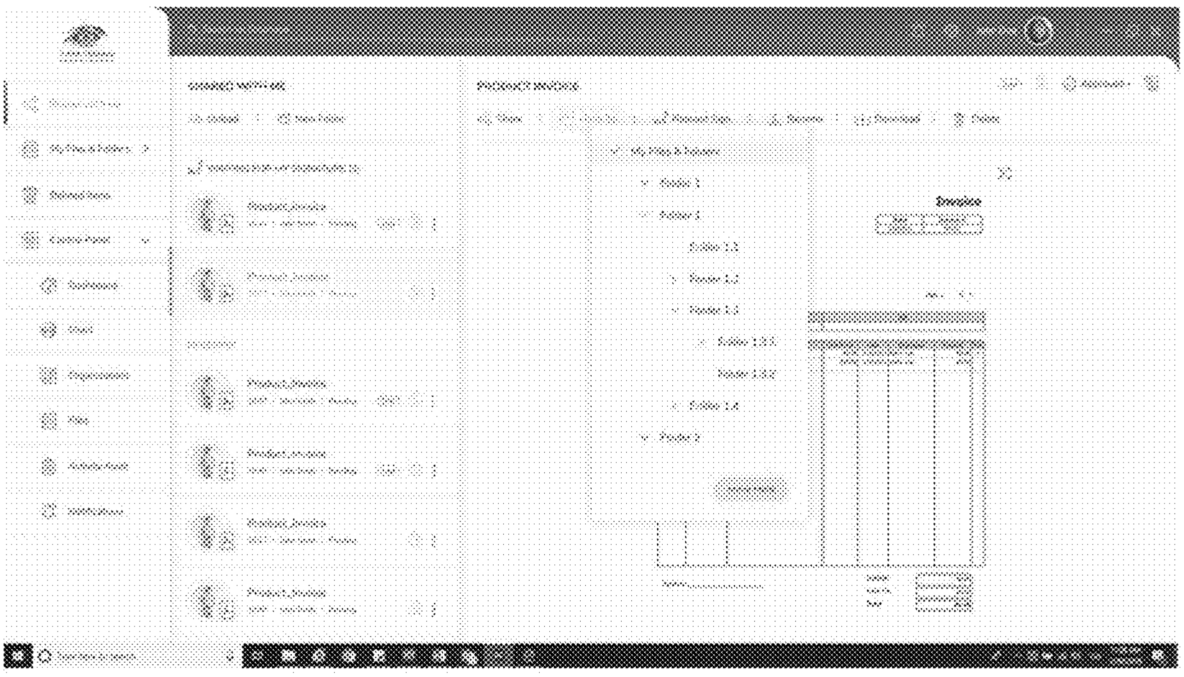
Figure 22.50

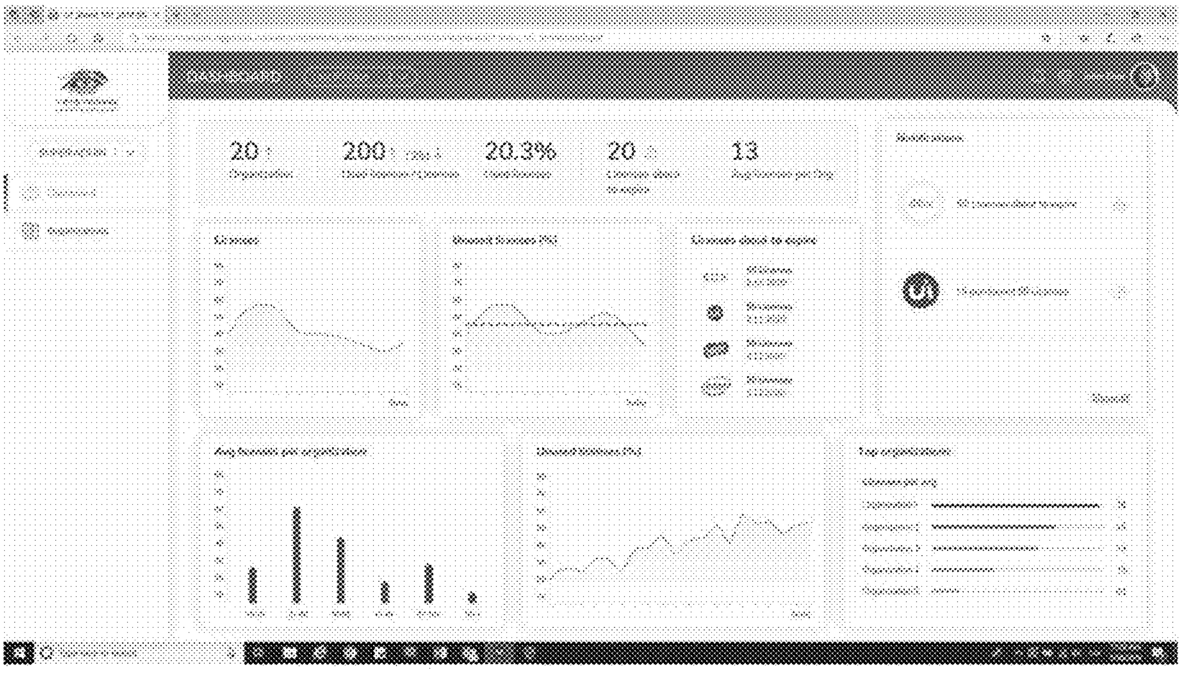
Figure 22.51

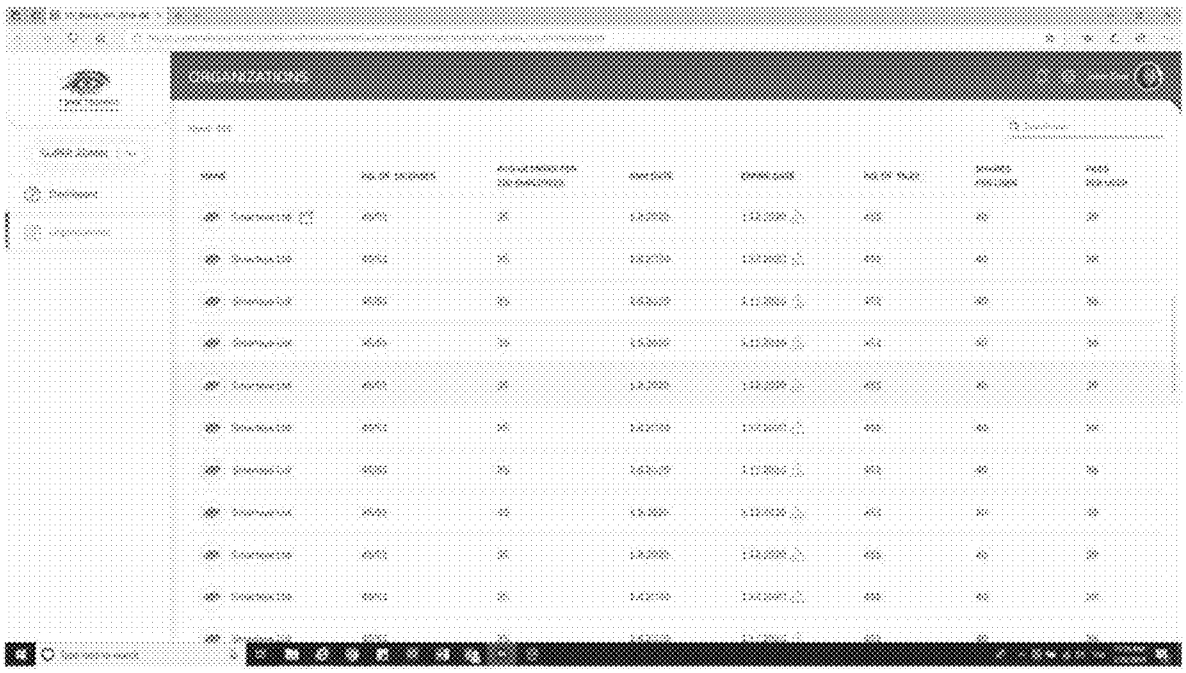
Figure 22.52

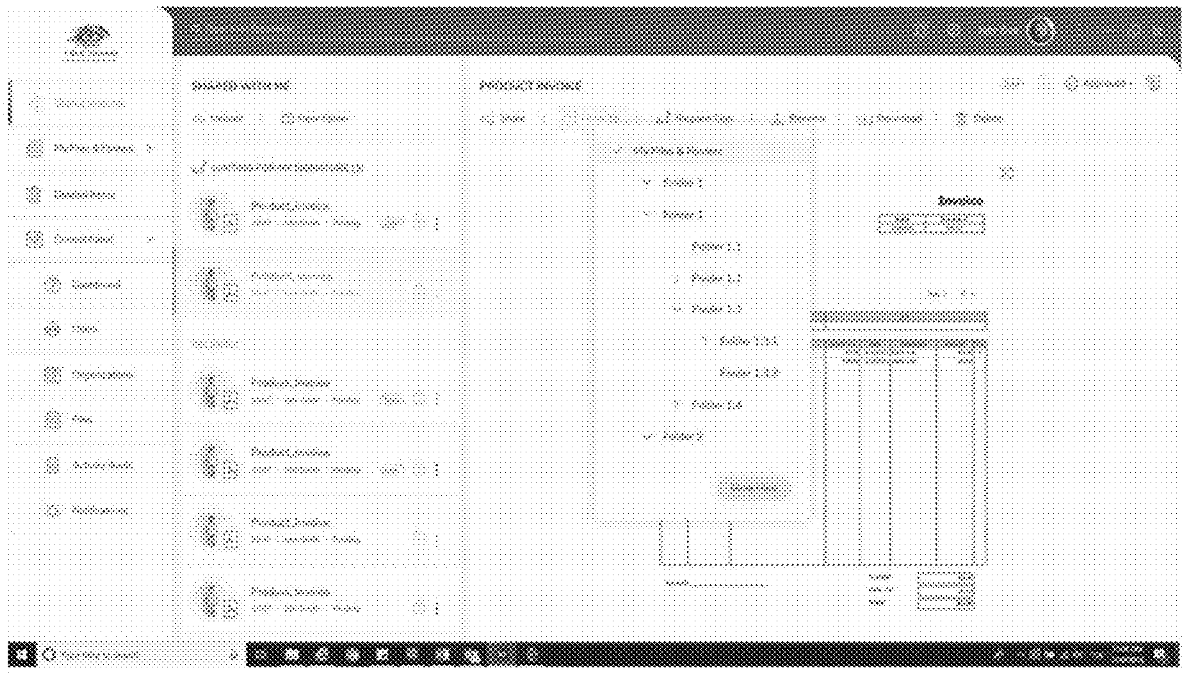
Figure 22.53

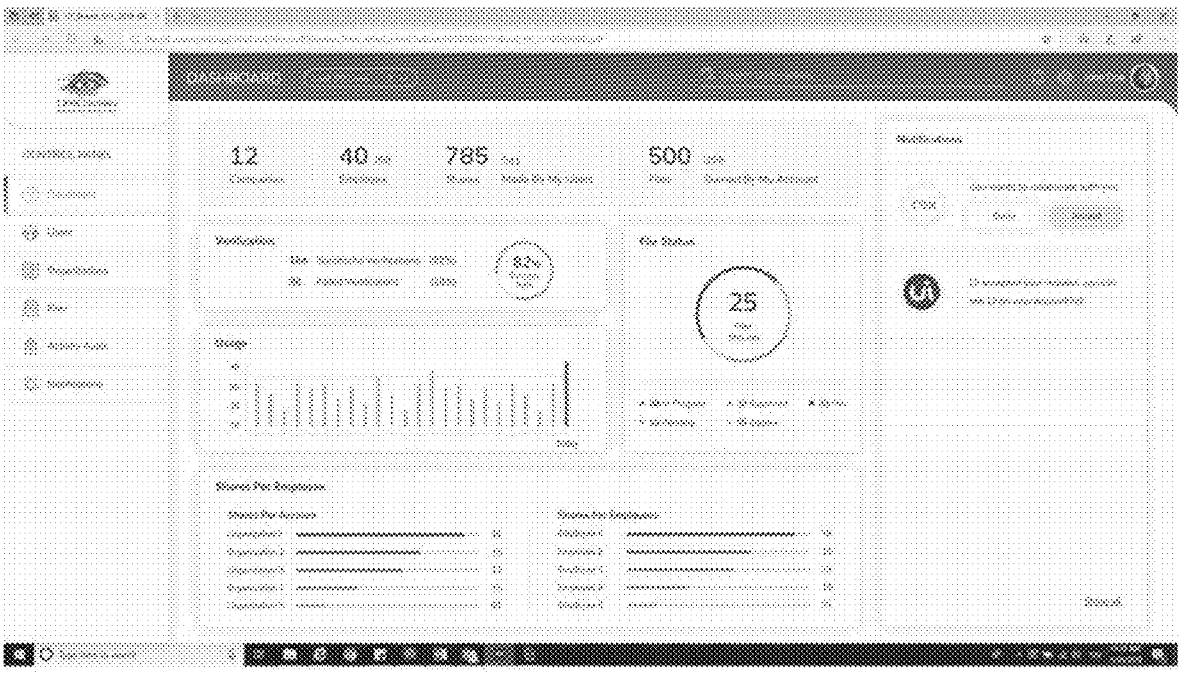
Figure 22.54

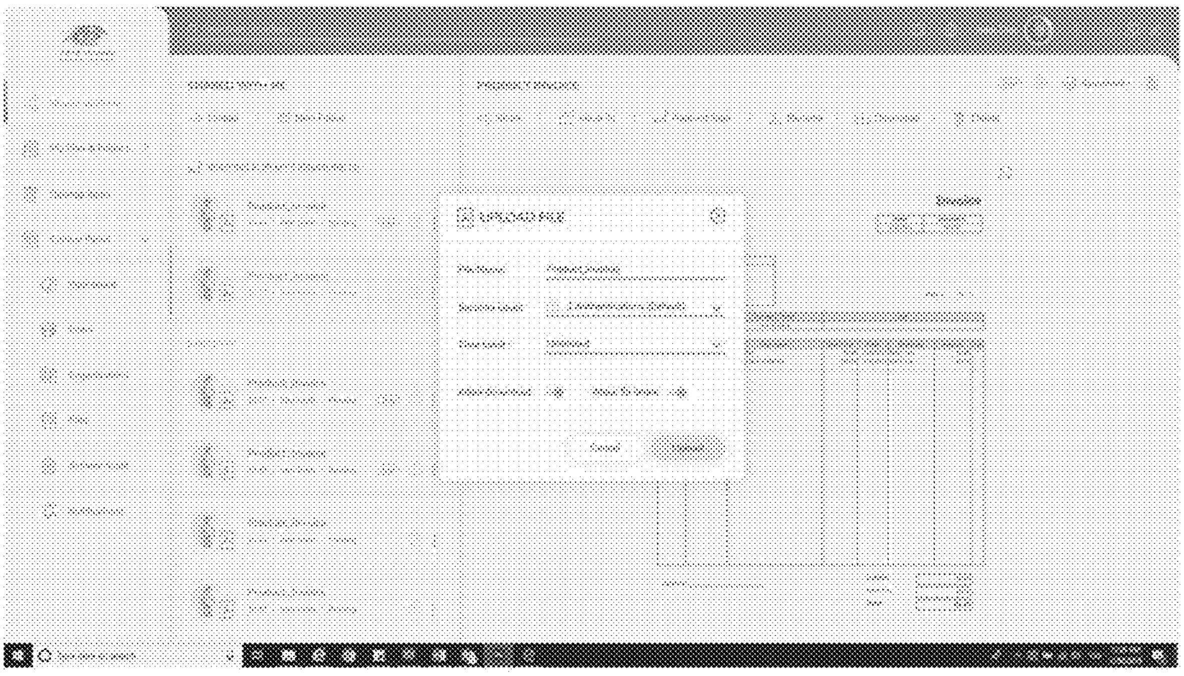
Figure 22.55

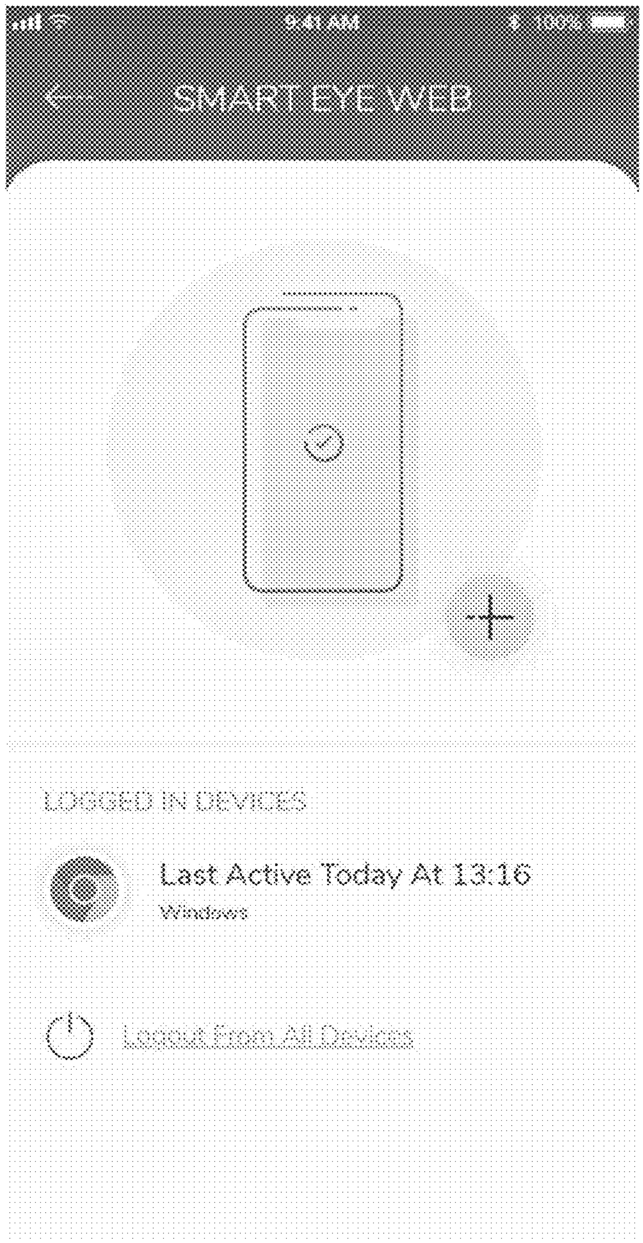
Figure 22.56

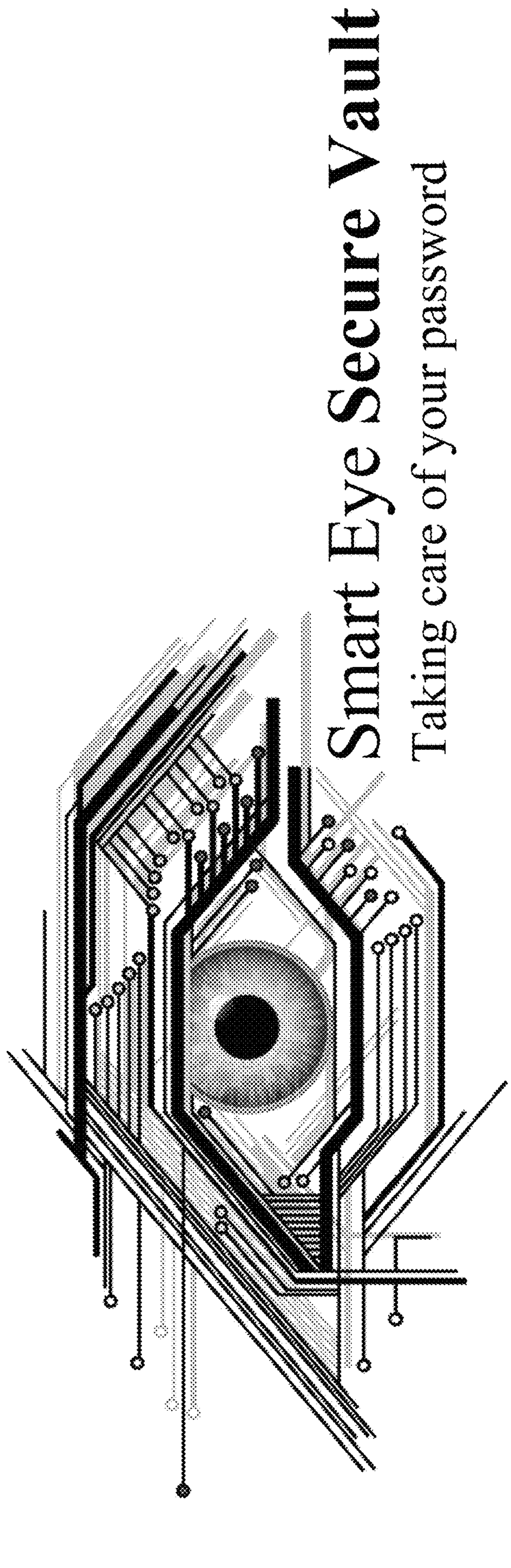
Figure 22.57

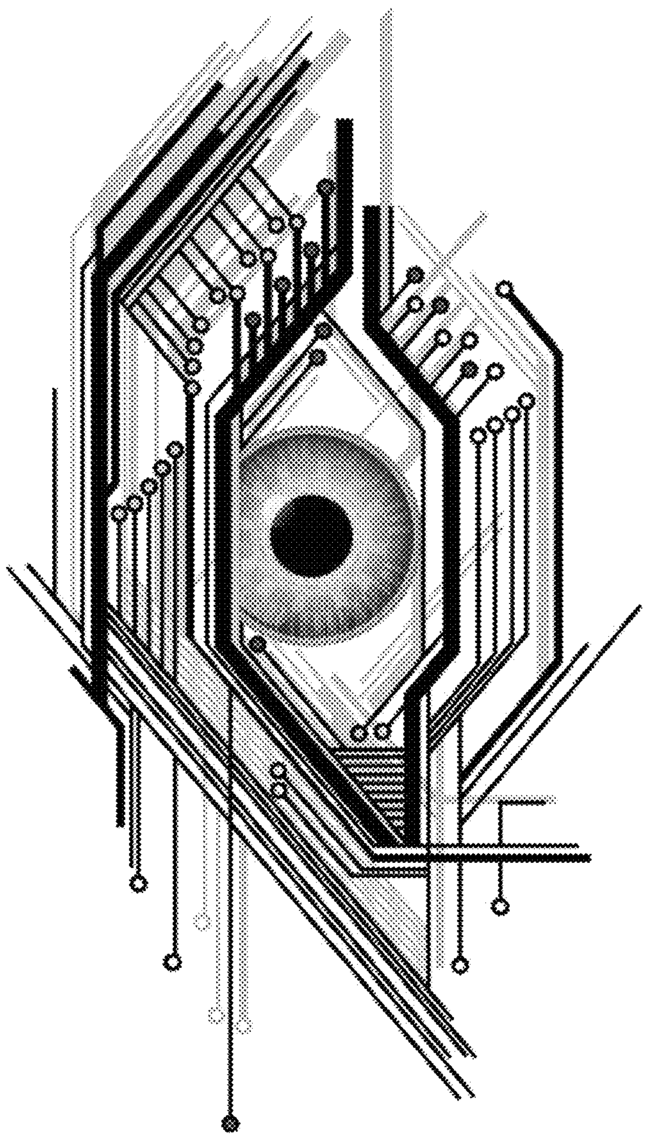
Figure 22.57 Continued

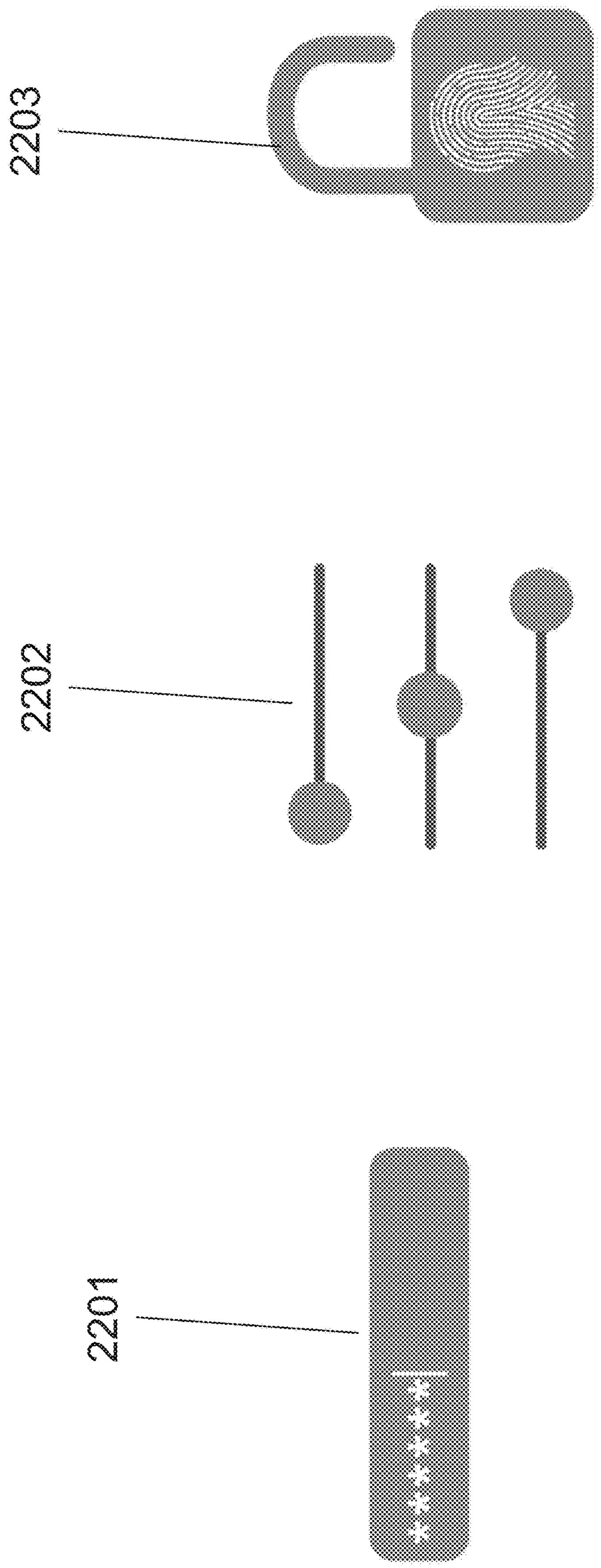
Figure 22.58

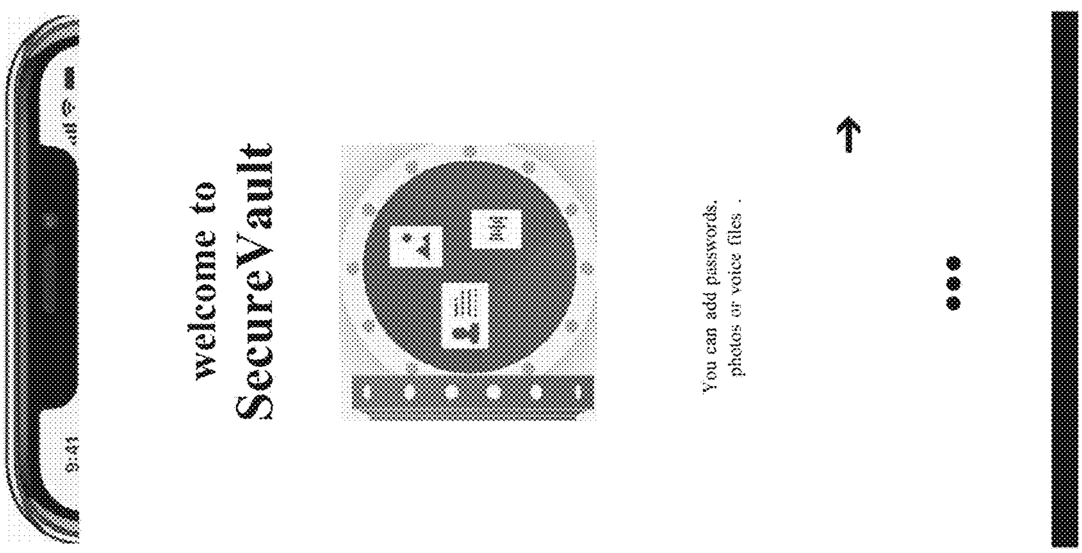
Figure 22.59

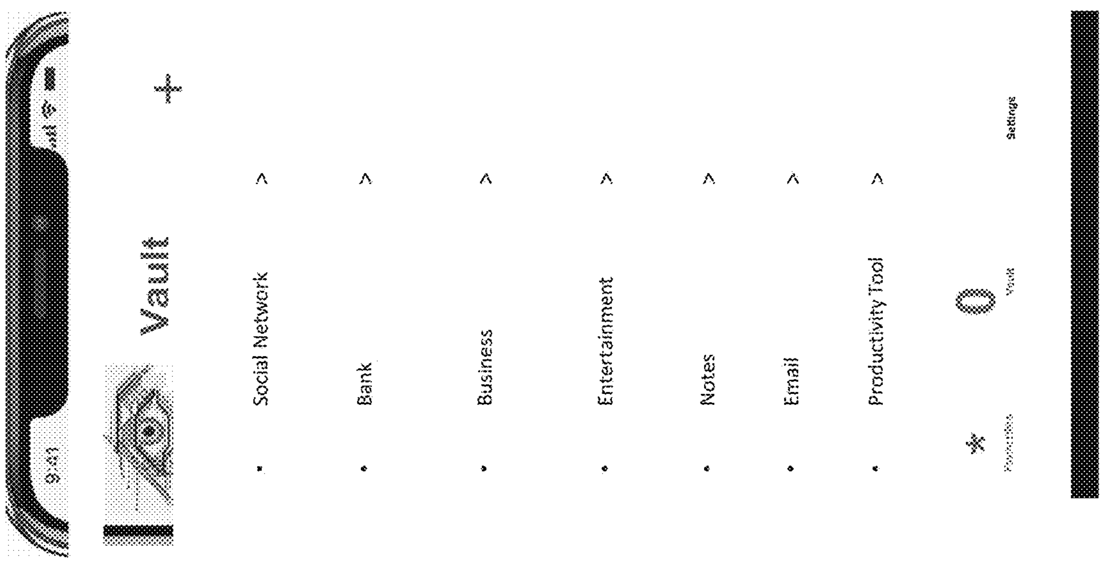
Figure 22.60

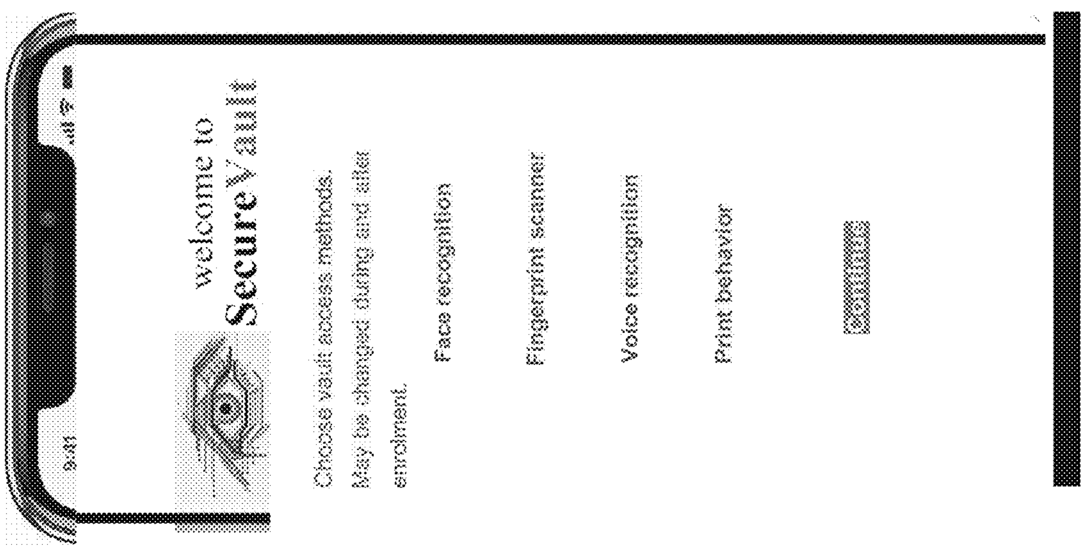
Figure 22.61

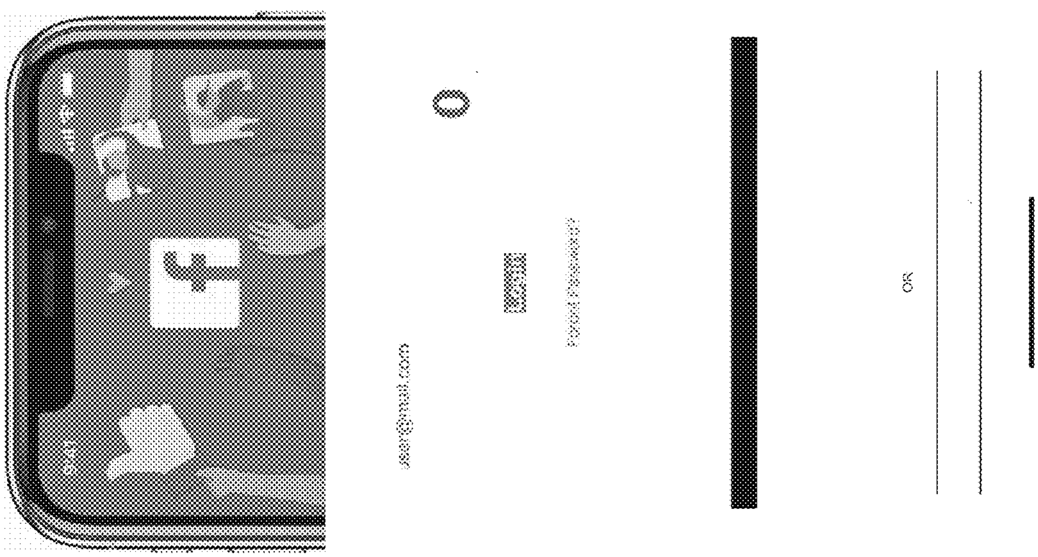
Figure 22.62

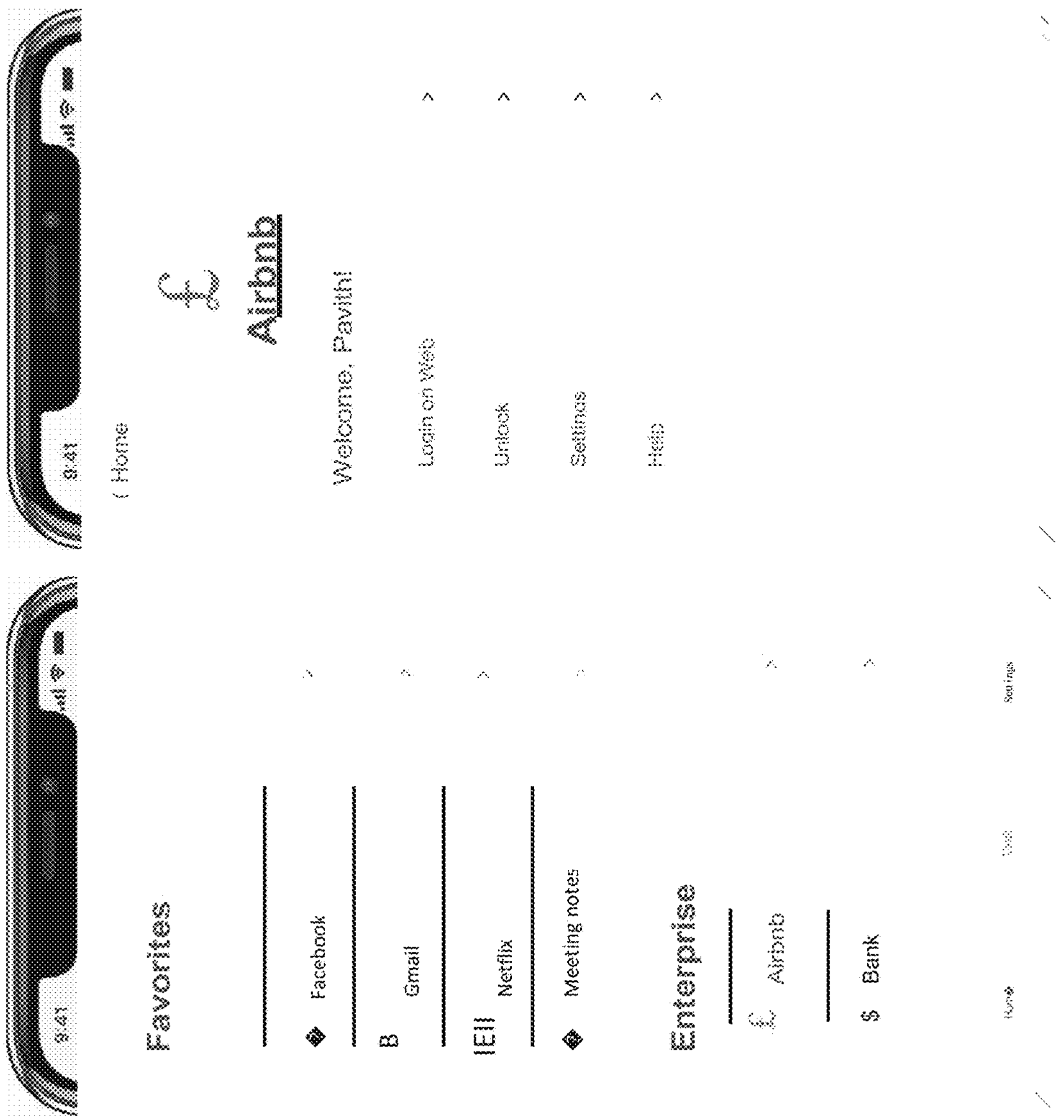
Figure 22.63

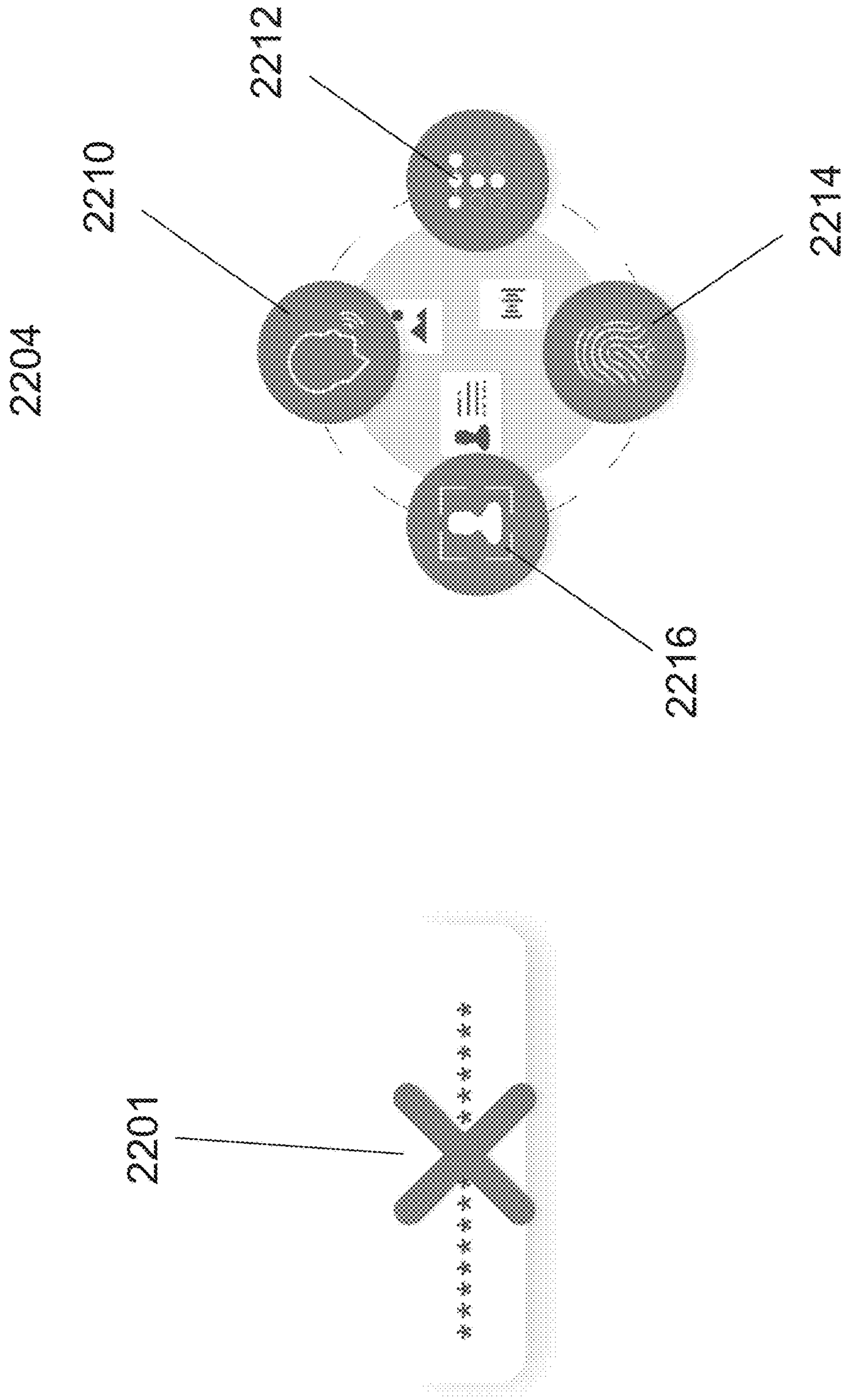
Figure 22.64

SYSTEM AND METHOD FOR SECURELY VIEWING, EDITING, SHARING, AND LOGGING DOCUMENTS AND OTHER FILES AND INFORMATION, AND AUTHENTICATING USERS IN VIDEO AND IMAGES

BACKGROUND AND SUMMARY OF THE INVENTION

It is very easy for a user in a crowded space to look on the screen of a nearby user's portable electronic device. For instance, in a café a user with a laptop open is vulnerable to people at nearby tables or in line waiting to be served. On an airplane, similarly, when a user looks at her phone or tablet, people in nearby seats may also observe what she is reading or a document she is editing. Improvements are required to prevent inadvertent observers of information on electronic devices.

The present invention allows for the creation of a secure environment that allows viewing, editing and sharing of confidential documents, or the like, in public places, without worrying that someone will see the contents.

The invention provides privacy, for example for the purposes of reading documents, in a public environment while having the confidence that you are the only one able to read the document. Privacy may be achieved through methods of identification using biometric features, such as: face, iris or voice recognition. Verification that a real person is viewing the document may also be achieved by pulse recognition, activity audit, or other liveness checks. In one embodiment, the screen will shut down when more than one person looks directly at the screen.

A second layer of security in the form of liveness checks may also be provided. For example, this may be accomplished using pulse detection, in one embodiment.

In one embodiment, the present invention may be implemented as a hardware product, a software product, or a combination thereof.

As will be explained in further detail below, some of the features of the present invention may include:

- Primary person identification—This is a "Log in" to a secure environment.
- Liveness—Help verify that a real person is trying to "Log in".
- Continued identification—Check that the authorized person is still reading the document.
- Backup identification—Additional method to check that the authorized person is still reading the document; this may be needed if the first method fails.
- Confidentiality—Verify that only authorized people are looking at the screen.
- Pause security—Give access to people who are not authorized, to read the confidential document.
- Several secure profiles—to control the security level of the documents, for example in a public place, a person may use the most secure setting and at the home least secure. Secure profiles may vary depending on location.
- Identify secure profile according to location/Wi-Fi network—it can help understand which secure profile needs to executed.
- Behavior recognition—help identify people based on style of typing text (e.g. average delay between striking the keys when typing a sentence) or based on how a person answers the phone or writes letters on a touchscreen, sometimes called print behavior.

In various embodiments, the present invention may be implemented on a variety of platforms, such as mobile device, tablet, laptop, desktop, etc., using a camera, microphone, etc.

For using some applications and systems, in the past a user will often need to perform a log-in operation, using a user ID and password that can identify the user. However, a password leaves the user with a very low level of protection. Most users are not fully aware of the dangers of cyber security these days and use passwords that are easily hackable. The use of more elaborate passwords results in forgetfulness and can, in some cases, lead to keeping a log of all passwords, which obviously contradicts the entire purpose of a complex password.

In contrast, biometric identification gives rise to a solution serving both purposes. The use of biometric technologies makes sure that the user will never forget a password again and simultaneously provides a very high level of security.

Biometric identification methods include, amongst others, face recognition (identification based on an image or video of a subject's face), iris recognition (identification based on an image or video of a subject's iris), fingerprint (identification based on a subject's finger print), voice recognition (identification based on a voice sample of the subject) or combination of any of the above methods, or other methods.

Hacking a biometric system is not simple at all, and yet it is possible. Many recent documented cases have been publicized, such as the fooling of the Samsung Galaxy S8 iris scanner back in May 2017. The iris scanner was fooled using a camera, a laser printer and a contact lens. In September 2017, the researchers were able to bypass Apple's FaceID with a 3D printed mask of the expert's face, made of stone powder. The total cost of the materials used was approximately $150.

A solution for avoiding such hacks is, as taught according to the present invention, the use of "liveness checks." A liveness check allows a biometric application to discriminate between the real biometric factor of a subject and artificial copies of those features making up the biometric factor. Liveness detection reduces the likelihood that spoofing attempts will succeed, and as such reduces the false acceptance rate. An example of a liveness check is facial recognition software requiring the subject to blink with his or her eyes, and smile or give a head nod. These are motions or actions cued by the software and requiring a response by the user. However, even these gestures are also quite easily faked using a mask with holes in it.

As will be described further below, these limitations may be overcome, such as by using pulse detection using a video that can be obtained using a dual camera array.

A secure environment must be protected at all times because identifying a person in the beginning of a document viewing/editing is not enough. A solution according to the present invention is that during the viewing/editing of the document, the identification process must run in the background and yet provide the highest possible level of security by performing an identification screening every X seconds. In addition, a backup identification is offered as a precaution in the event that the continuous identification fails.

For this method to be seamless and yet achieve the highest levels of performance, a weighing method is devised, comparing the validity of verification from the different methods.

A secure environment should provide complete confidentiality, which means that it is necessary to determine that only one person looks at a device in a given time. In a case where the system detects a breach, by detecting another face looking at the camera, meaning that another person is attempting to violate the privacy of the prime user, the system may provide an alert or at certain levels of confidence, even shut off the screen.

Behavioral profiling may be used in order to give the user the best secure environment, while not harming the convenience of use and improving the user experience. Behavioral profiling is a definition of a person by his habits, location, Wi-Fi to which he is often connected, often visited sites, matter of text input, the way in which a person holds his phone, etc. It is best to secure documents by using a behavioral profiling score for defining security levels that need to be applied. For example, by using GPS coordinates or a Wi-Fi network to define a score that gives lower score if a user is in a public place, the security level needs to be set on a higher level. A medium score would mean a person is in a work place, and the security would be at a medium level. A high score corresponds to, for example, the user being at their home, for which will result in a lower level of security.

In one embodiment, behavioral profiling scores can be calculated according to a sensor that appears in a device. For example, in a smartphone/tablet a location sensor, gyro sensor, Wi-Fi/mobile module may be provided that can provide relevant information. For laptops or desktop, location may, for example, be obtained according to IP address, the browser history may be checked, and many more components can be learned from different sensors and modules.

Behavioral profiling may be used in addition to existing biometric methods but, in one embodiment, behavioral profiling alone cannot supply a secure environment if biometric methods are not also employed.

BRIEF DESCRIPTION OF THE FIGURES

The accompanying figures depict the structure and operation of various aspects of the present invention, in one embodiment.

FIGS. 16.1 to 16.64 depict various typical screenshots of the present invention, with corresponding function.

FIGS. 17.1 to 17.99 and FIGS. 18.00 to 18.39 depict various additional and typical screenshots of the present invention, with corresponding function.

FIGS. 22.1 to 22.56 depict various screenshots of the present invention involving groups, administration, help screens, and the like.

FIGS. 22.57 to 22.64 depict various aspects of a secure vault and various methods of login.

DETAILED DESCRIPTION OF INVENTION

Biometrics

Biometric technologies are the science of detecting and recognizing human characteristics using technologies that measure and analyze individual biological data. The way we are genetically composed creates identifiable traits that can uniquely represent us as individuals. DNA can be used to distinguish between two individuals, for identical twins. Some biometric traits such as fingerprints and iris prints are distinctive even among identical twins.

Current antiquated mechanisms such as keys, passes, tokens, passwords, PIN's and secret questions are easily stolen and shared. However, biometrics is the method of identifying a person based on their distinctive physiological or behavioral characteristics and these attributes cannot be shared, misplaced or forgotten. Into the future, it is becoming increasingly important to have confidence in secure authentication of electronically stored information.

Figure 1:
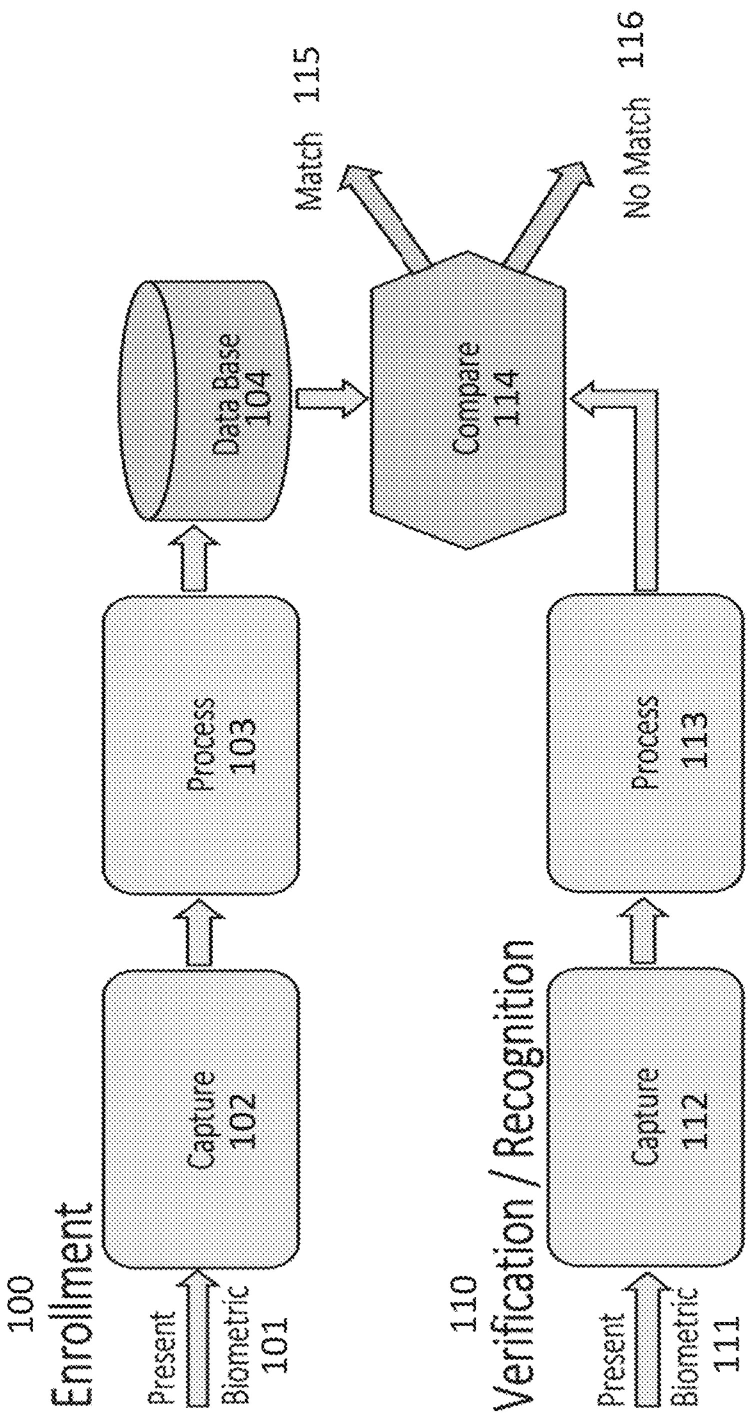
FIG. 1 is an overview of the enrollment and verification/recognition process of the present invention.

FIG. 1 provides an overview of a typical biometric enrollment 100 and verification and recognition flow 110.

In enrollment step 101, a user's biometric information is presented, captured in step 102, processed in step 103, and stored in a database 104. In the verification/recognition steps, biometric information is presented 111 and captured (step 112), processed in step 113, and in step 114 the biometric data processed in step 113 is compared to the enrollment biometric data stored in the database 104. The result is either a match (115) or no match (116).

There are different types of biometric processes and techniques that may be used, including: for example: facial biometrics, finger print recognition, speaker biometrics, liveness checks, iris recognition, etc.

1. Facial Biometrics

The face is an important part of who you are and how people identify you. Except in the case of identical twins, the face is arguably a person's most unique physical characteristics. While humans have the innate ability to recognize and distinguish different faces for millions of years, computers are just now catching up.

Figure 2:
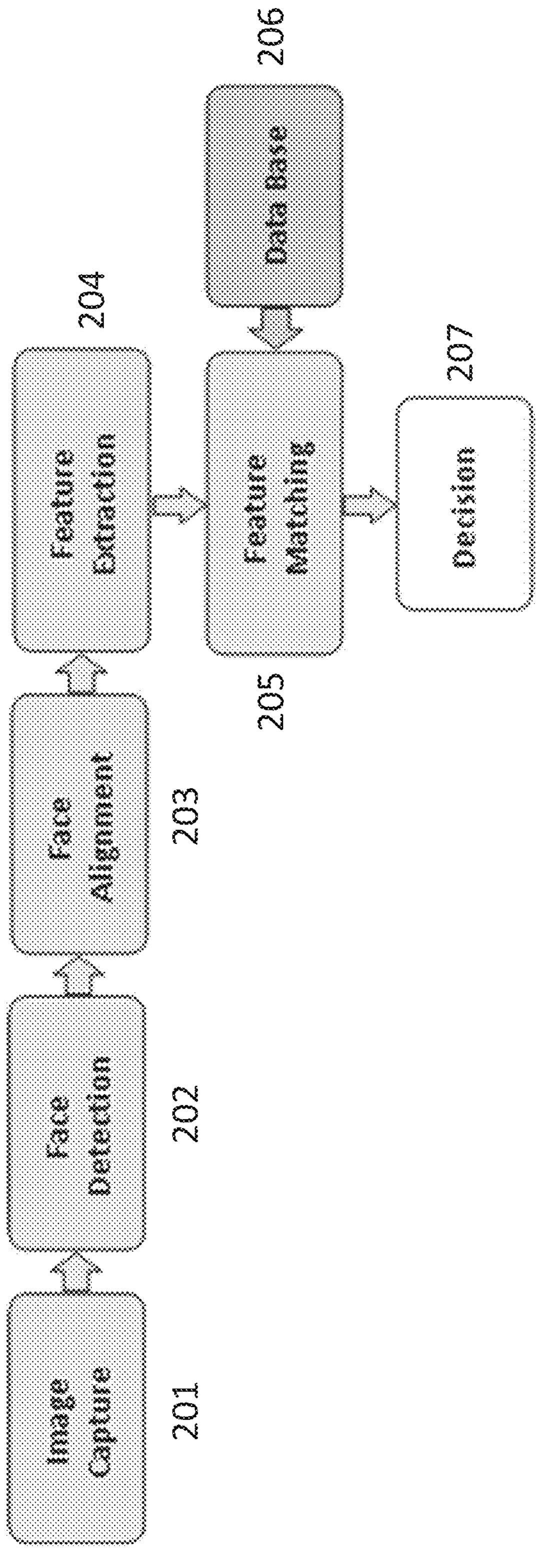
FIG. 2 is a typical facial biometric flow of the present invention.

A typical facial biometric flow is depicted in FIG. 2, and described further below.

Face detection is the identification of human faces in digital images. In essence, it is the task of defining bounding boxes that surround human faces. Face detection is a crucial pre-processing step in any face verification system. Detecting faces in the image allows the extraction of faces from the image and performs an analysis on each face alone and removes it from the background, allowing the system to perform the analysis on each face in the image separately.

In a typical embodiment of face detection, with reference to FIG. 2, in step 201, an image is captured, in step 202, a face is detected (as described in further detail, below), in step 203, face alignment is performed, and feature extraction is performed in step 204. In step 205, an image of a new face may be matched to the features of faces stored in database 206, and in step 207 a decision is made as to whether the new face matches a particular stored face.

For purposes of the present invention, face detection may be the tool used to determine whether only a single person is currently viewing the screen (a single face is located in the frame captured by the camera) or multiple people.

Joint Face Detection and Alignment using Multi-task Cascaded Convolutional Neural Networks is a face detection algorithm that utilizes Multi-Task Cascaded Convolutional Networks (MTCCN). MTCNN makes use of the different levels of the image's Gaussian pyramid to create a bounding box and extract facial land marks of the face. The procedure may be performed using a 3 stage deep convolutional network. Each stage outputs a more refined and more accurate depiction of the face's location in the image.

YOLO: Real-Time Object Detection is a concept recently introduced in the field of real time object detection. YOLO (you only look once) divides a given image into a square grid, predicts bounding boxes for each grid cell and predicts a class probability for it. As a final step, the bounding boxes are merged and a final class prediction is given. YOLO is known to work in a real time rate even when running on relatively simple devices. Seeing as the face viewed may be an object in a digital image, the use of an advanced, state of the art detection system would be a suitable choice.

Face alignment is the task of deforming two facial landmarks such that both will eventually have the same orientation. The task is vital in order to compensate for the high variability of poses in which the face may be captured. It allows for face verification to be feasible without having the user enroll in all possible poses to the camera. The procedure usually involves the use of facial landmarks and creates the best possible correspondence between these landmarks.

One Millisecond Face Alignment with an Ensemble of Regression Trees. This technique is when the framework learns face landmarks in preparation for the actual face alignment, thus allowing for an initial extraction of facial landmarks from the image and aligning the image according to said landmarks. This a priori step allows for real time performance. The alignment process itself may use a cascaded regression pipeline.

Deep Alignment Network: A convolutional neural network for robust face alignment Deep Alignment Network (DAN) is deep neural network that includes several stages. Each single stage of DAN includes a feed-forward neural network which performs landmark location estimation and connection layers that generate the input for the next stage. DAN moves between all stages 3 inputs; and input image which has been warped so that the current landmark estimates are aligned with the canonical shape, a landmark heatmap and a feature image. The advantage of DAN is that it extracts features from the entire face image rather than the patches around landmark locations. An additional advantage is the use of a landmark heatmap that is an image with high intensity values around landmark locations where intensity decreases with the distance from the nearest landmark.

Feature extraction is the stage in which a biometric vector is extracted from the image to later be used by the matcher to determine whether two facial images are identical.

FaceNet: A Unified Embedding for Face Recognition and Clustering. FaceNet is a system that directly learns mappings from image faces to a compact Euclidean space where distances directly correspond to a measure of face similarity. The framework goes through a learning procedure allowing it to extract features capable of differentiating different facial images. This framework is based on the use of positive and negative examples of facial images. For each user, an anchor is determined. The framework attempts to bring positive (images of the same individual) "closer" in the formed feature space and negative (images of different individuals) "further away". Said framework allows determining whether two facial images came from the same source or from different sources.

Video-Based Face Recognition Using Ensemble of Haar-Like Deep Convolutional Neural Networks. This framework treats the extraction stage of the features as a two stage operation. At the first stage, a neural network extracts features from the facial image. At the second step, three networks embed asymmetrical and complex facial features. This framework extracts facial embedding that can be fed into a matcher deciding if two faces came from the same source or from different sources.

Feature matching is the matching of feature vectors extracted from two different images. The matching may be performed in various different ways, including but not limited to:

- Euclidean distance—calculation of the Euclidean distance between two feature vectors and making a decision based on the distance between the two.
- Feature—Based Block Matching Algorithm-match face features by integral projection technique.
- Neural network—use a classifier to match between features.

Some advantages of Face Recognition include:

- All hardware requirements are comfortably located on any smartphone/tablet/laptop/desktop, etc. these days.
- As in the case of many biometric methods, makes remembering passwords completely redundant.
- This system has minimal requirement from the user. The use of state of the art detection and alignment algorithms has brought upon a new age in which a user can be identified in pretty much any pose and in most illumination conditions.

Disadvantages of Face Recognition:

- Very simple manipulations may be performed to fake a person's face. However, solutions to prevent this from happening are known.
- Face verification requires a minimal amount of illumination. In absence of such illumination, the method may fail.

2. Fingerprint Recognition

A fingerprint in its narrow sense is an impression left by the friction ridges of human finger. The fingerprint pattern is permanent and unchangeable. The probability that fingerprints of two individuals being alike is approximately 1 in quadrillion.

Figure 3:
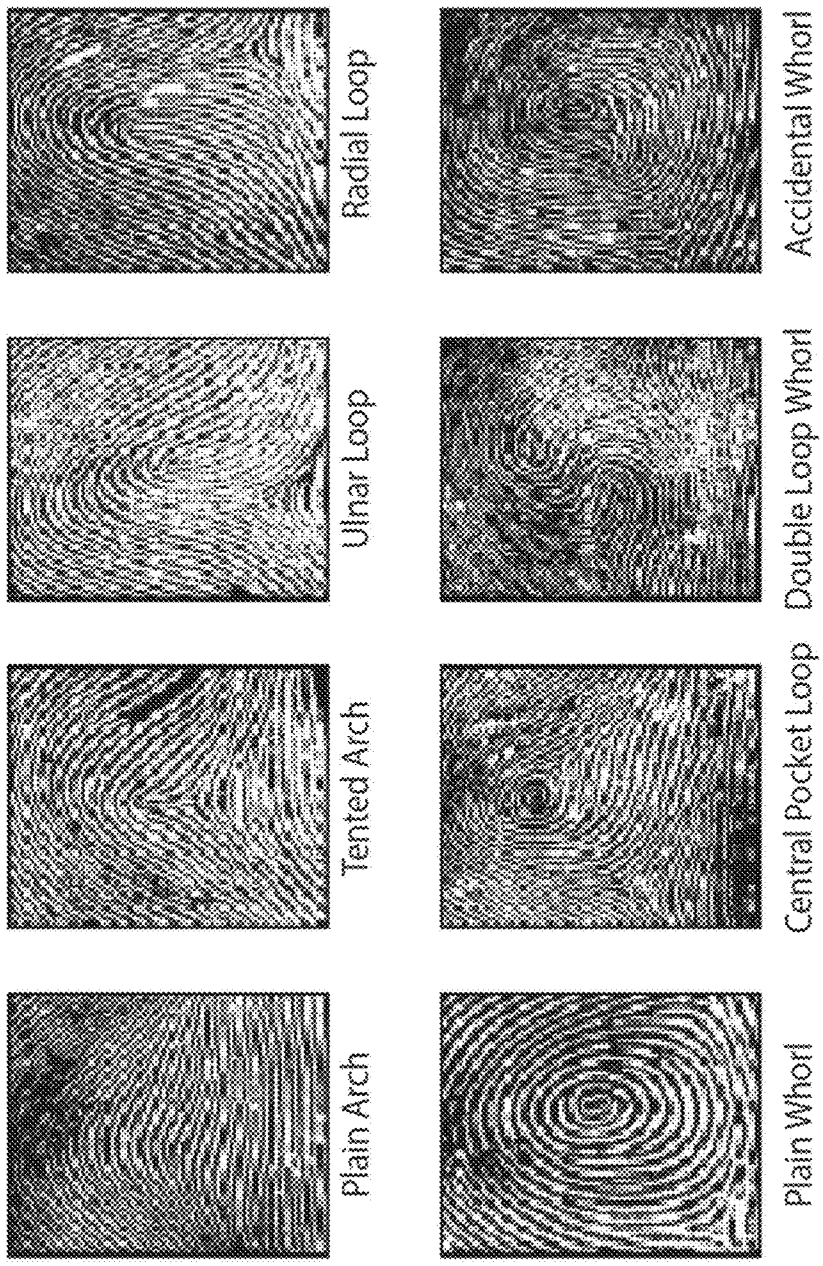
FIG. 3 depicts common fingerprint patterns.

FIG. 3 depicts common fingerprint patterns.

Figure 4:
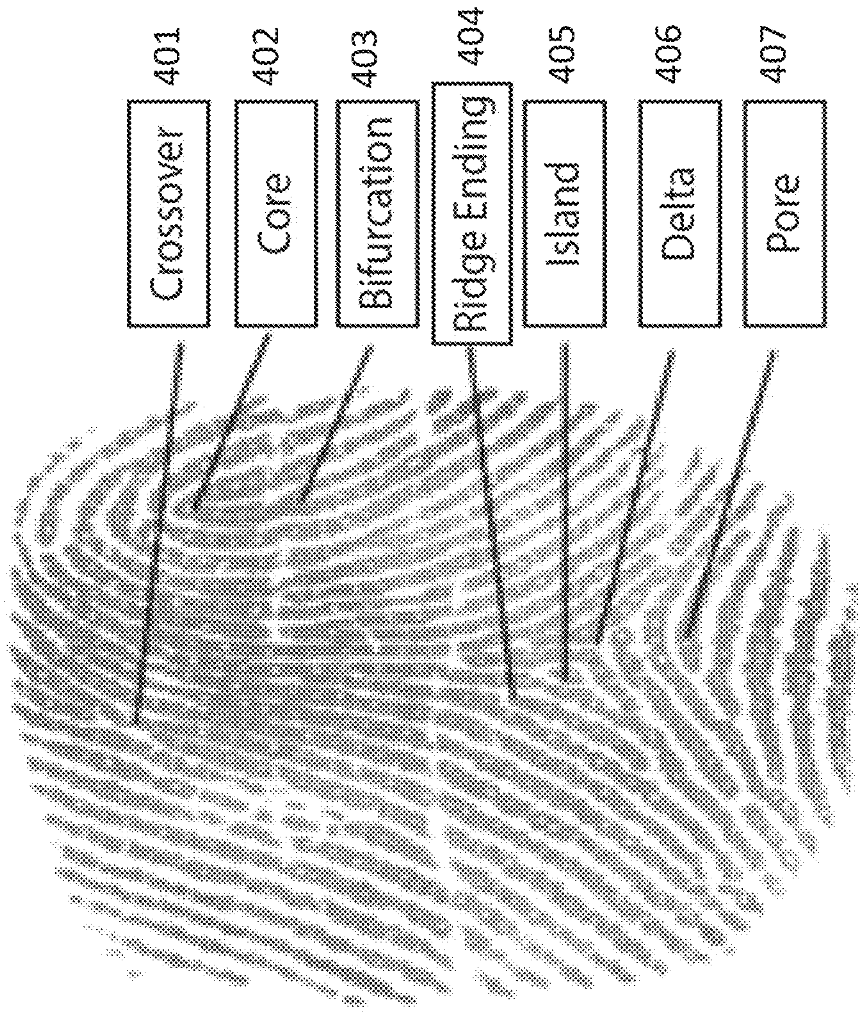
FIG. 4 depicts fingerprint classification features.

Most automatic systems for fingerprint matching are based on minutiae matching. Minutiae classification is based on:

- Crossover: two ridges cross each other
- Core: center
- Bifurcation: ridge separates
- Ridge ending: end point
- Island: small ridge between 2 spaces
- Delta: space between ridges
- Pore: human pore FIG. 4 depicts fingerprint classification features, such as Crossover 401, Core 402, Bifurcation 403, Ridge Ending 404, Island 405, Delta 406 and Pore 407.

Figure 5:
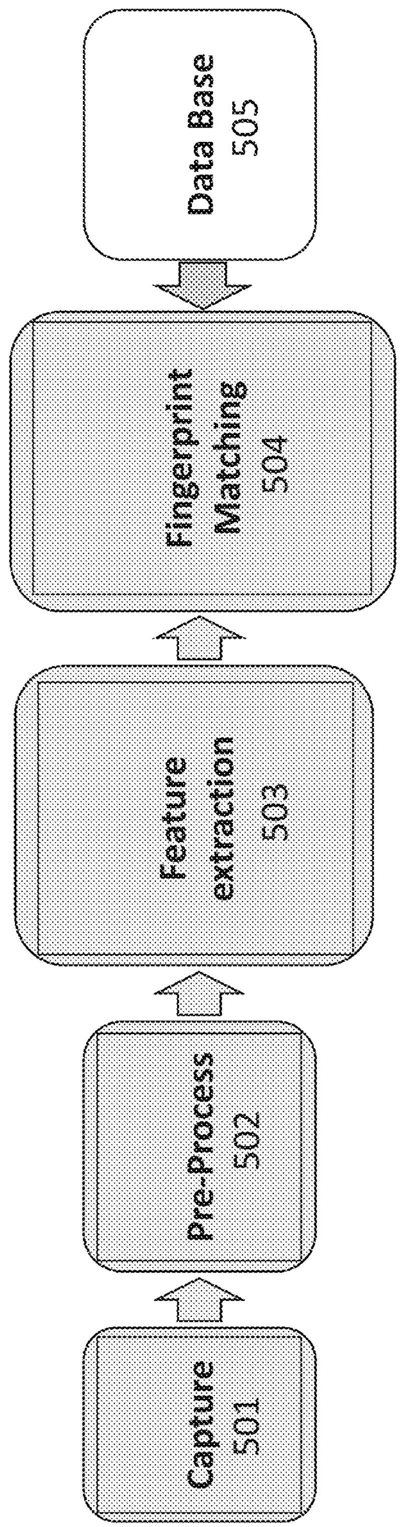
FIG. 5 depicts a typical fingerprint recognition process.

FIG. 5 depicts a typical fingerprint recognition flow, described in further detail thereafter.

In step 501, a fingerprint is captured, in 502 pre-processing occurs, features are extracted in step 503, and fingerprint matching is performed in step 504, based on stored fingerprints in database 505.

Two main technologies may be used to capture an image of the fingerprint

Optical-use light refracted through a prism

Capacitive-based-detect voltage changes in skin between ridges and valleys

Pre-process is the method that prepares the image to facilitate further work with the image. The pre-process can include the enhancement of the image, the binarization of the image, finding a region of interest (ROI), thinning of the fingerprint image, detecting a core point, and minutia extraction.

Thinning of the fingerprint image: Generally, the gray values of pixels of ridges in the fingerprint image gradually decrease, going from an edge towards the center of the ridge line, then, increase again going towards the other edge. This represents the definition of a local minimum. The idea is to capture this local minimum line to convert the ridge of (e.g. 5) pixels wide into one pixel wide.

Core point detection: The core (or singular) point of a fingerprint is defined as "the point of the maximum curvature on the convex ridge", which is usually located in the central area of fingerprint. The reliable detection of the position of a reference point can be accomplished by detecting the maximum curvature.

Minutiae extraction: Most fingerprint minutia extraction methods are thinning based where the skeletonization process converts each ridge to one pixel wide. Minutia points are detected by locating the end points and bifurcation points on the thinned ridge skeleton based on the number of neighboring pixels. The end points are selected if they have a single neighbor and the bifurcation points are selected if they have more than two neighbors.

Feature is a piece of information that describes a specific part in and input image. In the feature extraction, an extraction of the features is performed that creates a unique ID code for each of the fingerprints. Extracted features are used in the final matching feature stage to perform fingerprint recognition.

The features of the fingerprint will be represented by the number of minutiae of each type within a specific distance from the core point. This is achieved by dividing the fingerprint image into concentric tracks around the core point.

Fingerprint matching is the process used to determine whether two sets of fingerprint feature come from the same finger. One fingerprint feature is stored into the database and the other is computed from an acquired image of a fingerprint.

The matching may be performed in various different ways, including but not limited to:

Euclidean distance—calculation of the Euclidean distance between two feature vectors and making a decision based on the distance between the two.

Use deep structures, for example Fingerprint Pattern Classification Using Convolution Neural Network or High-Resolution Mobile Fingerprint Matching via Deep Joint KNN-Triplet Embedding.

Advantages of using fingerprint recognition include that it is a very fast technology, and the probability that fingerprints of two individuals being alike is approximately 1 in a quadrillion. The disadvantages include that you must have a fingerprint scanner, and acidity can change a fingerprint.

3. Voice or Spoken Biometrics

Speaker recognition is the identification of a person from characteristics of voices. It is also called voice recognition. There is a difference between speaker recognition (recognizing who is speaking) and speech recognition (recognizing what is being said). These two terms are frequently confused, and "voice recognition" can be used for both.

Speaker verification may be performed for text-dependent cases (unique pass phrase for a user) or for text-independent cases (the user is verified based on voice print alone, independently of what is said). This section will focus solely on methods for text-independent methods as we see these methods as the future of the field. Moreover, using text-independent recognition, one may form a second layer of pass-phrase matching to convert it into a text-dependent method.

Voice Activity Detection is the process in which voiced segments are extracted out of the entire speech signal. Speaker analysis should preferably be performed only on segments recognized as speech as silent segments are shared amongst all speech signals.

Most speaker verification techniques are based on features called Mel-Frequency-Cepstral-Coefficients (MFCC). MFCC is a representation of the short-term power spectrum of a sound, based on a linear cosine transform of a log power spectrum on a nonlinear mel scale of frequency. The MFCC features are extracted directly from the audio signal after several pre-processing steps that may vary as a result of different classification algorithms.

Figure 6:
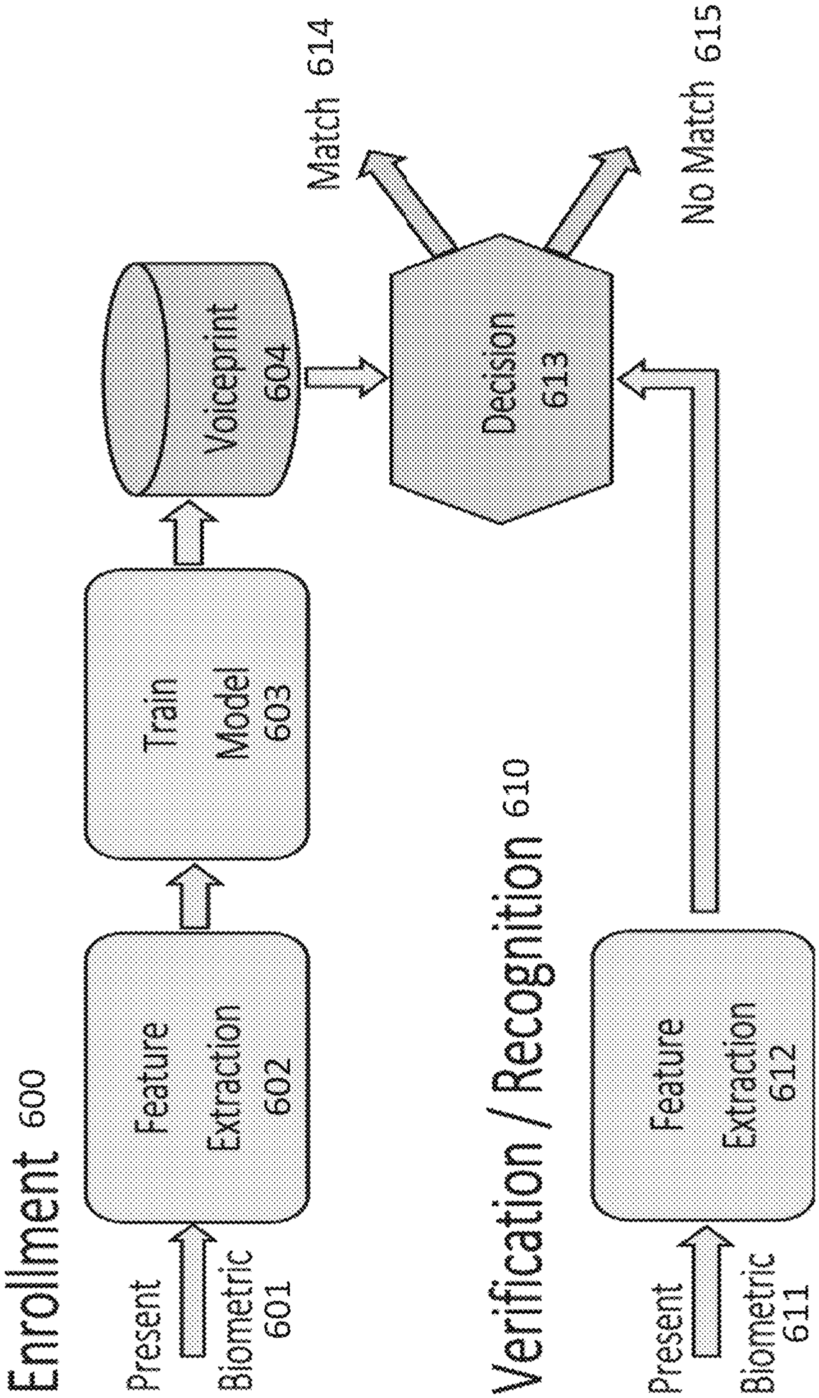
FIG. 6 depicts a typical flow of speaker biometrics.

FIG. 6 depicts the typical flow of speaker biometrics, described in further detail hereafter.

In one embodiment, two overall processes may be used for speaker biometrics-enrollment 600 and verification/recognition 610.

In step 601 of the enrollment process, the speech biometrics of a user to be enrolled may be presented. Features of the speech may be extracted in step 602, and a model may be trained (as will be described in further detail below) in step 603. A voiceprint is created and stored in step 604.

In the verification/recognition process 610, a person's speech biometrics may be presented in step 611, features are extracted in step 612, and in step 613, the extracted features are compared to the voiceprints (stored in step 604), resulting in a decision-match (614) or no match (615).

Again, most speaker verification techniques are based on features called Mel-Frequency-Cepstral-Coefficients (MFCC). MFCC is a representation of the short-term power spectrum of a sound, based on a linear cosine transform of a log power spectrum on a nonlinear mel scale of frequency. The MFCC features are extracted directly from the audio signal after several pre-processing steps that may vary as a result of different classification algorithms.

More recent approaches make use of various deep learning algorithms. The learning portion in these methods attempts to find the best possible features for discriminating between different speakers. These algorithms provide an "extractor" to be used in extracting features from new, unseen utters.

In one embodiment of a speaker verification system, the system is built around the likelihood ratio test for verification, using simple but effective Gaussian mixture models (GMMs) for likelihood functions, a universal background model (UBM) for alternative speaker representation, and a form of Bayesian adaptation to derive speaker models from the UBM. This method requires an initial learning step in which a UBM is created. This model is meant to capture the total variance of all possible speakers. The result is a model of the distribution of all background models.

At the verification phase, an utter is tested for the probability of it belonging to a set of speaker features or of it belonging to the UBM, and a decision is made based on the likelihood ratio. More recent approaches use SVM (support vector machines) and deep networks for binary classification for the task of verification.

4. Liveness Checks

Liveness check is a method that comes to verify that a real person is trying to perform biometric recognition to enter the device. A liveness check method is used in addition to some biometric recognition method (like face recognition, iris recognition, voice recognition). Liveness detection reduces the likelihood of spoofing attempts to succeed, and as such reduces the false acceptance rate. Examples of liveness checks are described below.

Pulse recognition—Pulse may be extracted from video, for example using known techniques.

Advantages of pulse recognition include:

Need short time to detect pulse.

Can work on small devices such smartphone

Helps stop spoofing attacks.

Disadvantages of pulse recognition include:

Usually must be used with additional methods (like face recognition).

Device typically must have 2 cameras.

Reduces user experience, because of the need to add instructions.

Can reduce performance of recognition system, because the liveness check requires computing power.

Blinking—a person may be asked to blink and then a camera may be used to recognize when a person is blinking.

Advantages of blinking recognition include:

Easy to verify that a real person is trying to enter the device

Can be performed on all devices with a camera

Helps stop spoofing attacks.

Disadvantage of blinking recognition include:

Can only be used with additional methods (like face recognition).

Reduces user experience, because of the need to add instructions.

Can reduce performance of recognition system, because the liveness check requires computing power.

Voice recognition—ask a person to say one of a number of random sequences, that appear in a data base, and then match the recorded voice pattern with a voice pattern that appears in data base.

Advantages of voice recognition include:

Helps stop spoofing attacks.

Can be performed on all devices with a microphone.

Disadvantages of voice recognition include:

Must typically be used with additional methods (like face recognition).

Reduces user experience, because of the need to add instructions.

Can reduce the performance of a recognition system, because the liveness check requires computing power.

5. Iris Recognition

The iris is a thin circular diaphragm, which lies between the cornea and the lens of the human eye. It is perforated close to its center by a circular aperture known as the pupil. The function of the iris is to control the amount of light entering the eye by controlling the diameter and size of the pupil. The eye color is defined by that of the iris.

Figure 7:
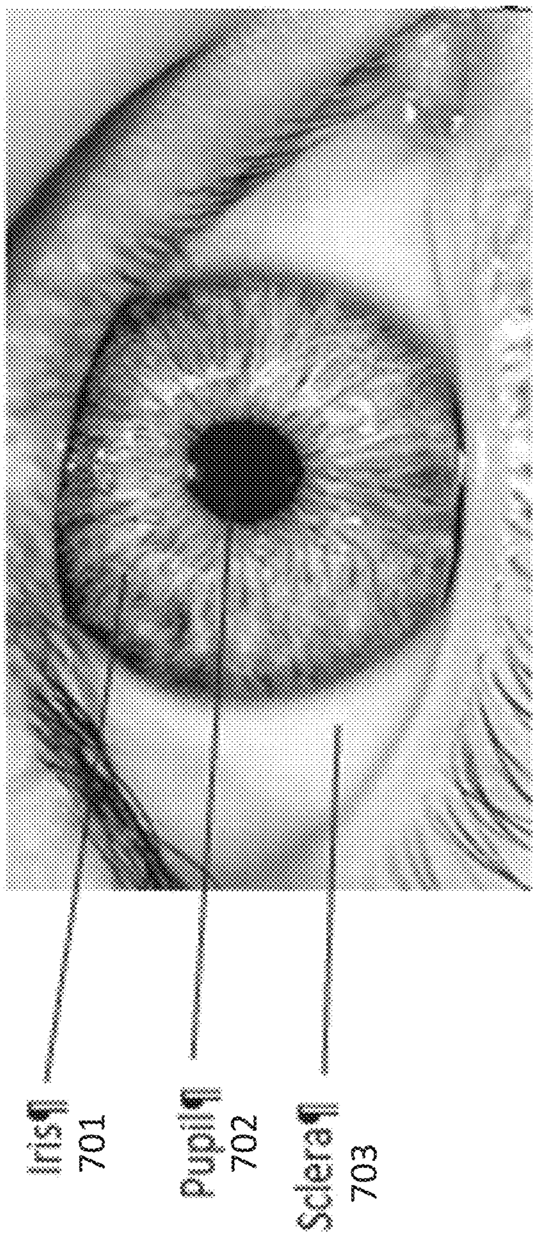
FIG. 7 depicts an eye and its various parts.

FIG. 7 depicts an eye and its various parts—for example, an iris 701, pupil 702 and sclera 703.

Figure 8:
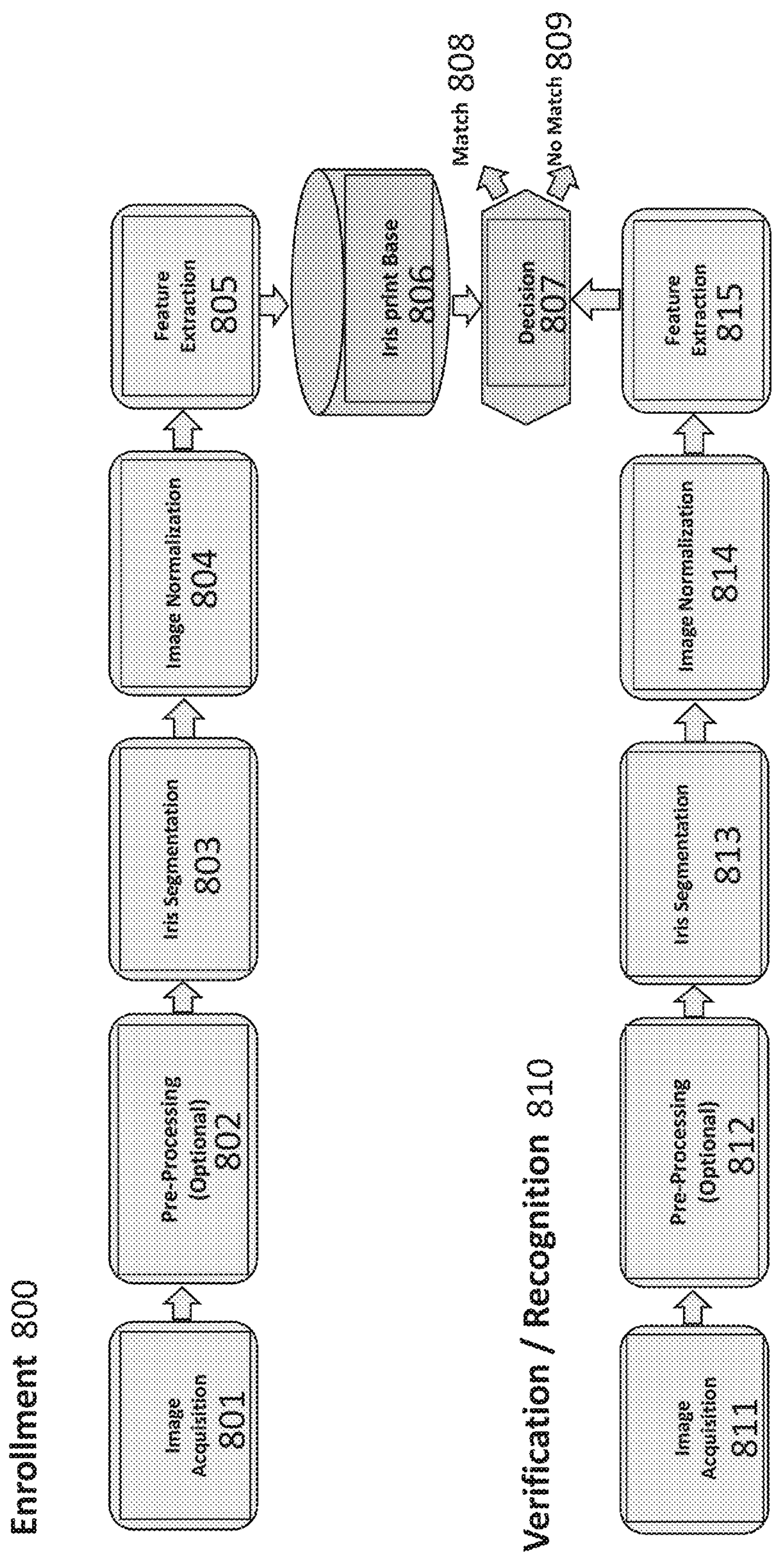
FIG. 8 depicts a typical flow of an iris recognition process.

FIG. 8 depicts a typical flow of an iris recognition process, described in further detail hereafter.

In the enrollment stage 800, image acquisition 801 deals with capturing a sequence of iris images from the subject using cameras and is desirable with sensors that have high resolution and good sharpness. Today it is possible to do so using the front smartphone camera or a modern camera, as examples.

To perform iris recognition the minimum size of an iris needs to be at least 70 pixels, in one embodiment. To achieve an iris size of at least 70 pixels, the maximum distance that the phone can be placed from the eyes is around 50 centimeters. The iris needs to be clearly visible in the image, in one embodiment.

Figure 9:
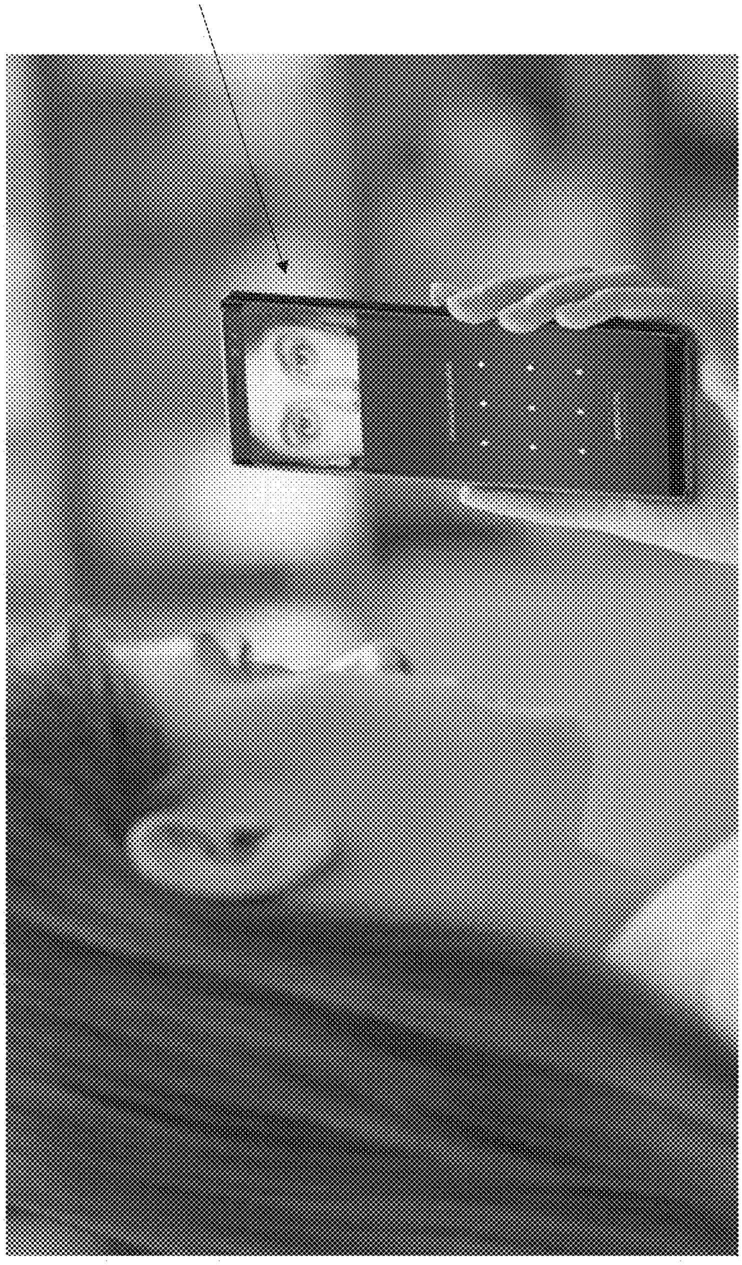
FIG. 9 depicts a typical smartphone with iris scanning capabilities.

FIG. 9 depicts a smartphone 901 (in this case made by Samsung), with iris scanning capabilities.

Referring back to FIG. 8, after an optional pre-processing step (802), iris segmentation 803 is used to locate the valid part of the iris for iris biometrics, including finding the pupillary and limbic boundaries of the iris, localizing its upper and lower eyelids if they occlude, and detecting and excluding any superimposed occlusions of eyelashes, shadows, or reflections. Iris segmentation can greatly affect the iris features that are needed for iris recognition.

Iris segmentation may be performed in various ways, as described in further detail below.

Daugman's algorithm method for iris recognition-a biometric approach. The iris region can be approximated by two circles, one for the iris/sclera boundary and another, interior to the first, for the iris/pupil boundary. To find two circles to be used for approximating the iris region, a combination of circular and linear Hough transforms can be used. The use of the two transforms yields a valid approximation of the iris in the image.

Deep Learning-Based Iris Segmentation for Iris Recognition in Visible Light Environment. This method uses a two-stage iris segmentation method based on convolutional neural networks (CNN), which is capable of robustly finding the true iris boundary in intense cases with limited user cooperation. The first stage is pre-processing which includes bottom-hat filtering, noise removal, Canny edge detector, contrast enhancement, and modified Hough Transform to segment the approximate the iris boundary. The second stage is a deep CNN that is used as input image with fixed size and then fits the true iris boundary. This second stage applies only on a region of interest (ROI) that is defined by the approximate iris boundary detected in the first stage. The choice to apply the second stage only on ROI reduces the processing time and error of iris segmentation. The result of the segmentation stage can be given to iris feature extraction for future matching.

After detecting the bounded iris in the segmentation stage (803), a normalization stage 804 may be performed, in which the bounded iris is converted to an accepted iris template. This is needed, in one embodiment, for future matching 807 between the iris template and iris templates from database 806. Typically, the process is a conversion from Cartesian to non-concentric polar representation of the iris template.

Daugman's Rubber sheet Model by Daugman. Daugman's rubber sheet model ensures the proper handling of the matter due to the specifics of the iris. This model converts the iris area from Cartesian representation to polar representation that maps each pixel in the iris area into a pair of polar coordinates $(r, \theta)$, where r and $\theta$ are on the intervals of

[0 1] and [0 2π] respectively. It accounts for size inconsistencies and pupil dilation of the iris area, but does not compensate for rotational inconsistencies between templates. The output of this stage is an iris template with polar representation that is consistent with template sizes in the data base.

Image Registration modified by Wildes et al. Wildes has proposed an image registration technique for normalizing iris textures. A newly acquired image would be aligned with an image in the database, and a comparison will be performed. The alignment process is a transformation using a choice of mapping function. The alignment process compensates the rotation and scale variations. It must be noted that the normalization is performed in the matching time.

A feature is a piece of information that describes a specific part in an input image. In the feature extraction stage 805, an extraction of the features is performed, that creates a unique ID code for each of the iris normalized representations. Extracted features are used in a final matching feature stage 807 to perform iris recognition (with a result of match 808 or no match 809).

To use the iris recognition of FIG. 8, the verification/recognition stage 810 may be performed. First, image acquisition 811 is performed, as well as an optional pre-processing 812 step. Iris segmentation 813, image normalization 814 and feature extraction 815 are then performed. Finally, the matching decision 807 is performed, based on the database of 806.

Gabor Filters: To extract features from an iris pattern, in polar representation, may use a demodulation process. Local regions of an iris are projected onto quadrature 2-D Gabor wavelets, generating complex valued coefficients whose real and imaginary parts specify the coordinates of a phasor in the complex plane. The angle of each phasor is quantized to one of the four quadrants, setting two bits of phase information. This process is repeated all across the iris with many wavelet sizes, frequencies, and orientations to extract vector of 2048 phase bits (256 bytes) are computed for each iris. In one embodiment, this method is used only for phase information for recognizing irises because amplitude information is not very discriminating.

Iris Recognition with Off-the-Shelf CNN Features: A Deep Learning Perspective. To train a new deep network, a large amount of data is needed. These databases can be paid for or not at all, that is, they have not yet been created or they are still small. Therefore, this method suggests using one of the best known deep networks, such as AlexNet, VGG, GoogLeNet and Inception, ResNet or DenseNet. These deep networks are already trained on huge databases with a large number of classes. These deep networks are designed to recognize visual patterns directly from pixel images with minimal pre-processing. To achieve perfect performance that is close to human's recognition performance, these deep networks extract unique features that help to later recognize a detected object and classify this object to the classes with the similar features. So, this method suggests using the aforementioned deep networks prior to the stage of classification, namely until the stage of feature extraction. And then this feature of iris recognition may be used for matching with features in database.

A multi biometric iris recognition system based on a deep learning approach. This method is a real-time multimodal biometric system that is called IrisConvNet. Its architecture is based on a combination of Convolutional Neural Network (CNN) and Softmax classifier to extract discriminative features from the input images of both the right and left irises of a person without any domain knowledge. The input image represents the localized iris region and then classifies it into one of N classes by fusing the results obtained using a ranking-level fusion method.

Feature matching means finding corresponding features from two similar feature vectors based on a search distance. In one embodiment, one of the feature vectors is named source and the other target. The feature matching process analyzes the similarity of source and target by using a suitable method. The accuracy of feature matching depends on data similarity, complexity, and quality. In general, the more similar the two datasets, the better matching results.

Hamming distance employed by Daugman. The Hamming Distance uses XOR to measure how many bits disagreed between two templates. To get invariance to the rotation when calculating the Hamming distance of two templates, one template is shifted left and right bit-wise and a number of Hamming distance values are calculated from successive shifts. The actual number of shifts required to normalize invariance to the rotation will be determined by the maximum angle difference between two images of the same eye. One shift is defined as one shift to the left, followed by one shift to the right.

Deep neural networks for iris recognition system based on video: stacked sparse auto encoders (SSAE) and bi-propagation neural network models. For iris feature matching this method explains two different algorithms: first is Stacked Sparse Auto Encoders (SSAE) Deep Neural Network model and second is Bi-propagation Deep Neural Network, described further below.

Auto-encoder is an uncensored feature learning system that intends to enhance the feature depiction of inputting high-dimensional data via identifying the relationship amongst data. Training of the auto-encoder is to detect optimum parameters via decreasing the inconsistency between input and its rebuilding. The architecture of basic Sparse Auto encoder (SAE) is the Auto-encoder and cost function to labeled inconsistency between input and its rebuilding that is in Auto encoder. In this method SSAE contain two plains of sparse Auto Encoders (SAE).

The original idea of the bi-propagation algorithm is that the hidden layers of the multilayer perceptron (MLP) obtain the desired values performed with a back-propagation algorithm (Slow algorithm), where a perceptron is an algorithm for supervised learning of binary classifiers. The bi-propagation algorithm in this method is an N-layer perceptron and is divided into N single-layer perceptrons and with that the complex problem of learning is divided into several simpler problems, independent of each other and corrections of weight synapses during learning spread in both directions.

Advantages of iris recognition include:

Requires a simple smartphone/tablet/laptop camera.

Living password cannot be forgotten or lost.

Unique patterns that are hard to fake.

Stable with age.

High accuracy of recognition.

Easy user experience, because while a person is looking at the screen, the camera would normally be able to detect the iris.

Disadvantages of iris recognition include:

Hard to recognize person with low light

Iris may be partially blocked by eyelids which is difficult to control by individuals due to frequent blinking. But partial occlusion of the iris is normal (as no one is constantly attempting to keep their eyes wide open) but this occlusion may cause trouble when attempting to perform verification.

Applying Biometrics to the Present Invention

The present invention may allow for various functions and embodiments, such as the following three functions, each of which can be implemented in a variety of ways. Informally, we can refer to the three overall functions as:

Function 1—"Keep Your eyes off my screen"

Function 2—"Keep your eyes off my document"

Function 3—"Special glasses for viewing the screen"

Figure 10:
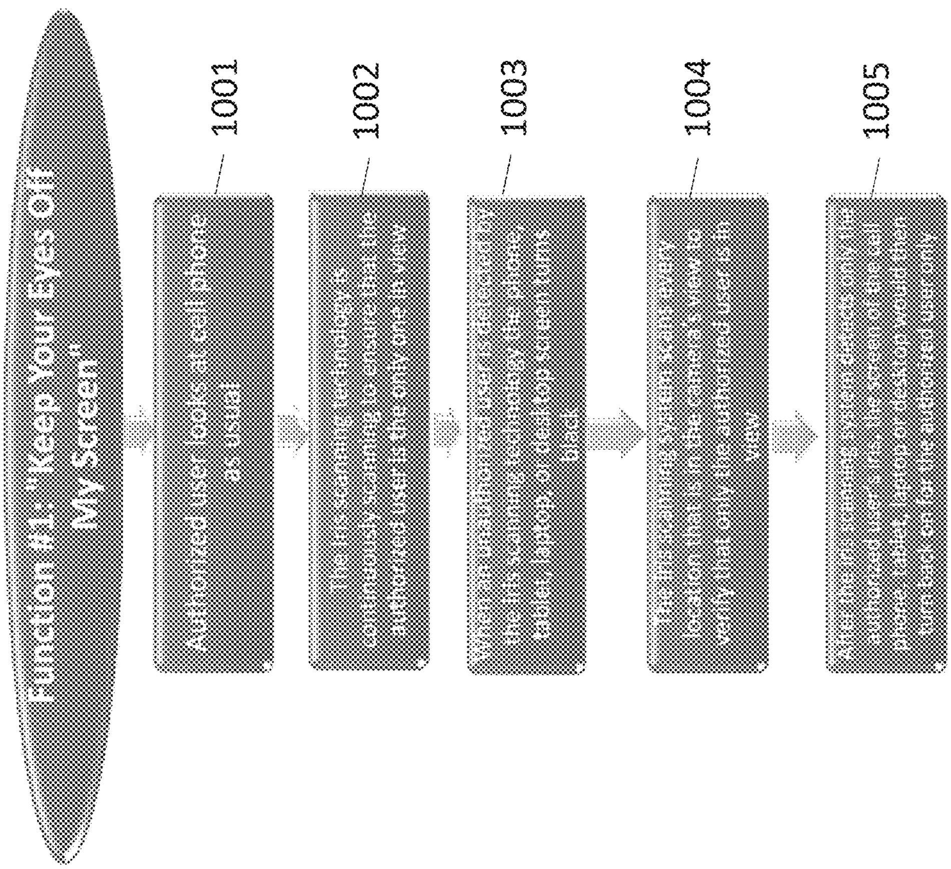
FIG. 10 depicts a first process that may be performed by the present invention.

FIG. 10 depicts Function 1—"Keep your eyes off my screen", in one embodiment. In step 1001, an authorized user of a device (smartphone, laptop, desktop, tablet, etc.) looks at the screen of the device, as usual. In step 1002, the present invention is continuously operating (using biometric technology) to ensure that only the authorized user is viewing the screen of the device. While iris scanning technology is depicted in FIG. 10, any other biometric technology, as described previously, may be used for this purpose, in other embodiments. In step 1003, when an unauthorized user is detected, the screen of the device is turned off, turned black, or otherwise deactivated. In step 1004, the system continues to scan to verify whether only the authorized user is in view. In step 1005, if only the authorized user is detected, the screen is turned back on.

Figure 11:
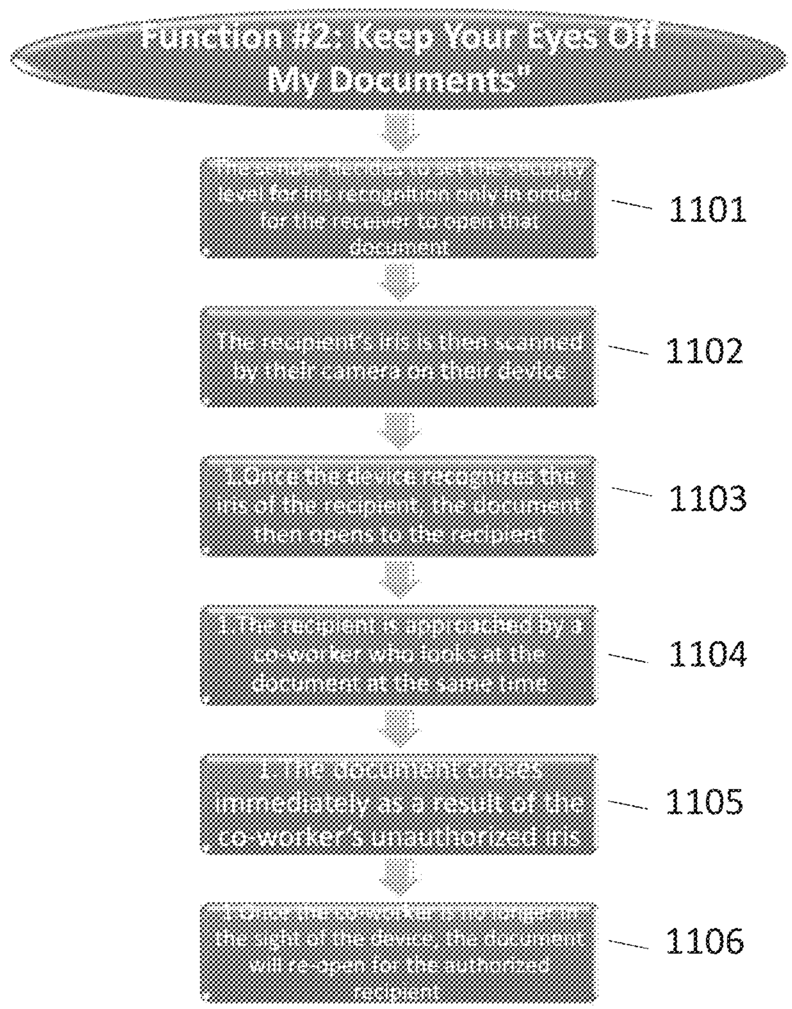
FIG. 11 depicts a second process that may be performed by the present invention.

FIG. 11 depicts Function 2—"Keep your eyes off my document". In step 1101, the user sets the security level for a particular document. In step 1102, the device operated by the recipient of the document scans (such as by using the camera on the device) biometric characteristics of the user of the device (such as by using iris detection, as shown in FIG. 11, but any other biometric detection may be used). In step 1103, once the device recognizes the recipient using the biometric scan, the document opens for the recipient. In step 1104, a co-worker, stranger, etc. approaches the recipient, and tries to view the document on the device, as well. In step 1105, the device detects the stranger, co-worker, etc., and closes the document (or blacks out the screen) immediately. In step 1106, once the stranger, co-worker, etc. is no longer in the sight of the device, the document will re-open for the authorized recipient to view, edit, etc.

To detect whether an authorized user is attempting to view the screen (FIG. 10) or a particular document (FIG. 11), the invention may use a tracking process. When a new face is detected in the camera's field of view or frame, the invention checks and tracks the new face to determine if it is a registered user of the present invention. If a person appears in the camera's field of view whose face is not recognized as a registered user of the present invention, the screen will shut down, in one embodiment. In other words, because there was a person(s) in the camera's field of view whose face(s) was not registered, the invention does not recognize the match, and may shut down the screen.

Figure 12:
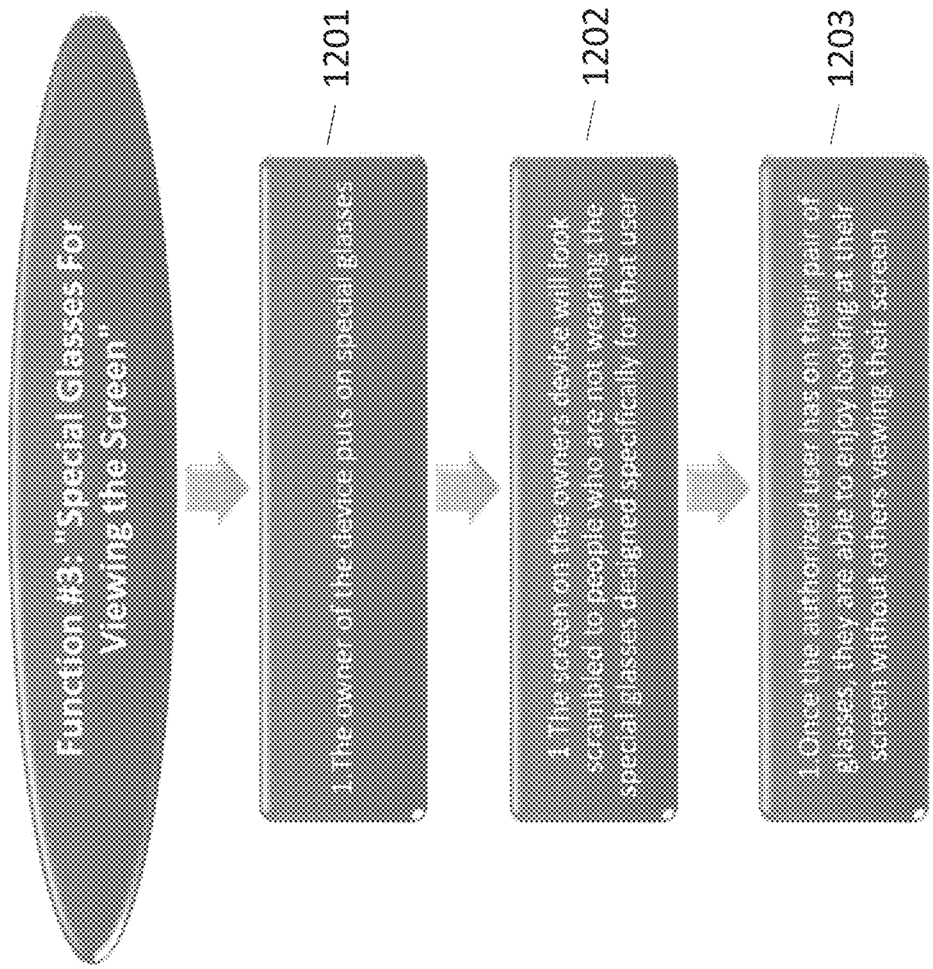
FIG. 12 depicts a third process that may be performed by the present invention.

FIG. 12 depicts Function 3—"Special glasses for viewing the screen". In step 1201, the owner of the device puts on special glasses. In step 1202, the screen on the device will look scrambled to people who are not wearing the special glasses, which have been designed specifically for that user. In step 1203, assuming the authorized user is wearing the special glasses designed for her/him, that user will be able to securely view the screen without any problems.

Figure 13:
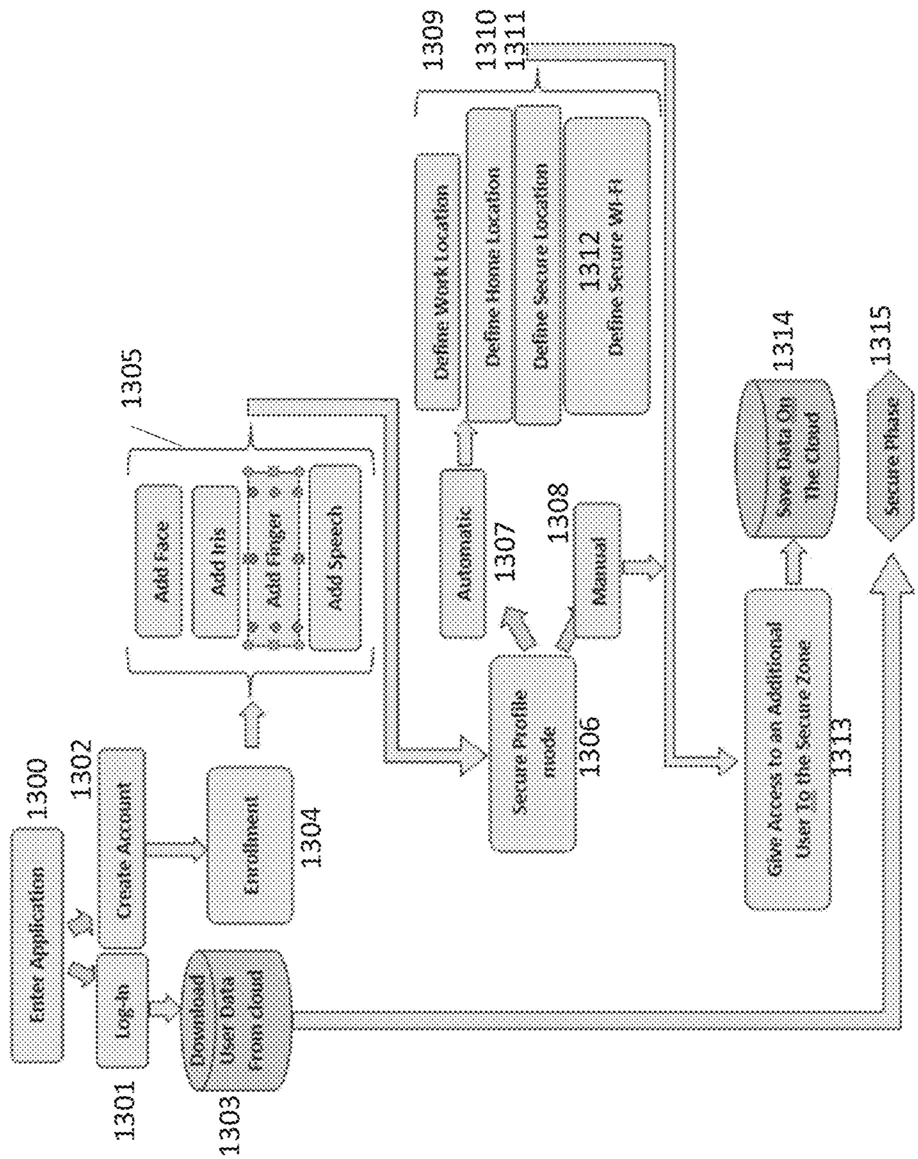
FIG. 13 depicts a typical flow of an enrollment process of the present invention.

FIG. 13 depicts an example flow of an enrollment process according to the present invention, in one embodiment.

FIG. 13 will be described in further detail, below, according to one embodiment.

To use an application (1300), in one embodiment, a user may Log-In to an existing account (1301) or register a new one (1302). If the user Logs-In to the application, the Cloud loads all necessary data for user identification (1303). If the user chooses to create an account, he or she may go through the enrollment phase beginning at step 1304.

Enrollment phase 1305: Application asks user to define secure profiles:

- User may register face for face recognition
- User may register iris for iris recognition
- User may register finger for fingerprint recognition
- User may register speech for voice recognition
- If a device also has a biometric password, then the application may not use it in one embodiment, for more security.

At step 1306, user may choose secure profile mode (automatic 1307 or manual 1308).

- If selection is automatic:
  - User may define work (1309)/home (1310)/secure location (1311)
  - User can register a secure Wi-Fi network (1312)
  - In one embodiment, if the user is unable to define a location (e.g. Wi-Fi and GPS are turned off) the application by default will assign a higher level of a secure profile.
- If selection is manual:
  - User may select secure profile mode regardless of current location or Wi-Fi network or other context.
  - Superuser or administrator may apply rules prohibiting individual users from over-riding the company's security rules.

At step 1313, user can define additional users for access to secure zone. At step 1314, data is saved for identification in a Cloud database Proceeding to secure phase at step 1315:

- Application asks to create/select folder to define a secure zone
- User can add additional folders to the secure zone
- User can add applications (for example email) to the secure zone Different documents typically need different levels of security. For this purpose, secure profiles can be used. They will determine the security level of each document and of all secure environments; for example, in a public place the security level may be the highest, whereas at home it may be the lowest.

Table 1 below provides an example of different secure profile levels which may be used with the present invention. This is just one example—these secure profiles may be implemented in a variety of ways.

TABLE 1

| Secure Profile | Secure methods | Effect on |
|---|---|---|
| Secure Level 1 | 1. Face Recognition | Open application |
| Secure Level 2 | 1. Face Recognition | Open application |
| | 2. Iris Recognition | Open edit documents |
| Secure Level 3 | 1. Face Recognition | Open application |
| | 2. Iris Recognition | Open edit documents |
| | 3. Continue identification | Share Document |
| Secure Level 4 | 1. Face Recognition | Open application |
| | 2. Iris Recognition | Open edit documents |
| | 3. Liveness Check | Share Document |
| | 4. Continue Identification | |
| | 5. Finger Recognition | |
| Secure Level 5 | 1. Face Recognition | Open application |
| | 2. Iris Recognition | Open edit documents |
| | 3. Liveness Check | Share Document |

TABLE 1-continued

| Secure Profile | Secure methods | Effect on |
|---|---|---|
| | 4. Continue Identification<br>5. Finger Recognition<br>6. Voice Recognition | |

Figure 14:
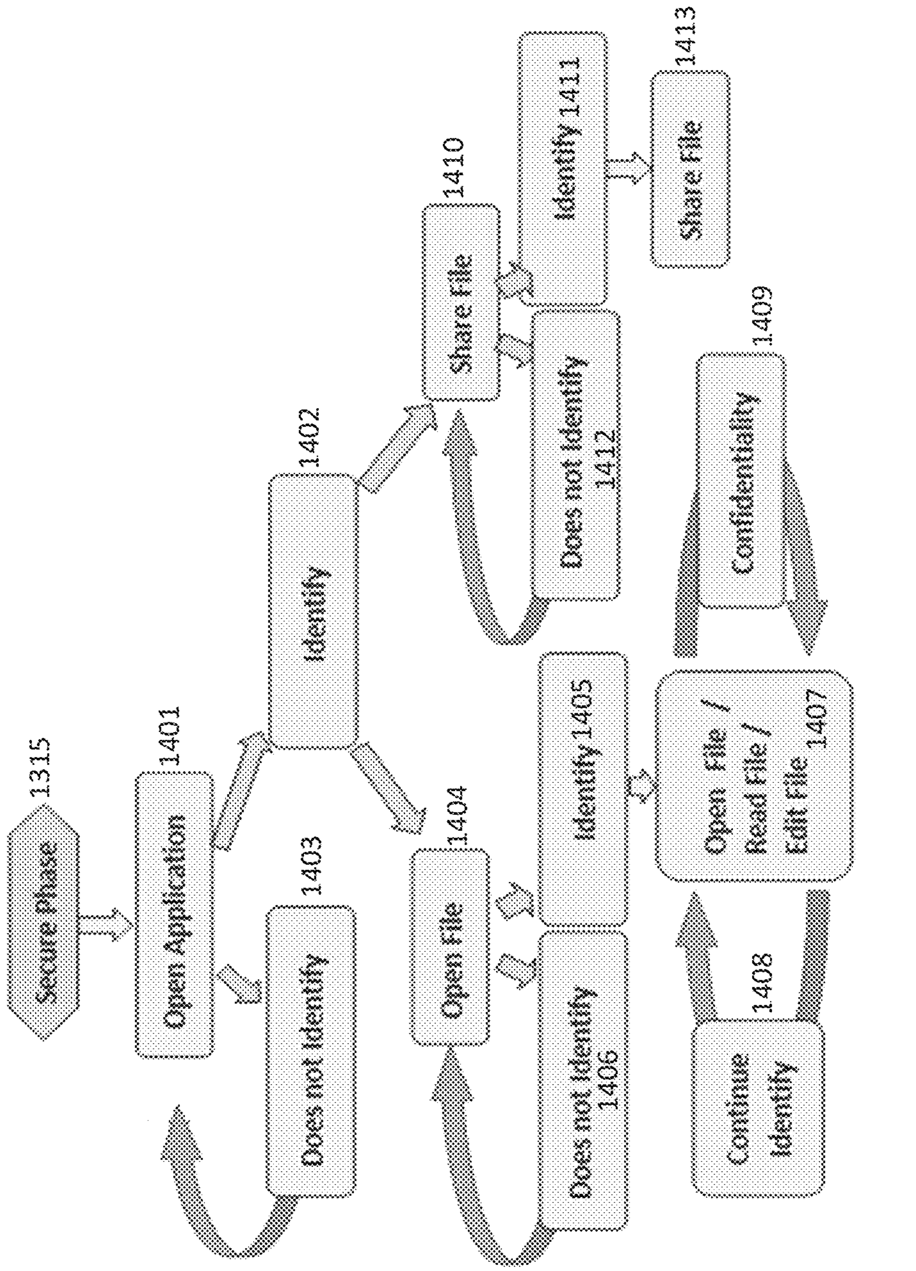
FIG. 14 depicts a typical flow of the secure phase of the present invention.

FIG. 14 depicts an example of the flow of the secure phase 1315, in one embodiment of the invention.

FIG. 14 will be described in further detail, below.

When a user opens an application (1401) the present invention asks for identification according to which a secure profile is activated, based on whether identification takes place (1402) or not (1403). When a user tries to open a document (step 1404), the present invention asks for identification according to which a secure profile is activated, based on whether identification takes place (1405) or not (1406). Similarly, when a user tries to share a file (step 1410), the present invention asks for identification according to which a secure profile is activated, based on whether identification takes place (1411, in which case the file is shared in step 1413) or not (1412). While user reads/edits a document (step 1407), continuous identification (1408) is performed according to which secure profile is activated, maintaining confidentiality (1409). In various embodiments, the file may comprise a document, a movie, a picture, a Word document, a spreadsheet, a computer program, a piece of computer code, a PDF document, or other type of document, known to those with skill in the art.

While user reads/edits a document, the user can pause the secure process by clicking on bottom to show document to a non-registered person. While a user reads/edits a document the system checks that nobody else is looking at the screen for which a secure profile is activated. And if an additional person is looking at the screen, the present invention performs the following steps:

- If the face is in the camera range less than a user defined time (e.g. 5 seconds), then it does not take any action.
- After the user defined time (e.g. 5 seconds) has elapsed, the devices shows a warning on the screen that notifies the owner that someone else is looking at his phone and shows an alert on the screen.
- If within a few seconds after the message appears, the user does not take any response, then the device screen will shut off.
- Additionally, when a warning appears, the owner will have the option to pause "confidentiality" and "continues identification" for showing the document to the companion
- Try to identify second person by face recognition; maybe this user has permission to see documents (user defined him to secure zone).
- If identification succeeds then remove alert, else turn of the screen When user finishes read/edit of document and closes the application then all secure processes are stopped, to give to the device better performance. In one embodiment, the document may be encoded before sharing, and decode can be performed by using same secure application.

The above-described steps describe the present invention as performed in "online mode".

For offline mode: User can download documents to the device and continue to work with the document when a network connection (Ethernet, Wi-Fi, etc.) is not available. However, in one embodiment, the most secure documents cannot be downloaded to the device in this situation. Also, in offline mode, and in one embodiment, not all biometric recognition methods will be available in this situation.

After a network connection is available once again, the downloaded documents may be merged with documents in the Cloud, and all secured documents will be erased.

Implementation Details

The present invention provides security of documents during storage, and also security while reading or editing the document. The security of the documents may be made through an application/software. As described previously, at the opening of an application/software the user will have to pass a primary person identification.

Primary person identification may be based on all (or a subset) of the biometric identification technologies described previously, such as face recognition, fingerprint, voice recognition, iris recognition. Moreover, primary person identification may be dependent on secure profile level. For example, a higher secure profile level may be required for identification of a person's identity. In one embodiment, the identification method may be chosen randomly every time when trying to log in to the application. To achieve better security, in addition to the primary person identification, a liveness check may be dependent on secure profile level. For a more secure profile level, more methods of identification of a person's identity may be required.

For a secure environment, a user may be required to register with the application in which the user is required to perform an enrollment phase (as described previously) that includes: enrollment of iris for iris recognition, enrollment of face for face recognition, enrollment of speech for voice recognition and enrollment of finger for fingerprint recognition. The enrollment phase may be necessary if the device already has some biometric signature, given the need to get the most updated biometric signature.

Additional personality recognition may be performed by device verification, such as by:

- Checking the model of the device which interacts with the Cloud.
- Check the location of the device which interacts with the Cloud.
- Check the IP address of the device which interacts with the Cloud.
- Verify the Wi-Fi network when entering the Cloud.

As described previously, a secure profile associated with each document may be used to determine the security level for the documents, and for all secure environments. User can change existing secure profiles as needed. The user will be able to determine, for each individual document, the level of protection and methods for recognizing the user. For each document, biometric personality recognition may be used, depending on the security level of the document.

During the viewing and editing of the document, continuous identification may be performed that is based, for example, on iris recognition technology to verify that the authorized person is still working with the device. A continuous identification process may run at all times in the background—for example, iris recognition may be performed periodically (such as every 10 seconds, or another suitable interval). Having the iris recognition perform only periodically balances effectiveness and performance. For the iris recognition to perform properly, the person's eyes must be open. If the person blinks then iris detection may fail to detect the person's iris. In this case, backup identification based on another biometric parameter, such as face recognition, may be performed to verify that an authorized person is still working with the device.

Additionally, during the viewing and editing of the document, face detection technology may be used to verify that only an authorized person is looking to the device screen. This process may run at all times (or periodically) in the background and search for additional faces that enter into the camera range, and then check for how long this extra face is in the camera range. If the face is in the camera range less than, for example, 2 seconds then no action may be taken, in one embodiment. Otherwise, the present invention may show a warning on the screen that notifies the owner that someone else is looking at his phone or device. If within, for example, a 10 second period after the message appears, no response is received from the owner, then the device screen will automatically turn off. Additionally, when a warning appears, the owner will have the option to pause “confidentiality” and “continuous identification” to show the document to the companion. User will be able to change the delay and related options.

When a second person is detected in the camera's range of review, the present invention may also try to identify this second person using, for example, face recognition. If it turns out that this second user already has permission to see the document (the user defined him in the enrollment phase), then the alert may automatically be removed. Otherwise, the screen may be turned off it there is no response from the owner's side.

Pause Security is an option to allow the pause of the “confidentiality” and “continuous identification” feature—for example, if an authorized user wants to show the document to a companion. The Pause Security option can be enabled when the system detects an additional face in the camera range or when the owner enables it from the settings. In one embodiment, and for additional security, to enable Pause Security the user may need to perform one random recognition.

To ensure full security on all platforms, all documents and all biometric vectors may be stored in the cloud, in one embodiment. This means that in this embodiment the full engine will be based in the cloud to prevent identity theft from the device. But for situations where access to the Internet is not available, an offline mode may be turned on. In order to be able to continue working offline it may be necessary to download a document and biometric vector to a local disk before offline mode will be activated.

In offline mode, the present invention is able to determine which documents can be viewed or edited. In one embodiment, an option may be included whereby especially important documents would not be able be downloaded to the device. This option may exist because offline capabilities will be available for the limited possibilities of biometric identifications and because the device may not have all necessary hardware to support all secure options. In both offline and online modes, the continuation and backup identification function may be available.

After working with documents offline, and thereafter going back online, the downloaded document may be synchronized with the document in the cloud, and after synchronization is complete, documents and biometric vectors may be erased automatically from the local disk.

In one embodiment, if the security level of the downloaded document is 0, then it can be stored on the device for an unlimited time but after X time biometric vector will be erased automatically from the local disk. In one embodiment, user must determine X time before enabling offline mode.

Additional possible features are described below.

The user may be able to create/select a folder and define it as a secure zone for downloaded documents and biometric vector.

The user can add applications (for example email/word processing software/pdf) to a secure environment.

Different types of information about the document may be stored in the cloud, for example: the date the document was edited, the name of the last editor, etc.

Document sharing may be possible, but only through the application, which means that the receiving party must also be authorized in the application/software and be able to open the document with its biometric identification.

In addition to the present invention that provides “confidentiality” for documents are available several hardware solutions, such as: a screen protector that narrows the viewing angle, a polarized screen protector whereby the user wears glasses, etc.

In addition to the biometric technologies described herein, behavioral profiling may also be used as a passive method of owner recognition.

Overall Architecture of the Present Invention

Figure 15:
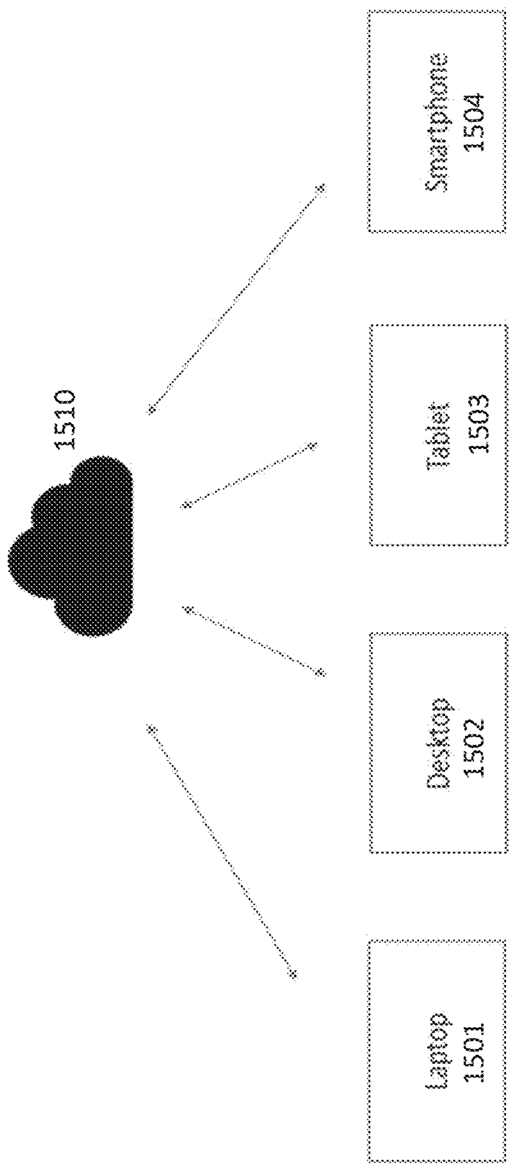
FIG. 15 depicts a typical architecture of the present invention.

The present invention may be implemented on a variety of computing and communications technology platform configurations. In one embodiment, a typical architecture may be as depicted below, with respect to FIG. 15. A device, such as a mobile device (laptop 1501, tablet 1503, smartphone 1504, etc.), a desktop computer 1502, or any other type of device may have an associated display device or screen, through which a document or any other information may be displayed to a user. The device(s) may have their own storage (hard disk, solid state drive, memory, etc.), and may also communicate with storage and functionality in a remote location, such as through a cloud computing platform 1510. Documents and other data may be transmitted between the devices and the cloud, and may also be stored locally on the device(s) itself.

B2C Implementation of Present Invention

An app developed in accordance with the teachings of the present invention may be developed using appropriate iOS, Android or other types of tools. If iOS or Android, the resulting app may appear in the iOS and/or Android store as a B2C app and will function accordingly:

- The user downloads the app from Apple's iOS store or Android App Store.
- The user will then began to fill out the information and use the app according to the flow chart of how the app process flows, as described in further detail below.

In the B2C app, in one embodiment, the system may use a cloud service (such as Amazon AWS cloud) to store all of their data.

OPERATION OF THE PRESENT INVENTION IN ONE EMBODIMENT

While the present invention may be implemented in a variety of ways, sample screenshots in one embodiment from, for example, a smartphone operating in accordance with the present invention are depicted in FIGS. 16.1 to 16.64, as well as in FIGS. 17.1 to 17.99 and FIGS. 18.00 to 18.39.

- FIGS. 16.1 through 16.64 are described in further detail below. Again, the ordering and operations described below are simply illustrative-variations are possible while still operating within the scope of the present invention.

FIG. 16.1. This depicts a sample home screen where the app of the present invention may be located on a user's phone.

FIG. 16.2. This depicts a sample first screen that shows when the app is activated, for the user to begin using the app.

FIG. 16.3. This is where the user logs in as a new user or an existing user, such as with their cell phone number or username.

FIG. 16.4. The new user logs in with their cell phone number.

FIG. 16.5. The new user receives an SMS text message with a verification code.

FIG. 16.6. The new user enters the verification code.

FIG. 16.7. The new user enters their first name, last name, and a username, as an example.

FIG. 16.8. The user sets up their iris recognition, facial recognition, fingerprint pattern, voice recognition, and creates a pattern swipe.

FIG. 16.9. This is where a user is notified that they should set up all of their security features if they have not done so.

FIG. 16.10. This is where the user returns and uses pattern swipe to enter the app/system.

FIG. 16.11. This is where the user returns and uses iris recognition to enter the present invention.

FIG. 16.12. This is where the user returns and uses facial recognition to enter the present invention.

FIG. 16.13. This is where the user returns and uses voice recognition to enter the present invention.

FIG. 16.14: This is where the user returns and uses fingerprint recognition to enter the present invention.

FIG. 16.15. This is the location where files are stored once a user creates and names each folder FIG. 16.16. This is the location where files are located once they are uploaded to the present invention.

FIG. 16.17. This is the homepage where Settings, Notifications, About, Security, Support, Storage, and Login using a desktop are located.

FIG. 16.18. This is where the user's shared documents and files are located.

FIG. 16.19. This is where recently uploaded documents are located.

FIG. 16.20. This is where information about each file is shown, including, for example, the file type, size, owner, security, sharing, location, and who created the file.

FIG. 16.21. This is where the user can push the plus button and scan a document, upload a file, or create a folder FIG. 16.22. This is just a sample document that may be displayed.

FIG. 16.23. This is where the user can do a "Quick Share" and choose Level 1, Level 2, Level 3, or Level 4 for security. The user can also choose View only, Notifications, or offline mode for the recipient of the document to use before the document opens.

FIG. 16.24. This is where the user can delete, rename, move, or star (tag as important) the file.

FIG. 16.25. This is where the document can be downloaded or not.

FIG. 16.26. This refers to the offline mode where the user can choose a time limit on the offline mode.

FIG. 16.27. This is where the user decides who to share the documents with.

FIG. 16.28. This shows the details of the document such as size, owner, file type, who created the document, location, security, and sharing of the document.

FIG. 16.29. This is where the user selects the level of security for each document sent first before a document will open for the receiver of the document. This is an example of how security levels may be used.

For Example:

Level 1: One biometric, push notification

Level 2: Two biometrics, and a pattern swipe

Level 3: Three biometrics

Level 4: Four biometrics.

FIG. 16.30. This is where the user may officially select the biometrics that will be used by the receiver to open the document.

FIG. 16.31. Sharing a file:

For example, the user selects if the receiver can:

1. View: The receiver can only view the document and is not allowed to download the document
2. Download: The receiver can download the document
3. Share: The receiver can share the document with anyone he or she chooses The User can Select the Following:

Location: The user can select a location where the receiver has access to the document. For example, if the user selects the address of the receiver's employer, then the receiver can only open the document at that address. The user can choose that the receiver can be in any location and the document will open.

Wi-Fi IP ADDRESS: The user can choose an IP address that the receiver must use for the document to open. The user may select an electronic address associated with a network in lieu of, or in addition to, a Wi-Fi IP address. If the receiver is not using that IP address, then the document will not open. The user can also decide not to specify an IP address for the receiver to use and the receiver can open the document on any Wi-Fi IP address.

Time Limit: The user can decide how long the user can have access to the document. For example, Unlimited time, 24 hours, 48 hours, 72 hours, etc.

Offline access: The user can choose if the receiver can receive documents offline when there is no internet available.

Notifications: The user can receive notifications for when files are shared, sent, or added.

FIG. 16.32. Select a biometric for the receiver to use before the file opens to the receiver.

FIG. 16.33. This is where the user clicks share or cancel on the file to be sent.

FIG. 16.34. This is where the user selects the time limit that a recipient can have access to the file that the user sends to them.

FIG. 16.35. This is where the user selects the Wi-Fi IP addresses for the recipient to use in order to access the document that the user sends to the recipient.

FIG. 16.36. This is where the user selects the location of where the recipient can access the document that was sent.

FIG. 16.37. This is where the user selects if the receiver is allowed to View, Download or Share the document.

FIG. 16.38. This is where the user can rename a file.

FIG. 16.39. This is where the user can decide to delete a file.

FIG. 16.40. This is where the user can move files into any folder that he or she decides.

FIG. 16.41. This is where the user may add their name, picture, and location.

FIG. 16.42. Notifications: This is where the user may specify to be notified when someone adds a file, or shares a file.

FIG. 16.43. This is the About Us section that may tell the users about the app/system.

FIG. 16.44. This is where the user may use a QR Code from a website or any location where it's located, to use the present invention as a Web App.

FIG. 16.45. This is where the user may add their picture, name, location, phone number and username.

FIG. 16.46. This is where the present invention may show the security that the user set up to access the present invention, as well as safe Wi-Fi IP addresses and safe locations.

FIG. 16.47. This is the notifications section when someone shares a file, or adds a file.

FIG. 16.48. This is the screen that shows when the authorized user has left the camera's view, and is away from the device.

FIG. 16.49. When an unauthorized viewer looks at the user's screen, the facial recognition recognizes the unauthorized user, and then the screen shows a warning sign indicating that multiple viewers looking at the user's screen.

FIG. 16.50. This screen is for the introduction of setting up fingerprint recognition.

FIG. 16.51. This is the screen where the authorized user sets up his or her fingerprint recognition.

FIG. 16.52. This is the screen where it shows that the authorized user has successfully set up fingerprint recognition.

FIG. 16.53. This is the screen for the introduction on setting up iris recognition.

FIG. 16.54. This is where the user sets up the iris recognition.

FIG. 16.55. This is where it shows that iris recognition is successfully set up.

FIG. 16.56. This is the introduction to setting up facial recognition.

FIG. 16.57. This is where the user sets up the facial recognition.

FIG. 16.58. This is where it shows that you successfully set up facial recognition.

FIG. 16.59. This is the introduction of setting up swipe pattern.

FIG. 16.60. This is where the user has set up the swipe pattern.

FIG. 16.61. This is where the swipe pattern is confirmed.

FIG. 16.62. This is the introduction for setting up voice recognition.

FIG. 16.63. This is where the user adds their voice recognition.

FIG. 16.64. This is where the user has successfully set up the voice recognition.

FIGS. 17.1 through 17.99 and FIGS. 18.00 through 18.39 are provided, as well, to further illustrate sample screenshots from a smartphone operating with the present invention, in one embodiment. Details regarding each exemplary screen are provided below each screenshot, in the accompanying figures themselves. Again, the ordering and operations described in FIGS. 17.1 through 17.99 and FIGS. 18.00 through 18.39 are simply illustrative-variations are possible while still operating within the scope of the present invention.

FIG. 17.1. This figure shows the screen in which a user is allowed to upload/cancel a new file and to select the desired security level for the receiver of the document to use in order to open the file.

FIG. 17.2. This figure shows the screen in which the "Attention" sign pops up when a user wants to allow a recipient to download a file.

FIG. 17.3. This figure shows the screen in which a new folder is created to put new files into.

FIG. 17.4. This screen is to input your biometric data such as voice, fingerprint, print behavior, and iris scan. This screen also allows the user to select a certain biometric to choose as a security level.

FIG. 17.5. This figure shows how a user is required to record a series of numbers to understand their vocal sounds.

FIG. 17.6. This figure shows how a user is required to repeat the set of numbers again to understand their vocal sounds.

FIG. 17.7. This figure shows where vocal sounds are recorded.

FIG. 17.8. This figure shows asking the user to repeat a set of numbers to confirm vocal sounds.

FIG. 17.9. This figure shows the capture of hand writing biometrics of a user.

FIG. 17.10. This figure requests the user to repeat their hand writing biometric once again.

FIG. 17.11. This figure shows a screen requesting the user to touch their fingerprint to the scanner on their device to collect fingerprint data.

FIG. 17.12. This figure shows a screen letting the user know why the facial recognition algorithm was unable to verify them.

FIG. 17.13. This is the screen that allows a user to access folders, shared with me content, deleted content, Smart Eye Web App, Settings, Help, Ability to Switch to personal Smart Eye account or Smart Eye corporate account, ability to log out of Smart Eye and Invite friends.

FIG. 17.14. This screen gives the user the ability to move a file, rename a file, share a file, delete a file, set security default, block a user, check file history, or open a file account.

FIG. 17.15. This screen allows a user to use their personal Smart Eye account or their business Smart Eye account.

FIG. 17.16. This screen displays when an unauthorized viewer looks at a document that a user has open inside of the Smart Eye app.

FIG. 17.17. This screen displays when a user steps away from their mobile phone while they have a file open inside of Smart Eye.

FIG. 17.18. This screen displays when a user looks at the history of a file they received from another user.

FIG. 17.19. This message displays when a document is moved to a folder.

FIG. 17.20. This message displays when a user shares a file with another user.

FIG. 17.21. This message displays when a document is deleted.

FIG. 17.22. This message displays when a product was downloaded inside of Smart Eye.

FIG. 17.23. This message displays when a file is about to be deleted from the owner of the file.

FIG. 17.24. This screen displays an empty folder.

FIG. 17.25. This screen displays a file in bold when a file has not been opened yet by a user.

FIG. 17.26. This screen displays the name of the file, the number of days or hours left for a recipient to view a file, the number of security levels it requires to open a file, the user's name, picture and type of file it is.

FIG. 17.27. This screen displays a file moving in action.

FIG. 17.28. This screen displays all files before and after any file was moved.

FIG. 17.29. This screen displays the user's list of folders and files.

FIG. 17.30. This screen displays when facial recognition was successful on a user that's ready to use Smart Eye.

FIG. 17.31. This screen displays a person's picture that is ready to do facial recognition.

FIG. 17.32. This is the settings page that shows how the user is setup with all their biometrics, signature, profile picture, and the user can delete their entire profile.

FIG. 17.33. This is the page that verifies that a person completed their facial recognition picture.

FIG. 17.34. This is the screen where a person puts their phone number to get set up with Smart Eye.

FIG. 17.35. This is the welcome screen for new or returning users.

FIG. 17.36. This is the SMS code page.

FIG. 17.37. This is the screen showing where a user adds their mobile phone number or their email address for a returning user.

FIG. 17.38. This is the Control Panel where a new employee could be added and would then can use Smart Eye.

FIG. 17.39. This is where an employee would be deleted in the control panel from access to using Smart Eye.

FIG. 17.40. This area of the control panel allows the System Admin to look for an employee.

FIG. 17.41. This is the control panel that has a dashboard, # of users, Organizations that you collaborate with inside of Smart Eye, names of files, Activity Audit, and notifications. The control panel shows the names of all employees, departments, positions, role, number of files sent or received, transactions, and varication of biometric success.

FIG. 17.42. This screen allows you to share a file with a colleague and to create a message to write to him or her.

FIG. 17.43. This screen displays all of the employees in another organization that a user has access to.

FIG. 17.44. This screen displays who a user is about to share with and what the message will be.

FIG. 17.45. This screen displays a list of all organization which use Smart Eye.

FIG. 17.46. This screen displays a user the file history of their file. It shows the type of document, the date uploaded, the owner of the file, who has access to the file, how many hours left on a file that was sent, who signed the document, and who downloaded the document.

FIG. 17.47. This screen displays that a user can not download a document they can just sign, share, move, or delete.

FIG. 17.48. This screen allows a user to send files to personal or corporate list from other companies.

FIG. 17.49. This screen displays setting up voice, fingerprint, print behavior, or iris scan.

FIG. 17.50. This screen displays where new files are uploaded into Smart Eye.

FIG. 17.51. This is the control panel where a system admin can see activity, who performed the activity, who a file was shared with and the time limit on that file.

FIG. 17.52. This is the control panel where a system admin can see when a file was uploaded, type, name of file, size of file, organization it went to, owner of the document, who signed it, status of the file, security level, and varication fails.

FIG. 17.53. This screen which explains that the facial recognition didn't recognize the user because of not enough light, too much light, hat that shades your facial recognition features required to recognize a user, sunglasses block key points in the face, or face mask that is on that doesn't allow facial recognition to recognize the user.

FIG. 17.54. This screen allows the receiver to change the status of the document that was sent in such as a invoice and the status of that invoice being accepted such as pending, in progress, approved or declined.

FIG. 17.55. This screen displays the status of the document that was sent in such as a invoice and the status of that invoice being accepted such as pending, in progress, approved or declined.

FIG. 17.56. This screen is where a user will go to before the status is changed on a document.

FIG. 17.57. This is the screen where a system administrator can sign into the Control Panel to with their mobile number to access all of the features.

FIG. 17.58. This is where the system admin enters the SMS text that comes to their cell phone and an error message happened because it was the wrong code.

FIG. 17.59. This is the screen where the SMS code is entered.

FIG. 17.60. This is the screen where employees enter the name of their organization.

FIG. 17.61. This is the Dashboard screen that show all of the activity inside of the organization. It shows notifications that an outside organization wants to collaborate with a user's organization. It displays the number of accounts it has, the number of employees, number of files shared, number of files owned by the organization, the file status (such as in progress, approved, declined, pending.)

FIG. 17.62. This screen displays the Activity Audit which shows all activity on documents inside the organization such as deleted, signed, downloaded, shared and many more activities. It shows the file type such as pdf, jpg, or word documents. It also shows the file's name, which organization it came from, the owner of the files name and the security level on the file.

FIG. 17.63. This screen on the control panel allows the system admin to search for documents from an employee.

FIG. 17.64. This screen allows the for a change in departments from an employee that may have moved to a different department in the company.

FIG. 17.65. This screen allows a system administrator to search for a file by name.

FIG. 17.66. The screen displays the outside organizations that the user's company is currently collaborating with or is waiting to collaborate with.

FIG. 17.67. This screen allows an admin to request another company that uses Smart Eye to collaborate with their organization.

FIG. 17.68. This screen allows the system admin to add a new employee to use Smart Eye.

FIG. 17.69. This screen allows a system admin to add new employees by importing an excel file as an example.

FIG. 17.70. This screen allows the system admin to find an employee inside of their organization to view all activity.

FIG. 17.71. This screen displays that a new just came on the system and the system admin could do nothing or they could delete the employee.

FIG. 17.72. This screen allows the system admin to allow access to Smart Eye by adding the employees that the system admin selected.

FIG. 17.73. This screen displays all the files inside of the organization and outside of the organization that have communicated through Smart Eye. It shows the security levels, verification fails, who signed the document, status of the document, name of the file, the size of the file, which department, and the owner of the file.

FIG. 17.74. This is the sign into Smart Eye page that allows a user to check the box if they are a corporate account or just an individual user.

FIG. 17.75. This screen displays when a owner of a document gives the permission for a recipient to download a document/file.

FIG. 17.76. This screen appears when a person has success entering the Smart Eye control panel.

FIG. 17.77. This screen displays when a system admin wants to delete a user.

FIG. 17.78. This screen ask users to check the box for accepting our terms of service and privacy policy.

FIG. 17.79. This screen displays to when a user checks the box an then pushes "Sign up and Accept".

FIG. 17.80. This screen displays that a contact declined to sign a document and added a comment why they declined to sign.

FIG. 17.81. This screen displays who received the document and who has or has not signed and the pending signature(s).

FIG. 17.82. This screen displays a document being prepared to share to an approved contact.

FIG. 17.83. This screen displays who signed a document, who declined to sign, and the pending signature of a document.

FIG. 17.84. This screen displays a highlighted area where the contacts need to sign.

FIG. 17.85. This screen displays a document is ready for signature with instructions.

FIG. 17.86. This screens displays a highlighted area where a signature is needed and from which contact.

FIG. 17.87. This screen displays which contacts have received the document, who has signed the document, and who has declined to sign the document.

FIG. 17.88. This screen displays where a signature is needed on a document.

FIG. 17.89. This screen displays the document itself.

FIG. 17.90. This screen displays that the contact was sent notification that the sender is still waiting on a signature.

FIG. 17.91. This screens displays that a reminder to sign the document was sent to the contact.

FIG. 17.92. This screen displays that a contact tapped the marked spot where a signature is required and that the contact has signed.

FIG. 17.93. This screens displays what type of signatures are required for the document.

FIG. 17.94. This screen displays the contacts signature.

FIG. 17.95. This screen displays that the contact has signed the document.

FIG. 17.96. This screen highlights the signature, the initials, and, if needed, a required comment.

FIG. 17.97. This screen displays that the contact has signed and initialed the document.

FIG. 17.98. This screen displays that notification is sent showing the contact has declined to sign.

FIG. 17.99. This screen displays instructions on how to connect your smart phone to your desktop by using a QR code.

FIG. 18.00. This screen prompts you to verify yourself using biometric authentications through your mobile phone.

FIG. 18.01. This screen displays that the sender is sharing a document to a recipient that requires a signature.

FIG. 18.02. This screen displays that the recipient has received and is opening the shared document.

FIG. 18.03. This screen displays that the document is open and is being shared with a smart eye contact. Instructions are also sent with the document.

FIG. 18.04. This screen displays that the sender is setting controls on a document that they are going to send to another recipient.

FIG. 18.05. This screen displays that the owner of file is moving document to another folder.

FIG. 18.06. This screen displays that the owner of file is accessing contact list to select someone to send a document to.

FIG. 18.07. This screen displays that the user will receive a notification each time a document is shared.

FIG. 18.08. This screen displays where the file information is located that tells a user everything about the shared file.

FIG. 18.09. This screen displays that the owner is creating a new folder for a document.

FIG. 18.10. This screen displays that the sender is setting up security permissions for a document.

FIG. 18.11. This screen displays that the folder is empty.

FIG. 18.12. This screen displays that the owner of the document has the ability to rename any document.

FIG. 18.13. This screen displays that the owner of document can add a status to the document.

FIG. 18.14. This screen displays taking a verification picture of a user's face.

FIG. 18.15. This screen displays that the picture is being verified through Smart Eye.

FIG. 18.16. This screen displays that the driver's license is used to verify the user's face through facial recognition from the ID itself.

FIG. 18.17. This screen displays the welcome setup screen to select a business or private account.

FIG. 18.18. This screen displays the system administrator adding a company employer identification number (EIN) for a business account.

FIG. 18.19. This screen displays where a user adds a company name.

FIG. 18.20. This screen displays that there was an error during the driver's license scan and that the license must be re-scanned.

FIG. 18.21. This screen displays that this business does not yet have an account set up through Smart Eye.

FIG. 18.22. This screen displays verification that the user's name is spelled correctly.

FIG. 18.23. This screen displays verification that account set up is complete.

FIG. 18.24. This screen displays that verification was a success.

FIG. 18.25. This screen displays where to add the verification code sent to a user's cell phone.

FIG. 18.26. This screen displays adding a business name to gain access to Smart Eye.

FIG. 18.27. This screen displays that the place to add a profile picture of a user.

FIG. 18.28. This screen displays that the all business users must verify their identities.

FIG. 18.29. This screen displays that there has been an error in that the cell phone number is incomplete.

FIG. 18.30. This screen displays the application scanning and verifying a user's information.

FIG. 18.31. This screen displays that print verification has been set up.

FIG. 18.32. This screen displays the instructions for writing letters to set up print behavior.

FIG. 18.33. This screen displays instructions for correcting set up of the print behavior.

FIG. 18.34. This screen displays the pop-up when the user has written too quickly.

FIG. 18.35. This screen displays advising the user to try again during set up of print behavior.

FIG. 18.36. This screen directs the user to draw the letters shown.

FIG. 18.37. This screen asks the user to write the letters one more time to complete print behavior set-up.

FIG. 18.38. This screen instructs the user to hold the device firmly during print behavior set up.

FIG. 18.39. This screen displays that the user's print behavior could not be verified and that the user must try again to set up print behavior.

Additional Features of the Present Invention

The present invention may include additional features, which may be used in addition to and/or in conjunction with the teachings described previously:

Group Sharing: The sender of a file may upload a document into a group that he or she has created—for example, 20 or 30 people on a board of a company.

Video Chatting: The camera will authenticate a user continuously as they are video chatting. If a user moves out of the camera field of view then the video feed will be disabled.

Voice Commands: A user will be able to give direction verbally to the system of the present invention, to send files, open documents and upload documents into the system. The user's voice is recognized by the system, whereby any other user's voice will not be recognized by the system.

Disability Feature: A person who is visually impaired will be able to give the system commands and the system will read the words out loud.

Screen Sharing Alert: When a user wants to share a document or other file on a screen on a video conference platform (e.g. Zoom, WebEx, Microsoft Teams, Google Meet, etc.), the system will allow this to happen; however the system will send a notification to the control panel that during the video conference the particular documents or files were shown, thereby creating a log of the same.

Documents Scan: Documents are able to be scanned and uploaded into the system.

A description regarding how these features may be structured and used, in various embodiments, is provided below.

Group Sharing: A sender of a file can upload a document into a group that he or she has created. For example, the sender may create a new group comprising members of a Board of Directors of a company or firm:

Group Name: Board Members

Bob Smith

Angelina Allen

Tony Evans

Karen Snow

Figure 19:
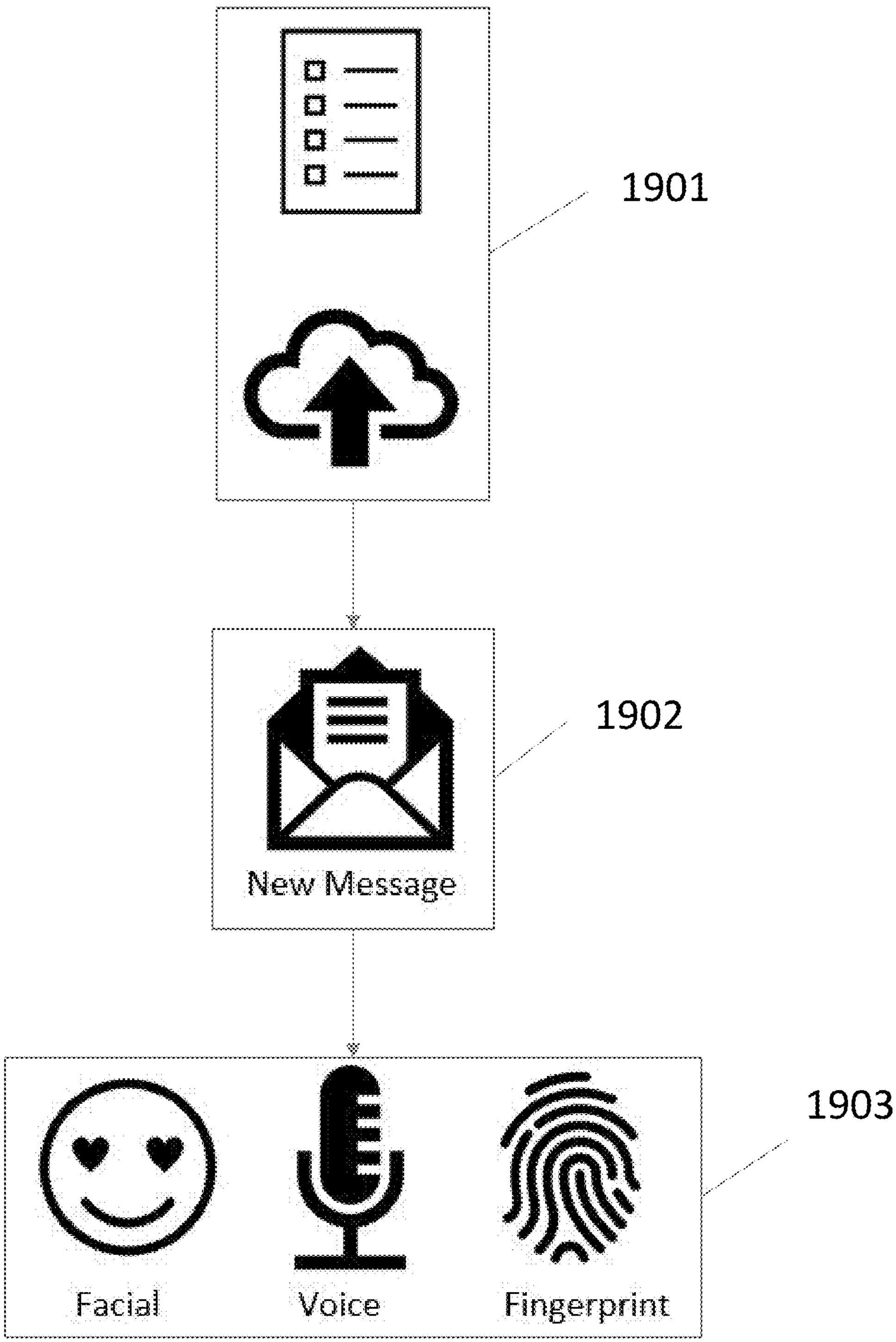
FIG. 19 depicts the steps that may be taken, in one embodiment, to perform group sharing.

FIG. 19 depicts the steps that may be taken, in one embodiment, to perform group sharing. In step 1901, documents are uploaded to the cloud 1510, in a manner similar to what has been described previously, such as with respect to FIGS. 16.1 et seq. In step 1902, each group member (e.g. those listed as Board Members) receives a notification that a new document is available to view. In step 1903, each group member is required to use a certain number of biometrics to access the document, in a manner similar as described previously with respect to FIGS. 14 and 16.1 et seq. Examples of biometrics which may be used include facial, voice, fingerprint, etc. Only after verification, could the recipient(s) access the document.

Video Chatting: The camera on the device (901 of FIG. 9, 1501-1504 of FIG. 15) continuously authenticates/verifies a user, as described previously with respect to the various figures. When the person is out of the camera's view, then the screen is blocked until the user is back in front of the camera to ensure that that viewer is the only one on the video call (see, e.g., FIGS. 10 and 11). The screen may display "Multiple Viewers" if another face is detected by the camera. The screen may also display "Away From Computer or Device", if the authorized user walks away from the device.

The present invention may use facial tracking or other methods to determine if an authorized user is the one that is in front of the camera. If an unauthorized face is tracked, the present invention may block the screen of a video conferencing service (such as Zoom, WebEx, Google Meet, Microsoft Teams, etc.), where the authorized user is registered to look at the screen. Continual facial tracking allows the screen to stay open to the authorized video conference participant. Blocking the screen may include stopping the video feed or stopping the audio feed.

Figure 20:
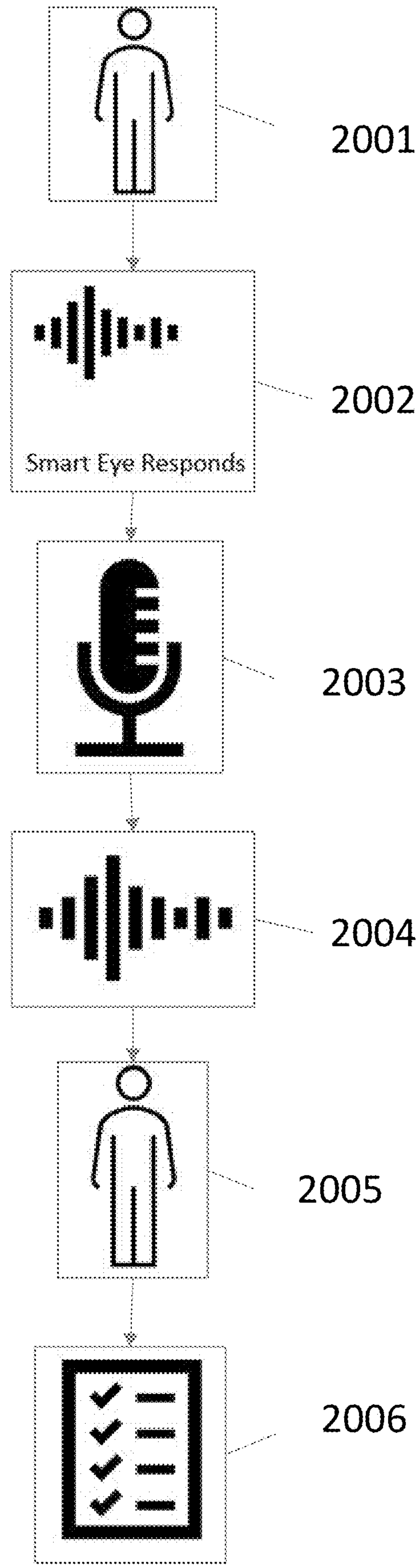
FIG. 20 depicts the steps that may be taken, in one embodiment, to implement voice commands.

Voice Commands: In one embodiment, the user of the present invention may use voice commands to use the app for various actions, as well as other commands:

FIG. 20 depicts the steps that may be taken, in one embodiment, to implement voice commands. For example, in step 2001, a user of the device (901, 1501-1504) may say a specified code word into the device (e.g., "What's up Smart Eye?"), to initiate the voice command feature. In step 2002, the present invention may cause the device to reply to the user by saying, for example, the person's name and "How can Smart Eye help you?". In step 2003, the user may speak a command to send a file to another user. In step 2004, assuming the user's voice is authorized, the system may ask the authorized user if he/she would like to set a number of biometric security levels, if the recipient can download or share with others, etc. In step 2005, the authorized user may reply with the number of biometric security levels, the ability to download or not, the ability to share the file, etc. In step 2006, the system agrees to send the file to the desired recipient(s), and this process is executed, as described previously.

Figure 21:
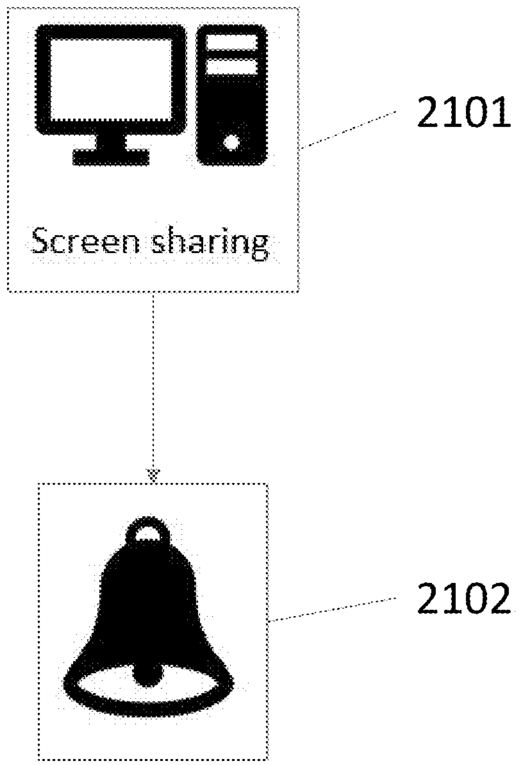
FIG. 21 depicts a screen sharing alert feature of the present invention, in one embodiment.

Screen Sharing Alert: With respect to FIG. 21, the screen sharing alert feature is described. In step 2101, when a user uses a video conferencing platform (such as Zoom, WebEx, Google Meet, Microsoft Teams, etc.), and shows or displays documents inside of the app of the present invention, the present system will send a notification to the Control Panel showing which documents were shown during the screen sharing. In step 2102, an alert may notify the Control Panel's Systems Administrator. In addition, if an unauthorized user appears in the camera field of view of one of the video conference participants while another participant is screen sharing a document meant to be viewed only by authorized viewers, then the system may stop displaying the shared document on the display of the user whose camera field of view has an unauthorized participant.

Figure 22:
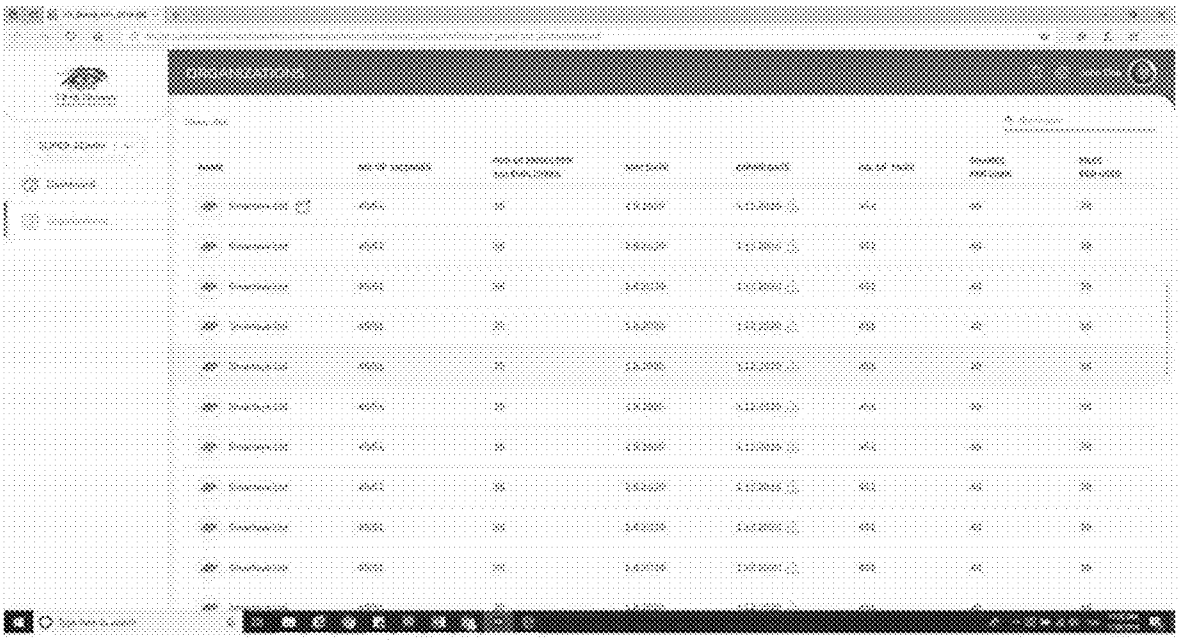
FIG. 22 depicts the organization screen of the super administrator.

While the present invention may be implemented in a variety of ways, sample screenshots in one embodiment from, for example, a smartphone operating in accordance with the present invention are depicted in FIGS. 22, and 22.1 to 22.64.

FIGS. 22 and 22.1 through 22.56 are described in further detail below. Again, the ordering and operations described below are simply illustrative-variations are possible while still operating within the scope of the present invention.

FIGS. 22 and 22.1 through 22.56 are described below.

FIG. 22. This figure displays the super administrator (super admin or super user) organization screen.

FIG. 22.1. This screen displays setting up a new group.

FIG. 22.2. This screen displays administration of a group of users.

FIG. 22.3. This screen displays the shared files inside a group.

FIG. 22.4. This screen displays creation of a group to share files and documents.

FIG. 22.5. This screen displays creation of a new group, naming, and adding users.

FIG. 22.6. This screen displays how to edit the group: renaming, adding, or removing users.

FIG. 22.7. This screen displays documents shared with the user.

FIG. 22.8. This screen displays the Smart Eye menu.

FIG. 22.9. This screen displays the file information owned by the user.

FIG. 22.10. This screen displays adding a contact to a group.

FIG. 22.11. This screen displays icon definitions.

FIG. 22.12. This screen displays the opened file screen from the desktop app.

FIG. 22.13. This screen displays a frequently asked questions (FAQ) how to video.

FIG. 22.14. This screen displays a user's files and folders.

FIG. 22.15. This screen displays the user support questions page.

FIG. 22.16. This screen displays what the icons do in the "shared with me" page.

FIG. 22.17. This screen displays sharing a document and a filled text box.

FIG. 22.18. This screen displays viewing group information.

FIG. 22.19. This screen displays viewing file information on the desktop app.

FIG. 22.20. This screen displays creating a new group from the desktop app.

FIG. 22.21. This screen displays creating a new group and entering the group name on Desktop app.

FIG. 22.22. This screen displays the sharing a document screen in the desktop app.

FIG. 22.23. This screen displays viewing an approved file in the desktop app.

FIG. 22.24. This screen displays different desktop app view options.

FIG. 22.25. This screen displays viewing an approved invoice from a folder in the desktop app.

FIG. 22.26. This screen displays the different file header widths on the desktop app.

FIG. 22.27. This screen displays different widths for file and folder tabs on the desktop app.

FIG. 22.28. This screen displays viewing the uploaded document in the desktop app.

FIG. 22.29. This screen displays that no camera has been detected so this screen pops up.

FIG. 22.30. This screen displays the warning screen before accepting the deletion of a user's account.

FIG. 22.31. This screen displays the delete app screen before accepting account deletion.

FIG. 22.32. This screen displays the live chat assistance screen.

FIG. 22.33. This screen displays the customer support screen.

FIG. 22.34. This screen displays the FAQ screen.

FIG. 22.35. This screen displays selection of a how to video.

FIG. 22.36. This screen displays sharing options for sharing a file such as changing a security level or saving the receivers as a group.

FIG. 22.37. This screen displays selecting which folder to open for a Smart Eye menu screen.

FIG. 22.38. This screen displays the organizations screen.

FIG. 22.39. This screen displays the organization set-up screen for mobile phone and accepting the terms.

FIG. 22.40. This screen displays an error message when creating an account.

FIG. 22.41. This screen displays preparation of a document for signature using the Adobe sign screen.

FIG. 22.42. This screen displays signature preparing wait screen.

FIG. 22.43. This screen displays a list of icons.

FIG. 22.44. This screen displays sharing a document from a corporate list with multiple recipients.

FIG. 22.45. This screen displays notification that a user has been added to a group and that a file was shared in the desktop app.

FIG. 22.46. This screen displays the changing security settings on a file on the desktop app.

FIG. 22.47. This screen displays renaming a document.

FIG. 22.48. This screen displays deletion of a user.

FIG. 22.49. This screen displays that the document is ready for upload.

FIG. 22.50. This screen displays the document being moved to folder.

FIG. 22.51. This screen displays the super admin dashboard.

FIG. 22.52. This screen displays the super admin organization dashboard.

FIG. 22.53. This screen displays moving a document to a folder.

FIG. 22.54. This screen displays the control panel, dashboard option.

FIG. 22.55. This screen displays uploading a document and setting the file specific security level.

FIG. 22.56. This screen displays the log out from all Smart Eye devices such as the Desktop app and the Mobile app.

FIG. 22.57. This screen displays the company logo.

FIG. 22.58. This screen displays login using a password 2201, security settings 2202, and easy access symbol 2203.

FIG. 22.59. This screen displays the Secure Vault for adding passwords, photos, or voice files.

FIG. 22.60. This screen displays the secure vault for users to save passwords to social media platforms, bank accounts, and all accounts where passwords are used.

FIG. 22.61. This screen displays an embodiment of choosing a vault access method such as face recognition, fingerprint, voice recognition, iris recognition, or print behavior.

FIG. 22.62. This screen displays autofilling a password to enter a social media website.

FIG. 22.63. This screen displays automatically entering a password for some other websites.

FIG. 22.64. This screen displays logging in without a password 2201, and a representation of some alternative methods 2204 for logging in such as voice recognition 2210, print behavior 2212, fingerprint scan 2214, and face recognition, in this embodiment.

B2B Implementation of the Present Invention, and Administration of the Same

The app of the present invention may have an admin panel, for example for business clients. The admin panel may include a variety of features that will help security professionals who manage the company's documents have oversight of documents and files.

Below is a list of features that may in various embodiments be included in the admin panel:

The app may connect to a company's cloud provider(s) such as Azure, Box.com, AWS etc.

The present invention may only act as an interface for the enterprise and not hold any data, since the present invention only connects to their list of cloud providers.

The organization/business may have an Admin panel to use to control and monitor various administrative functions.

The Admin may be able to add or remove employee's access to present invention app, and also provide other functionalities, as described in further detail below.

The Admin may optionally receive notifications or perform an activity audit, as described below:

The Admin may receive a notification when the "Warning Multiple Viewers" sign is dismissed (security was paused) to show another person the document that was being viewed.

The Admin may receive a notification when the employee takes a screenshot of the document with their device.

Several failed attempts to log in with your face, voice, fingerprint, and iris.

Too many shares on a document—the Admin needs to know why is this document so "hot"?

Too much data being used by an employee.

Too much bandwidth being used by an employee.

Unusual behavior: e.g., when there is a sudden spike in the usage of the present invention app. The employee may be searching for specific documents because he or she knows that they are leaving the job for another job.

Additionally, the below describes some security features that may be implemented:

Redirect files with an alias link: This action is taken to hide the location of where the file is located.

Onboarding process: users take a picture of their driver's license or passport to match the facial recognition that they use when they set up the present invention.

Sign documents inside of the app. The signatures are verified by the photo on the driver's license or passport.

Further Implementation Details and Design Alternatives

It will be apparent to persons skilled in the relevant fields that various modules and features of the present disclosure, as described herein, can be implemented in hardware using analog and/or digital circuits, in software, through the execution of computer instructions by one or more general purpose or special-purpose processors, or as a combination of hardware and software.

Embodiments of the present disclosure can be implemented in hardware, or as a combination of software and hardware. Consequently, embodiments of the disclosure may be implemented in the environment of a computer system or other processing system.

Suitable development platforms may be used to implement the various features of the present invention, whether implemented on a server, on the client side (e.g., as an app on a mobile device), or the like. Those skilled in the art will be familiar with such development platforms.

In another embodiment, features of the present invention may be implemented in hardware using, for example, hardware components such as application-specific integrated circuits (ASICs) and gate arrays, or the like. Implementation of a hardware state machine so as to perform the functions described herein will also be apparent to persons skilled in the relevant art(s).

The invention claimed is:

1. A system for managing access to a display of a user device comprising:

a user device with a display;

a detection device for capturing a field of view in proximity to the display; and a processor for:

creating a user profile associated with a user, wherein the user profile includes a plurality of biometric features associated with the user and a weight associated with each of the plurality of biometric features;

creating a file profile associated with a file, wherein the file profile includes an authorized user, functions that the authorized user can perform on the file, and a minimum confidence level required for the user to be identified as the authorized user;

upon detecting in the field of view a person, determining a first biometric feature of the person;

calculating a confidence level using:

the first biometric feature of the plurality of biometric features of the person, the plurality of biometric features from the user profile, and the weight associated with each of the plurality of biometric features of the user profile;

if the calculated confidence level exceeds a predetermined threshold, identifying the person as the authorized user for the file;

if the calculated confidence level falls below the predetermined threshold, requesting the person to provide an additional biometric feature of the plurality of biometric features, and re-calculating the confidence level with the additional biometric feature and the weight associated with the additional biometric feature until either the calculated confidence level exceeds the predetermined threshold or there are no more additional biometric features of the plurality of biometric features to be determined, in which case the user is not identified as the authorized user;

if the person is identified as the authorized user, activating the display to allow the authorized user to perform the functions that the authorized user can perform on the file; and if the person is not identified as the authorized user, deactivating the display to prevent the person from performing the functions that the authorized user can perform on the file.

2. The system of claim 1, wherein the file comprises an application.

3. The system of claim 2, wherein the application is a communication application using text, audio, or video.

4. A method for managing access to a display of a user device comprising a processor, the display and a detection device for capturing a field of view in proximity to the display, the method comprising:

creating a user profile associated with a user, wherein the user profile includes a plurality of biometric features associated with the user and a weight associated with each of the plurality of biometric features;

creating a file profile associated with a file, wherein the file profile includes an authorized user, functions that the authorized user can perform on the file, and a minimum confidence level required for the user to be identified as the authorized user;

upon detecting in the field of view a person, determining a first biometric feature of the person;

calculating a confidence level using:

the first biometric feature of the plurality of biometric features of the person, the plurality of biometric features from the user profile, and the weight associated with each of the plurality of biometric features of the user profile;

if the calculated confidence level exceeds a predetermined threshold, identifying the person as the authorized user for the file;

if the calculated confidence level falls below the predetermined threshold, requesting the person to provide an additional biometric feature of the plurality of biometric features, and re-calculating the confidence level with the additional biometric feature and weight associated with the additional biometric feature until either the calculated confidence level exceeds the predetermined threshold or there are no more additional biometric features of the plurality of biometric features to be determined, in which case the user is not identified as the authorized user;

if the person is identified as the authorized user, activating the display to allow the authorized user to perform the functions that the authorized user can perform on the file; and if the person is not identified as the authorized user, deactivating the display to prevent the person from performing the functions that the authorized user can perform on the file.

5. The method of claim 4, wherein the file comprises an application.

6. The method of claim 5, wherein the application is a communication application using text, audio, or video.

7. A computer program product comprising one or more non-transitory computer readable media comprising computer-executable instructions that, when executed by a processor associated with a user device, the user device comprising the processor, a display, and a detection device for capturing a field of view in proximity to the display, execute a method comprising:

creating a user profile associated with a user, wherein the user profile includes a plurality of biometric features associated with the user and a weight associated with each of the plurality of biometric features;

creating a file profile associated with a file, wherein the file profile includes an authorized user, functions that the authorized user can perform on the file, and a minimum confidence level required for the user to be identified as the authorized user;

upon detecting in the field of view a person, determining a first biometric feature of the person;

calculating a confidence level using:

the first biometric feature of the plurality of biometric features of the person, the plurality of biometric features from the user profile, and the weight associated with each of the plurality of biometric features of the user profile;

if the calculated confidence level exceeds a predetermined threshold, identifying the person as the authorized user for the file;

if the calculated confidence level falls below the predetermined threshold, requesting the person to provide an additional biometric feature of the plurality of biometric features, and re-calculating the confidence level with the additional biometric feature and the weight associated with the additional biometric feature until either the calculated confidence level exceeds the predetermined threshold or there are no more additional biometric features of the plurality of biometric features to be determined, in which case the user is not identified as the authorized user;

if the person is identified as the authorized user, activating the display to allow the authorized user to perform the functions that the authorized user can perform on the file; and if the person is not identified as the authorized user, deactivating the display to prevent the person from performing the functions that the authorized user can perform on the file.

8. The computer program product of claim 7, wherein the file comprises an application.

9. The computer program product of claim 8, wherein the application is a communication application using text, audio, or video.

* * * * *